US012602001B2

(12) United States Patent
Murakami et al.

(10) Patent No.: US 12,602,001 B2
(45) Date of Patent: Apr. 14, 2026

(54) PHOTOSENSITIVE MEMBER UNIT, CARTRIDGE AND ELECTROPHOTOGRAPHIC IMAGE FORMING APPARATUS

(71) Applicant: CANON KABUSHIKI KAISHA, Tokyo (JP)

(72) Inventors: Ryuta Murakami, Shizuoka (JP); Makoto Hayashida, Shizuoka (JP); Takatoshi Hamada, Shizuoka (JP); Yusuke Niikawa, Kanagawa (JP); Akinobu Hirayama, Shizuoka (JP); Toshiki Fujino, Kanagawa (JP); Tachio Kawai, Tokyo (JP); Teruhiko Sasaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 17/854,573

(22) Filed: Jun. 30, 2022

(65) Prior Publication Data

US 2023/0032591 A1 Feb. 2, 2023

Related U.S. Application Data

(63) Continuation of application No. PCT/JP2021/032565, filed on Aug. 31, 2021.

(30) Foreign Application Priority Data

Aug. 31, 2020 (JP) ................................. 2020-145892

(51) Int. Cl.
*G03G 15/00* (2006.01)
*G03G 21/16* (2006.01)
*G03G 21/18* (2006.01)

(52) U.S. Cl.
CPC ....... *G03G 15/757* (2013.01); *G03G 21/1647* (2013.01); *G03G 21/186* (2013.01);
(Continued)

(58) Field of Classification Search
CPC ............. G03G 15/757; G03G 21/1647; G03G 21/186; G03G 21/1864; G03G 2221/1654;
(Continued)

(56) References Cited

U.S. PATENT DOCUMENTS 2,982,146 A * 5/1961 Stoeckicht ................ F16H 1/08 74/410
4,829,335 A 5/1989 Kanemitsu et al.
(Continued)

FOREIGN PATENT DOCUMENTS

CN 1808301 A 7/2006
CN 101794100 A 8/2010
(Continued)

OTHER PUBLICATIONS

Co-pending U.S. Appl. No. 17/899,758, filed Aug. 31, 2022.
(Continued)

*Primary Examiner* — Francis C Gray
(74) *Attorney, Agent, or Firm* — Venable LLP

(57) ABSTRACT

A photosensitive member unit is detachably mountable to a main assembly of an image forming apparatus. The photosensitive member unit includes a photosensitive member rotatable about a rotational axis thereof, a rotatable first helical gear portion; and a second helical gear portion integrally rotatable with the first helical gear portion. A twisting direction of a tooth of the second helical gear portion is the same as a twisting direction of a tooth of the first helical gear portion, and a helix angle of the tooth of the
(Continued)

second helical gear portion is greater than a helix angle of the tooth of the first helical gear portion.

41 Claims, 114 Drawing Sheets

(52) U.S. Cl.
CPC . *G03G 21/1864* (2013.01); *G03G 2221/1654* (2013.01); *G03G 2221/1657* (2013.01)

(58) Field of Classification Search
CPC ........ G03G 2221/1657; G03G 21/1857; F16H 1/08
See application file for complete search history.

(56) References Cited

U.S. PATENT DOCUMENTS

| | | | |
|---|---|---|---|
| 5,126,800 | A | 6/1992 | Shisido et al. |
| 5,382,998 | A | 1/1995 | Shida et al. |
| 5,499,112 | A | 3/1996 | Kawai et al. |
| 5,559,581 | A | 9/1996 | Sugiura et al. |
| 5,561,496 | A | 10/1996 | Sugiura et al. |
| 5,602,623 | A | 2/1997 | Nishibata et al. |
| 5,634,178 | A | 5/1997 | Sugiura et al. |
| 5,825,472 | A | 10/1998 | Araki et al. |
| 5,903,803 | A | 5/1999 | Kawai et al. |
| 5,905,583 | A | 5/1999 | Kawai et al. |
| 5,920,753 | A | 7/1999 | Sasaki et al. |
| 6,055,406 | A | 4/2000 | Kawai et al. |
| 6,084,622 | A | 7/2000 | Sugiura et al. |
| 6,115,567 | A | 9/2000 | Kawai et al. |
| 6,128,454 | A | 10/2000 | Kawai et al. |
| 6,141,508 | A | 10/2000 | Sasaki et al. |
| 6,163,665 | A | 12/2000 | Watanabe et al. |
| 6,175,706 | B1 | 1/2001 | Watanabe et al. |
| 6,178,302 | B1 | 1/2001 | Nagashima et al. |
| 6,226,478 | B1 | 5/2001 | Watanabe et al. |
| 6,240,266 | B1 | 5/2001 | Watanabe et al. |
| 6,282,389 | B1 * | 8/2001 | Matsuzaki ........... G03G 15/757 399/167 |
| 6,336,018 | B1 | 1/2002 | Kawai et al. |
| 6,349,188 | B1 | 2/2002 | Kawai et al. |
| 6,381,430 | B1 | 4/2002 | Yokomori et al. |
| 6,426,807 | B1 | 7/2002 | Kawai et al. |
| 6,463,232 | B1 | 10/2002 | Kawai et al. |
| 6,480,687 | B1 | 11/2002 | Kawai et al. |
| 6,496,667 | B2 | 12/2002 | Shiratori et al. |
| 6,501,926 | B1 | 12/2002 | Watanabe et al. |
| 6,501,927 | B1 | 12/2002 | Watanabe et al. |
| 6,512,600 | B1 | 1/2003 | Kawai et al. |
| 6,560,422 | B2 | 5/2003 | Kanno et al. |
| 6,735,403 | B2 | 5/2004 | Kanno et al. |
| 6,735,405 | B2 | 5/2004 | Yokoi et al. |
| 6,738,588 | B2 | 5/2004 | Yokomori et al. |
| 6,836,639 | B2 | 12/2004 | Karakama et al. |
| 6,898,392 | B2 | 5/2005 | Karakama et al. |
| 6,947,686 | B2 | 9/2005 | Kawai et al. |
| 6,968,142 | B2 | 11/2005 | Arimitsu et al. |
| 6,987,938 | B2 | 1/2006 | Murakami et al. |
| 7,016,626 | B2 | 3/2006 | Yokomori et al. |
| 7,024,131 | B2 | 4/2006 | Komatsu et al. |
| 7,027,754 | B2 | 4/2006 | Harada et al. |
| 7,046,942 | B2 | 5/2006 | Arimitsu et al. |
| 7,057,778 | B2 | 6/2006 | Kawai et al. |
| 7,085,516 | B2 | 8/2006 | Kawai et al. |
| 7,130,560 | B2 | 10/2006 | Kawai et al. |
| 7,156,797 | B2 | 1/2007 | Komatsu et al. |
| 7,194,220 | B2 | 3/2007 | Sasaki et al. |
| 7,206,534 | B2 | 4/2007 | Murakami |
| 7,233,752 | B2 | 6/2007 | Harada et al. |
| 7,257,353 | B2 | 8/2007 | Kawai et al. |
| 7,310,489 | B2 | 12/2007 | Kawai |
| 7,457,569 | B2 | 11/2008 | Kawai |
| 7,555,249 | B2 | 6/2009 | Kawai |
| 7,593,139 | B2 | 9/2009 | Kawai et al. |
| 7,720,412 | B2 | 5/2010 | Anan et al. |
| 7,848,684 | B2 | 12/2010 | Kawai |
| 7,933,534 | B2 | 4/2011 | Hoshi et al. |
| 8,045,899 | B2 | 10/2011 | Kawai |
| 8,121,517 | B2 | 2/2012 | Asanuma et al. |
| 8,180,262 | B2 | 5/2012 | Kawai |
| 8,249,485 | B2 | 8/2012 | Horikawa et al. |
| 8,270,876 | B2 | 9/2012 | Morioka et al. |
| 8,369,744 | B2 | 2/2013 | Asanuma et al. |
| 8,494,409 | B2 | 7/2013 | Kawai et al. |
| 8,494,414 | B2 | 7/2013 | Taniguchi |
| 8,515,306 | B2 | 8/2013 | Kawai et al. |
| 8,620,181 | B2 | 12/2013 | Murakami |
| 8,682,211 | B2 | 3/2014 | Hoshi et al. |
| 8,688,004 | B2 | 4/2014 | Asanuma et al. |
| 8,755,713 | B2 | 6/2014 | Kawai et al. |
| 8,879,954 | B2 | 11/2014 | Nonaka et al. |
| 8,953,984 | B2 | 2/2015 | Ijima et al. |
| 8,965,243 | B2 | 2/2015 | Hayashida |
| 9,046,823 | B2 | 6/2015 | Satomura et al. |
| 9,052,638 | B2 | 6/2015 | Matsumaru et al. |
| 9,069,289 | B2 | 6/2015 | Batori et al. |
| 9,083,831 | B2 | 7/2015 | Niikawa |
| 9,116,466 | B2 | 8/2015 | Makiguchi et al. |
| 9,128,417 | B2 | 9/2015 | Yamasaki et al. |
| 9,164,424 | B2 | 10/2015 | Nakamura et al. |
| 9,164,430 | B2 | 10/2015 | Murakami et al. |
| 9,188,906 | B2 | 11/2015 | Batori et al. |
| 9,213,267 | B2 | 12/2015 | Hoshi et al. |
| 9,229,371 | B2 | 1/2016 | Murakami et al. |
| 9,285,765 | B2 | 3/2016 | Anan et al. |
| 9,377,716 | B2 | 6/2016 | Yamasaki et al. |
| 9,423,767 | B2 | 8/2016 | Fujino et al. |
| 9,465,318 | B2 | 10/2016 | Takeuchi et al. |
| 9,494,890 | B2 | 11/2016 | Komatsu et al. |
| 9,500,995 | B2 | 11/2016 | Satomura et al. |
| 9,507,288 | B2 | 11/2016 | Yamashita et al. |
| 9,523,942 | B2 | 12/2016 | Takeuchi et al. |
| 9,599,932 | B2 | 3/2017 | Takeuchi et al. |
| 9,684,279 | B2 | 6/2017 | Nakamura et al. |
| 9,708,116 | B2 | 7/2017 | Koishi et al. |
| 9,778,616 | B2 | 10/2017 | Hiramatsu et al. |
| 9,791,825 | B2 | 10/2017 | Kamoshida et al. |
| 9,989,892 | B2 | 6/2018 | Takeuchi et al. |
| 10,007,225 | B2 | 6/2018 | Nosho et al. |
| 10,095,161 | B2 | 10/2018 | Takeuchi et al. |
| 10,203,652 | B2 | 2/2019 | Kamoshida et al. |
| 10,303,116 | B2 | 5/2019 | Inaba et al. |
| 10,324,413 | B2 | 6/2019 | Nakamura et al. |
| 10,427,867 | B2 | 10/2019 | Koishi et al. |
| 10,444,702 | B2 | 10/2019 | Sato et al. |
| 10,474,096 | B2 | 11/2019 | Hirayama et al. |
| 10,558,165 | B2 | 2/2020 | Hirayama et al. |
| 10,627,780 | B2 | 4/2020 | Fujiwara et al. |
| 10,671,015 | B2 | 6/2020 | Kamoshida et al. |
| 10,678,184 | B2 | 6/2020 | Murakami et al. |
| 10,739,721 | B2 | 8/2020 | Hirayama et al. |
| 10,761,479 | B2 | 9/2020 | Hirayama et al. |
| 10,788,788 | B2 | 9/2020 | Inaba et al. |
| 10,831,150 | B2 | 11/2020 | Hirayama et al. |
| 10,877,434 | B2 | 12/2020 | Sato et al. |
| 10,901,366 | B2 | 1/2021 | Murakami et al. |
| 10,948,871 | B2 | 3/2021 | Uesugi et al. |
| 10,955,795 | B2 | 3/2021 | Hirayama et al. |
| 10,955,796 | B2 | 3/2021 | Uesugi et al. |
| 10,962,926 | B2 | 3/2021 | Hirayama et al. |
| 10,962,927 | B2 | 3/2021 | Fujiwara et al. |
| 10,969,733 | B2 | 4/2021 | Hirayama et al. |
| 10,969,734 | B2 | 4/2021 | Hirayama et al. |
| 10,983,475 | B2 | 4/2021 | Sueshige et al. |
| 11,036,179 | B2 | 6/2021 | Hirayama et al. |
| 11,042,117 | B2 | 6/2021 | Hirayama et al. |
| 11,061,364 | B2 | 7/2021 | Uesugi et al. |
| 11,061,366 | B2 | 7/2021 | Uesugi et al. |
| 11,061,367 | B2 | 7/2021 | Uesugi et al. |
| 11,061,368 | B2 | 7/2021 | Uesugi et al. |
| 11,067,947 | B2 | 7/2021 | Uesugi et al. |
| 11,067,948 | B2 | 7/2021 | Uesugi et al. |

(56) References Cited

U.S. PATENT DOCUMENTS

| | | | | |
|---|---|---|---|---|
| 11,073,790 | B2 | 7/2021 | Uesugi et al. | |
| 11,073,791 | B2 | 7/2021 | Uesugi et al. | |
| 11,169,483 | B2 | 11/2021 | Murakami et al. | |
| 11,175,620 | B2 | 11/2021 | Niikawa | |
| 11,199,807 | B2 | 12/2021 | Kamoshida et al. | |
| 11,204,582 | B2 | 12/2021 | Hirayama et al. | |
| 11,334,023 | B2 | 5/2022 | Uesugi et al. | |
| 11,353,821 | B2 | 6/2022 | Hirayama et al. | |
| 11,378,909 | B2 | 7/2022 | Sueshige et al. | |
| 11,392,081 | B2 | 7/2022 | Murakami et al. | |
| 11,392,082 | B2 | 7/2022 | Nishida et al. | |
| 11,402,798 | B2 | 8/2022 | Murakami et al. | |
| 11,435,693 | B2 | 9/2022 | Uesugi et al. | |
| 11,442,404 | B2 | 9/2022 | Uesugi et al. | |
| 11,442,405 | B2 | 9/2022 | Jesugi et al. | |
| 2003/0068177 | A1 | 4/2003 | Kitayama | |
| 2004/0156652 | A1 | 8/2004 | Chung et al. | |
| 2007/0280743 | A1 | 12/2007 | Nakajima et al. | |
| 2009/0203494 | A1 | 8/2009 | Koizumi | |
| 2009/0284810 | A1 | 11/2009 | Kawai et al. | |
| 2010/0196058 | A1 | 8/2010 | Mihara et al. | |
| 2011/0017003 | A1 | 1/2011 | Taniguchi | |
| 2011/0058861 | A1* | 3/2011 | Suzuki ............... | G03G 21/1685 399/328 |
| 2012/0294649 | A1 | 11/2012 | Kikuchi et al. | |
| 2013/0251405 | A1 | 9/2013 | Iijima et al. | |
| 2014/0003838 | A1 | 1/2014 | Kawai et al. | |
| 2014/0112686 | A1 | 4/2014 | Asanuma et al. | |
| 2016/0091822 | A1 | 3/2016 | Koishi et al. | |
| 2016/0221747 | A1 | 8/2016 | Koishi et al. | |
| 2016/0246250 | A1 | 8/2016 | Kamoshida et al. | |
| 2017/0248869 | A1 | 8/2017 | Matsumoto et al. | |
| 2017/0357210 | A1 | 12/2017 | Inaba et al. | |
| 2018/0027464 | A1 | 1/2018 | Yokoyama | |
| 2018/0373199 | A1 | 12/2018 | Sugimoto et al. | |
| 2019/0129356 | A1 | 5/2019 | Murakami et al. | |
| 2019/0243306 | A1 | 8/2019 | Inaba et al. | |
| 2019/0249751 | A1* | 8/2019 | Miyoshi .............. | A47L 11/4066 |
| 2019/0250550 | A1 | 8/2019 | Niikawa | |
| 2020/0073288 | A1 | 3/2020 | Nakamura et al. | |
| 2020/0301352 | A1 | 9/2020 | Matsumaru et al. | |
| 2020/0387108 | A1* | 12/2020 | Inaba ................. | G03G 21/1647 |
| 2021/0149335 | A1 | 5/2021 | Fujiwara et al. | |
| 2022/0043389 | A1 | 2/2022 | Kamoshida et al. | |
| 2022/0050404 | A1 | 2/2022 | Asanuma et al. | |
| 2022/0050417 | A1 | 2/2022 | Nishida et al. | |
| 2022/0066385 | A1 | 3/2022 | Uesugi et al. | |
| 2022/0082984 | A1 | 3/2022 | Fujiwara et al. | |
| 2022/0146978 | A1 | 5/2022 | Niikawa | |
| 2022/0187758 | A1 | 6/2022 | Murakami et al. | |
| 2022/0236691 | A1 | 7/2022 | Hirayama et al. | |
| 2022/0283535 | A1 | 9/2022 | Sueshige et al. | |

FOREIGN PATENT DOCUMENTS

| | | | | |
|---|---|---|---|---|
| CN | 109313409 | A | | 2/2019 |
| CN | 110161815 | A | | 8/2019 |
| JP | S63-4252 | A | | 1/1988 |
| JP | H02-166470 | A | | 6/1990 |
| JP | H4-12516 | A | | 3/1992 |
| JP | H07-083314 | A | | 3/1995 |
| JP | H08-328449 | A | | 3/1996 |
| JP | H09-197905 | A | | 7/1997 |
| JP | H10-161477 | A | | 6/1998 |
| JP | H10-171331 | A | | 6/1998 |
| JP | 2808455 | B | | 10/1998 |
| JP | H10-268733 | A | | 10/1998 |
| JP | 2002-328563 | A | | 11/2002 |
| JP | 2003-057998 | A | | 2/2003 |
| JP | 2003-091184 | A | | 3/2003 |
| JP | 2004-078087 | A | | 3/2004 |
| JP | 2005091609 | A | * | 4/2005 |
| JP | 2009-116246 | A | | 5/2009 |
| JP | 2011-027933 | A | | 2/2011 |
| JP | 3183618 | U | | 5/2013 |
| JP | 2014-119102 | A | | 6/2014 |
| JP | 2017-096435 | A | | 6/2017 |
| JP | 2017-211456 | A | | 11/2017 |
| JP | 2017-223802 | A | | 12/2017 |
| JP | 2019-100460 | A | | 6/2019 |
| KR | 2003-0064147 | A | | 7/2003 |
| TW | 200632598 | A | | 9/2006 |
| TW | 201140257 | A | | 11/2011 |
| TW | 201516590 | A | | 5/2015 |
| TW | 201734677 | A | | 10/2017 |
| TW | 201800881 | A | | 1/2018 |
| TW | 201843542 | A | | 12/2018 |
| TW | 201937316 | A | | 9/2019 |

OTHER PUBLICATIONS

Co-pending U.S. Appl. No. 17/900,039, filed Aug. 31, 2022.

Oct. 26, 2023 Office Action in Taiwanese Patent Application No. 110132292.

Jun. 3, 2023 Examination Report in Australian Patent Application No. 202133385.

May 15, 2024 Office Action in Chinese Patent Application No. 202180018257.8.

English Translation of Japanese Patent Application Pub. No. 2005-091609 A.

English Translation of Japanese Patent Application Pub. No. 2004-078087 A.

Sep. 13, 2023 Office Action in Indian Patent Application No. 202247037823.

International Search Report and Written Opinion for International Patent Application No. PCT/JP2021/032565.

May 30, 2024 Notice of Acceptance in Australian Patent Application No. 2021333385.

Sep. 20, 2024 Extended Search Report in European Patent Application No. 21 86 1792.6.

Oct. 15, 2024 Office Action in Taiwan Patent Application No. 113128473.

Feb. 12, 2025 Notice of Acceptance in Korean Patent Application No. 10-2022-7028972.

English translation of Japanese Patent Application Pub. No. H10-161477.

English translation of Japanese Patent Application Pub. No. H4-12516.

English translation of Japanese Patent Application Pub. No. 2003-057998.

English translation of Japanese Patent Application Pub. No. H10-268733.

English translation of Japanese Patent Application Pub. No. H09-197905.

English translation of Japanese Patent Application Pub. No. H02-166470.

English translation of Japanese Patent Application Pub. No. 2002-328563.

English translation of Japanese Patent Application Pub. No. H10-171331.

English translation of Japanese Patent Application Pub. No. 2009-116246.

English translation of Japanese Patent No. 2808455.

Dec. 9, 2024 Office Action in Chinese Office Action No. 202180018257.8 (with English translation).

Apr. 28, 2025 Office Action in Australian Patent Application Pub. No. 2024203361.

May 20, 2025 Notice of Allowance in Chinese Patent Application Pub. No. 2021800188257.8.

Jun. 4, 2025 Notice of Allowance in Korean Patent Application Pub. No. 10-2022-7028972.

Jun. 26, 2025 Office Action in Taiwanese Patent Application Pub. No. 114114969.

Jul. 8, 2025 Office Action in Japanese Patent Applicaiton No. 2021-139940 (with English translation).

English translation of Japanese Patent Application Pub. No. 2017-211456.

(56) References Cited

OTHER PUBLICATIONS

Nov. 11, 2025 Office Action in Japanese Patent Applicaiton No. 2021-139940 (with English translation.).
Feb. 23, 2026 Notice of Allowance in Korean Patent Application No. 10-2025-7015262.

* cited by examiner (a)

(b)

(a)

(b)

(a)

(b)

(a)

(b)

(a)

(b)

(a)

(b)

(a)

(b)

(a)

(b)

(a)

(b)

(c)

(a)

(b)

(a)

(b)

PHOTOSENSITIVE MEMBER UNIT, CARTRIDGE AND ELECTROPHOTOGRAPHIC IMAGE FORMING APPARATUS

TECHNICAL FIELD

The present invention relates to a cartridge which is mountable to and dismountable from an electrophotographic image forming apparatus and relates to an electrophotographic image forming apparatus using the cartridge.

The electrophotographic image forming apparatus forms an image on a recording material by using an electrophotographic image forming method. Examples of the electrophotographic image forming apparatus include, an electrophotographic copying apparatus, an electrophotographic printer (LED 15 printer, laser beam printer, and so on), a facsimile machine, a word processor, and the like, for example.

BACKGROUND ART

In an electrophotographic image forming apparatus (hereinafter, also simply referred to as "image forming apparatus"), a toner image is formed on an electrophotographic photosensitive member (photosensitive drum or drum), and the toner image is directly or indirectly transferred onto a recording material, by which an image is formed on the recording material.

In general, such an image forming apparatus requires replenishment of toner (developer) and maintenance of various members. Therefore, there is a cartridge-type image forming apparatus in which a cartridge can be mounted to and dismounted from the image forming apparatus, and the toner replenishment and maintenance operation is performed in effect by exchanging the cartridge.

The cartridge includes at least one of a drum and a process means, and is dismountably mounted to the main assembly (apparatus main assembly) of the image forming apparatus. The process means are means for forming an image, and those acting on the drum mainly include developing means, charging means, image transfer means, electric charge elimination means, cleaning means and the like. Examples of the cartridge include a process cartridge including a drum and at least one process means and being integrally mountable to and dismountable from the apparatus main assembly, a drum cartridge including a drum, a developing cartridge including a developing means, and the like. According to such a cartridge method, it becomes possible to easily perform toner replenishment and maintenance operations of the image forming apparatus.

As a structure for transmitting the driving force from the main assembly of the apparatus to the cartridge, a gear is used as shown in Japanese Patent Application Laid-Open No. S63-4252, and a coupling is used as shown in Japanese Patent Application Laid-Open No. H8-328449.

SUMMARY OF THE INVENTION

Problem to be Solved

It is an object of the present invention (disclosure) to provide a development a photosensitive member unit, a cartridge, or an electrophotographic image forming apparatus.

Means for Solving the Problem

The present invention provides at least a photosensitive member unit detachably mountable to a main assembly of an image forming apparatus, the image forming apparatus including a first main assembly side helical gear portion and a second main assembly side helical gear portion which are coaxially rotatable, the photosensitive member unit comprising a photosensitive member rotatable about a rotational axis thereof; a first unit side helical gear portion for meshing engagement with the first main assembly side helical gear portion; and a second unit side helical gear portion for meshing engagement with the second main assembly side helical gear portion, wherein a twisting direction of a tooth of the second unit side helical gear portion is the same as the twisting direction of a tooth of first unit side helical gear portion, wherein a helix angle of the tooth of the second unit side helical gear portion is larger than a helix angle of the tooth of the first unit side helical gear portion, and wherein the first unit side helical gear portion and the second unit side helical gear portion are rotatable in a state in which the first unit side helical gear portion is in meshing engagement with the first main assembly side helical gear portion, and the second unit side helical gear portion is in meshing engagement with the second main assembly side helical gear portion.

Effect of the Invention

According to the present invention (the present disclosure), there is provided a development for a photosensitive member unit, a cartridge, or an electrophotographic image forming apparatus.

EMBODIMENTS

Embodiment 1

<Overall Structure of Image Forming Apparatus>

Figure 2:
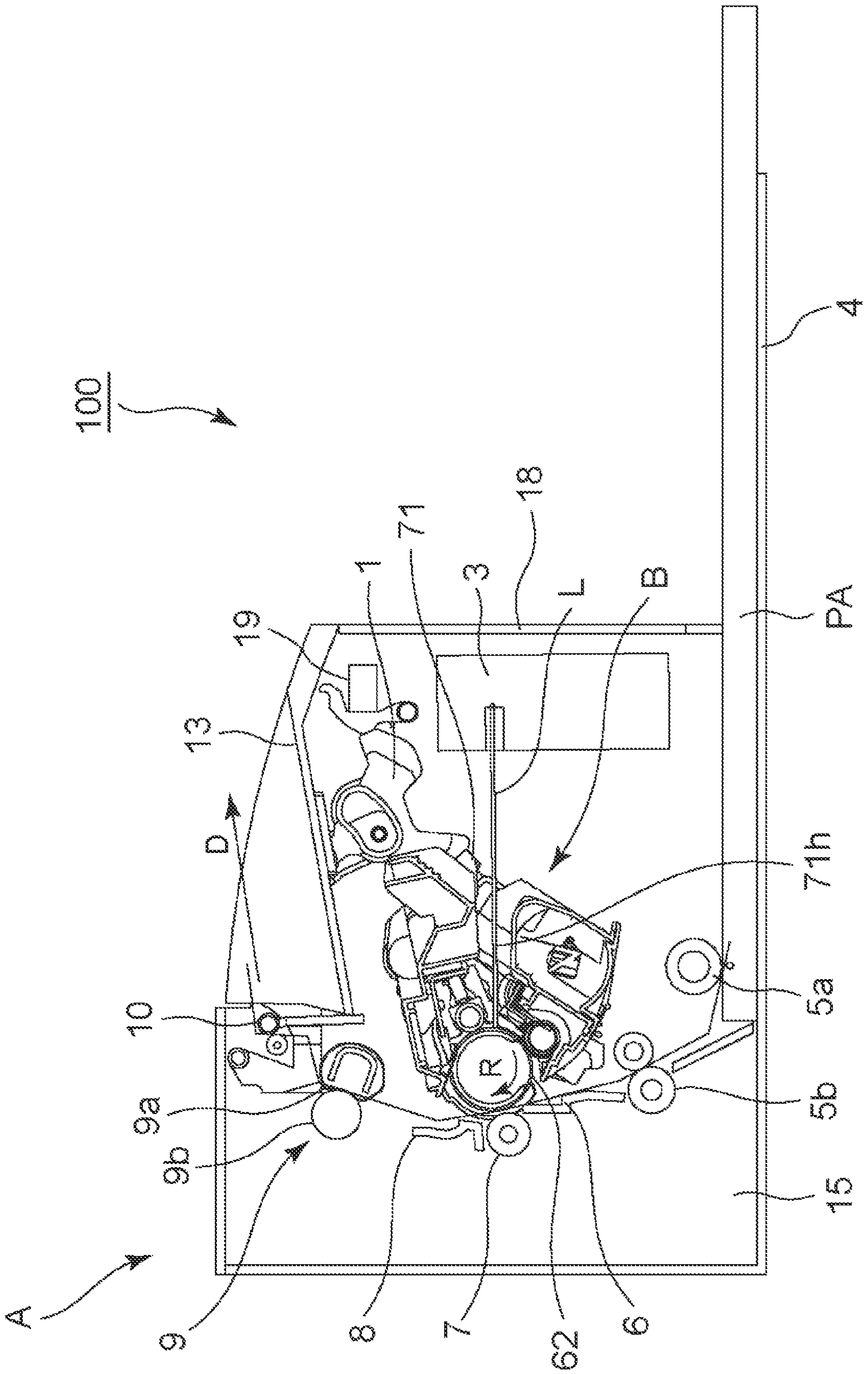
FIG. 2 is a schematic sectional view of a main assembly of the apparatus and a cartridge.

FIG. 2 is a sectional view of the electrophotographic image forming apparatus (image forming apparatus) 100, and the plane of the cross-section is perpendicular to a rotational axis L1 of a photosensitive drum 62 which will be described hereinafter. The image forming apparatus 100 is a laser beam printer using electrophotographic process, and a cartridge B including the photosensitive drum 62 is dismountably mounted to an apparatus main assembly A. That is, parts of the image forming apparatus 100 excluding the cartridge B is the apparatus main assembly A. When the cartridge B is mounted in the apparatus main assembly A, it is possible to form an image on a recording material (sheet material) PA such as paper.

<Structure of Main Assembly of the Apparatus>

The apparatus main assembly A includes an exposure device (laser scanner unit) 3 and a sheet tray 4 for accommodating the sheet material PA. Further, the apparatus main assembly A includes a pickup roller 5*a*, a feeding roller pair 5*b*, a transfer guide 6, a transfer roller 7, a feeding guide 8, a fixing device 9, a discharge roller pair 10, and a discharge tray 11 in the order named along a feed direction D of the sheet material PA. The fixing device 9 includes a heating roller 9*a* and a pressure roller 9*b*.

<Cartridge Structure>

Figure 3:
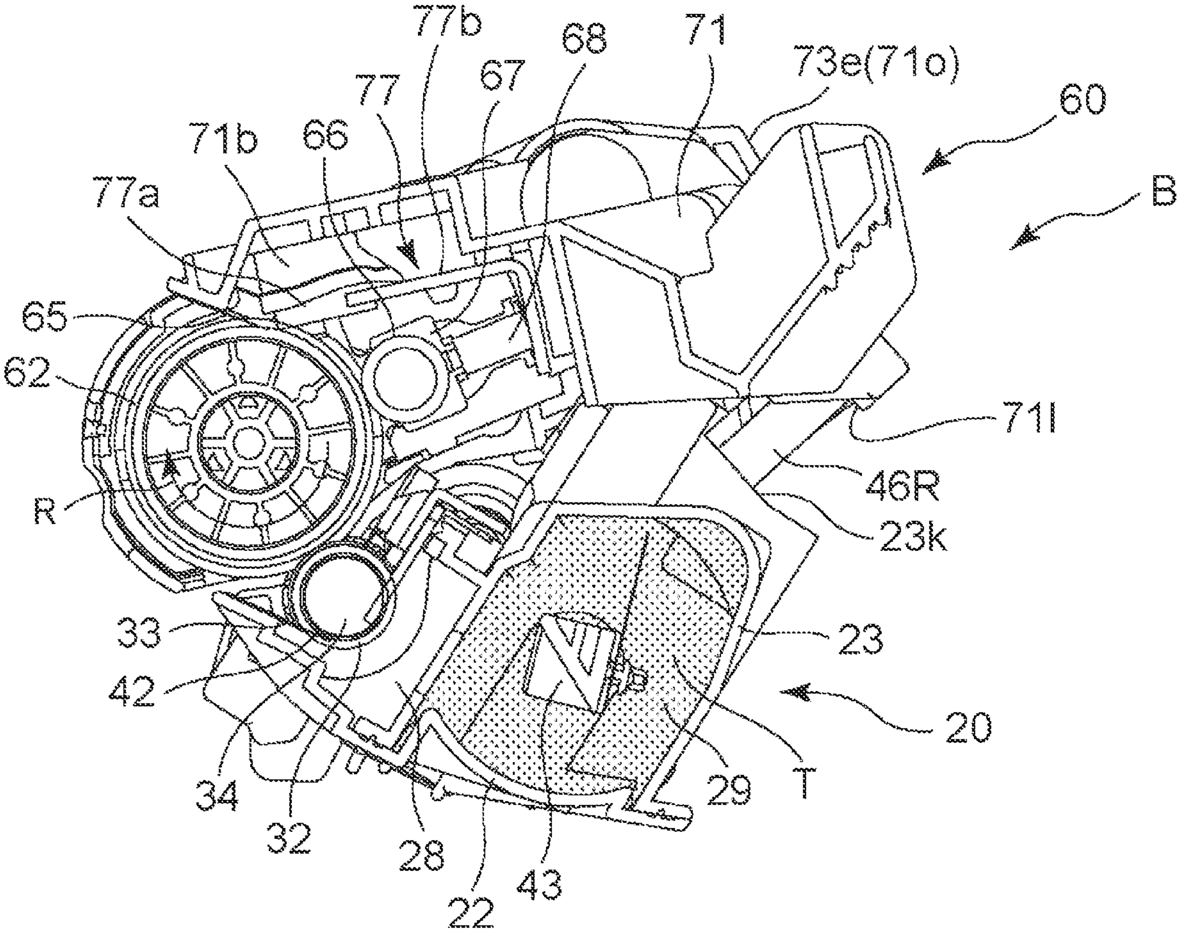
FIG. 3 is a cross-sectional view of the cartridge.
Figure 4:
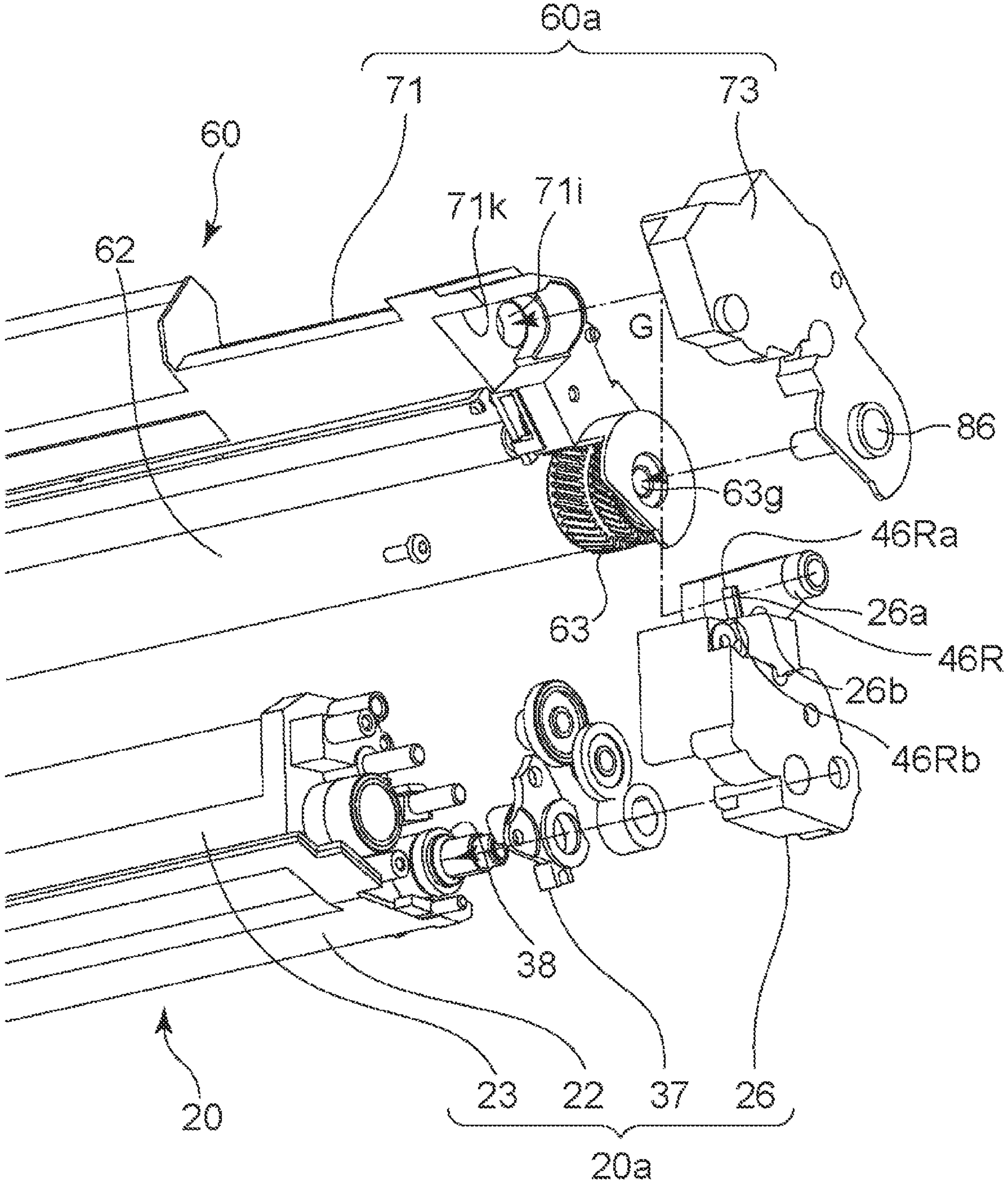
FIG. 4 is an exploded perspective view of the cartridge.
Figure 5:
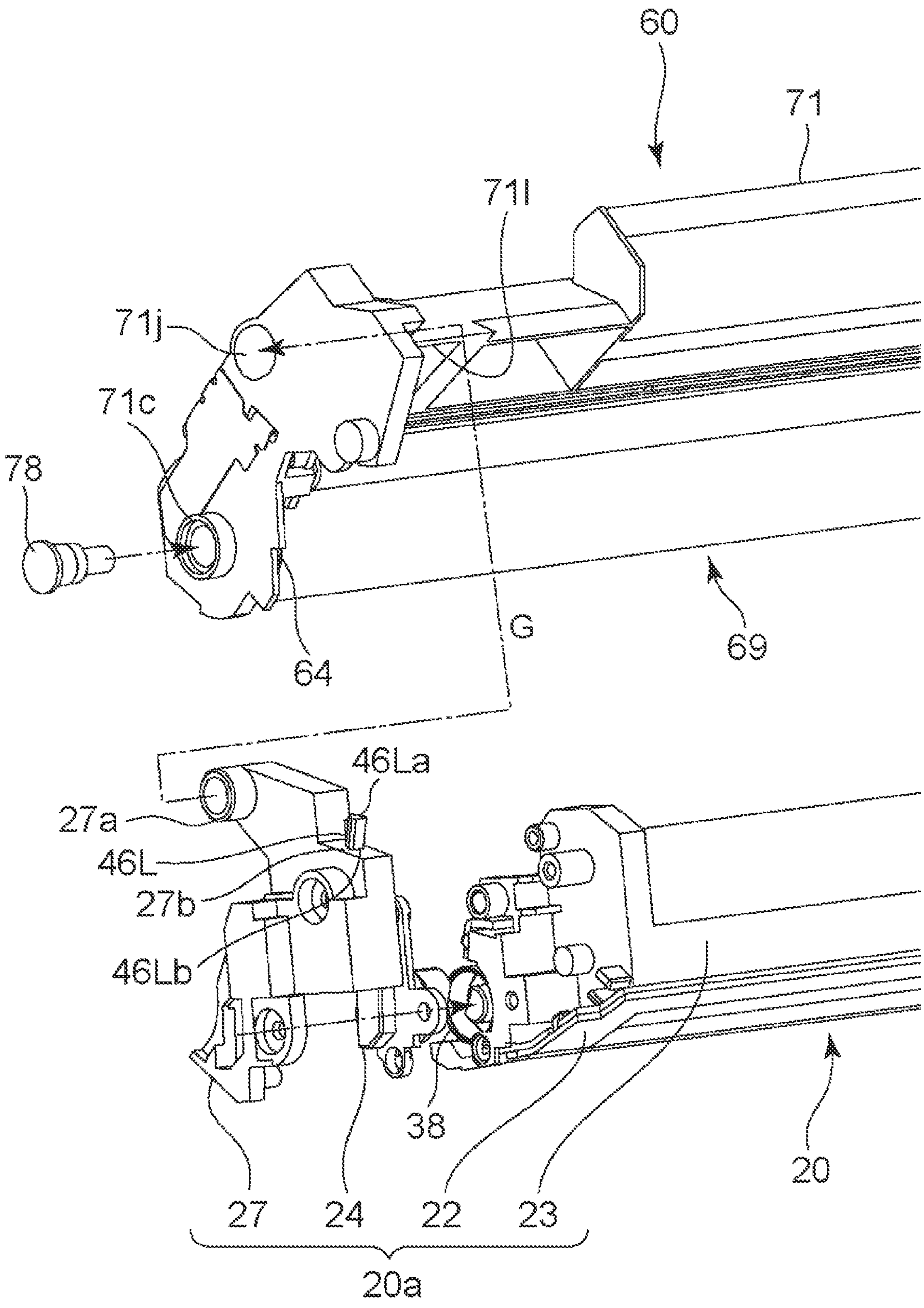
FIG. 5 is an exploded perspective view of the cartridge.
Figure 6:
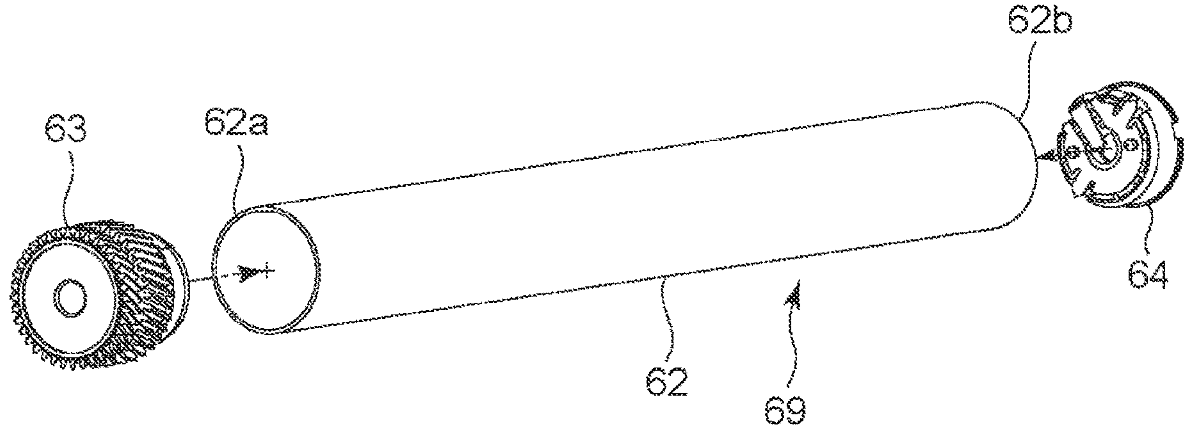
FIG. 6 is exploded perspective views of a cleaning unit.
Figure 6:
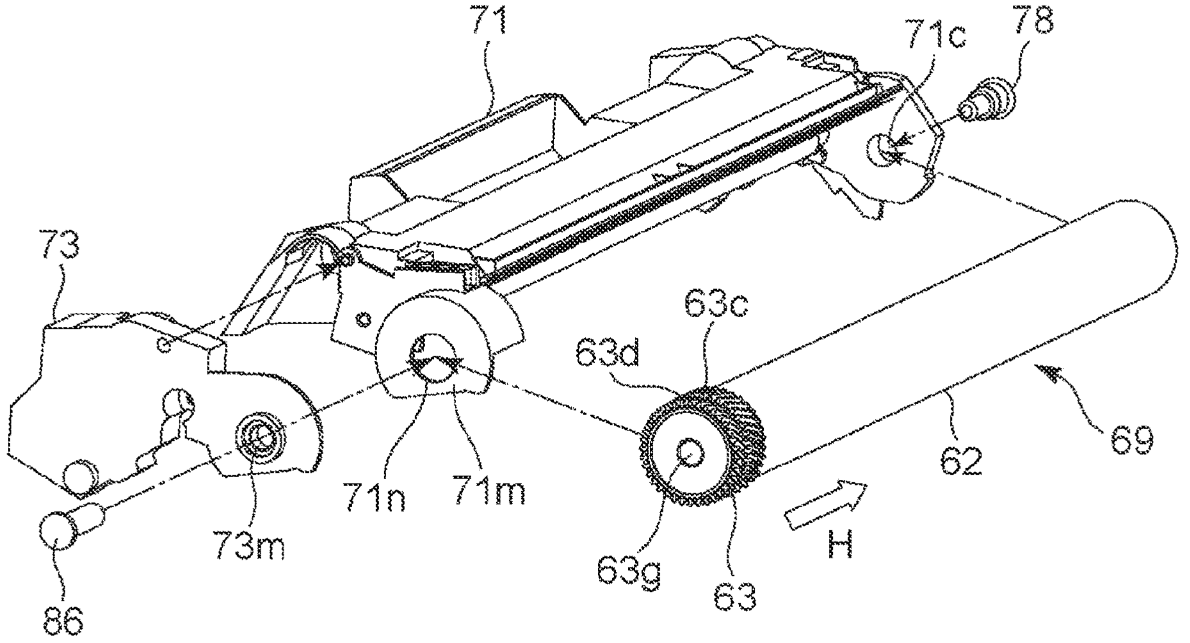
Figure 7:
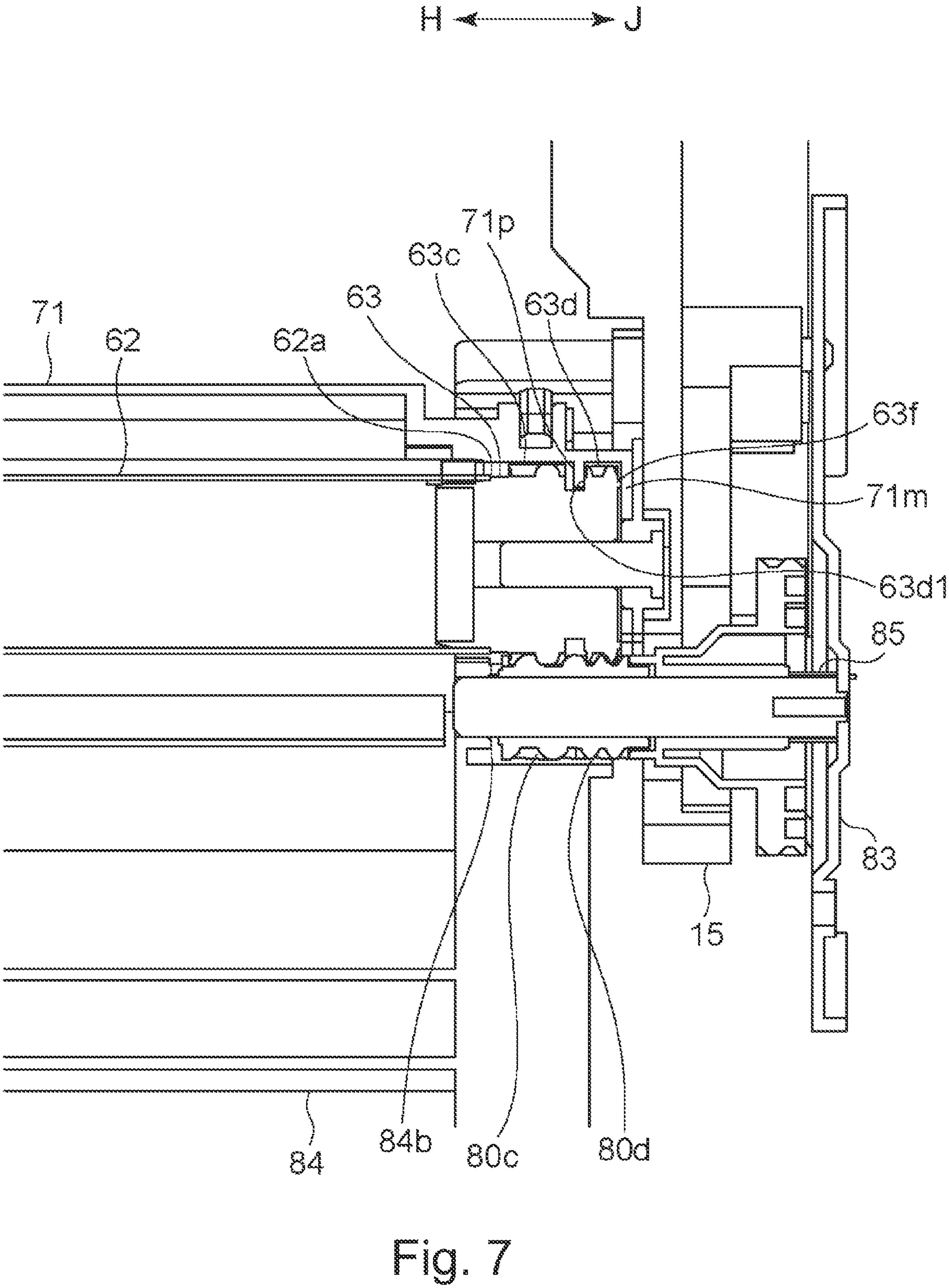
FIG. 7 is a sectional view of a drive portion from the main assembly of the apparatus to the cartridge.

Next, referring to FIGS. 3, 4, 5, 6, and 7, an overall structure of the cartridge B will be described. FIG. 3 is a cross-sectional view of the cartridge B, taken along a plane perpendicular to the rotational axis L1 of the photosensitive drum 62 which will be described hereinafter. FIGS. 4 and 5 are exploded perspective views illustrating the structure of the cartridge B. Part (a) of FIG. 6 is an exploded perspective view illustrating the structure of the drum unit 69. Part (b) of FIG. 6 is an exploded perspective view illustrating the structure of the cleaning unit. FIG. 7 is a cross-sectional view of a drive unit which transmits a driving force from the image forming apparatus A to the cartridge B. In this embodiment, the screws and the like used to connect the parts will be omitted.

The cartridge B is a process cartridge and mainly includes an electrophotographic photosensitive member and a process means acting on the electrophotographic photosensitive member. The process means includes charging means, developing means and cleaning means which will be described hereinafter. The cartridge B has a structure mainly including a cleaning unit (drum unit) 60 and a developing unit 20, and the electrophotographic photosensitive member and the process means are provided in these cleaning unit 60 or in the developing unit 20.

The longitudinal direction of the drum 62 is parallel with the direction of the rotational axis L1 of the drum 62 (direction of the rotational axis). In the drum 62, the side on which the driving force is transmitted from the apparatus main assembly A with respect to the rotational axis direction is referred to as a driving side, and the opposite side thereof in the direction is referred to as a non-driving side. Further, the direction from the non-driving side toward the driving side in the rotational axis L1 of the drum 62 (parallel to the rotational axis L1) is J direction, and the direction from the driving side toward the non-driving side is H direction. When the J direction and the H direction are referred to in the apparatus main assembly A, they are defined so as to be the same as the J direction and the H direction at the time when the cartridge B is mounted in the apparatus main assembly A.

<Cleaning Unit (Drum Unit)>

As shown in FIG. 3, the cleaning unit (drum unit) 60 includes a photosensitive drum 62, a charging roller 66, a cleaning member 77, and a cleaning frame (drum frame) 60*a* which supports them. The cleaning frame (drum frame) 60*a* includes a frame member 71 and a drum bearing member 73.

As shown in part (a) of FIG. 6, the photosensitive drum (drum) 62, which is a rotatable member, is a cylindrical electrophotographic photosensitive member, and is an aluminum cylinder having an outer peripheral surface coated with a photosensitive layer. A driving side flange (driving force receiving member) 63 is fixed, by clamping, to the end of the drum 62 on the driving side (one end side), and a non-driving side flange 64 is fixed, by clamping, to the end of the non-driving side (the other end side). A unit in which the drum 62, the driving side flange 63, and the non-driving side flange 64 are integrated (that is, a unit that can rotate integrally with the drum 62) is referred to as a drum unit 69.

In general, the cleaning unit 60 may be referred to as a drum unit, and in such a case, the drum 62 is contrasted with the developing means in the developing unit 20 from the standpoint of the means provided in the cartridge B, recognizing the entire cleaning unit 60 as a unit including the drum 62. Therefore, the drum unit as a name of the entire cleaning unit 60 is based on a concept different from that of the drum unit 69 (a unit rotatable integrally with the drum 62) in this embodiment. In the following description, the drum unit refers to a unit which can rotate integrally with the drum 62.

The drum 62, the driving side flange 63, and the non-driving side flange 64 rotate integrally around the rotational axis L1 of the drum. That is, the rotation axes of the driving side flange 63, the non-driving side flange 64, and the drum unit 69 are coaxial with the rotational axis L1 of the drum 62. Therefore, in the following, the rotation axes of the drum 62, the driving side flange 63, the non-driving side flange 64, and the drum unit 69 in the assembled drum unit 69 are all referred to as rotational axis L1.

Further, the driving side flange 63 and the non-driving side flange 64 are integrally fixed in the direction of the rotational axis L1. The driving side flange 63 and the non-driving side flange 64 are made of resin material. The driving side flange 63 includes a first gear portion 63*c* and a second gear portion 63*d*, which will be described in detail hereinafter.

As shown in part (b) of FIG. 6, the drum unit 69 is supported, rotatably around the rotational axis L1, by the drum frame 60*a* (frame member 71 and drum bearing member 73). Specifically, the driving side flange 63 is provided with a hole 63*g* coaxial with the rotational axis L1, and a shaft member 86 press-fitted into the drum bearing member 73 is inserted into the hole 63*g*, by which the driving side flange 63 is rotatably supported by the drum bearing member 73. The non-driving side flange 64 has a hole (not shown) coaxial with the rotational axis L1, and the shaft member 78 press-fitted into the hole 71*c* of the frame member 71 is inserted into this hole, by which the non-driving side flange is rotatably supported by the frame member 71. As described above, the non-driving side flange 64 and the driving side flange 63 are supported portions rotatably supported by the shaft members 86 and 78.

Further, as shown in FIG. 7, the second gear portion 63*d* of the driving side flange 63 is provided with a projecting portion 63*d*1 projecting in the H direction on the end surface on the downstream side in the H direction, and is provided with a projecting portion 63*f* projecting in the J direction on the upstream side in the H direction (downstream side in the J direction). In addition, the frame member 71 includes a rib 71*p* and a side wall 71*m* provided so as to extend in a direction perpendicular to the rotational axis L1. The projecting portion 63*d*1 is contactable with the side surface of the rib 71*p*, and the projecting portion 63*f* is contactable with the side surface of the side wall 71*m*. The driving side flange 63 is slidably fitted between the rib 71*p* and the side wall 71*m* by loose fitting. Therefore, it is likely that the projecting portion 63*d*1 contacts the side surface of the rib 71*p* or the projecting portion 63*f* contacts the side surface of the side wall 71*m*, but the fitting play (gap) is extremely small (about 150 μm at the maximum), and therefore, it can be said that the positioning is substantially the same in these cases. As described above, it can be said that the drum unit 69 including the driving side flange 63 is positioned in the direction of the rotational axis L1 with respect to the drum frame 60*a* by the rib 71*p* and the side wall 71*m*.

In this embodiment, the longitudinal direction of the cartridge B, the drum frame 60*a*, and the frame member 71 is a direction parallel to the direction of the rotational axis L1 of the drum 62.

Further, as shown in FIG. 3, in the cleaning unit 60, the charging roller (charging member) 66 as the charging means and the cleaning member 77 as the cleaning means are arranged in contact with the outer peripheral surface of the drum 62, respectively. The cleaning member 77 includes a rubber blade 77*a*, which is a blade-shaped elastic member made of rubber as an elastic material, and a support member 77*b* which supports the rubber blade 77*a*. The rubber blade 77*a* is in contact with the drum 62 counterdirectionally with respect to the rotational direction of the drum 62. That is, the rubber blade 77*a* is in contact with the drum 62 so that the free end surface thereof faces the upstream side in the rotational direction of the drum 62. Waste toner removed from the surface of the drum 62 by the cleaning member 77 is stored (accumulated) in a waste toner chamber 71*b* formed by the frame member 71 and the cleaning member 77. A sheet 65 for suppressing the leakage of waste toner through the gap between the frame member 71 and the drum 62 is mounted to the edge of the frame member 71 in contact with the drum 62.

Opposite end portions of the charging roller 66 in the direction of the rotational axis are rotatably supported by a charging roller bearings 67 supported by the frame member 71. A rotational axis of the charging roller 66 is substantially parallel with the rotational axis L1 of the drum 62. The charging roller 66 is pressed against the drum 62 by pressing the charging roller bearings 67 toward the drum 62 by the urging member 68. The charging roller 66 is driven by the rotation of the drum 62.

<Developing Unit>

As shown in FIG. 3, the developing unit 20 includes a developing roller 32, a magnet roller 34, a developing blade 42, a feeding member 43, a developing frame 20*a* which supports them, and so on. The developing frame 20*a* includes a developing container 23, a bottom member 22, a bearing member 24 (see FIG. 5), a bearing member 37 (see FIG. 4), a developing side cover (see FIG. 4) 26, and a developing side cover 27 (see FIG. 5). In the developing unit 20, a toner supply chamber 28 and a toner chamber 29 are formed inside by the developing container 23 and the bottom member 22.

As shown in FIGS. 4 and 5, in the toner supply chamber 28, opposite end portions of the developing roller 32 in the rotational axis direction are rotatably supported by the bearing member 24 and the bearing member 37. The bearing member 24 and the bearing member 37 are mounted to the developing container 23. The developing roller (developing member) 32 as a developing means is a cylindrical member, and a magnet roller 34 is provided inside the cylindrical member. A developing blade 42 is provided to determine (regulate) a thickness of the toner (toner layer) carried on the surface of the developing roller 32.

Spacing members 38 are mounted to the end portions of the developing roller 32 in the direction of the rotational axis, respectively, and by the spacing members 38 contacting with the surface of the drum 62, A distance of the surface of the developing roller 32 from the surface of the drum 62 is determined. Specifically, the distance is determined such that a small gap is provided between the surface of the developing roller 32 and the surface of the drum 62.

In addition, as shown in FIG. 3, a sheet 33 for preventing the toner from leaking through a gap between the developing frame 20*a* and abuts on the developing roller 32 is mounted to an edge portion of the bottom member 22 so as to be in contact with the developing roller 32. Further, in the toner chamber 29, a feed member (stirring member) 43 is rotatably provided. The feeding member 43 rotates to stir the toner contained in the toner chamber 29, and transports the toner from the toner chamber 29 into the toner supply chamber 28.

<Connection Between Cleaning Unit and Developing Unit>

The cartridge B is assembled by connecting the cleaning unit 60 and the developing unit 20. As shown in FIGS. 4 and 5, first, An alignment is carried out between a center of a first development boss 26*a* of the developing container 23 for a first hanging hole 71*i* on the driving side of the frame member 71 and a center of a second supporting boss 27*a* for a second development hanging hole 71*j* on the non-driving side. Then, by moving the developing unit 20 in the direction of the arrow G, the first development supporting boss 26*a* and the second development supporting boss 27*a* are fitted into the first hanging hole 71*i* and the second hanging hole 71*j*. Thereafter, by assembling the drum bearing member 73 to the cleaning unit 60, the developing unit 20 is restricted from disengaging from the cleaning unit 60. By this, the developing unit 20 is movably connected with the cleaning unit 60. Specifically, the developing unit is connected with the cleaning unit 60 rotatably (tiltably) about the first development supporting boss 26*a* and the second development supporting boss 27*a*.

In addition, as shown in FIG. 4, a first end portion 46Rb of a driving side spring (urging member) 46R is fixed to a surface 26*b* of the developing side cover 26, and a second end portion 46Ra contacts a surface 71*k* of the frame member 71 of the cleaning unit 60. Further, as shown in FIG. 5, a first end portion 46Lb of a non-driving side spring (urging member) 46L is fixed to a surface 27*b* of the developing side cover 27, and a second end portion 46La contacts a surface 711 of the frame member 71. The non-driving side spring 46L and the driving side spring 46R are compression springs. The urging force of these springs produces an urging force between the developing frame 20*a* and the cleaning frame 60*a* so as to press the developing roller 32 toward the drum 62. By this, as described above, the spacing member 38 is pressed against the surface of the drum 62 and is held with the gap between the surface of the developing roller 32 and the surface of the drum 62.

<Image Forming Process>

Next, the image forming process will be described. A control unit (not shown) receives a print command signal fed from a host computer or the like, and generates a print start signal based on the print command signal to start the image forming process.

When the image forming process starts, the drum 62 is first rotationally driven in a direction of arrow R (see FIGS. 2 and 3) at a predetermined peripheral speed (process speed). A charging bias voltage is applied to the charging roller 66 to substantially uniformly charge the surface (outer peripheral surface) of the drum 62. Further, as shown in FIG. 2, the exposure device (exposure means) 3 emits a laser beam L in accordance with the image information to be printed. The laser beam L passes through the laser opening 71*h* provided in the frame member 71 of the cartridge B, is projected to the surface of the drum 62 charged by the charging roller 66, and scans the surface of the drum 62 with the laser beam L. By this, an electrostatic latent image corresponding to the image information is formed on the photosensitive layer on the surface of the drum 62.

On the other hand, as shown in FIG. 3, in the developing unit 20, the toner (developer) T in the toner chamber 29 is stirred and fed by the rotation of the feeding member 43, into the toner supply chamber 28. The toner T is carried on the surface of the developing roller 32 by a magnetic force of the magnet roller (fixed magnet) 34. The developing roller 32 is a developer carrying member which supports the toner T on its surface to visualize (develop) the electrostatic latent image formed on the drum 62 described above with the toner. The toner T is triboelectrically charged by the developing blade 42, and the developing blade 42 regulates the thickness (layer thickness) of the layer of the toner T on the peripheral surface of the developing roller 32 to a desired thickness. Then, the toner T carried on the surface of the developing roller 32 is supplied to and adheres to the region corresponding to the electrostatic latent image of the drum 62. By this, the electrostatic latent image on the drum 62 is visualized (developed) into a toner image. It can be said that the drum 62 is an image bearing member which carries an electrostatic latent image or a toner image (developer image) on its surface.

Further, as shown in FIG. 2, in synchronism with output timing of the laser beam L, the sheet material PA stored in the sheet tray 4 at the lower portion of the apparatus main assembly A is fed out to the feed path in the main assembly A by the pickup roller 5*a* and the feeding roller pair 5*b*. Thereafter, the sheet material PA is guided by the transfer guide 6 and fed to a transfer nip provided between the drum 62 and the transfer roller (transfer means) 7. In this transfer nip, the toner image formed on the drum 62 is transferred onto the sheet material PA.

The sheet material PA on which the toner image is transferred in the transfer nip is guided by the transfer guide 8 and conveyed into the fixing device (fixing means) 9. Then, the sheet material PA passes through the fixing nip provided between the heating roller 9*a* and the pressure roller 9*b* of the fixing device 9. By pressing and heating the sheet material PA in this fixing nip, the toner image is fused to the sheet material PA and fixed thereon. The sheet material PA which has passed through the fixing nip is fed to the discharge roller pair 10 and discharged onto the discharge tray 11.

On the other hand, as shown in FIG. 3, the surface of the drum 62 after sheet material passes through the transfer nip comes into contact with the cleaning blade 77, the toner remaining on the surface of the drum 62 is removed, and the surface of the drum 62 can be used again in the above-mentioned image forming process. The toner removed from the drum 62 by the cleaning blade 77 is stored as waste toner in the waste toner chamber 71*b* of the cleaning unit 60.

In this embodiment, at least the charging roller 66, the exposure device 3, the developing roller 32, the transfer roller 7, and the cleaning blade 77 are process means acting on the drum 62.

<Mounting and Dismounting of Cartridge>

Figure 8:
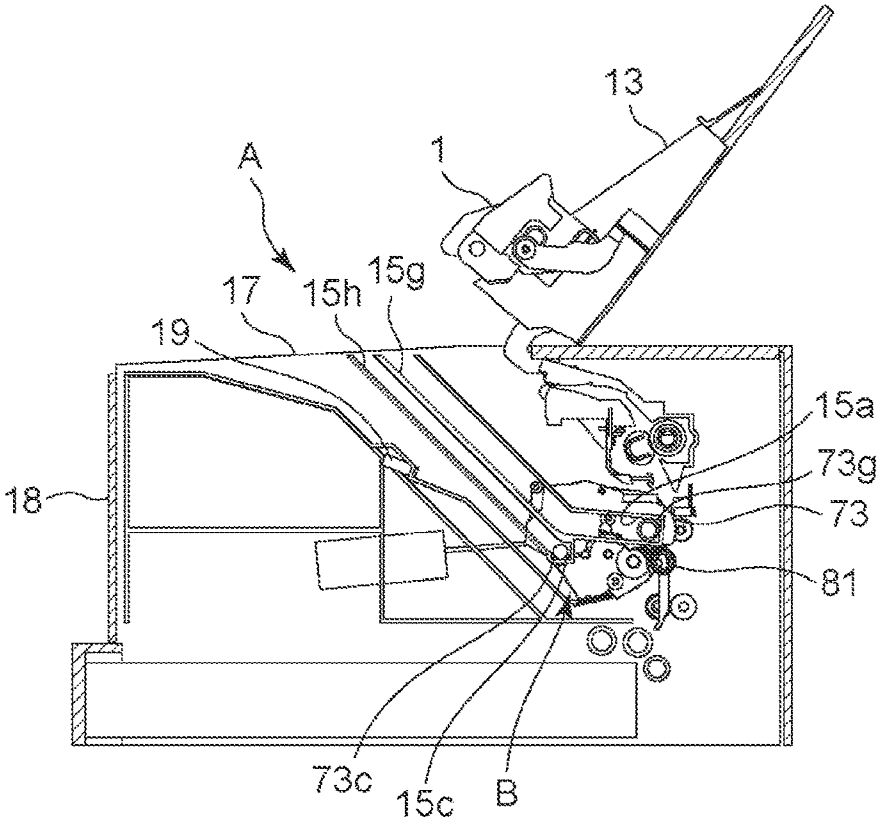
FIG. 8 is sectional views of the main assembly of the apparatus.
Figure 8:
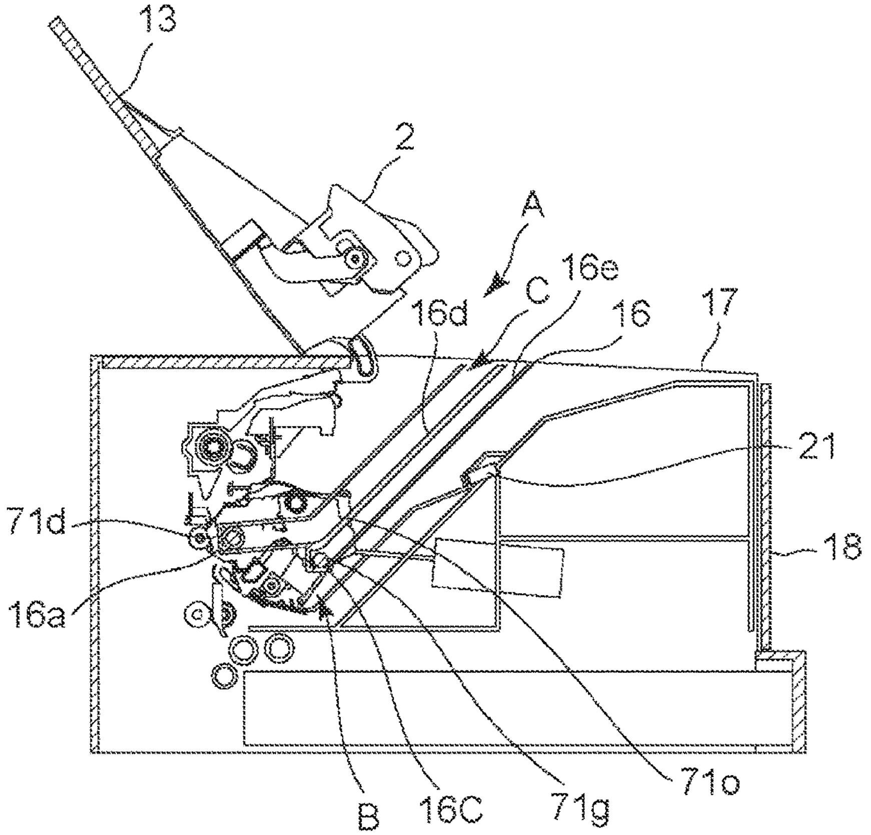
Figure 9:
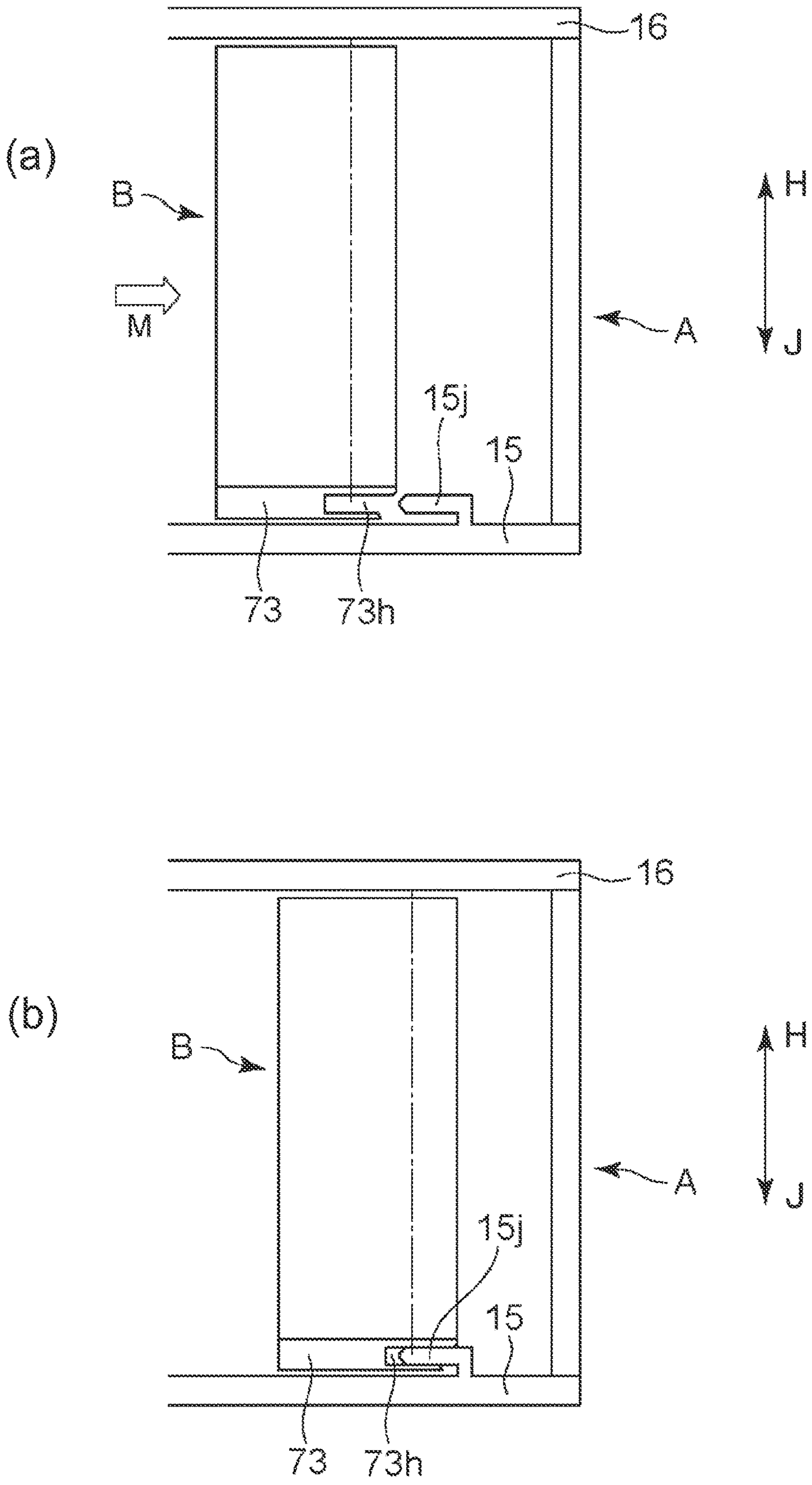
FIG. 9 is sectional views of the main assembly of the apparatus.
Figure 10:
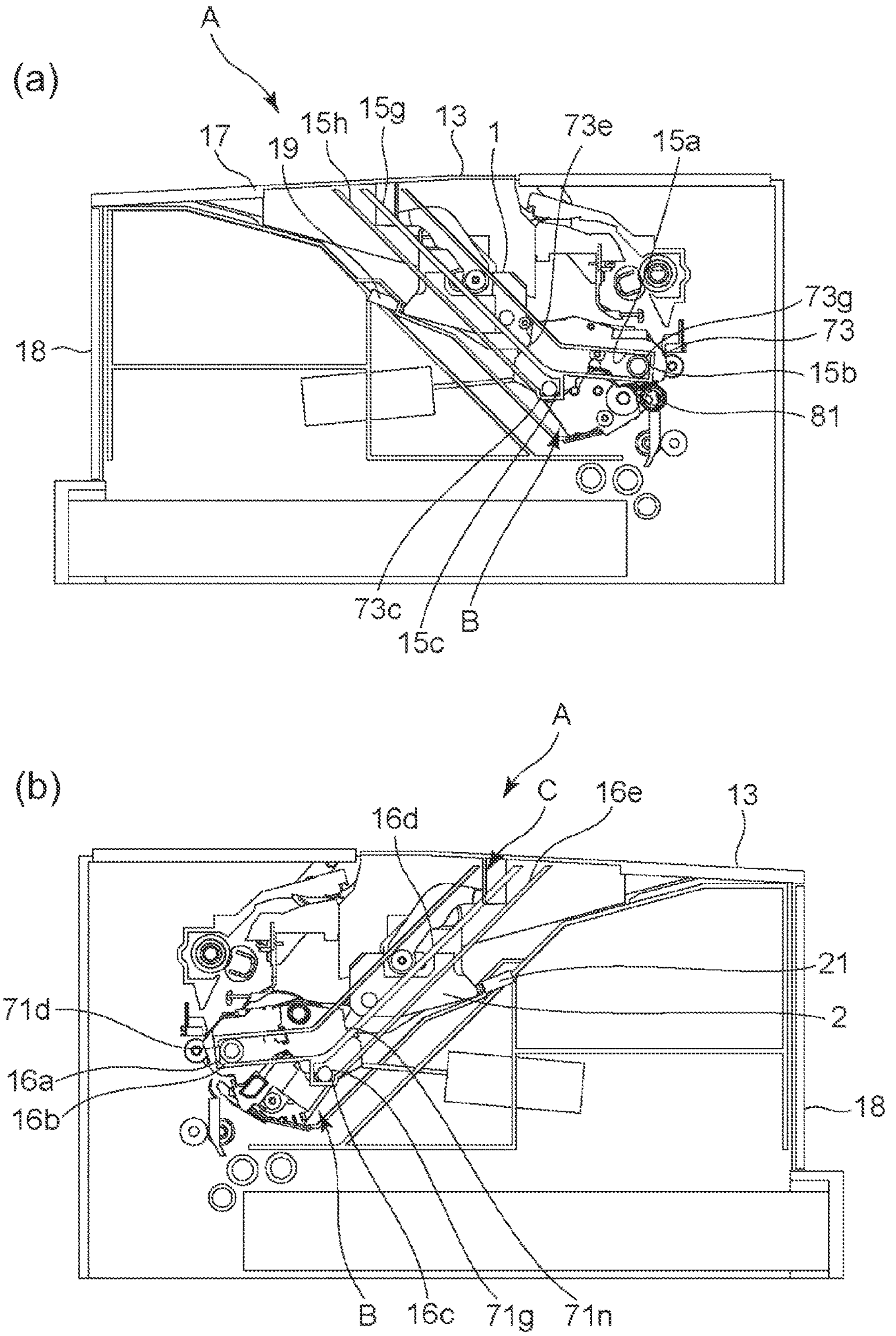
FIG. 10 is sectional views of the main assembly of the apparatus.

Next, referring to FIGS. 8, 9 and 10, the mounting of the cartridge B on the apparatus main assembly A will be specifically described. Part (a) of FIG. 8 is a sectional view of the driving side of the apparatus main assembly A with the door 13 open, and part (b) of FIG. 8 is a sectional view of the non-driving side of the apparatus main assembly A with the door 13 open. The sectional planes of part (a) of FIG. 8 and part (b) of FIG. 8 are perpendicular to the rotational axis L1. FIG. 9 is views illustrating positioning of the cartridge B in the longitudinal direction (direction of the rotational axis L1), and is sectional views of a fitting portion 15*j* of the apparatus main assembly A taken along a horizontal plane parallel to the rotational axis L1 (parallel with an installation surface of the apparatus main assembly A). Part (a) of FIG. 9 shows a state immediately before the cartridge B is fitted with the fitting portion 15*j*, and part (b) of FIG. 9 shows a state in which the cartridge B is in fitting engagement at the fitting portion 15*j*. Part (a) of FIG. 10 is a sectional view of the driving side of the apparatus main assembly A with the door 13 closed, and part (b) of FIG. 10 is a sectional view of the non-driving side of the apparatus main assembly A with the door 13 closed. The planes of the section of part (a) of FIG. 10 and part (b) of FIG. 10 are perpendicular to the rotational axis L1.

First, the mounting of the cartridge B on the apparatus main assembly A will be described. The apparatus main assembly A comprises a first driving side plate 15 and a non-driving side plate 16 which sandwich the cartridge B mounted on the apparatus main assembly A in the direction of the rotational axis L1. Further, a door 13 for opening and closing the insertion opening 17 is rotatably mounted on the apparatus main assembly A. The first driving side plate 15 is provided with an upper guide rail 15*g* and a lower guide rail 15*h* which guide the cartridge B when the cartridge B is mounted and dismounted. The non-driving side plate 16 is provided with an upper guide rail 16*d* and a lower guide rail 16*e* which guide the cartridge B when the cartridge B is mounted and dismounted. In addition, the drum bearing member 73 of the cartridge B is provided with a guided portion 73*g* and a rotation stop portion 73*c*, and the frame member 71 is provided with a positioned portion 71*d* and a rotation stop portion 71*g*. Therefore, the guided portion 73*g* and the rotation stop portion 73*c* are disposed on the driving side of the cartridge B, and the guided portion 73*g* and the rotation stop portion 73*c* are disposed on the non-driven side of the cartridge B.

When the door 13 of the apparatus main assembly A is opened and the insertion opening 17 formed between the first driving side plate 15 and the non-driving side plate 16 is open, the cartridge B can be inserted into and can be removed from the apparatus main assembly A through the insertion opening 17. At this time, by moving the cartridge B in a direction substantially perpendicular to the rotational axis L1 of the drum 62, the cartridge B can be inserted and mounted to and removed from the apparatus main assembly A. That is, a mounting direction M of the cartridge B to the apparatus main assembly A (part (a) of FIG. 9 and a dismounting direction thereof from the apparatus main assembly A (reverse direction to the mounting direction M) are directions substantially perpendicular to the rotational axis L1. The rotational axis L1 of the cartridge B mounted in the apparatus main assembly A is parallel to the rotational axis L2 of the drive transmission gear 81, and therefore, the mounting direction M of the cartridge B to the apparatus main assembly A and the dismounting direction thereof from the apparatus main assembly A are substantially perpendicular to the rotational axis L2. In addition, when the cartridge B is mounted to and dismounted from the apparatus main assembly A, the drum unit 69 moves integrally with the cartridge B to the apparatus main assembly A, and is mounted to and dismounted from the apparatus main assembly A. Therefore, the mounting direction of the drum unit 69 to the apparatus main assembly A and the dismounting direction thereof from the apparatus main assembly A are the same as the mounting direction M of the cartridge B to the apparatus main assembly A and the dismounting direction thereof from the apparatus main assembly A, respectively.

<Mounting and Positioning of Cartridge>

When the cartridge B is inserted into the apparatus main assembly A through the cartridge insertion opening 17, the guided portion 73*g* and the rotation stop portion 73*c* on the driving side of the cartridge B are guided by the upper guide rail 15*g* and the guide rail 15*h*, respectively. The non-driven side positioned portion 71*d* and the rotation stop portion 71*g* of the cartridge B are guided by the upper guide rail 16*d* and the lower guide rail 16*e*. By guiding the cartridge B by the guide rails of the apparatus main assembly A and inserting the cartridge B in this manner, the mounting of the cartridge B on the apparatus main assembly A is finally completed.

As shown in parts (a) and (b) of FIG. 9, the drum bearing member 73 is provided with a fitted portion 73*h* functioning as a positioned portion (axial direction positioned portion) to be positioned with respect to the apparatus main assembly A in the direction of the rotational axis L1. The fitted portion 73*h* has a recess shape (or a groove shape or a slit shape) recessed in the mounting direction M (direction perpendicular to the rotational axis L1). On the other hand, the first driving side plate 15 of the apparatus main assembly A is provided with a fitting portion 15*j* which can be fitted with the fitted portion 73*h*. The fitting portion 15*j* has a projection shape projecting in the direction opposite to the mounting direction MD.

In the process of inserting the cartridge B into the apparatus main assembly A, as shown in part (b) of FIG. 9, the fitted portion 73*h* is fitted with the fitting portion 15*j*, by which the position of the cartridge B in the direction of the rotational axis L1 (the longitudinal direction of the cartridge B) is determined. The fitting between the fitted portion 73*h* and the fitting portion 15*j* is loose fitting, but the fitting play (gap) is set to be extremely small (150 μm at the maximum). For this reason, it can be said that the cartridge B is positioned at substantially the same position in the direction of the rotational axis L1 regardless of whether the fitted portion 73*h* abuts the fitting portion 15*j* in either the H direction or the J direction.

Further, as shown in part (a) of FIG. 8, part (b) of FIG. 8, part (a) of FIG. 10, and part (b) of FIG. 10, the first driving side plate 15 is provided with a positioning portion 15*a*, a positioning portion 15*b*, and a rotation stop portion 15*c*, and the non-driving side plate 16 is provided with a positioning portion 16*a*, a positioning portion 16*b*, and a rotation stop portion 16*c*. Cartridge pressing members 1 and 2 are mounted to opposite ends of the door 13 in the direction of the rotational axis of the door 13 so as to be movable (rotatable) with respect to the door 13. In addition, the first driving side plate 15 and the non-driving side plate 16 is provided with pressing springs 19 and 21, respectively.

Further, as shown in FIG. 3, the drum bearing member 73 of the cartridge B has a pressed portion (urging force receiving portion) 73*e*, and the frame member 71 has a pressed portion (urging force receiving portion) 71*n*. The pressed portions 73*e* and 71*n* are provided in recess portions on the driving side and the non-driving side of the cartridge B, respectively.

As shown in part (a) of FIG. 10 and part (b) of FIG. 10, by closing the door 13, the cartridge pressing members 1 and 2 are urged toward the cartridge B by the pressing springs 19 and 21. And, the cartridge pressing members 1 and 2 abut to the pressed portions 73*e* and 71*n*, and press the pressed portions 73*e* and 71*n* by the urging force of the pressing springs 19 and 21.

By this, on the driving side, the positioned portion 73*g* of the cartridge B contacts the positioning portion 15*a* and the positioning portion 15*b* of the apparatus main assembly A, and the rotation stop portion 73c contacts the rotation stop portion 15c of the apparatus main assembly A. By this, the driving side portion of the drum frame 60a of the cartridge B is positioned in a direction perpendicular to the rotational axis L1 and rotation about the axis parallel to the rotational axis L1 is restricted. On the non-driven side, the positioned portion 71d of the cartridge B abuts to the positioning portions 16a and 16b of the apparatus main assembly A, and the rotation stop portion 71g abuts to the rotation stop portion 16c of the apparatus main assembly A. By this, the non-driving side portion of the drum frame 60a of the cartridge B is positioned in the direction perpendicular to the rotational axis L1, and rotation about the axis parallel to the rotational axis L1 is restricted.

By positioning the drum frame 60a of the cartridge B with respect to the apparatus main assembly A in this manner, the drum unit 69 positioned with respect to the drum frame 60a is also indirectly positioned with respect to the apparatus main assembly A.

<Drive Transmission to Drum Unit>

Figure 1:
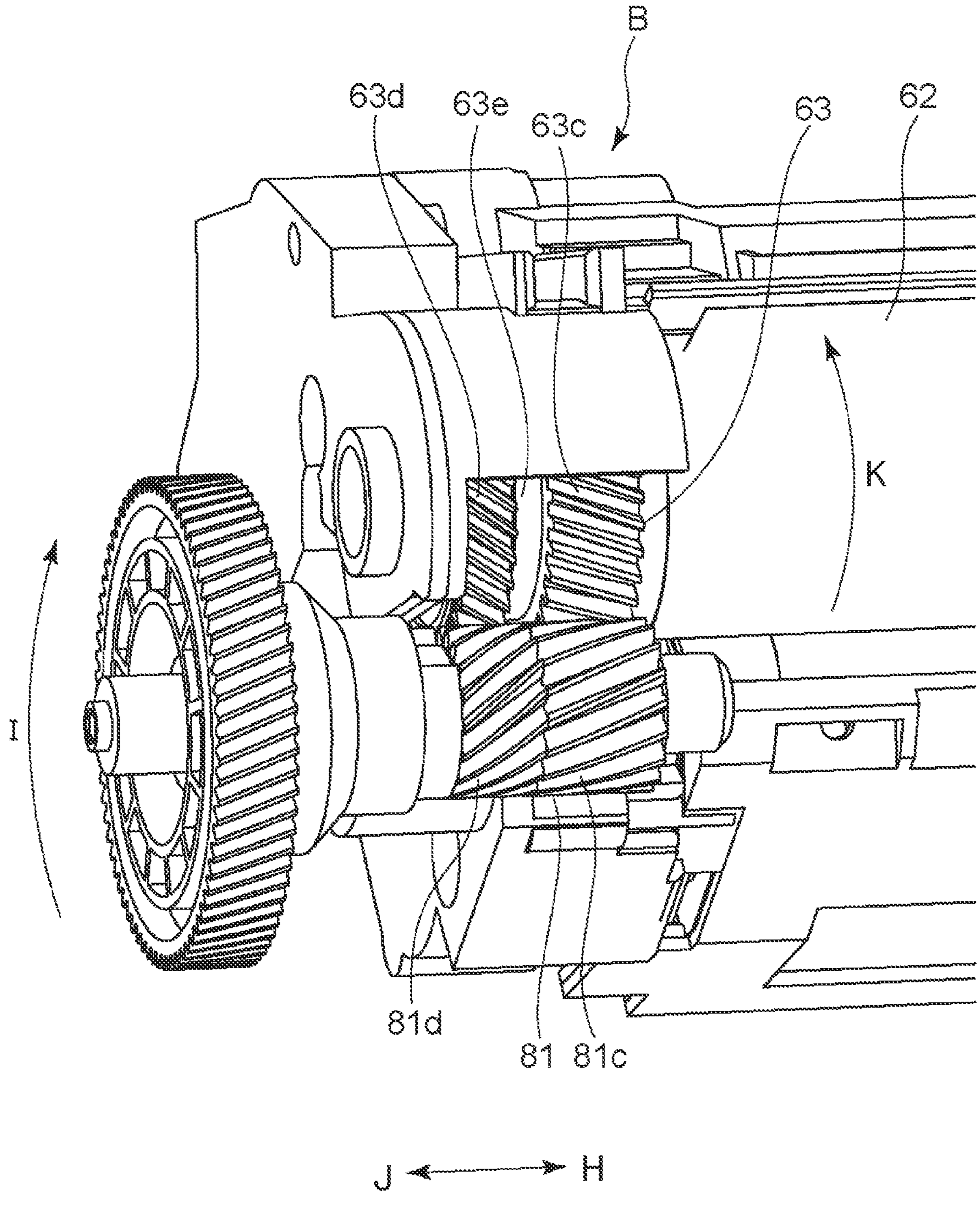
FIG. 1 is a perspective view of a part which transmits a driving force from the main assembly of the apparatus to the drum unit.
Figure 11:
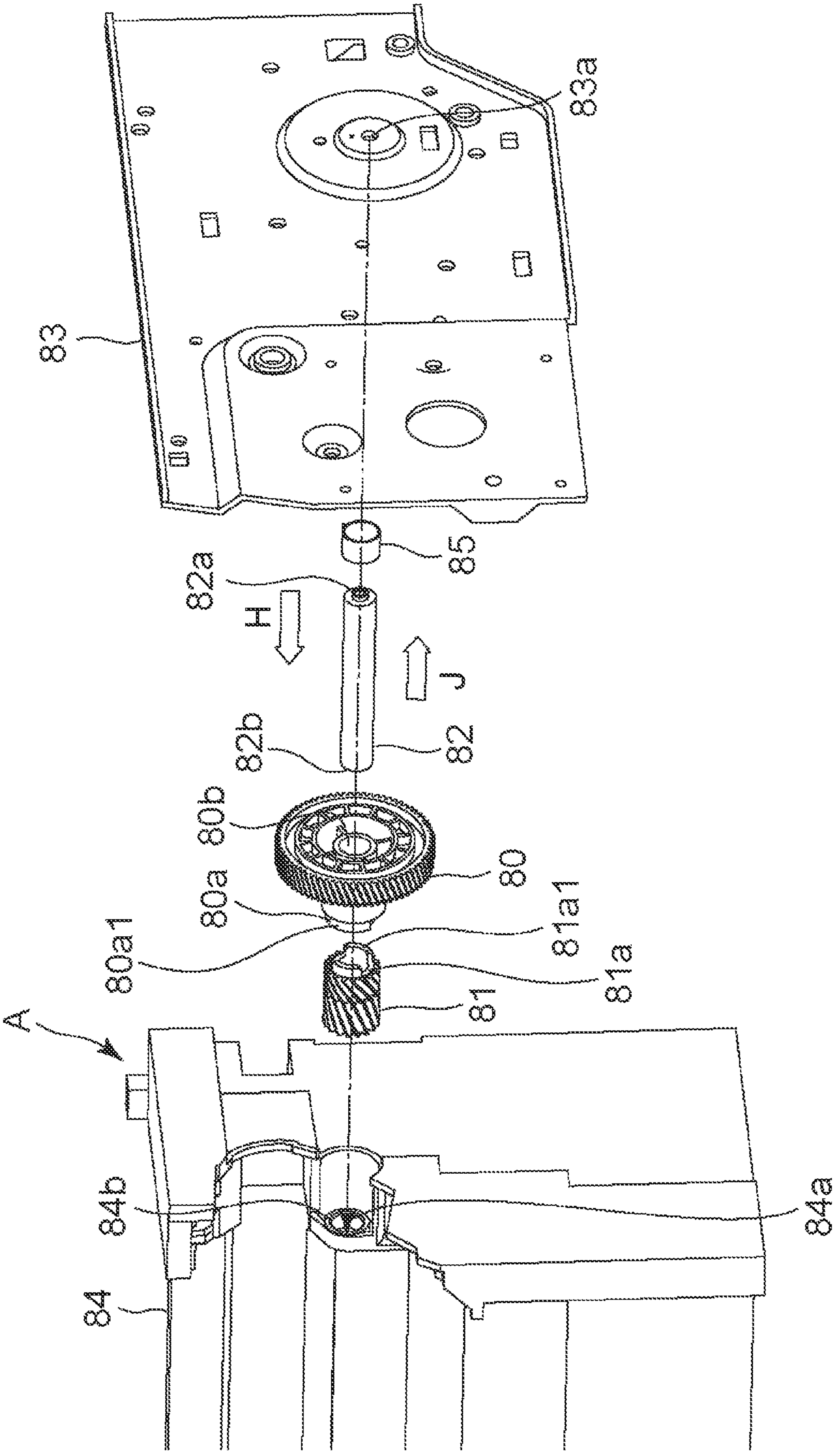
FIG. 11 is an exploded perspective view of the main assembly of the apparatus.
Figure 12:
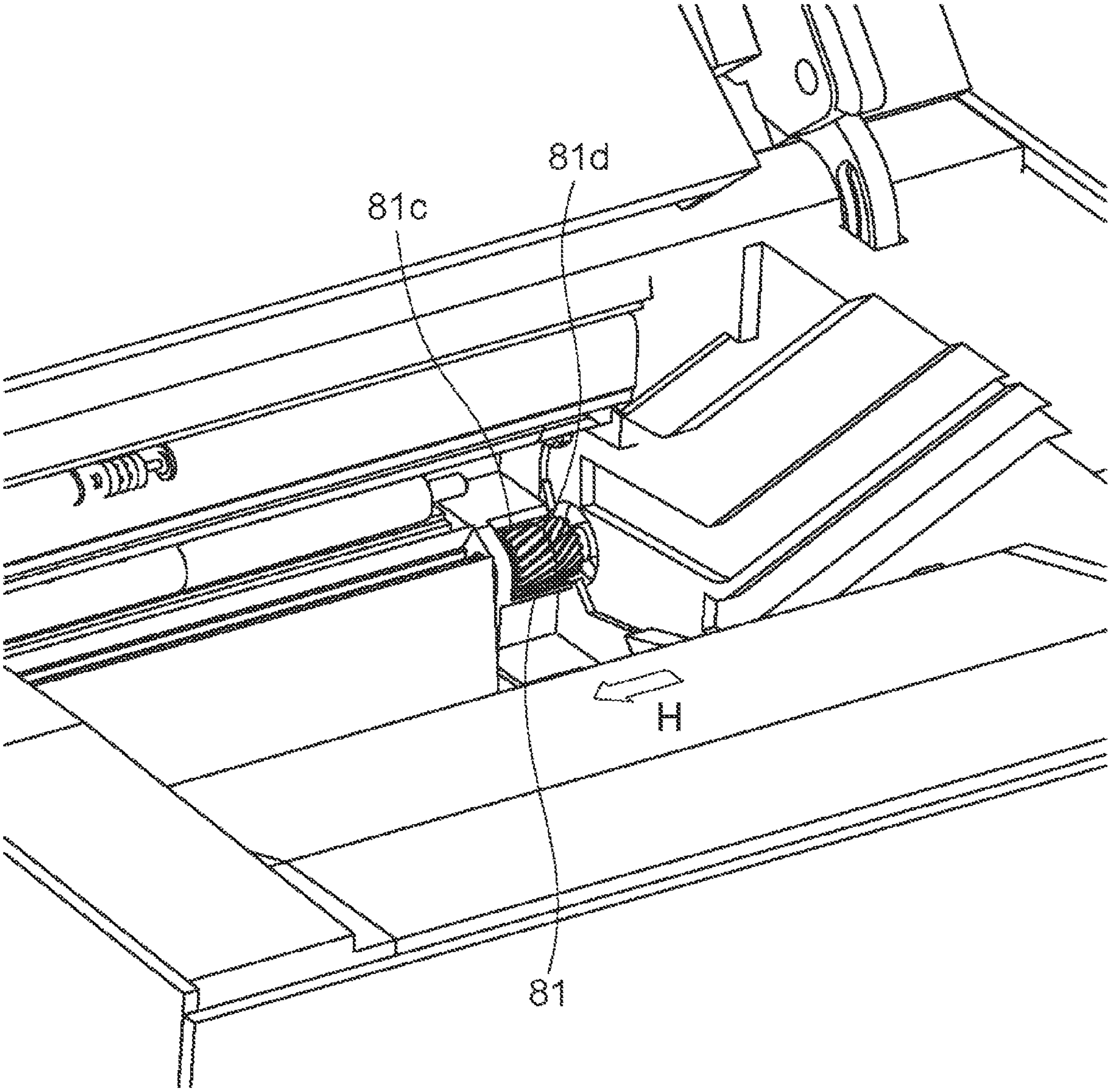
FIG. 12 is a perspective view of a drive transmission portion of the main assembly of the apparatus.
Figure 13:
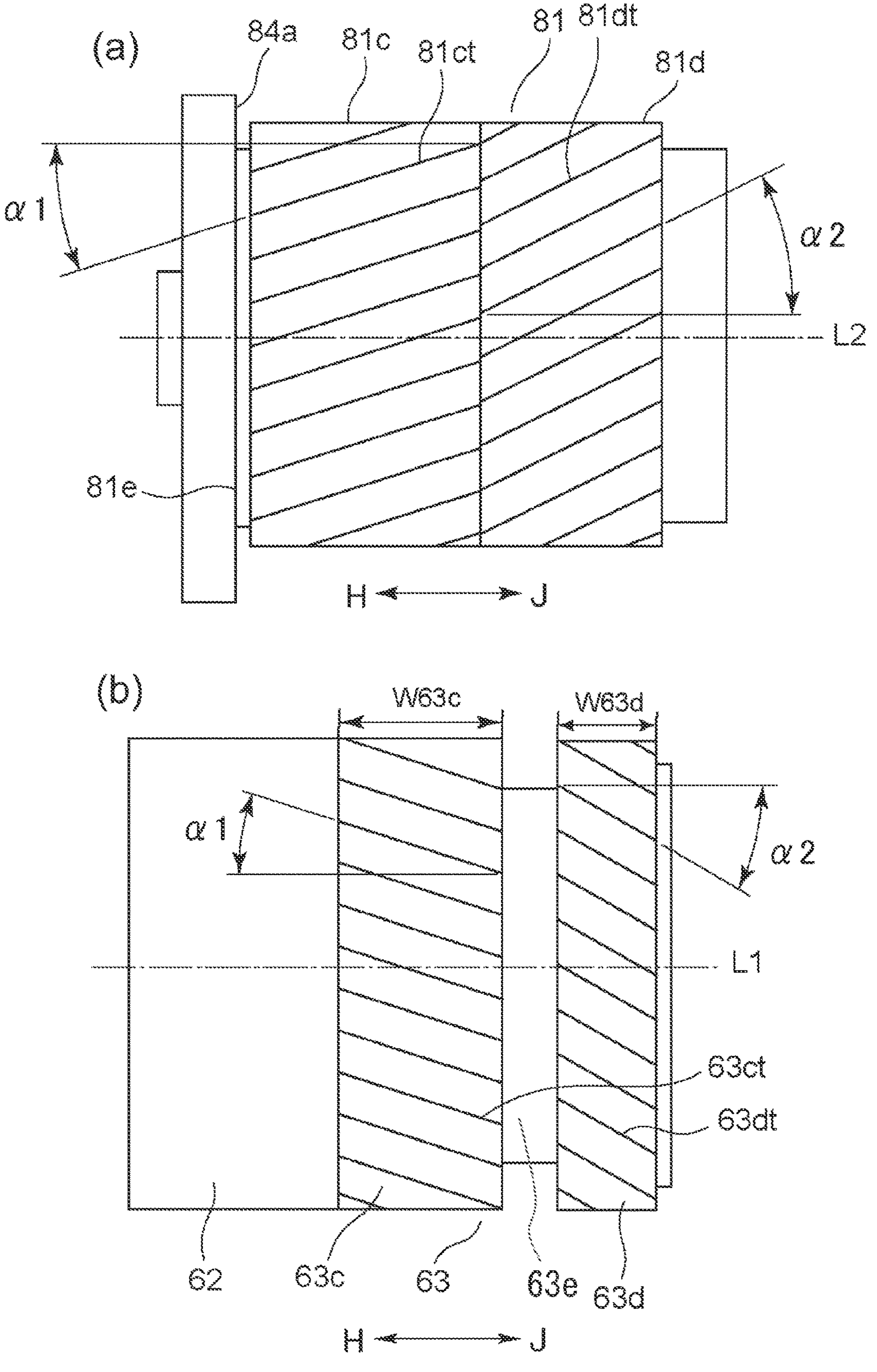
FIG. 13 is schematic views of a drive transmission gear of the main assembly of the apparatus.
Figure 14:
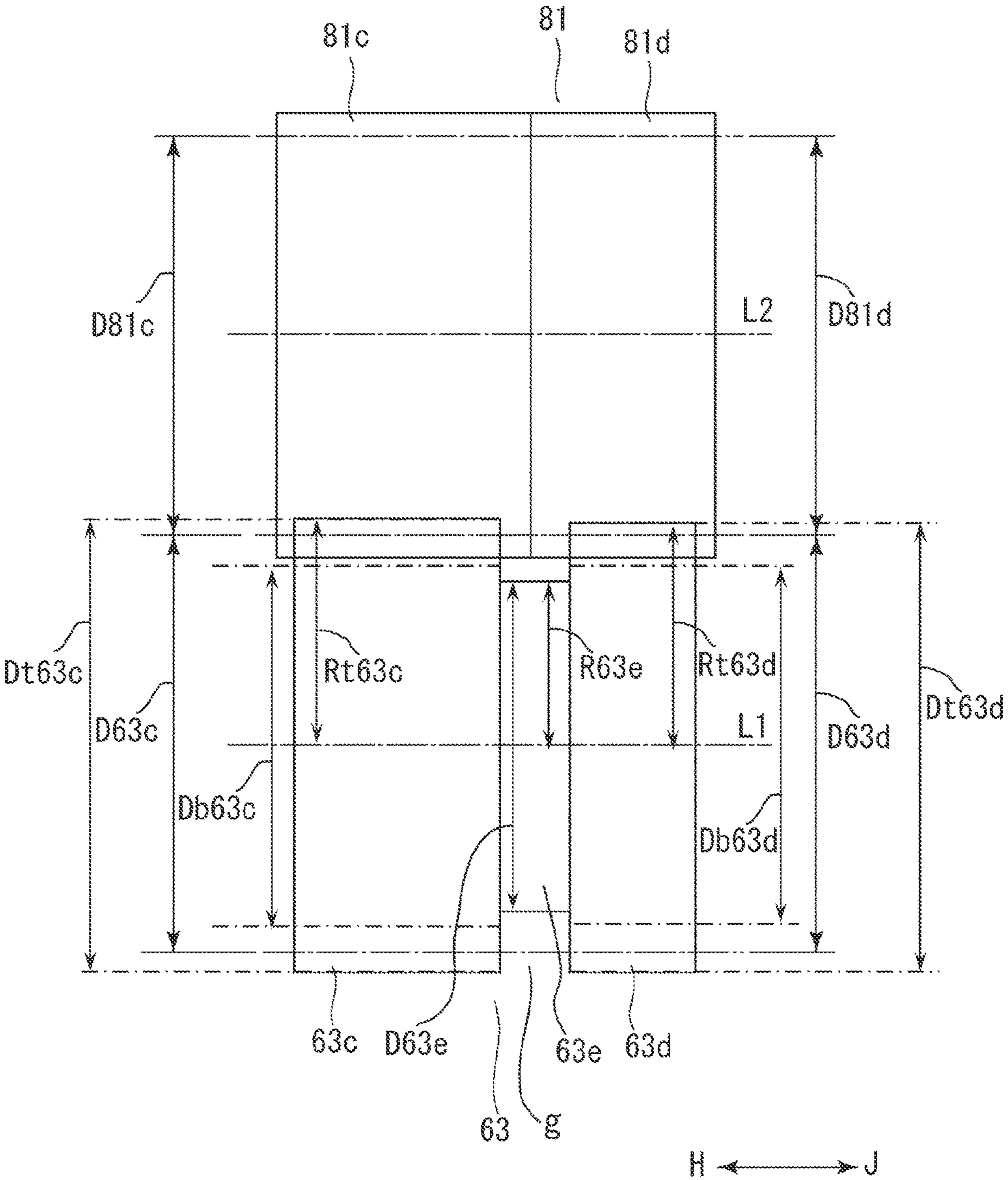
FIG. 14 is a schematic illustration of a drive transmission structure from the drive transmission gear to a driving side flange.

Next, a structure for transmitting the drive from the apparatus main assembly A to the drum unit 69 and the drum 62 will be described. FIG. 1 is a perspective view of a portion for transmitting the drive from the apparatus main assembly A to the drum unit 69. FIG. 11 is an exploded perspective view illustrating a support structure of the drive transmission gear 81 of the apparatus main assembly A. FIG. 12 is a perspective view illustrating a drive transmission unit of the apparatus main assembly A. Part (a) of FIG. 13 is an illustration schematically showing the drive transmission gear 81 of the apparatus main assembly A. Part (b) of FIG. 13 is an illustration schematically showing the driving side flange 63 of the cartridge B. In part (a) of FIG. 13 and part (b) of FIG. 13, an addendum circle of the gear is shown for the gear tooth. FIG. 14 is an illustration schematically showing a drive transmission structure from the drive transmission gear 81 of the apparatus main assembly A to the driving side flange 63 of the cartridge B.

<Drive Structure on Apparatus Main Assembly Side>

As shown in FIG. 11, the apparatus main assembly A includes a motor (not shown), an idler gear 80, a drive transmission gear 81, a second driving side plate 83, a main frame 84, a driving shaft 82, and a compression spring 85. The driving force of the motor is transmitted from the idler gear 80 to the drive transmission gear 81. The idler gear 80 and the drive transmission gear 81 are supported by the driving shaft 82 so as to be coaxially rotatable and movable in the direction of the rotational axis. One end 82a of the driving shaft 82 is fixed to the hole 83a of the second driving side plate 83, and the other end 82b thereof is supported by the hole 84a of the main frame 84. The driving shaft 82 is provided so that the rotational axis of the drive transmission gear 81 is parallel with the rotational axis L1 of the drum 62 when the cartridge B is mounted in the apparatus main assembly A.

In addition, the compression spring 85 is provided between the other end 80b of the idler gear 80 and the second driving side plate 83, so that the idler gear 80 is urged in the H direction of the rotational axis direction. As described above, the J direction and the H direction in the apparatus main assembly A are defined to be coincident with the J direction and the H direction of the cartridge B having been mounted on the apparatus main assembly A. As a result, as shown in FIG. 11, the J direction is the direction from the idler gear 80 toward the second driving side plate 83 along the rotational axis of the idler gear 80, and the H direction is the direction opposite thereto.

One end 80a of the idler gear 80 is provided with a recess 80a1 recessed in the direction of the rotational axis. On the other hand, one end 81a of the drive transmission gear 81 is provided with a projection 81a1 projecting in the direction of the rotational axis at a position facing the recess 80a1 of the idler gear 80. By engagement of the recess 80a1 of the idler gear 80 with the projection 81a of the drive transmission gear 81, the drive force is transmitted from the idler gear 80 to the drive transmission gear 81, and the drive transmission gear 81 is rotated integrally. The projection-recess relationship between the recess 80a1 and the projection 81a1 may be reversed.

As will be described hereinafter, the drive transmission gear 81 mesh-engages with the driving side flange 63 of the cartridge B to transmit the drive force. As shown in part (d) of Figure luring performing the above-mentioned image forming process operation, the initial operation after mounting the cartridge B, and the preparatory operation of the image forming process (collectively referred to as "driving"), the drive transmission gear 81 is rotated in the I direction to rotate the driving side flange 63 in the K direction. That is, the driving direction (rotational direction) of the drive transmission gear 81 during driving is the I direction, and the driving direction (rotational direction) of the driving side flange 63 during driving is the K direction. As the drive transmission gear 81 and the driving side flange 63 are viewed from the driving side to the non-driving side along the H direction, the I direction is a clockwise direction and the K direction is a counterclockwise direction.

<Drive Transmission Gear 81>

As shown in FIGS. 1, 12 and part (a) of FIG. 13, the drive transmission gear 81 includes a first main assembly gear portion (first main assembly side gear portion, first main assembly side helical tooth gear portion) 81c and a second main assembly gear portion (second main assembly side gear portion, second main assembly side helical tooth gear portion) 81d are provided which are coaxial with each other, as an helical tooth gear portion. The first main assembly gear portion 81c is located on the downstream side, in the H direction (upstream side in the J direction), with respect to the second main assembly gear portion 81d. The first main assembly gear portion 81c includes a plurality of first main assembly helical teeth 81ct, and the second main assembly gear portion 81d includes a plurality of second main assembly helical teeth 81dt. The first main assembly helical tooth 81ct and the second main assembly helical tooth 81dt both have involute tooth profiles. The first main assembly gear portion 81c and the second main assembly gear portion 81d are integrally resin-molded and are integrally rotatable. In addition, twisting directions of the first main assembly gear portion 81c and the second main assembly gear portion 81d are the same, and the tooth surfaces are twisted so as to shift in the I direction as go in the J direction. Further, as shown in part (a) of FIG. 13, a helix angle $\alpha 2$ of the second main assembly gear portion 81d is larger than a helix angle $\alpha 1$ of the first main assembly gear portion 81c (that is, $\alpha 1 < \alpha 2$ is satisfied). Furthermore, the numbers of teeth of the first main assembly gear portion 81c and the second main assembly gear portion 81d are the same.

<Driving Side Flange 63>

On the other hand, as shown in FIGS. 1, part (b) of FIG. 6 and part (b) of FIG. 13, the driving side flange 63 is coaxially provided with the first gear portion (first unit side gear portion, first unit side helical gear portion) 63c as the helical gear portion, and a second gear portion (second unit side gear portion, second unit side helical gear portion, second helical gear portion) 63d. The first gear portion 63c is disposed on a downstream side, in the H direction (upstream side in the J direction), of the second gear portion 63*d*. That is, the first gear portion 63*c* is disposed between the second gear portion 63*d* and the drum 62 in the direction of the rotational axis L1. The first gear portion 63*c* includes a plurality of first helical teeth (first projections) 63*ct* provided at different positions in a circumferential direction about the rotational axis L1, and the second gear portion 63*d* includes a plurality of second helical teeth (second projections) 63*dt* provided at different positions in the circumferential direction about the rotational axis L1. The first helical teeth 63*ct* and the second helical teeth 63*dt* are both involute teeth and are projections projecting in the radial direction centered on the rotational axis L1. The first gear portion 63*c* and the second gear portion 63*d* are integrally molded of resin and rotate integrally, and therefore, the first gear portion 63*c* and the second gear portion 63*d* can be said to be a first rotating portions and a second rotating portion which are rotatable integrally with each other. The first gear portion 63*c* meshes with the first main assembly gear portion 81*c* of the drive transmission gear 81, and the second gear portion 63*d* meshes with the second main assembly gear portion 81*d* of the drive transmission gear 81.

As shown in FIG. 1, twisting directions of the first gear portion 63*c* and the second gear portion 63*d* of the driving side flange 63 are the same, and the tooth surfaces twisted so as to shift in the K direction as go in the J direction. The twisting direction of the first gear portion 63*c* and the second gear portion 63*d* is opposite to the twisting direction of the first main assembly gear portion 81*c* and the second main assembly gear portion 81*d* of the drive transmission gear 81. Further, as shown in part (b) of FIG. 13, a helix angle $\alpha 2$ of the second gear portion 63*d* is larger than a helix angle $\alpha 1$ of the first gear portion 63*c* (that is, $\alpha 1<\alpha 2$ is satisfied). The helix angle $\alpha 1$ of the first gear portion 63*c* is the same as the helix angle $\alpha 1$ of the first main assembly gear portion 81*c*, and the helix angle $\alpha 2$ of the second gear portion 63*d* is the same as the helix angle $\alpha 2$ of the second main assembly gear portion 81*d*. In addition, the numbers of the teeth of the first gear portion 63*c* and the second gear portion 63*d* of the driving side flange 63 are the same. Further, a width (tooth width) W63*c* (Wc, Wc1) of the first helical tooth (first projection) 63*ct* measured in the direction of the rotational axis L1 is larger than a width (tooth width) W63*d* (Wd) of the second helical tooth (second projection) 63*dt* measured in the direction of the rotational axis L1. That is, the first gear portion 63*c* and the second gear portion 63*d* is each provided with at least one tooth such that the tooth width Wc of the first helical tooth (tooth, first projection) 63*ct* measured in the direction of the rotational axis L1 and the tooth width Wd of the second helical tooth (tooth, second projection) 63*dt* measured in the direction of the rotational axis L1 satisfy the following formula A1.

$$Wc>Wd \quad \text{(Formula A1).}$$

In other words, when the width (tooth width) of the first helical tooth 63*ct* having the largest width (tooth width) measured in the direction of the rotational axis L1 of the first gear portion 63*c* is Wc1, the second gear portion 63*d* has a second helical tooth (second projection) 63*dt* having a width (tooth width) measured in the direction of the rotational axis L1 which is smaller than Wc1.

As will be described in detail hereinafter, while the driving side flange 1763 is driven by the drive transmission gear 1781 in a balanced state, the drive force FD received by a first gear portion 1763*c* is higher than a restricting force FB received by a second gear portion 1763*d*, and therefore, such a relationship is preferable.

In addition, the larger a width (meshing width), in the direction of the rotational axis L1, of the portion where the first gear portion 63*c* in meshing engagement (contact) with the first main assembly gear portion 81*c* and a meshing engagement width of the second helical tooth gear portion 63*c* with the second main assembly gear portion 81*d*, the better the drive transmission accuracy. However, if the meshing width is set larger than necessary, the widths of the first gear portion 63*c* and the second gear portion 63*d* in the direction of the rotational axis L1 are large, and the driving side flange 63, the drum unit 69, the cartridge B, and eventually the apparatus main assembly A are upsized. Therefore, the tooth width Wc1 of the first helical tooth (tooth) 63*ct* having the largest tooth width in the first gear portion 63*c* and the tooth width Wd1 of the second helical tooth (tooth) 63*dt* having the largest tooth width in the second gear portion 63*d* preferably satisfies the following formula A2, more preferably formula A3.

$$Wd1\leq(4/5)\cdot Wc1 \quad \text{(A2)}$$

$$Wd1\leq(3/4)\cdot Wc1 \quad \text{(A3)}$$

Further, from a standpoint of the strength of the second helical tooth (tooth) 63*dt* of the second gear portion 63*d*, it is preferable that the second helical tooth (tooth) 63*dt* has a tooth width of a certain level or more, and it is preferable that the tooth width Wc1 and the tooth width Wd1 satisfies the following formula A4.

$$Wd1\geq(1/10)\cdot Wc1 \quad \text{(formula A4).}$$

In addition, as shown in FIG. 14, meshing pitch circle diameters D63*c* and D63*d* of the first gear portion 63*c* and the second gear portion 63*d* in the meshing between the driving side flange 63 and the drive transmission gear 81 are set to be substantially the same. Further, addendum circle diameters Dt63*c* and Dt63*d* of the first gear portion 63*c* and the second gear portion 63*d* are also set to be substantially the same. Similarly, the meshing pitch circle diameters D81*c* and D81*d* of the first main assembly gear portion 81*c* and the second main assembly gear portion 81*d* are set to be substantially the same. By this, the meshing between the first gear portion 63*c* and the first main assembly gear portion 81*c* and the meshing between the second gear portion 63*d* and the second main assembly gear portion 81*d* can be appropriately meshed without tip tooth bearing.

In order to set the meshing pitch circular diameters D63*c* and D63*d* of the first gear portion 63*c* and the second gear portion 63*d* to be substantially the same, it is preferable that the shapes of the first gear portion 63*c* and the second gear portion 63*d* are as follows.

Specifically, it is preferable that the addendum circle diameter Dt63*c* of the first gear portion 63*c* is larger than a dedendum circle diameter Db63*d* of the second gear portion 63*d*, or is larger than 0.8 times (further preferably 0.9 times) the addendum circle diameter Dt63*d* of the second gear portion 63*d*. In addition, it is preferable that the addendum circle diameter Dt63*c* of the first gear portion 63*c* is preferably smaller than 1.1 times the addendum circle diameter Dt63*d* of the second gear portion 63*d*.

Further, it is preferable that the dedendum circle diameter Db63*c* of the first gear portion 63*c* is smaller than the addendum circle diameter Dt63*d* of the second gear portion 63*d*. Furthermore, the dedendum circle diameter Db63*c* of the first gear portion 63*c* is preferably larger than 0.9 times the dedendum circle diameter Db63*d* of the second gear portion 63*d*.

Moreover, it is preferable that the addendum circle diameter Dt63*d* of the second gear portion 63*d* is larger than the dedendum circle diameter Db63*c* of the first gear portion 63*c*, or is larger than 0.8 times (further preferably 0.9 times) the addendum circle diameter Dt63*c* of the first gear portion 63*c*. Further, the addendum circle diameter Dt63*d* of the second gear portion 63*d* is preferably smaller than 1.1 times the addendum circle diameter Dt63*c* of the first gear portion 63*c*.

Further, the dedendum circle diameter Db63*d* of the second gear portion 63*d* is preferably smaller than the addendum circle diameter Dt63*c* of the first gear portion 63*c*. Further, the dedendum circle diameter Db63*d* of the second gear portion 63*d* is preferably larger than 0.9 times the dedendum circle diameter Db63*c* of the first gear portion 63*c*.

Here, the relationship between these dimensions is expressed using the diameters of the first gear portion 63*c* and the second gear portion 63*d*, but it is a matter of course that the relationship remains the same even if the diameters are replaced with radii. In addition, in the embodiments which will be described hereinafter, examples in which the teeth of the first gear portion 63*c* and the second gear portion 63*d* are replaced with a plurality of projections including various shapes will be shown. In such cases, the addendum circle is a circle drawn as a rotation locus when the free end (point) most remote from the rotational axis L1 among the tips of the plurality of projections rotates, and the diameter/radius of this circle is the addendum circle diameter/radius.

In order to make the meshing pitch circle diameters D63*c* and D63*d* the same while making the helix angles of the first gear portion 63*c* and the second gear portion 63*d* different, as described above, the modules and/or the amounts of gear profile shifts are made different between the first gear portion 63*c* and the second gear portion 63*d*. Similarly, for the drive transmission gear 81, the modules and/or the amounts of gear profile shifts are different between the first main assembly gear portion 81*c* and the second main assembly gear portion 81*d*.

In addition, the driving side flange 63 includes a cylindrical portion (intermediate portion, small diameter portion, shaft portion) 63*e* between the first gear portion 63*c* and the second gear portion 63*d* in the direction of the rotational axis L1. The maximum diameter D63*e* centered on the rotational axis L1 of the cylindrical portion 63*e* is smaller than the addendum circle diameter Dt63*c* of the first gear portion 63*c* and the addendum circle diameter Dt63*d* of the second gear portion 63*d*. Further, in this embodiment, the maximum diameter D63*e* centered on the rotational axis L1 of the cylindrical portion 63*e* is smaller than the dedendum circle diameter Db63*c* of the first gear portion 63*c* and the dedendum circle diameter Db63*d* of the second gear portion 63*d*. However, the maximum diameter D63*e* centered on the rotational axis L1 of the cylindrical portion 63*e* is not limited to the above unless it comes into contact with the drive transmission gear 81 while the driving side flange 63 is being driven by the drive transmission gear 81. Further, as will be described hereinafter in Embodiments 22 and 23, the structure may be such that the distance (radius) R63*e* from the rotational axis L1 to the outer diameter of the cylindrical portion 63*e* is at least temporarily smaller than the addendum circle radius Rt63*ct* of the first gear portion 63*c* or the addendum circle radius Rt63*d* of the second gear portion 63*d*, so that the driving side flange 63 and the drive transmission gear 81 can be in meshing engagement with each other to transmit the drive force.

Here, the relationship between these dimensions is expressed using the diameters of the first gear portion 63*c*, the second gear portion 63*d*, and the cylindrical portion 63*e*, but it is a matter of course that the relationships remain the same even if the diameters are replaced with radii. The shape of the cylindrical portion 63*e* does not have to be a cylindrical shape centered on the rotational axis L1. For example, various shapes such as a polygonal prism shape and a shape that is not symmetrical with respect to the rotational axis L1 can be used. In such cases, a diameter of the circle drawn as the rotation locus of the point most remote with respect to the rotational axis L1 in the intermediate portion 63*e* is the above-mentioned maximum diameter D63*e* when the driving side flange 63 rotates, and the radius of the circle is the maximum of the radius R63*e*.

By providing the cylindrical portion 63*e*, the second gear portion 63*d* can be arranged at a position away from the drum 62 (more downstream side in the J direction) so as not to contact the first gear portion 81*c*. Similarly, the first gear portion 63*c* can be placed at a position close to the drum 62 (more downstream in the H direction) so as not to contact the second main assembly gear portion 81*d*. That is, by providing the cylindrical portion 63*e*, a gap g is provided between the first gear portion 81*c* and the second gear portion 63*d* in the direction of the rotational axis L1. By this, when the cartridge B is mounted to the apparatus main assembly A, the first gear portion 63*c* is prevented from contacting the second main assembly gear portion 81*d*, and the second gear portion 63*d* is prevented from contacting the first main assembly gear the portion 81*c*, in the direction of the rotational axis L1. In addition, when the drive transmission gear 81 is driven and the drive transmission gear 81 is moved to a balanced position, the first main assembly gear portion 81*c* is prevented from contacting the second gear portion 63*d*, and the second main assembly gear portion 81*d* is prevented from contacting the first gear portion 63*c*. A width of the cylindrical portion 63*e* measured in the direction of the rotational axis L1 will be described in detail hereinafter.

<Drive Transmission to Developing Roller>

Figure 15:
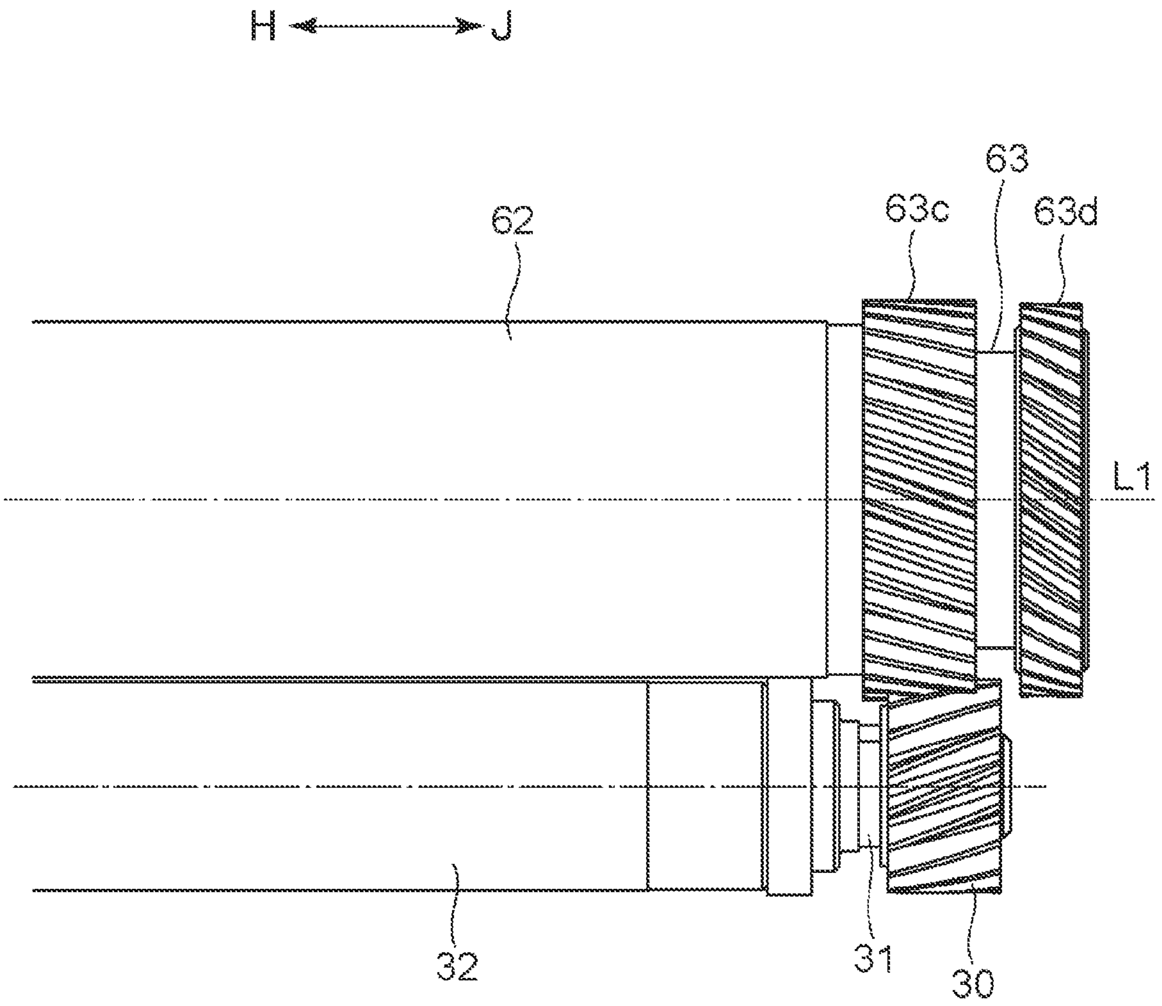
FIG. 15 is an illustration showing a drive transmission structure from the driving side flange to a developing roller.

FIG. 15 is an illustration of a structure of drive transmission from the driving side flange 63 to the developing roller 32. The developing roller 32 is fixed to the developing roller shaft 31, and a developing roller gear 30 is provided at one end on the driving side of the developing roller shaft 31 so as to be movable in the direction of the rotational axis of the developing roller shaft 31. The developing roller gear 30 is rotatable integrally with the developing roller shaft 31 and the developing roller 32. That is, the developing roller gear 30 is provided so as to be able to transmit the driving force to the developing roller shaft 31 and the developing roller 32. The developing roller gear 30 is meshing engagement with the first gear portion 63*c* of the driving side flange 63 to transmit the driving force thereto.

Alternatively, the developing roller gear 30 may be engaged with the second gear portion 63*d* to transmit the driving force. However, by employing a structure in which the developing roller gear 30 meshes with the first gear portion 63*c*, the length of the developing roller shaft 31 in the rotational axis direction can be reduced as compared with the structure in which the developing roller gear 30 meshes with the second gear portion 63*d*.

<Drive Transmission Operation>

Next, referring to FIGS. 16, 17, 19, 20, and 21, the meshing operation between the drive transmission gear 81 and the driving side flange 63 will be described in the order from the mounting of the cartridge B.

Figure 16:
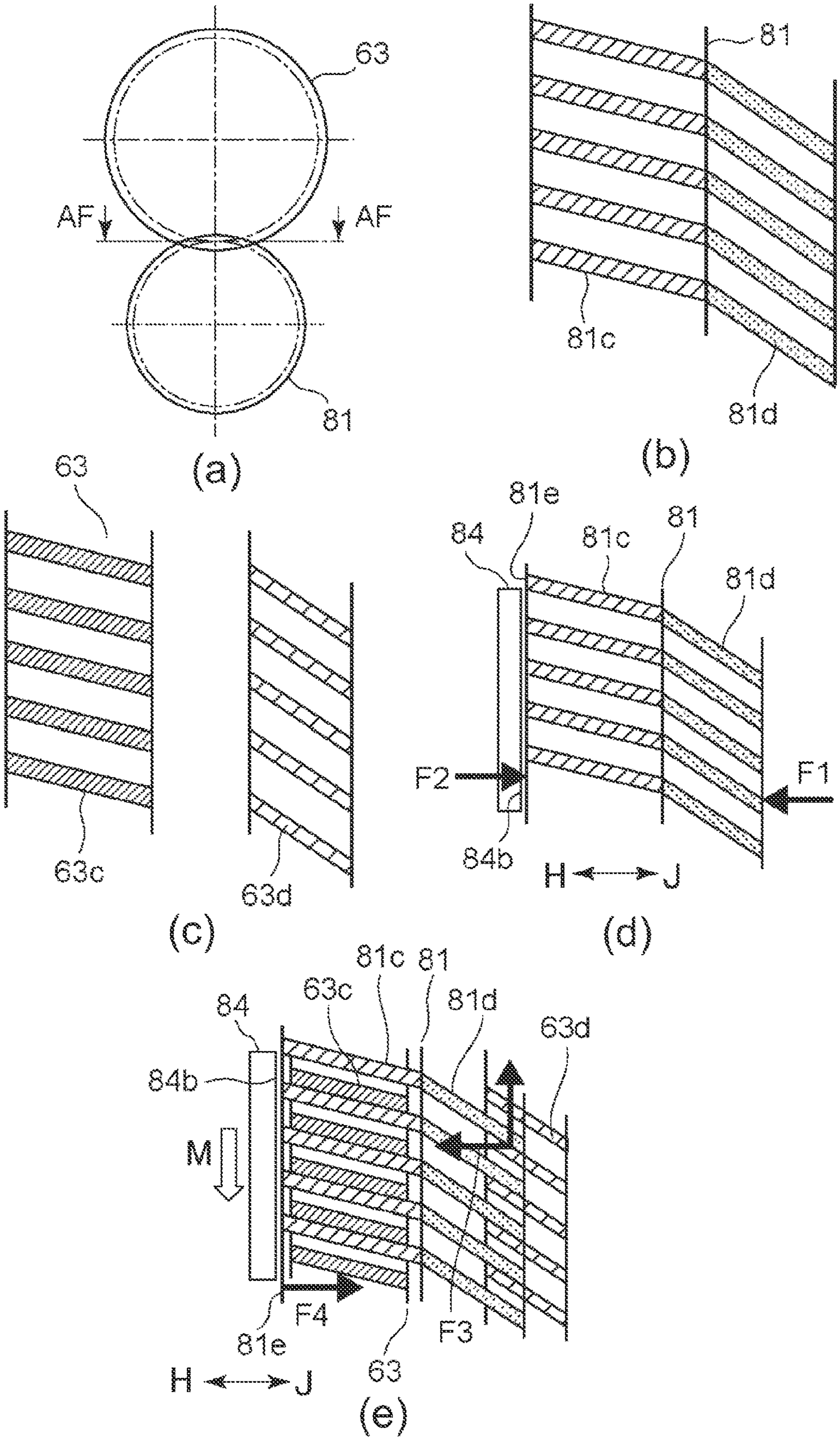
FIG. 16 is schematic views of the drive transmission gear and the driving side flange, and sectional views of the drive transmission gear.

Part (a) of FIG. 16 is a schematic view of the drive transmission gear 81 and the driving side flange 63 as viewed along the rotational axis direction. Part (b) of FIG. 16 is a sectional view of the drive transmission gear 81 taken along a line AF-AF. In the drawings subsequent to part (b) of FIG. 16, the shaded (hatched) portions in the Figures are sections of the tooth portions of the gear and the portion between adjacent shaded portions correspond to a part of the gear including the intertooth space portions of the gear. Part (c) of FIG. 16 is a sectional view of the driving side flange 63 taken along a line AF-AF. Part (d) of FIG. 16 is a sectional view of the drive transmission gear 81 taken along the line AF-AF before mounting the cartridge. Part (e) of FIG. 16 is a sectional view, taken along the line AF-AF, of the drive transmission gear 81 and the driving side flange 63 after mounting of the cartridge B and before start of the driving operation.

Figure 17:
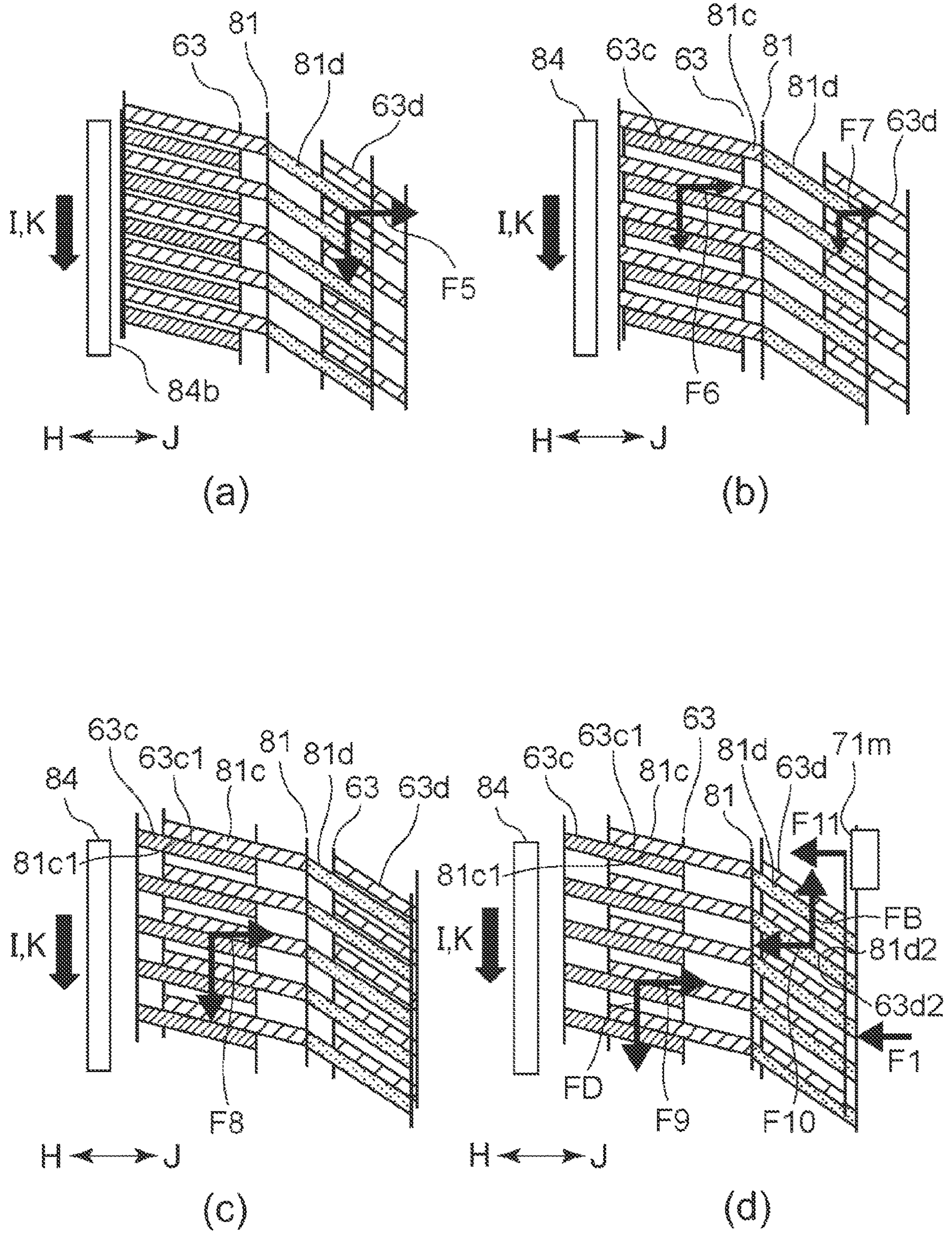
FIG. 17 is sectional views of the drive transmission gear and the driving side flange.

FIG. 17 is sectional views, taken along the line AF-AF which is in contact with the meshing pitch circle between of the drive transmission gear 81 and the driving side flange 63 immediately after the start of the drive, in which part (a) of FIG. 17, part (b) of FIG. 17, part (c) of FIG. 17, and part (d) of FIG. 17 shows states with elapse of time.

Figure 19:
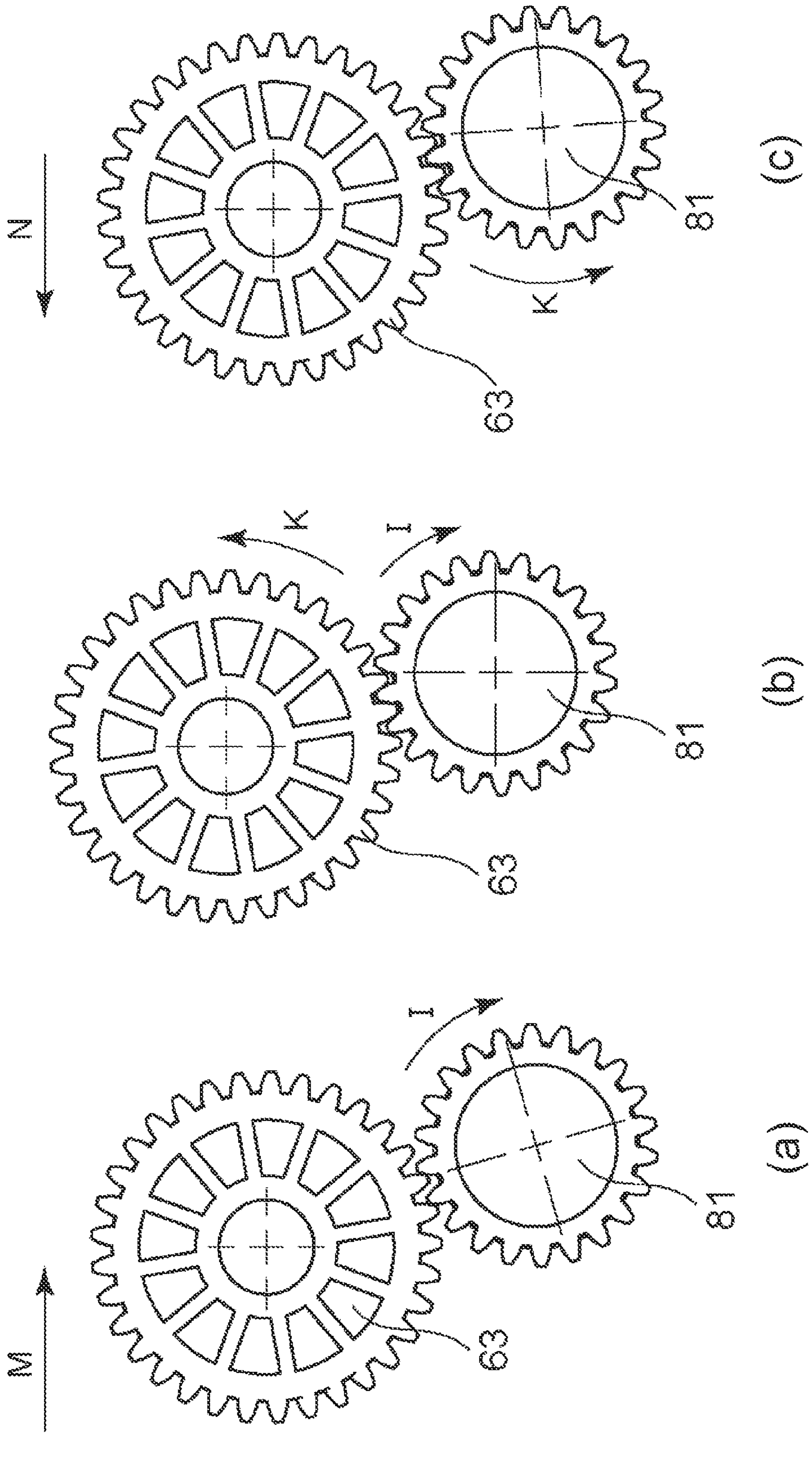
FIG. 19 is side views of the drive transmission gear and the driving side flange.

Part (a) of FIG. 19, part (b) of FIG. 19, and part (c) of FIG. 19 are illustrations of the drive transmission gear 81 and the driving side flange 63 as viewed along the H direction.

Figure 21:
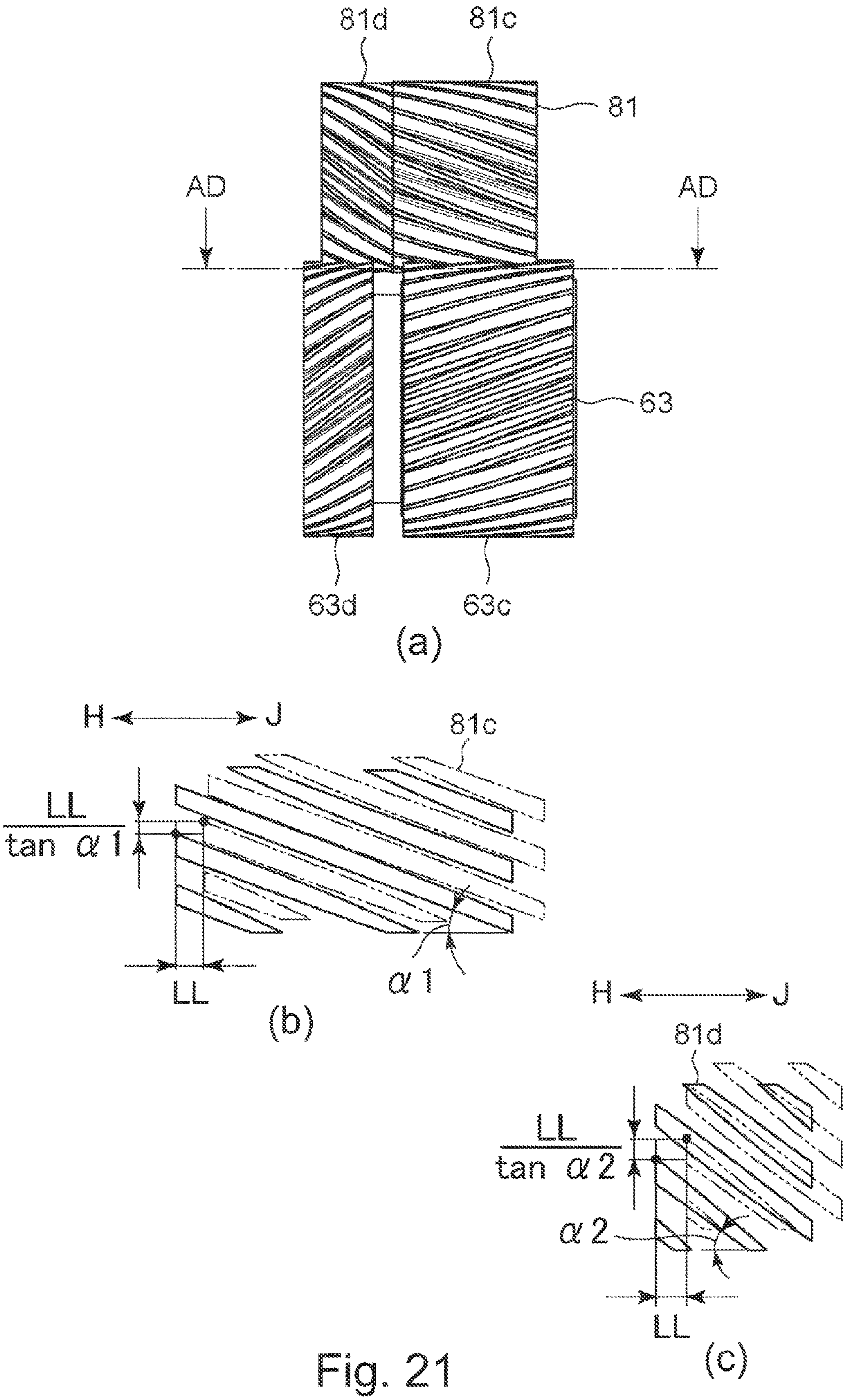
FIG. 21 is illustrations of the drive transmission gear and the driving side flange.

Part (a) of FIG. 21 is a view of the drive transmission gear 81 and the driving side flange 63 as viewed along the direction perpendicular to the rotational axis direction. Part (b) of FIG. 21 is a sectional view, taken along a line AD-AD, of the first main assembly gear portion 81*c* during the driving operation. Part (c) of FIG. 21 is a sectional view, taken along the line AD-AD, of the second main assembly gear portion 81*d* during the driving operation.

<Engagement when Cartridge B is Mounted>

As shown in part (d) of FIG. 16, in the drive transmission gear 81 before mounting the cartridge B, the other end 81*e* of the drive transmission gear 81 is abutted against a surface 84*b* of the main frame by the urging force F1 of the compression spring 85, so that the drive transmission gear 81 is held thereby. By abutting and holding the drive transmission gear 81 against the abutting surface 84*b* in this manner, the initial position of the drive transmission gear 81 in the rotational axis direction is fixed, so that the meshing with the driving side flange 63 can be stabilized.

When the cartridge B is mounted to the apparatus main assembly A along the mounting direction M (M direction), the driving side flange 63 is brought into meshing engagement with the drive transmission gear 81 as shown in part (a) of FIG. 19. Here, the force required to rotate the driving side flange 63 is larger than the force required to rotate the drive transmission gear 81. Therefore, the drive transmission gear 81 is rotated in the I direction (clockwise direction) by the movement of the driving side flange 63 in the M direction. At this time, as shown in part (e) of FIG. 16, the first main assembly gear portion 81*c* or the second main assembly gear portion 81*d* of the drive transmission gear 81 is brought into contact the first gear portion 63*c* or the second gear portion 63*d* of the driving side flange 63, and is pressed in the M direction. A thrust force F3 in the H direction is applied to the drive transmission gear 81. However, since the other end 81*e* of the drive transmission gear 81 abuts against the abutting surface 84*b* of the main frame 84 and receives the reaction force F4, the drive transmission gear 81 cannot move in the H direction.

<Operation after Start of Driving>

Next, a case where the driving side flange 63 is driven in order to perform an initial operation, a preparatory operation for image formation, and the like will be described. As shown in part (b) of FIG. 19, the drive transmission gear 81 is rotated by a motor (not shown) of the apparatus main assembly A and rotates in the I direction. By this, the driving side flange rotates in the K direction. It is assumed that immediately after the start of rotation of the drive transmission gear 81 in the I direction, the second main assembly gear portion 81*d* of the drive transmission gear 81 first meshes with the second gear portion 63*d* of the driving side flange 63 to transmit the driving force thereto, as shown in part (a) of FIG. 17. Then, the second main assembly gear portion 81*d* applies a thrust force in the H direction to the second gear portion 63*d*. However, the driving side flange 63 is prevented from moving in the H direction by the rib 71*p*, and receives a reaction force in the J direction corresponding to the thrust force in the H direction. Therefore, the second main assembly gear portion 81*d* receives a thrust force F5 in the J direction due to the action of the reaction force received from the second gear portion 63*d*. The drive transmission gear 81 moves in the J direction by this thrust force F5.

When the drive transmission gear 81 moves in the J direction with further rotation, as shown in part (b) of FIG. 17, the first gear portion 63*c* also brought into meshing engagement with the first main assembly gear portion 81*c*, so that the first main assembly gear portion 81*c* A receives a thrust force F6. The direction of the thrust force F6 is the J direction which is the same as that of the thrust force F7 received by the meshing engagement of the second main assembly gear portion 81*d* with the second gear portion 63*d*. By this, the drive transmission gear 81 moves further in the J direction.

When the drive transmission gear 81 further rotates and moves in the J direction, the second main assembly gear portion 81*d* becomes out of engagement with the second gear portion 63*d*, as shown in part (c) of FIG. 17. On the other hand, the meshing engagement between the first gear portion 81*c* and the first gear portion 63*c* is maintained, and a thrust force F8 is applied to the first gear portion 81*c* in the J direction. At this time, the drive transmission gear 81 rotates the driving side flange 63 only through the engagement between the first main assembly gear portion 81*c* and the first gear portion 63*c*. That is, the tooth surface 81*c*1, on the downstream side in the I direction, of the first main assembly gear portion 81*c* and the tooth surface 63*c*1, on the upstream side in the I direction, of the first gear portion 63*c* are in contact with each other.

This is effected because the helix angle $\alpha 2$ of the second main assembly gear portion 81*d* of the drive transmission gear 81 is larger than the helix angle $\alpha 1$ of the first main assembly gear portion 81*c* ($\alpha 2 > \alpha 1$). Details will be described below, referring to part (b) of FIG. 21 and part (c) of FIG. 21. It is assumed that the drive transmission gear 81 is moved by the amount of movement LL in the J direction by the thrust force through the engagement with the driving side flange 63. In parts (b) and (c) of FIG. 21, the first main assembly gear portion 81*c* and the second main assembly gear portion 81*d* are shown by a solid line before movement and a broken line after movement, respectively. The amounts of movement of the first main assembly gear portion 81*c* and the second main assembly gear portion 81*d* in the rotational direction by this movement can be expressed by $LL/\tan \alpha 1$ and $LL/\tan \alpha 2$, respectively. Based on the relationship between the helix angles $\alpha 1$ and $\alpha 2$, the movement amount $LL/\tan \alpha 2$ in the rotational direction of the second main assembly gear portion 81*d* is larger than the movement amount LL/tan α1 in the rotational direction of the first main assembly gear portion 81*c* (LL/tan α1<LL/tan α2). As will be understood, the movement amount in the rotational direction corresponding to the movement amount LL in the J direction is larger in the second main assembly gear portion 81*d* than in the first main assembly gear portion 81*c*. Therefore, even if the first main assembly gear portion 81*c* and the first gear portion 63*c* are engaged with each other, the second main assembly gear portion 81*d* is separated from the second gear portion 63*d*.

When the drive transmission gear 81 further continues to rotate and moves to the driving side J, the tooth surface 81*d*2, on the upstream side, in the I direction of the second main assembly gear portion 81*d* finally comes into contact with the tooth surface (contact portion) 63*d*2, on the downstream side in the I direction, of the second gear portion 63*d*, as shown in part (d) of FIG. 17. The surface 81*c*1 of the first main assembly gear portion 81*c* and the surface 63*c*1 of the first gear portion 63*c* maintain contact with each other. That is, in this state, the first main assembly gear portion 81*c* of the drive transmission gear 81 presses the tooth surface (contact portion) 63*c*1 by the tooth surface 81*c*1 to rotate the driving side flange 63, and the tooth surface 81*d*2 of the second main assembly gear portion 81*d* of the drive transmission gear 81 contacts the tooth surface 63*d*2, so that the drive transmission gear 81 is sandwiched by the driving side flange 63. Then, the movement of the drive transmission gear 81 in the direction of the rotational axis L1 stops. The position in the direction of the rotational axis L1 at this time is a balanced position. A state in which the drive transmission gear 81 rotates at the balanced position and is driven to effect the drive transmission to the driving side flange 63 will be described.

In the balanced state, the force F9, the force F10, and the force F1 are applied to the drive transmission gear 81 in the direction of the rotational axis L1. The force F9 is the thrust force in the J direction which the first main assembly gear portion 81*c* receives by the meshing engagement with the first gear portion 63*c*, and the force F1 is the thrust force in the H direction which the second main assembly gear portion 81*d* receives by the meshing engagement with the second gear portion 63*d*, and the force F1 is the urging forces of the compression spring 85. In addition, the driving side flange 63 receives a force from the drive transmission gear 81 and is positioned by the side wall 71*m* or the rib 71*p* in the direction of the rotational axis L1, and a reaction force F11 is produced which balances with the force received from the drive transmission gear 81. Part (d) of FIG. 17 shows a case in which the drive transmission gear 81 is positioned in contact with the side wall 71*m*. When friction is ignored in the balanced state, the force F9, the force F10, the force F1, and the force F11 are balanced, and the drive transmission gear 81 and the driving side flange 63 are positioned in the direction of the rotational axis L1.

Further, the driving side flange 63 is sandwiched (contacted) between the first main assembly gear portion 81*c* and the second main assembly gear portion 81*d* of the drive transmission gear 81 and receives the following forces in the K direction (rotational direction). That is, the tooth surface (contact portion) 63*c*1 of the first gear portion 63*c* is in contact with the first main assembly gear portion 81*c* existing on the upstream side in the K direction (first circumferential direction), and it receives the driving force FD as the force of the component for rotating the driving side flange 63 the in the direction K (predetermined direction). At the same time, the tooth surface (contact portion) 63*d*2 of the second gear portion 63*d* is in contact with the second main assembly gear portion 81*d* existing on the downstream side in the K direction (first circumferential direction), and it receives a restricting force (braking force) FB as the force of the component in the direction which suppresses (restricts) the rotation of the driving side flange 63 in the direction K. Therefore, it can be said that the first gear portion 63*c* is a driving force receiving portion which receives the driving force FD, and the second gear portion 63*d* is the restricting force receiving portion which receives the restricting force FB. The driving force FD is larger than the restricting force FB.

Here, since the second gear portion 63*d* is integrally provided with the first gear portion 63*c* in the rotational direction, the structure is such that the second gear portion 63*d* cannot rotate relative to the first gear portion 63*c* in the opposite direction K. Strictly speaking, since the driving side flange 63 is made of resin and deformation of teeth and members occurs, the second gear portion 63*d* subjected to the restricting force FB is slightly rotated in the direction opposite to the K direction relative to the first gear portion 63*c*, and then the rotation thereof stops and the position thereof is fixed. Therefore, the restricting force FB received by the second gear portion 63*d* acts on (is transmitted to) the first gear portion 63*c*. By the same principle, the driving force FD received by the first gear portion 63*d* acts on (is transmitted to) the second gear portion 63*d*.

The state in which the first gear portion 63*c* receives the driving force FD and the second gear portion 63*d* receives the restricting force FB in this manner is a state that there is no play (backlash) in the rotational direction (I direction) between the driving side flange 63 and the drive transmission gear 81, that is, a backlashless state. In this manner, the driving side flange 63 is rotationally driven in the K direction with the backlashless state maintained. While the drive is transmitted by engaging with each other in the backlashless state, the drive transmission with high rotation accuracy is accomplished.

In addition, the width (tooth width) W63*c* of the first helical tooth (first projection) 63*ct* measured in the direction of the rotational axis L1 is larger than the width (tooth width) W63*d* of the second helical tooth (second projection) 63*dt* in the direction of the rotational axis L1. In other words, the second gear portion 63*d* has a second helical tooth (second projection) 63*dt* which is narrower than the first helical tooth 63*ct*, which has the largest width (tooth width) of the first gear portion 63*c* in the direction of the rotational axis L1.

If the second main assembly gear portion 81*d* and the second gear portion 63*d* do not come into contact with each other at the start of driving, and the first main assembly gear portion 81*c* and the first gear portion 63*c* come into contact with each other, The driving starts from the state shown in part (c) of FIG. 17 without going through the state shown in part (b) of FIG. 17. Then, according to the same principle as described above, the balanced state shown in part (d) of FIG. 17 is reached. That is, from the state shown in part (c) of FIG. 17, the drive transmission gear 81 moves in the J direction by the thrust force F8 to reach the balanced state shown in part (d) of FIG. 17.

<Disengagement when Dismounting Cartridge B>

Figure 18:
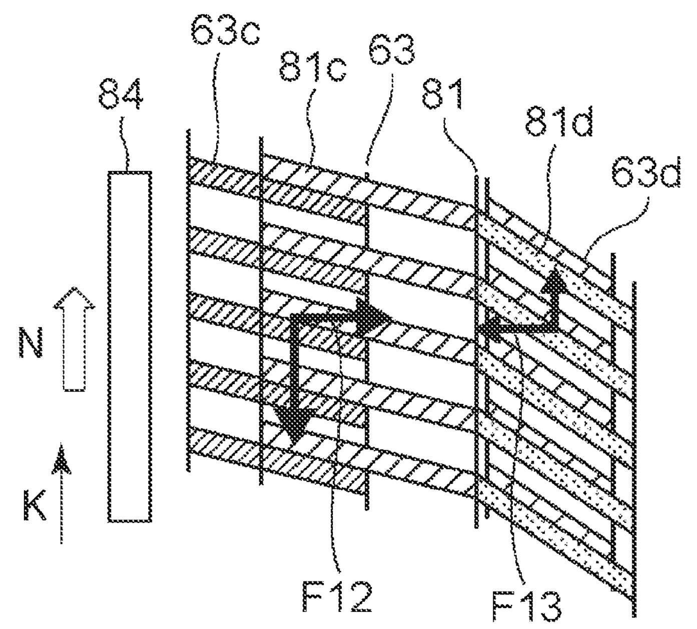
FIG. 18 is sectional views of the drive transmission gear and the driving side flange.
Figure 18:
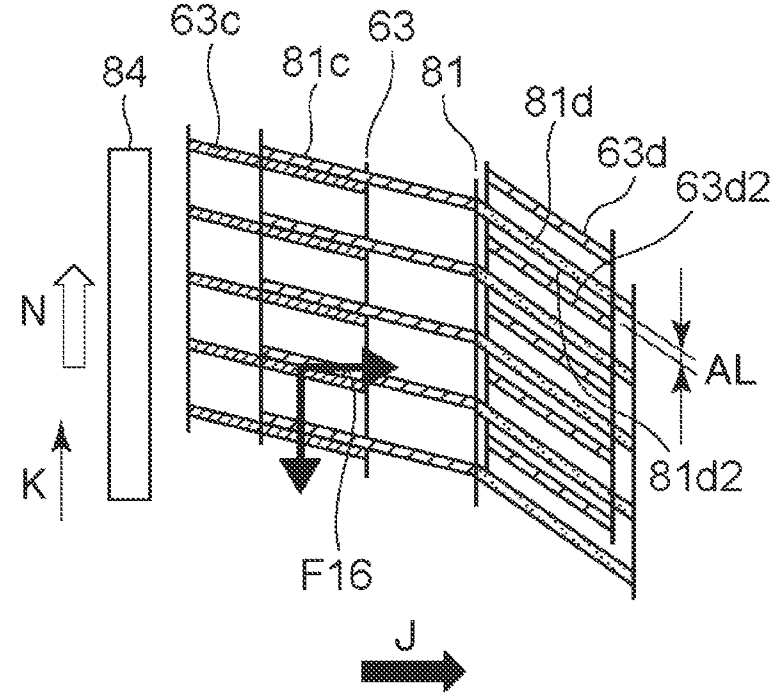
Figure 20:
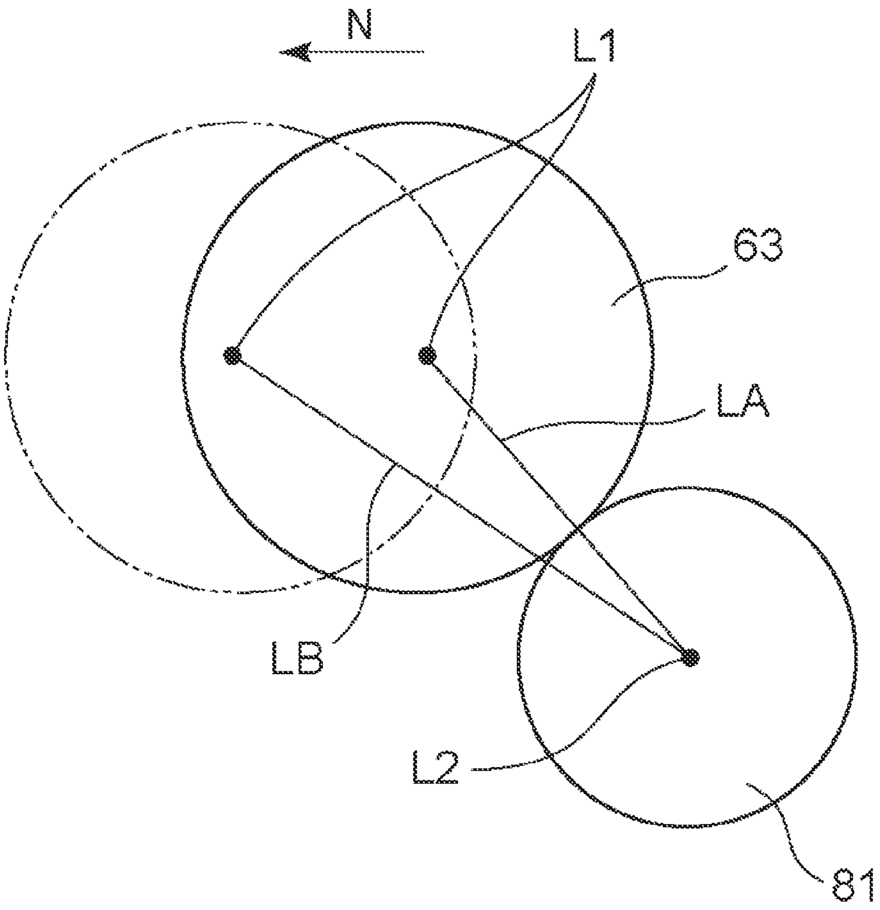
FIG. 20 is a side view of the drive transmission gear and the driving side flange.

Next, referring to FIGS. 18, 19, and 20, the meshing disengagement operation between the drive transmission gear 81 and the driving side flange 63 when the cartridge B is dismounted after the end of driving operation will be described. FIG. 18 is a sectional view taken along a line AF-AF in contact with the meshing pitch circle between the drive transmission gear 81 and the driving side flange 63 when the cartridge B is to be dismounted after the end of driving operation, and the time elapses in the order of part (a) of FIG. 18 and part (b) of FIG. 18. FIG. 20 is a schematic view of the drive transmission gear 81 and the driving side flange 63 as viewed along the H direction.

As shown in part (c) of FIG. 19, the cartridge B is dismounted in the take-out direction N
(N direction) and removed from the apparatus main assembly A. The N direction is opposite of the M direction. As described above, the force required to rotate the driving side flange 63 is larger than the force required to rotate the drive transmission gear 81. Therefore, the drive transmission gear 81 is rotated in the K direction (counterclockwise direction) by the movement of the driving side flange 63 in the N direction. At this time, as shown in part (a) of FIG. 18, when the driving side flange 63 moves in the N direction, the first gear portion 63*c* presses the first main assembly gear portion 81*c*. In addition, FIG. 20 shows the positional relationship between the driving side flange 63 that moves in the N direction and the drive transmission gear 81, in which a solid line indicates the state before the movement in the N direction, and a broken line indicates the state after the movement. The distance between the rotation center (rotational axis) L1 of the driving side flange 63 and the rotation center (rotational axis) L2 of the drive transmission gear 81 changes from a distance LA to a distance LB as the driving side flange 63 moves in the N direction ($LA<LB$)

By this, the meshing position of the teeth of the first gear portion 63*c* and the first main assembly gear portion 81*c* gradually moves toward the teeth tops. Therefore, as shown in part (b) of FIG. 18, the backlash of the meshing in the rotational direction increases, and gap AL between the surface 63*d*2 of the second gear portion 63*d* and the tooth surface 81*d*2 of the second main assembly gear portion 81*d* increases. When a gap AL is provided between the tooth surfaces, the force from the second gear portion 63*d* does not act on the drive transmission gear 81, and the thrust force F16 in the J direction by the engagement between the first main assembly gear portion 81*c* and the first gear portion 63*c* acts. As a result, when the cartridge B is dismounted, the drive transmission gear 81 gradually moves in the J direction while rotating in the K direction, and finally the meshing between the first gear portion 63*c* and the first main assembly gear portion 81*c* is disappears. By this, the engagement between the driving side flange 63 and the drive transmission gear 81 is released.

<Helix Angle Setting>

Figure 46:
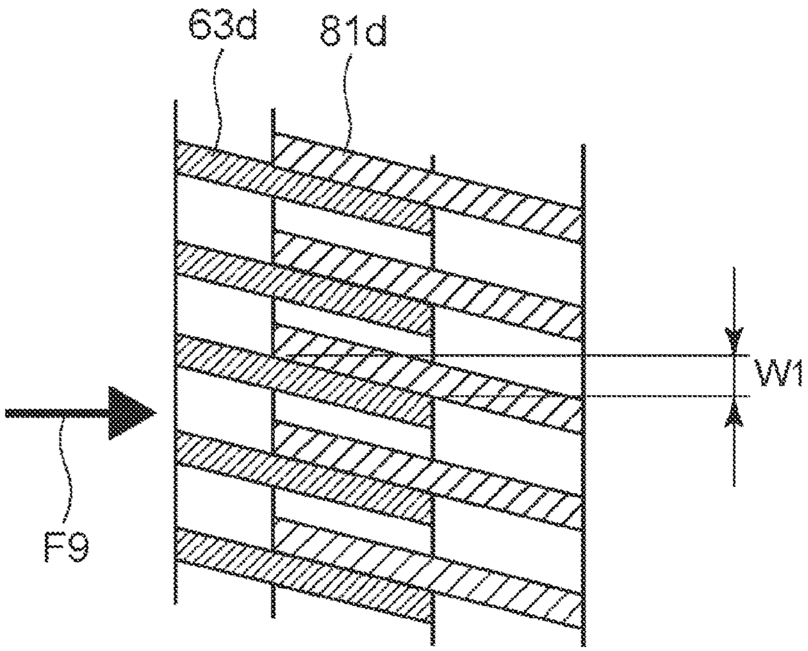
FIG. 46 is sectional views of the drive transmission gear and the driving side flange.
Figure 46:
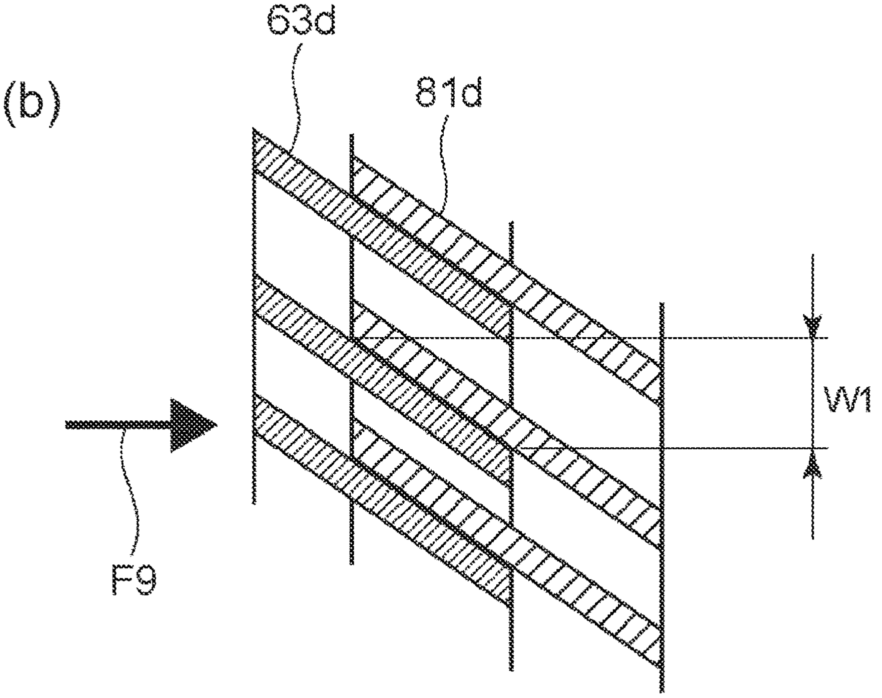

Next, referring to FIG. 46, the helix angles of the first gear portion 63*c* and the second gear portion 63*d*, which are preferable, will be described. Part (a) of FIG. 46 and part (b) of FIG. 46 are sectional views of the second gear portion 63*d* and the second main assembly gear portion 81*d*, taken along a line AF-AF in contact with the meshing pitch circle between the drive transmission gear 81 and the driving side flange 63.

The description will be made as to the setting of the helix angle $\alpha 1$ of the first gear portion 63*c* and the helix angle $\alpha 2$ of the second gear portion, in the case that the first gear portion 63*c* is the gear portion which receives the driving force FD and the second gear portion 63*d* is the gear portion which receives the restriction force FB as described above. First, as a premise, since the first gear portion 63*c* is the gear portion which receives the driving force FD and the second gear portion 63*d* is the gear portion that receives the restriction force FB, the helix angle $\alpha 2$ is larger than the helix angle $\alpha 1$ ($\alpha 2>\alpha 1$). If the helix angle $\alpha 2$ is smaller than the helix angle $\alpha 1$, drive transmission cannot be performed in a backlashless state. That is, the thrust force applied by the first gear portion 63*c* to the first main assembly gear portion 81*c* and the thrust force applied by the second gear portion 63*d* to the second main assembly gear portion 81*d* do not balance, and therefore, the position of the drive transmission gear 81 in the direction of the rotational axis L1 is not determined at a balanced position, and.

The helix angle $\alpha 1$ of the first gear portion 63*c* of the driving side flange 63 is preferably 10° or more ($\alpha 1\geq 10°$), further preferably 15° or more ($\alpha 1\geq 15°$), and even further preferably 20° or more ($\alpha 1\geq 20°$). The reason is that, in general, if the tooth width (the width of the gear tooth in the direction of the rotational axis L1) is the same, the larger the helix angle, the larger the meshing ratio and the higher the rotation accuracy. The helix angle $\alpha 1$ is preferably 40° or less ($\alpha 1\leq 40°$), further preferably 35° or less ($\alpha 1\leq 35°$). The reason is that, in general, when the helix angle is large, the moldability by the mold deteriorates.

On the other hand, the helix angle $\alpha 2$ of the second gear portion 63*d* of the drum gear 63 is preferably 40° or less ($\alpha 2\leq 40°$), further preferably 35° or less ($\alpha 2\leq 35°$). The reason is that, in general, when the helix angle is large, the moldability by the mold deteriorates. In addition, the helix angle $\alpha 2$ of the second gear portion 63*d* of the drum gear is preferably 20° or more ($\alpha 2\geq 20°$), and further preferably 25° or more ($\alpha 2\geq 25°$). The reason is that, as shown in part (a) of FIG. 46 and part (b) of FIG. 46, the larger the helix angle $\alpha 2$, the larger the width E in the rotational direction (K direction) of the contact surface with the second main assembly gear portion 81*d*. In this embodiment, the helix angle $\alpha 2$ is 35°.

If the width E is small, when the second gear portion 63*d* receives the thrust force F9 (see part (d) of FIG. 17 received by the first gear portion 63*c*, the tooth surface of the second gear portion 63*d* is deformed, and the second main assembly gear portion 81*d* enters like a wedge and moves, and the positioning in the direction of the rotational axis L1 becomes unstable. Therefore, it is necessary to assure a certain width E in order to reliably receive the thrust force F9 to position the drive transmission gear 81 in the direction of the rotational axis L1.

In view of the above-described analysis as a whole, the helix angle $\alpha 1$ is preferably 10° or more and 40° or less ($15°\leq\alpha 1\leq 40°$), further preferably 15° or more and 40° or less ($15°\leq\alpha 1\leq 40°$), and further preferably 20° or more and 35° or less ($20°\leq\alpha 1\leq 35°$). The helix angle $\alpha 2$ is preferably 20° or more and 40° or less ($20°\leq\alpha 2\leq 40°$), and further preferably 25° or more and 35° or less ($25°\leq\alpha 2\leq 35°$). In this embodiment, the helix angle $\alpha 1$ is 20° and the helix angle $\alpha 2$ is 35°, satisfying the above conditions.

<Width of Cylindrical Portion 63*e*>

Figure 47:
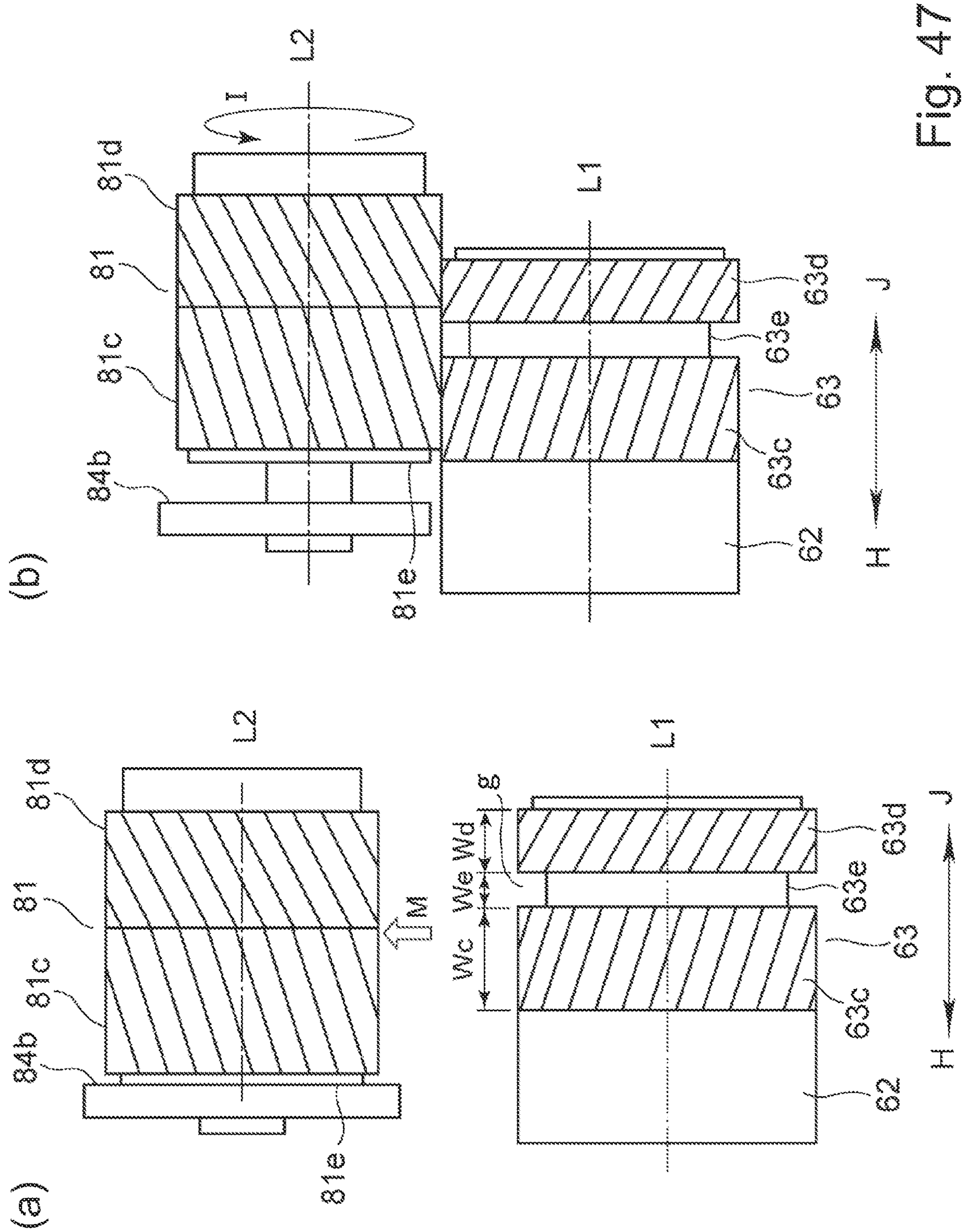
FIG. 47 is schematic views of the drive transmission gear and the driving side flange.

Next, the width (length) of the cylindrical portion 63*e* in the direction of the rotational axis L1 will be described. Part (a) of FIG. 47 is a schematic view of the driving side flange 63 and the drive transmission gear 81 when the cartridge B is mounted, as viewed in a direction perpendicular to the rotational axis L1. Part (b) of FIG. 47 is a schematic view of the driving side flange 63 and the drive transmission gear 81 during the driving operation, as viewed through a direction perpendicular to the rotational axis L1.

As described above, by providing the cylindrical portion 63*e*, the first gear portion 63*c* is prevented from contacting the second main assembly gear portion 81*d*, and the second gear portion 63*d* is prevented from contacting the first main assembly gear portion 81*c*, with respect to the direction of the rotational axis L1. Further, by providing the cylindrical portion 63*e*, when the drive transmission gear 81 is driven and the drive transmission gear 81 moves to the balanced position, the first main assembly gear portion 81_c_ is prevented from contacting the second gear portion 63_d_, and the second main assembly gear portion 81_d_ is prevented from contacting the first gear portion 63_c_. That is, by providing the cylindrical portion 63_e_, a gap g is formed between the first gear portion 81_c_ and the second gear portion 63_d_ in the direction of the rotational axis L1. Therefore, in the following description, the width (length) of the cylindrical portion 63_e_ measured in the direction of the rotational axis L1 is synonymous with the width (length) of the gap g measured in the direction of the rotational axis L1.

The above-mentioned contact may occur in the following two situations. First, as shown in part (a) of FIG. 47, when the cartridge B is mounted on the apparatus main assembly A, the other end 81_e_ of the drive transmission gear 81 is held in contact with the abutting surface 84_b_ of the main frame 84. Second is the state in which the drive transmission gear 81 is driven and being moved toward the balanced position, as shown in part (b) of FIG. 47.

The positions of the first gear portion 63_c_ and the second gear portion 63_d_ of the driving side flange 63, the positions of the first main assembly gear portion 81_c_ and the second main assembly gear portion 81_d_ of the drive transmission gear 81, and the balanced position may be different depending on the following factors. Specifically, (1) a tolerance in the direction of the rotational axis L1 of related portions such as the driving side flange 63, the drive transmission gear 81, and the cleaning frame (drum frame) 60_a_, (2) a tolerance related to the distance between the rotational axis L1 of the driving side flange 63 and the rotational axis L2 of the drive transmission gear 81, (3) a tolerance of phase in the rotational direction of the teeth of the first gear portion 63_c_ and the second gear portion 63_d_ of the driving side flange 63, (4) a tolerance of the phase in the rotational direction between the teeth of the first main assembly gear portion 81_c_ and the second main assembly gear portion 81_d_ of the drive transmission gear 81, (5) deformation of the teeth due to the maximum drive load, and thermal expansion and contraction of the driving side flange 63 and the drive transmission gear 81. In consideration of these factors, the width (length) We of the cylindrical portion 63_e_ (or the gap g) in the direction of the rotational axis L1 is selected.

Specifically, the width We is selected so that, the following Formula B1 is satisfied in which the width (tooth width, length) measured in the direction of the rotational axis L1 of the teeth of the first gear portion 63_c_ is Wc as a reference, $$We \geq Wc/5 \quad \text{(Formula B1)}.$$

In addition, as the width We increases, the width in the direction of the rotational axis L1 of the cartridge B increases, and therefore, in order to downsize the cartridge B and the apparatus main assembly A, the width We is to be selected so as not to be larger than necessary. In view of the standpoint, it is further preferable to satisfy the following formula B2.

$$We \leq Wc \quad \text{(Formula B2)}.$$

In this embodiment, Wc=8.6 mm and We=2.3 mm, satisfying the above formulas B1 and B2. In the case that the tooth width Wc of the first gear portion 63_c_ is not constant, the tooth width Wc1 of the tooth having the largest tooth width is deemed to be the tooth width Wc.

In addition, as will be understood from part (b) of FIGS. 13, 14 and 47 it is preferable for the width We to satisfy the following formula B3, in which Wd is the width (tooth width, length) of the teeth of the second gear portion 63_c_ in the direction of the rotational axis L1.

$$We \leq Wd \quad \text{(Formula B3)}$$

<Rotation Accuracy>

Figure 22:
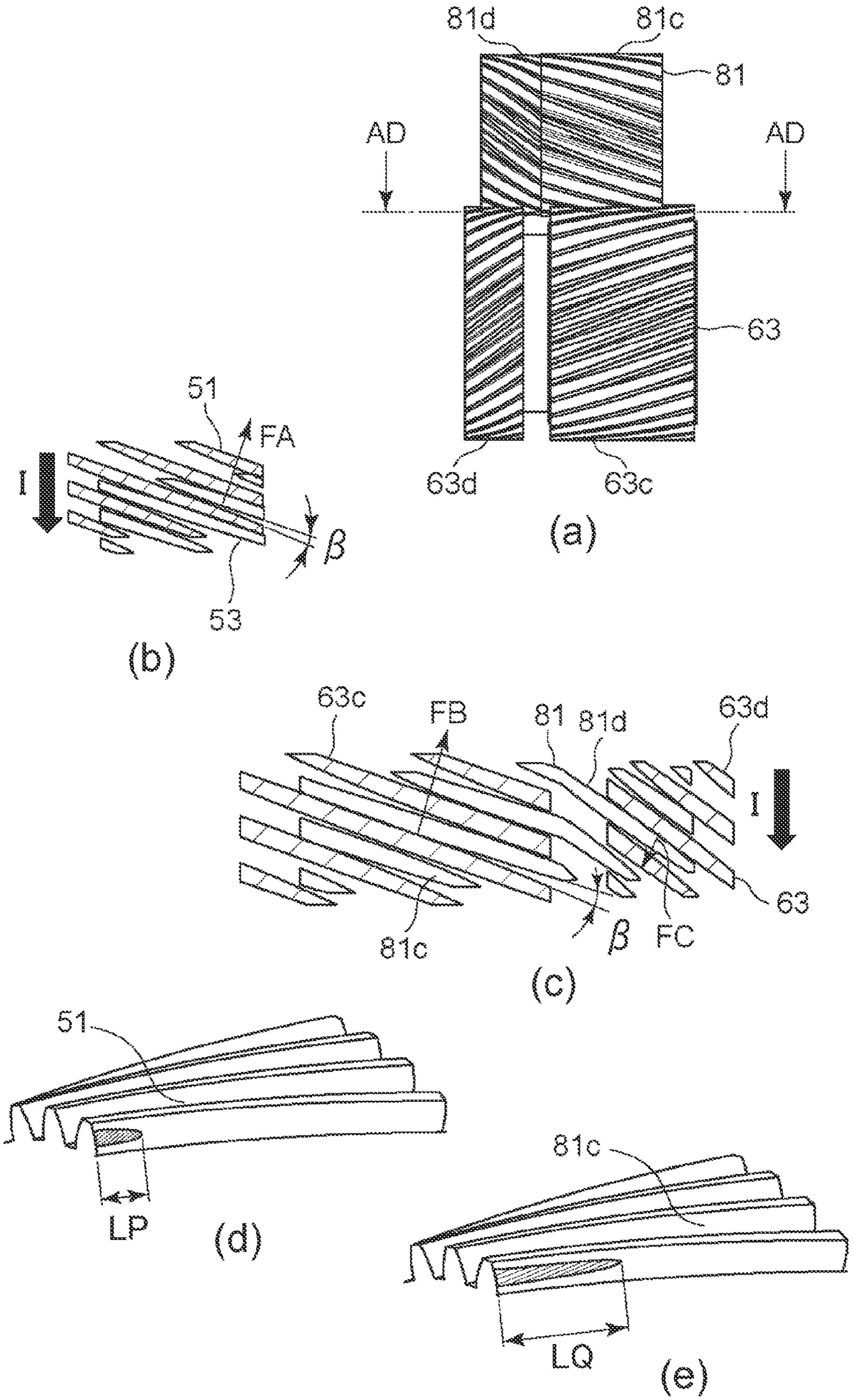
FIG. 22 is illustrations of the drive transmission gear and the driving side flange.
Figure 49:
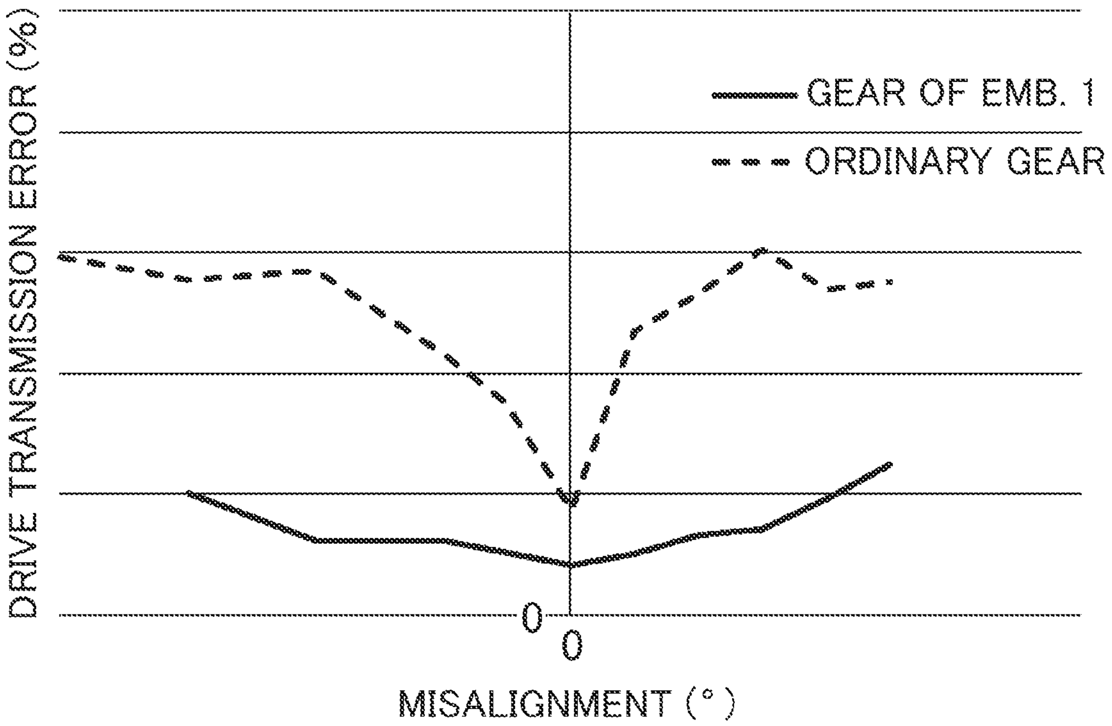
FIG. 49 is a graph of a drive transmission error at the time of misalignment.

Hereinafter, referring to FIGS. 22 and 49, the reason why the rotation accuracy is improved in the backlashless state will be described. Part (a) of FIG. 22 is a view of the drive transmission gear 81 and the driving side flange 63 as viewed along the direction perpendicular to the rotational axis direction. Part (b) of FIG. 22 is a partial sectional view of the meshing engagement portion of an ordinary helical tooth gears 51 and 53 as a comparative example. Part (c) of FIG. 22 is a partial sectional view taken along a line AD-AD in contact with the meshing pitch circle of the drive transmission gear 81 and the driving side flange 63. Part (d) of FIG. 22 is a partial perspective view of the helical tooth gear 51. Part (e) of FIG. 22 is a partial perspective view of the drive transmission gear 81. FIG. 49 is a graph comparing the drive transmission error when the alignment of the driving side flange 63 and the helical tooth gear 53 is off.

As shown in part (b) of FIG. 22, in gear drive, the tooth surfaces of the helical tooth gears on the driving side and the driven side may mesh with each other without being parallel in a tooth line direction due to molding accuracy, play and deformation of the shaft portion. Such a state is generally called a misaligned state. When the alignment of the helical tooth gear (driving side) 51 and the helical tooth gear (driven side) 53, which are general helical tooth gears, is off by β°, the helical tooth gears 51 and 53 are at one end of the tooth surface in the axial direction, with the result that the meshing rate is significantly reduced as compared with the state where the meshing is performed only at the position and the alignment is not deviated. By this, the rotation accuracy at the time of drive transmission is extremely deteriorated. Part (d) of FIG. 22 shows a region in which the tooth surface of the helical tooth gear 51 meshes with the helical tooth gear 53 when the alignment is deviated, and the width of this region is defined as the width LP.

On the other hand, as shown in part (c) of FIG. 22, the driving side flange 63 is rotated while the first gear portion 63_c_ and the second gear portion 63_d_ of the driving side flange 63 sandwiches the first main assembly gear portion 81_c_ and the main assembly gear portion 81_d_ of the drive transmission gear 81. By this, a pinching force FC (that is, rotary drive brake) acting on the second main assembly gear portion 81_d_ is generated. A reaction force of the pinching force FC is added to the force applied to the tooth surface of the first main assembly gear portion 81_c_ in a direction of pressing the first gear portion 63_c_ in the I direction, resulting in the force FB. On the other hand, when the same load torque is driven in the conventionally used helical tooth gear 51, no such additional force is produced to the force FA applied to the tooth surface of the helical tooth gear 51. Therefore, the force FB applied to the tooth surface of the first main assembly gear portion 81_c_ of this embodiment is larger than the force FA applied to the tooth surface of the helical tooth gear 51. Part (e) of FIG. 22 shows a region of the tooth surface of the first main assembly gear portion 81_c_ of the drive transmission gear 81 which is in meshing engagement with the first gear portion 63 of the driving side flange 63 when the alignment is deviated, in which a width of this region is LQ. Since the force FB is larger than the force FA, when the width LP in part (d) of FIG. 22 and the width LQ in part (e) of FIG. 22 are compared, the width LQ is larger than the width LP. Therefore, when the alignment is deviated, the decrease in the overlapping meshing ratio between the first main assembly gear portion 81*c* and the first gear portion 63*c* is smaller than that between the helical tooth gears 51 and 53.

FIG. 49 is a graph showing measurement results of the drive transmission errors to the driven side helical tooth gear 53 and driving side flange 63 with respect to the amount of misalignment, when the ordinary helical tooth gears 51 and 53 and the drive transmission gear 81 and the driving side flange 63 of this embodiment are used. In the helical tooth gear 51 and 53, and, the drive transmission gear 81 and the driving side flange 63, the gear specifications such as the number of teeth and the backlash amount in the inter-axis direction of 0.15 mm and the conditions such as the load torque are 0.25 N·m and rotation speed 270 rpm were the same, and the shaft and gear are fitted without play. Here, the drive transmission error (%) is a ratio of the experimental rotation pitch deviation data to the ideal rotation pitch in the gear meshing period. For example, if the ideal rotation pitch is 0.7258 mm and the amount of experimental deviation data from the ideal rotation pitch is 0.00036 mm, the result is 0.05% (=(0.00036/0.7258)×100). In addition, the alignment deviation amount (°) is 0° when the axes of the meshing gears are parallel to each other, and is an angle (see parts (b) and (c) of FIG. 22) between the axes when the axis of the gear is tilted on the driven side is tilted so that the tooth line directions of the gears is tilted by an angle β. As shown in this graph, when the alignment is deviated, the deterioration of the rotational accuracy of the driving side flange 63 of this embodiment is suppressed as compared with that in the ordinary helical tooth gear 53. Therefore, it can be said that the drive transmission structure using the drive transmission gear 81 and the driving side flange 63 of this embodiment is more resistant to misalignment than the drive transmission structure using an ordinary helical tooth gear.

<Wear of Drive Transmission Gear>

Figure 24:
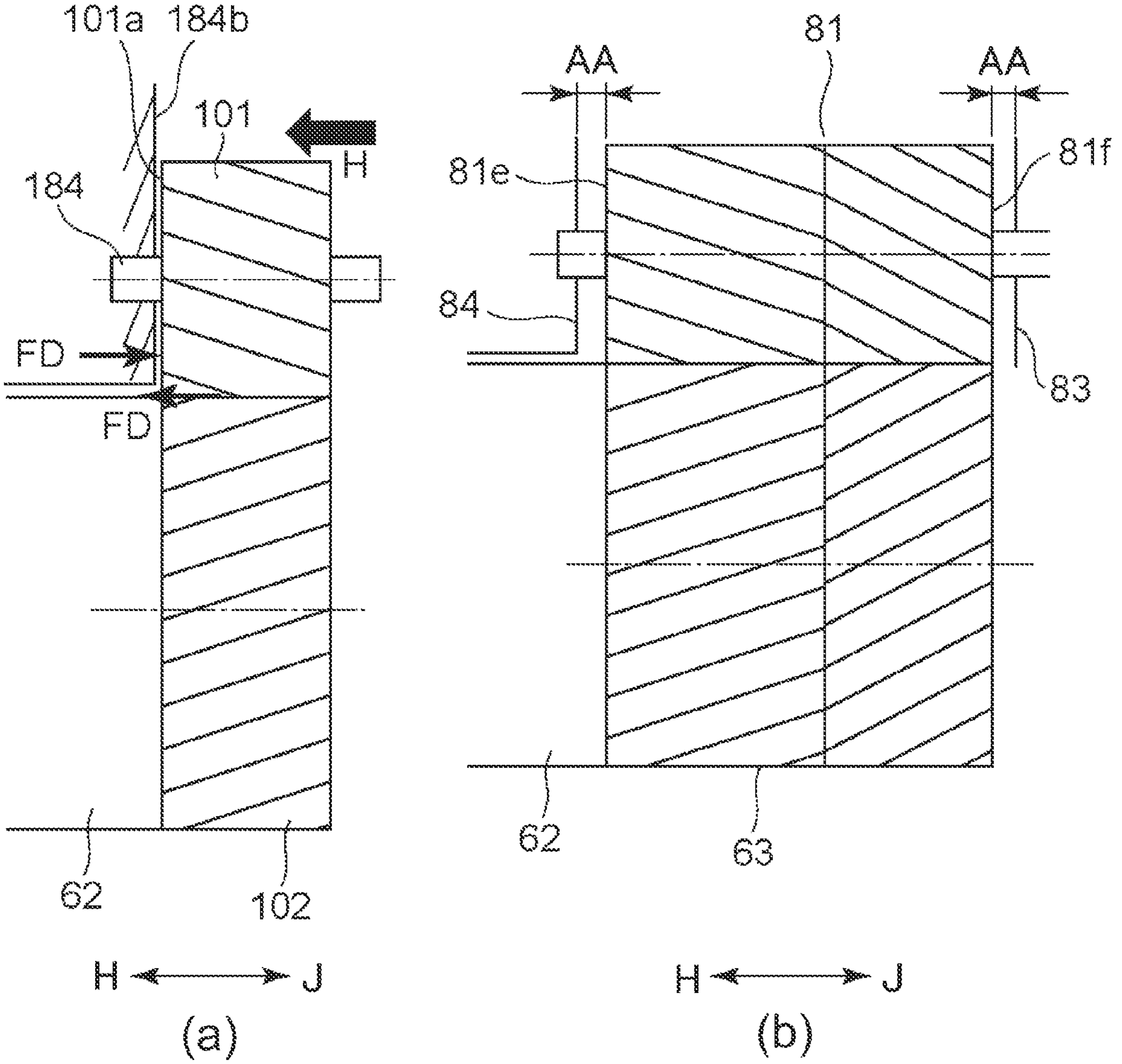
FIG. 24 is schematic illustrations of the drive transmission structure.

Next, referring to FIG. 24, the wear of the drive transmission gear 81 and the helical tooth gear 101 will be described below. Part (a) of FIG. 24 is a schematic illustration of a drive transmission structure using a conventional helical tooth gear. Part (b) of FIG. 24 is a schematic illustration of the drive transmission structure of this embodiment. As shown in part (a) of FIG. 24, when rotational driving is performed by the helical tooth gear 101, the helical tooth gear 101 receives a thrust force (force in the axial direction) FD provided by the meshing engagement force. By this, the helical tooth gear 101 moves in the H direction toward the non-driving side, and the end surface 101*a* of the helical tooth gear abuts and slides on the abutting surface 184*b* of the main frame 84, and therefore, they are worn. On the other hand, as shown in part (b) of FIG. 24, in the drive transmission gear 81 of this embodiment, the position thereof in the direction of the rotational axis L1 is determined by the driving side flange 63 and the spring 85 (not shown) during driving, and therefore, the end surface 81*e* in the H direction and the end surface 81*f* in the J direction of the drive transmission gear 81 do not slide because a gap AA is formed between the main frame 84 and the second driving side plate 83. Therefore, wear of the two end surfaces 81*e* and 81*f* of the drive transmission gear 81, the main frame 84, and the second driving side plate 83 can be suppressed, and the durability can be improved.

<Comparison with Conventional Coupling Drive>

Figure 26:
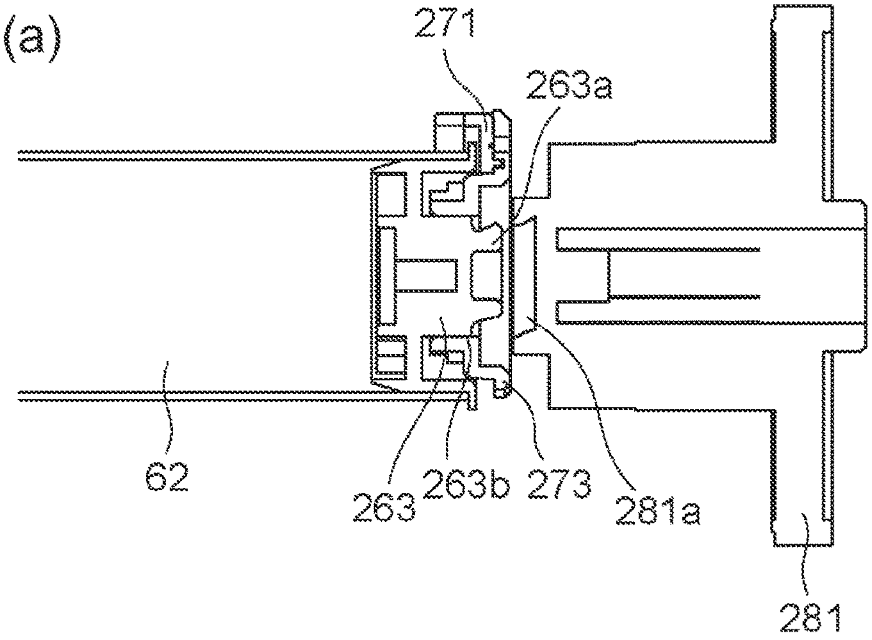
FIG. 26 is sectional views of the drive transmission portion.
Figure 26:
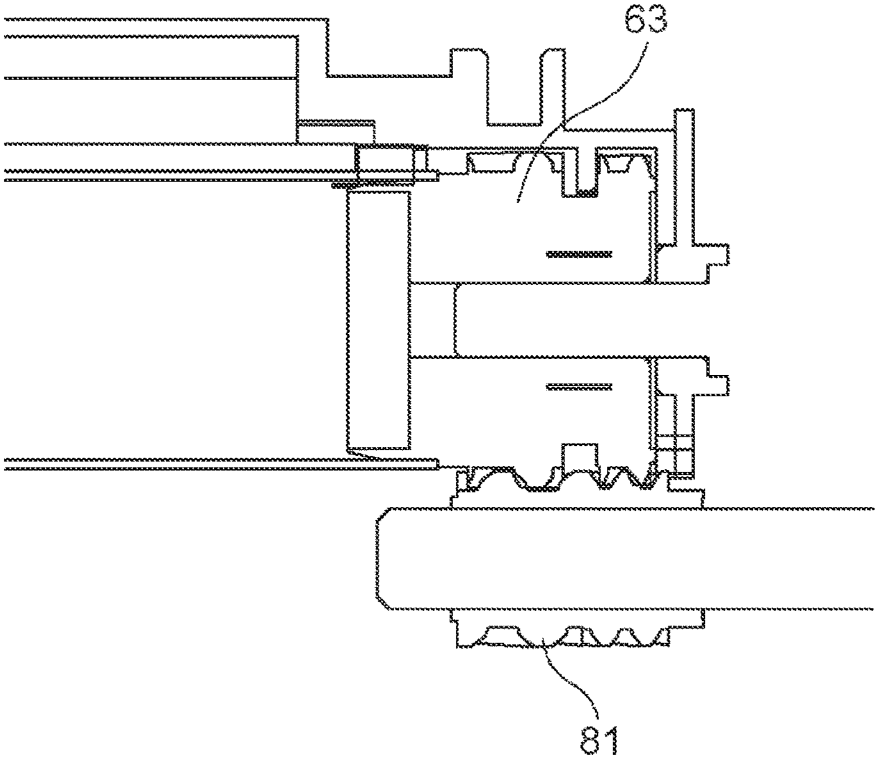
Figure 27:
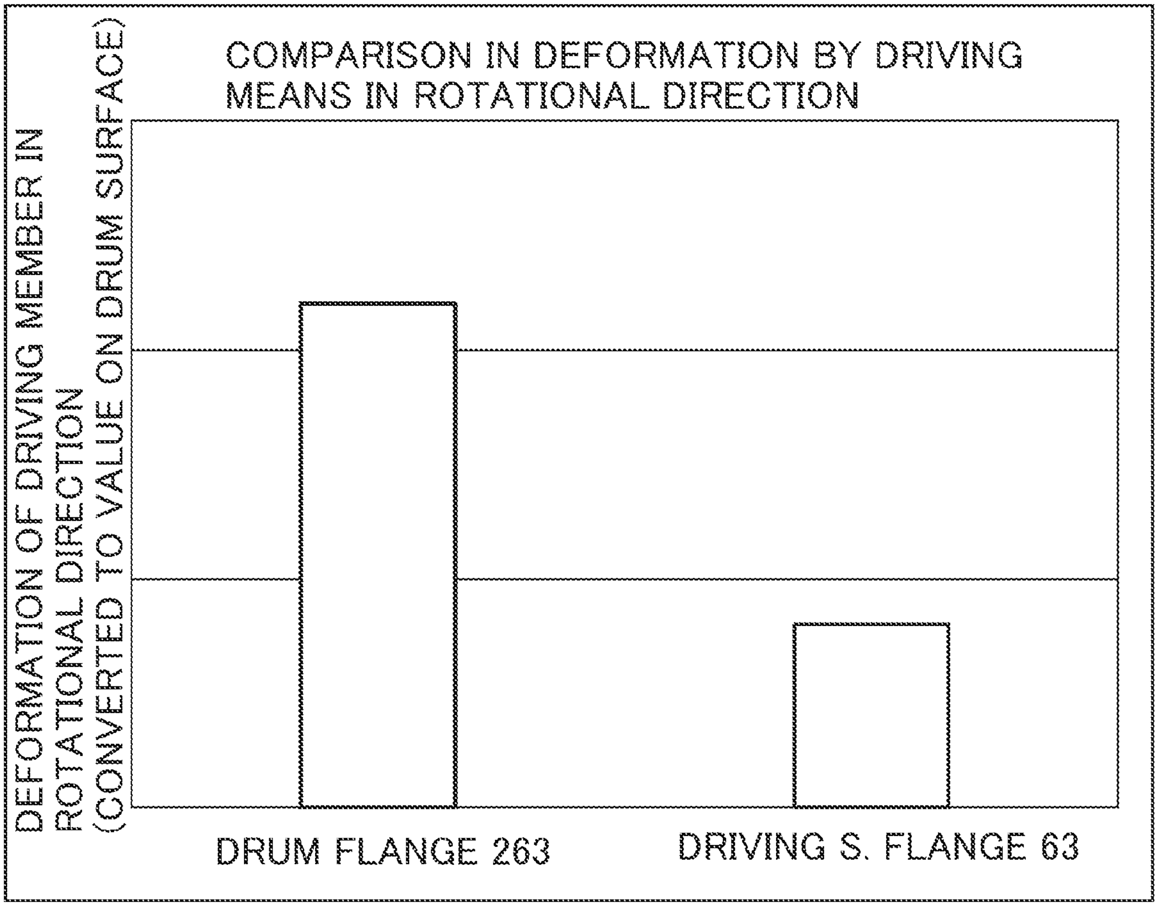
FIG. 27 is a graph showing amounts of deformation of the coupling drive and the drive transmission gear.

Next, referring to FIGS. 26 and 27, a comparison with a structure in which the drum is driven by the conventional coupling will be described. Part (a) of FIG. 26 is a sectional view of a drive transmission portion of a conventional coupling drive, and the sectional plane includes a rotational axis of the coupling. Part (b) of FIG. 26 is a sectional view of the drive transmission unit of this embodiment, which is a sectional view including the rotational axis (L1) of the driving side flange 63 and the rotational axis of the drive transmission gear 81. FIG. 27 is a graph showing amount of deformations in the coupling drive and the drive transmission gear.

As shown in part (a) of FIG. 26, in the conventional coupling drive, a driving side flange 263 provided with a projection coupling 263*a* including a twisted polygonal prism shape is mounted to the end of the drum 62 of the cartridge. The drum flange 263 has a support portion 263*b* which is a cylindrical portion having a diameter smaller than the diameter of the drum 62. The apparatus main assembly has a drive transmission gear 281 with a recess coupling 281*a* into which the coupling 263*a* is inserted and engaged.

The coupling 263*a* is provided at the end of the driving side flange 263 in the direction of the rotational axis. Therefore, the twist amount of the driving side flange 263 during drive in the coupling drive is larger than the twist amount of the driving side flange 63 in the gear drive of this embodiment shown in part (b) of FIG. 26. FIG. 27 shows simulation results of the deformation amounts of the drive members (drum flange 263, driving side flange 63) in the rotational direction, and as will be understood, the amount of deformation in the gear drive (drive with the driving side flange 63) is smaller than in the coupling drive (driving at drum flange 263). Here, the amount of deformation of the drive member in the rotational direction will be described. This amount of deformation is the amount of displacement of a drive transmission point to the drum 62 in the rotational direction when the drum 62 sides of the drum coupling 263 and the driving side flange 63 are fixed, and the same static load torque of 0.25 N·m is applied to the engaging portion with the drive input member 281 or the meshing engagement portion with the drive transmission gear 81. The drive transmission point is a point fixed on the drum 62. And, the displacement amount is converted into the displacement amount when there is no twist at a predetermined point on the surface of the drum 62. Due to this difference in the amounts of deformation of the drive members, the change in the amount of deformation of the drive member when the load torque of the cartridge B changes, and the fluctuation of the rotation speed of 62 are smaller in the gear drive than in the coupling drive. That is, the density unevenness of the image in the rotational direction of the drum 62 on the image when the load torque fluctuation of the cartridge B occurs (caused by variation of the pitch between the scanning lines in the sub-scanning direction resulting when scanning the surface of the drum 62 with the laser beam L (pitch variation)) can be suppressed keep the pitch variation. As described above, with the drive transmission structure of the driving side flange 63 and the drive transmission gear 81 of the above-described embodiment, the deterioration of the rotational accuracy of the drum 62 with respect to the load torque fluctuation can be suppressed as compared with the conventional coupling drive structure.

In addition, as compared with the conventional coupling drive from another standpoint, in the case of the conventional coupling drive, it is necessary to provide a retracting mechanism for advancing and retreating the coupling 263*a* on the main assembly side in the direction of the rotational axis to permit mounting and dismounting the cartridge B.

Figure 28:
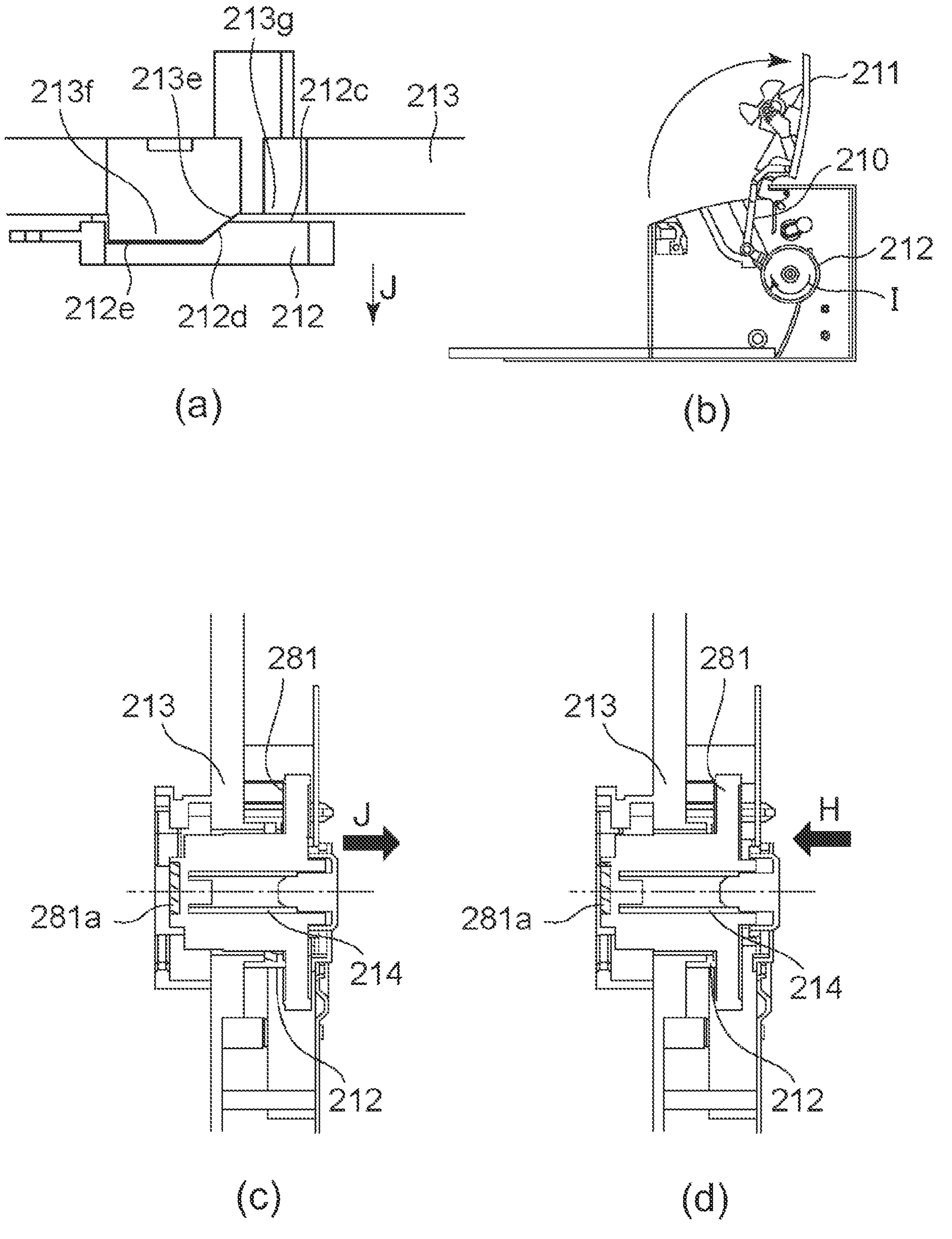
FIG. 28 is illustrations of a retracting mechanism.

Next, referring to FIG. 28, this retracting mechanism will be described. Part (a) of FIG. 28 is a sectional view of the drum 62 of the retracting mechanism in cross-section including the rotational axis. Part (b) of FIG. 28 is a schematic sectional view of an image forming apparatus provided with a retracting mechanism. Parts (c) and (d) of FIG. 28 are sectional views of the drive transmission gear 281 and the retracting mechanism, and the section thereof includes the rotational axis of the drive transmission gear 281.

The main assembly of the coupling-driven image forming apparatus is equipped with a retracting mechanism including a link 210, a cylindrical cam 212, and a compression spring 214. One end of the link 210 is connected with an opening/closing door 211 of the apparatus main assembly A. The other end of the link 210 is connected, coaxially with the drive input member 281, with a cylindrical cam 212 rotatably provided between the drive input member 281 and the side wall 213. In addition, as shown in part (a) of FIG. 28, the cylindrical cam 212 has a slope 212*d*, a projection surface 212*c*, and a recess surface 212*e* with height difference in the rotational direction on one end surface in the axial direction. Further, the side wall 213 has a slope 213*e*, a projection surface 213*f*, and a recess surface 213*g* at locations facing the slope 212*d*, the projection surface 212*c*, and the recess surface 212*e*, respectively. Furthermore, as shown in part (d) of FIG. 28, the drive transmission gear 281 is urged in the H direction by the compression spring 214.

As shown in part (b) of FIG. 28, by the operation of opening the door 211, the cylindrical cam 212 is rotated in the I direction by way of the link 210, and the cylindrical cam 212 and the projection surfaces 212*c* and 213*f* provided on the side wall 213 come into contact with each other, so that the cylindrical cam 212 is moved in the J direction. By the operation of the cylindrical cam 212 in the J direction, as shown in part (c) of FIG. 28, the cylindrical cam 212 moves the drive input member 281 in the J direction against the urging force of the compression spring 214. By this, the drive input member 281 is moved away from the drum flange 263 (see part (a) of FIG. 26 to disengage the coupling 281*a* from the coupling 263*a* (see part (a) of FIG. 26. As a result, the cartridge B can be dismounted.

Further, as shown in part (b) of FIG. 28, with the closing operation of the door 211, the cylindrical cam 212 is rotated in a direction opposite to the I direction while the cylindrical cam 212 and the slopes 212*d* and 213*e* are in contact with each other provided on the side wall 213, by way of the link 210. During this rotation, the cylindrical cam 212, the side wall 213, and the drive input member 281 becomes out of contact with each other in the rotational axis direction, and as shown in part (d) of FIG. 28, the drive input member 281 becomes rotatable in the H direction by the urging force of the compression spring 214. By this, the drive input member 281 moves in a direction approaching the drum flange 263 (see part (a) of FIG. 26, and the coupling 281*a* and the coupling 263*a* become engageable with each other.

As described above, the conventional coupling drive requires, a retracting mechanism, and there is a possibility that the size of the apparatus main assembly or the cost increases correspondingly to the amount of the retracting mechanism. However, in the case of gear drive as in this embodiment, the cartridge B can be mounted and dismounted without such a retracting mechanism.

Modified Example 1

Next, Modified Example 1 will be described. In the above-described embodiment, the first main assembly gear portion 81*c* and the second main assembly gear portion 81*d* of the drive transmission gear 81 have the same number of teeth, but the numbers of teeth do not necessarily have to be the same. However, the reduction ratio between the first main assembly gear portion 81*c* of the drive transmission gear 81 and the first gear portion 63*c* of the driving side flange 63, and the second gear of the second main assembly gear portion 81*d* of the drive transmission gear 81 and the second gear portion 63*d* of the driving side flange 63 need to be the same. For example, in the case that the number of teeth of the first gear portion 81*c* of the drive transmission gear is 20, the number of teeth of the first gear portion of the drum gear is 30, and therefore, the reduction ratio is 2:3, the reduction ratio is the same 2:3 if, the number of teeth of the second main assembly gear portion 81*d* of the drive transmission gear is 40 and the number of teeth of the second gear portion 63*d* of the driving side flange 63 is 60. In this case as well, the gear of the drive transmission gear 81 can be sandwiched by the first gear portion 63*c* and the second gear portion 63*d* of the driving side flange 63, and therefore, it is possible to establish the backlashless state in the rotational direction.

Modified Example 2

Next, Modified Example 2 will be described. In this Modified Example, the first gear portion 181*c* and the second gear portion 181*d* of the drive transmission gear 181 have different numbers of teeth, and the number of teeth on one side is not an integer multiple of the number of teeth on the other side. The first gear portion 163*c* and the second gear portion 163*d* of the driving side flange 163 also have different numbers of teeth, and the number of teeth on one side is not an integer multiple of the number of teeth on the other side. These points are different from those in the above-described embodiment of this Modified Example, and the structures of this Modified Example and the above-mentioned embodiment are the same except for these different points and the structures associated therewith, and therefore, the explanation thereof is omitted.

Figure 25:
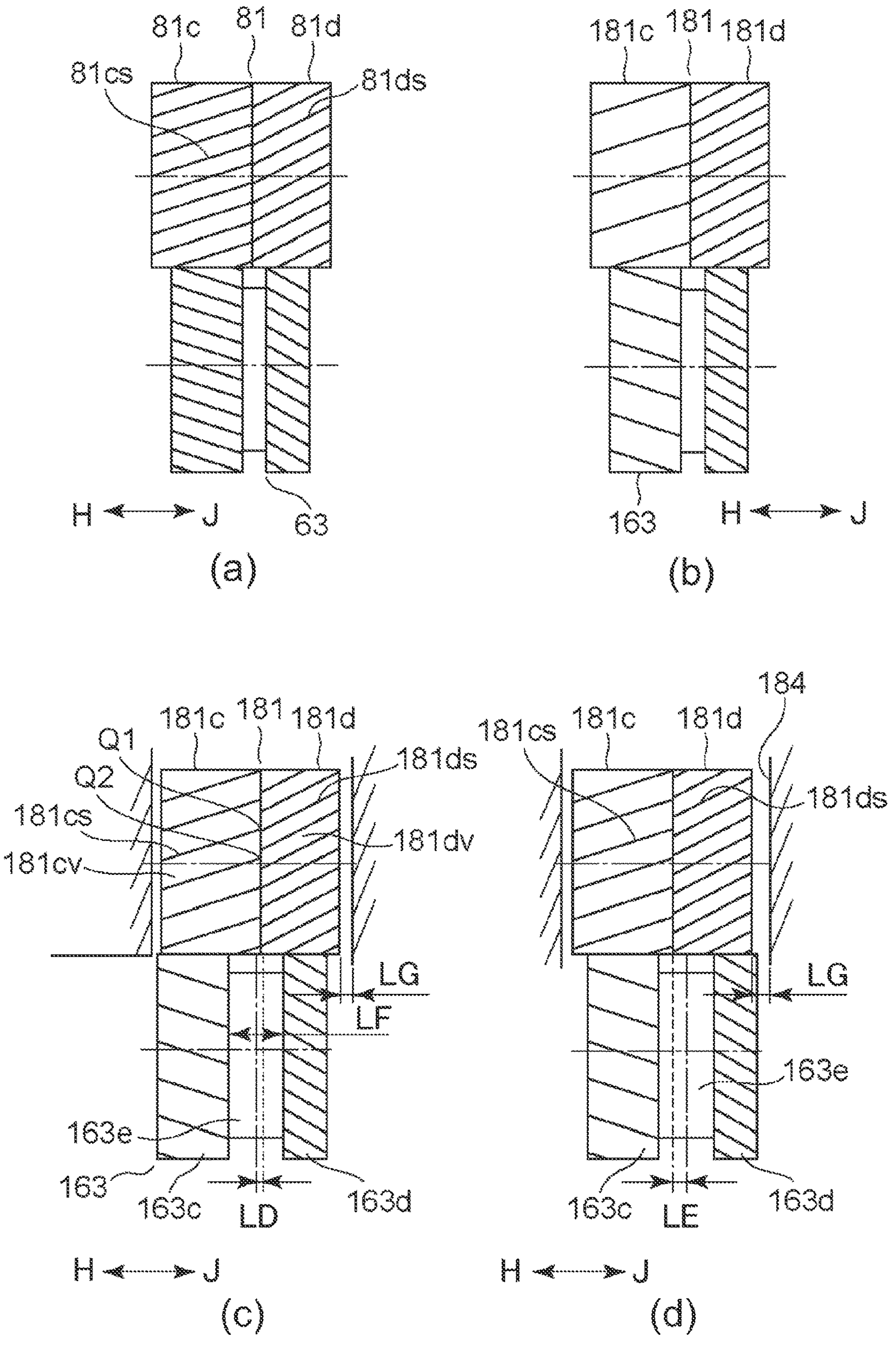
FIG. 25 is illustrations of the drive transmission structure.

Also in this Modified Example, it is possible to establish the backlashless state in the rotation direction as in the above-described embodiment. However, due to the setting of the numbers of teeth as described above, in the structure of this modified example the meshing phase of the gear with respect to the drive transmission gear 181 of the driving side flange 163 is not unique. Referring to FIG. 25, as to the structure in which the meshing phase is not uniquely determined, the position where the drive transmission gear 181 is positioned in the axial direction (balanced) will be described. Part (a) of FIG. 25 is a schematic illustration of a drive transmission structure using the drive transmission gear 81 of this embodiment described above. Part (b) of FIG. 25 is an illustration of a drive transmission portion using the drive transmission gear 181 and the driving side flange 163 of the modified example. Part (c) of FIG. and part (d) of FIG. 25 show a state in which the drive transmission gear 181 is in a balanced position after the drive transmission gear is driven.

Comparing part (c) of FIG. 25 and part (d) of FIG. 25, the drive transmission gear 181 and the driving side flange 163 are in meshing engagement with each other, but the meshing ways at the meshing engagement portions are different from each other. Specifically, part (c) of FIG. 25 shows a state in which a tooth top of the first gear portion 181*c* of the drive transmission gear 181 and a tooth top of the second gear portion 181*d* are in phase alignment with each other at the meshing engagement portion between the driving side flange 163 and the drive transmission gear 181, and the tooth top of the first gear portion 163*c* of the driving side flange 163 and the tooth top of the second gear portion 163*d* are in phase alignment with each other. In part (d) of FIG. 25 shows a state in which the tooth top of the first gear portion 181*c* of the drive transmission gear 181 and the tooth top of the second gear portion 181*d* are in phase alignment with each other at the meshing engagement portion, and the tooth top of the first gear portion 163*c* of the driving side flange 163 and the intertooth space of the second gear portion 163*d* are in phase alignment with each other.

When the numbers of teeth of the first gear portion 181*c* and the second gear portion 181*d* of the drive transmission gear 181 are different from each other, the phases of the tooth tops of the first gear portion 181*c* and the second gear portion 181*d* are different from each other depending on the phase of the gear in the rotational direction. For example, there are a position Q1 in which the tooth top portion 181*cs* of the tooth of the first gear portion and the tooth top 181*ds* of the second gear portion are in phase alignment with each other, and, a position Q2 in which the tooth top portion 181*cs* of the first gear portion and the intertooth space 181*dv* of the second gear portion are in phase alignment with each other, as well, depending on the phase in the rotational direction of the gear. This also applies to the relationship between the first gear portion 163*c* and the second gear portion 163*d* of the drum gear 163. As a result, as shown in part (c) of FIG. 25 and part (d) of FIG. 25, The balanced position of the drive transmission gear 181 relative to the driving side flange 163 in the axial direction is different, depending on an initial (before drive) meshing phase between the drive transmission gear 181 and the driving side flange 163 in the rotational direction. Part (c) of FIG. 25 shows the case where the balance position of the drive transmission gear 181 is the most downstream side in the H direction, and part (d) of FIG. 25 shows the case where the balance position of the drive transmission gear 181 is the most downstream side in the J direction. The amount of change of the balanced position can be expressed by the amount of deviation of a boundary between the first gear portion 181*c* and the second gear portion 181*d* of the drive transmission gear 181, with reference to an intermediate line between the first gear portion 163*c* and the second gear portion 163*d* of the driving side flange 163, for example. That is, in the state of part (c) of FIG. 25, the deviation amount LD in the J direction, and in the state of part (d) of FIG. 25, the deviation amount LE in the H direction, and therefore, sum (LD+LE) of the deviation amount LD and the deviation amount LE is the amount of change of the balanced position in this Modified Example.

In the case that the first gear portion 181*c* comes into contact with the second gear portion 163*d* or the second gear portion 181*d* comes into contact with the main assembly frame 184, or the second gear portion 181*d* comes into contact with the first gear portion 163*c* before the drive transmission gear 181 reaches the balanced position, the backlashless state cannot be established even if the driving operation is carried out. Therefore, in this Modified Example, the distance LF (width of the cylindrical portion 163*e*) between the first gear portion 163*c* and the second gear portion 163*d* of the driving side flange 163 and/or the gap LG between the drive transmission gear 181 and the main assembly frame 184 is selected, taking into consideration the amount of change in the balanced position (LD+LE)

On the other hand, in the structure of this embodiment shown in part (a) of FIG. 25, the numbers of teeth of the first main assembly gear portion 81*c* and the second main assembly gear portion 81*d* are the same, and the positional relationship between the tooth top 81*cs* and the tooth top 81*ds* of the first main assembly gear portion 81*c* and the second main assembly gear portion 81*d* is not changed by the phase in the rotational direction. Therefore, the balanced position where the position of the drive transmission gear 81 is determined in the axial direction with respect to the driving side flange 63 does not change. That is, it is not necessary to pay attention to the amount of change in the balanced position (LD+LE), which had to be considered in the modified example. Therefore, in this embodiment, the gap (width of the cylindrical portion 63*e*) between the first gear portion 63*c* and the second gear portion 63*d* of the driving side flange 63 can be designed to be smaller than that of the modified example, and the cartridge B can be downsized. In addition, the apparatus main assembly A of this embodiment can be designed in which the gap between the drive transmission gear 81 and the main assembly frame 84 is smaller than that of the modified example. By this, the cartridge B and/or the apparatus main assembly A can be downsized.

Other Modified Examples

Next, a modified example will be described in which the main modifications are in portions other than the drive transmission structure itself of the driving side flange 63 or the drive transmission gear 81.

<Application to Cleanerless Structure>

In the above-described embodiment, in the cartridge B, the toner remaining on the drum 62 without being transferred is scraped off by the rubber blade 77*a* into contact with the drum 62 and is stored in the waste toner chamber 71*b* (FIG. 3). However, the cartridge B may have a cleanerless structure. In other words, the drive transmission structure of the driving side flange 63 and the drive transmission gear 81 of the above-described embodiment may be applied to the cartridge having the cleanerless structure.

Figure 23:
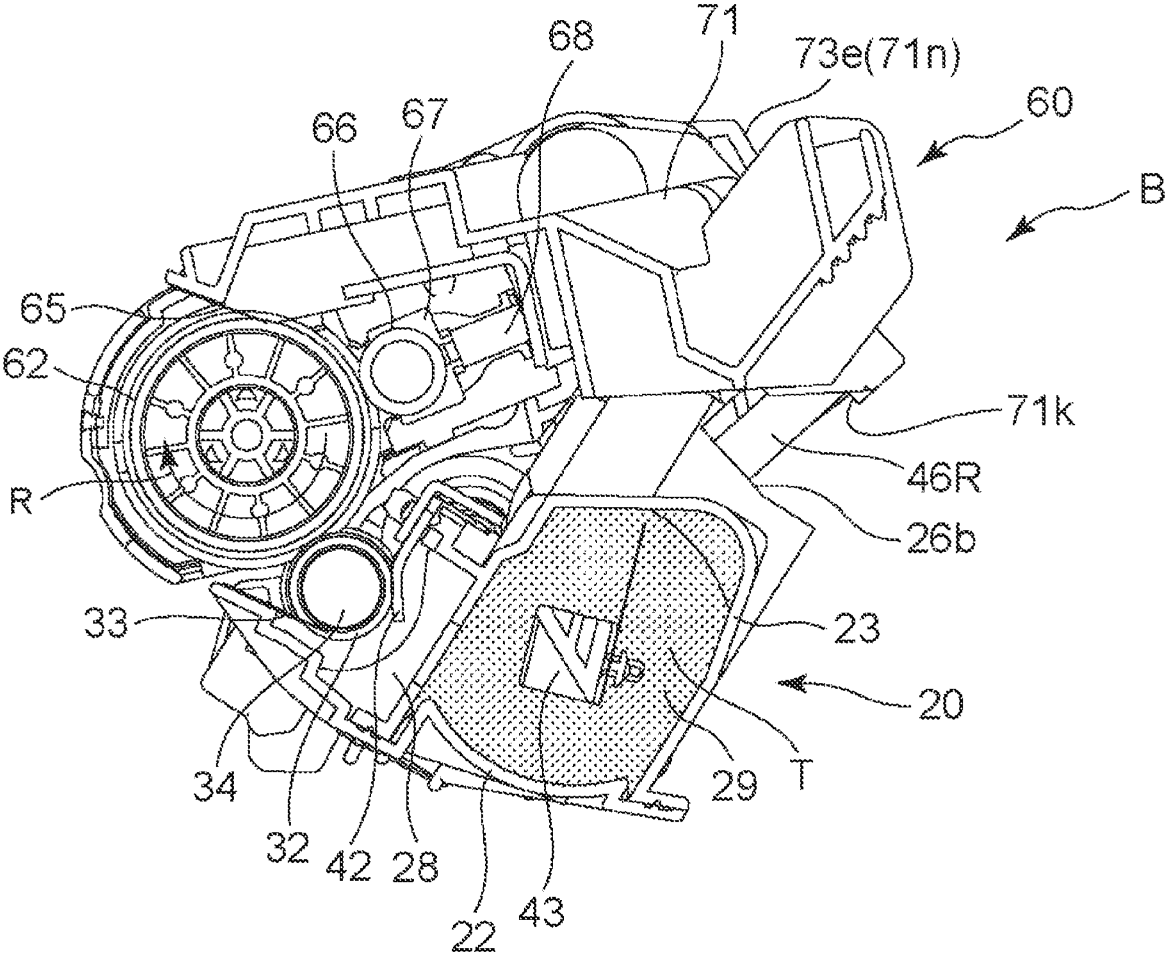
FIG. 23 is a cross-sectional view of the cartridge.

FIG. 23 is a cross-sectional view of the cartridge B having the cleanerless structure. The cartridge B having a cleanerless structure is structured and controlled so that the residual toner on the drum 62 can be recovered by the developing roller 32. Therefore, the cartridge B does not have a rubber blade in contact with the drum 62, a rubber blade being a resistance against rotation of the drum 62, and for this reason, the torque required for rotation of the drum 62 is smaller in the cleanerless structure as compared with the structure having the rubber blade 77*a* in contact with the drum 62 by the amount corresponding to the absence of the rubber blade 77*a*. As a result, the rotation speed of the drum 62 tends to fluctuate due to the influence of the impact when the sheet material PA is fed. In other words, the rotation accuracy of the drum 62 may deteriorate. By applying the drive transmission structure of the driving side flange 63 and the drive transmission gear 81 of the above-described embodiment, the drum 62 can be driven with transmission between the driving side flange 63 and the drive transmission gear 81 in a backlashless state. For this reason, it is possible to suppress the rotation accuracy deterioration of the drum 62 attributable to, the absence of the rubber blade, as compared with the structure in which the drive is transmitted with the backlash and play in the rotational direction existing between the driving side flange and the drive member on the main assembly side.

<Application to Structures without Magnet Rollers 34>

Further, in the above-described embodiment, the developer carrying member in which a magnet roller 34 is provided in a developing roller 32 has been described, but an elastic roller in which the magnet roller is not provided may be used.

<Application to the Structure in which the Developing Roller Gear 30 is Engaged with the Second Gear Portion 63*d*>

Figure 29:
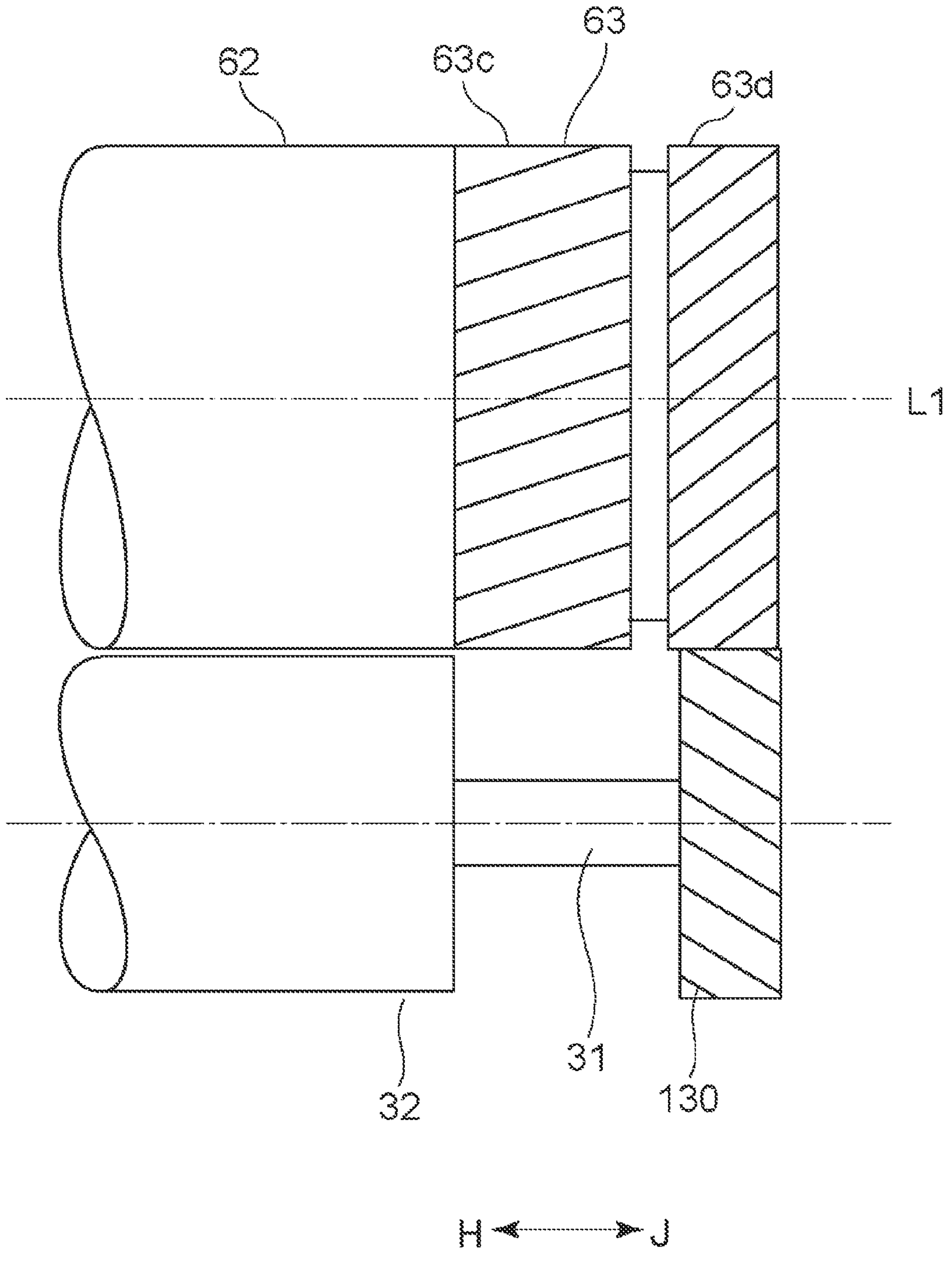
FIG. 29 is a schematic view illustrating engagement between the driving side flange and a developing roller gear.

Further, in the above-described embodiment, the structure in which the developing roller gear 30 is in meshing engagement with the first gear portion 63*c* of the driving side flange 63 has been described. However, the developing roller gear 30 may be structured to be in meshing engagement with the second gear portion 63*d*. Referring to FIG. 29, such a case will be described. FIG. 29 is a schematic view illustrating the engagement between the driving side flange 63 and the developing roller gear 30. The developing roller gear 130 fixed to the end of the developing roller shaft 31 meshes with the second gear portion 63*d*. Since the second gear portion 63*d* has the larger helix angle than the first gear portion 63*c*, the meshing ratio also increases accordingly. Therefore, the developing roller gear 130 which meshes with the second gear portion 63*d* can have a smaller tooth width than the developing roller gear 30 which meshes with the first gear portion 63*d*.

<Application to Drive Transmission Structure from Driving Side Flange to Developing Roller Gear>

Figure 30:
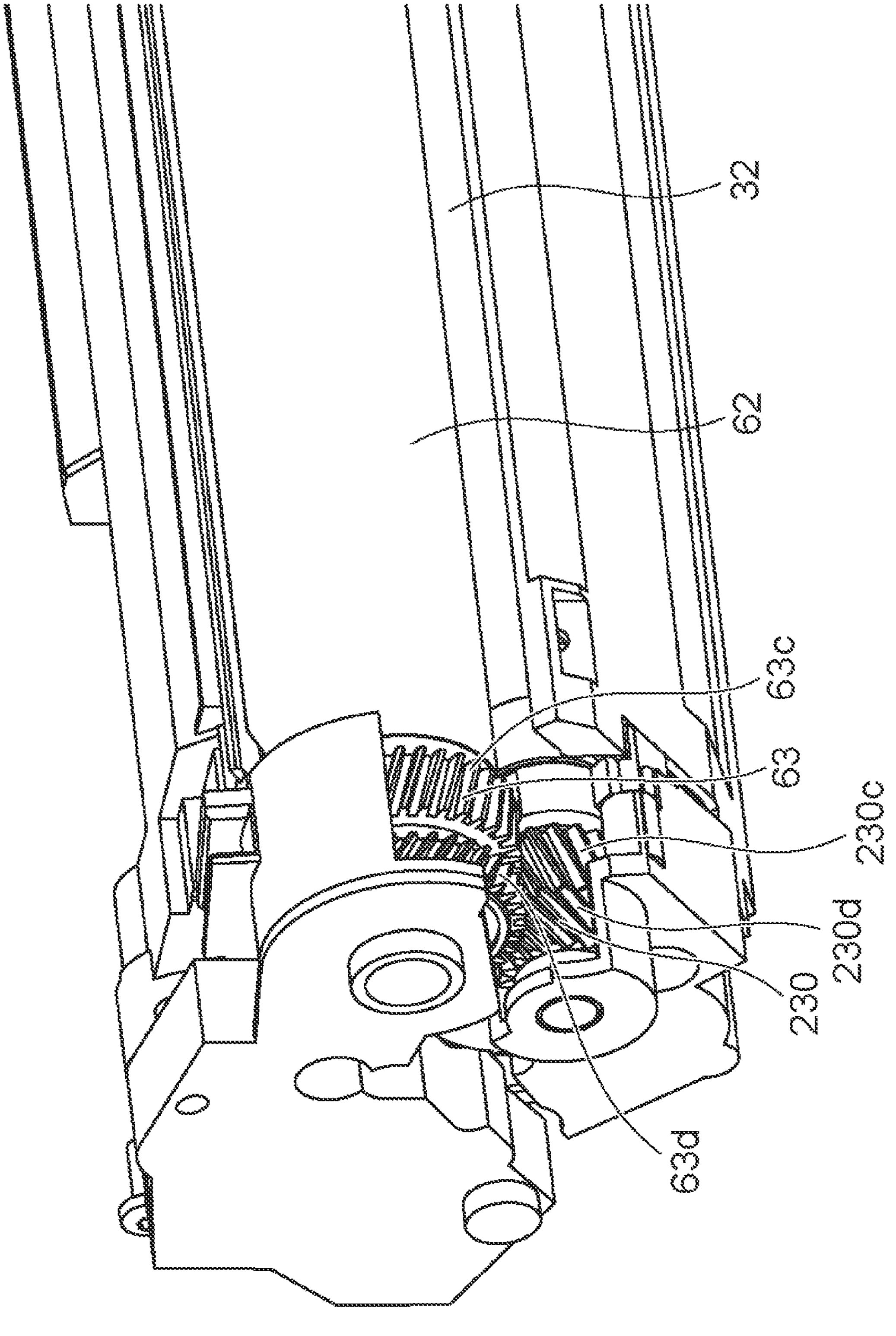
FIG. 30 is a perspective view of the cartridge.

Further, the same structure as the driving force transmission structure from the drive transmission gear 81 to the driving side flange 63 may be further applied to the drive force transmission structure from the driving side flange 63 to the developing roller gear 230. Such a case will be described with reference to FIG. 30. FIG. 30 is a perspective view of the cartridge B. The developing roller gear 230 includes a first developing gear portion 230*c* and a second developing gear portion 230*d* which mesh with the first gear portion 63*c* and the second gear portion 63*d* of the driving side flange 63, respectively. When the driving side flange 63 is driven, the developing roller gear 230 moves in the direction of the rotational axis L1 by the same principle in the above-described embodiment, so that the drive transmission gear 81 moves in the direction of the rotational axis L1 and reaches the balanced position. In the state the developing roller gear 230 is in the balanced position, the developing roller gear 230 is driven in a backlashless state with respect to the driving side flange 63, so that the misalignment and the deterioration of the rotational accuracy of the developing roller 32 in the load fluctuates can be suppressed.

<Application to the Structure of the Driving the Developing Roller Gear not Through the Driving Side Flange>

Figure 44:
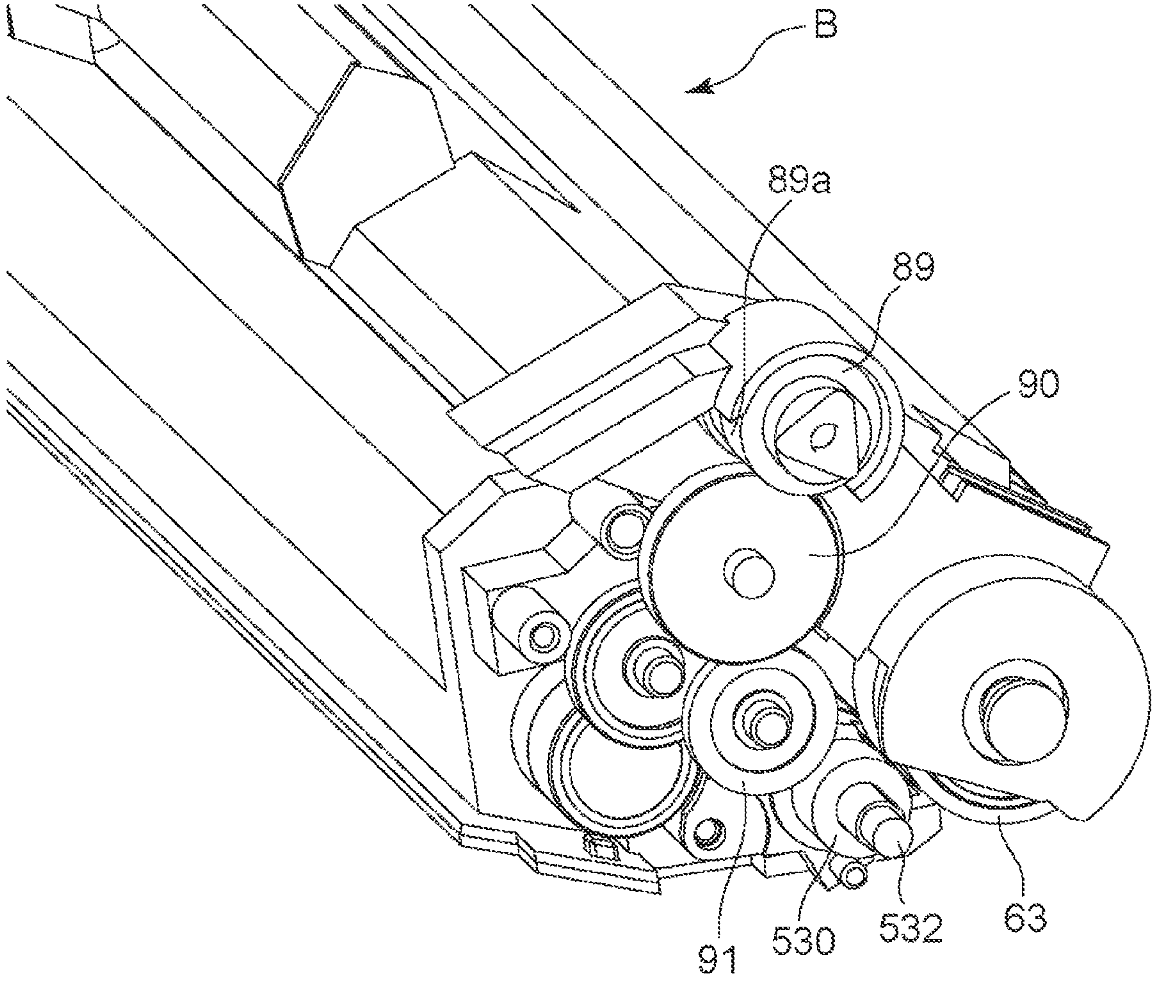
FIG. 44 is a partial perspective view of the cartridge.

Further, the driving force may be transmitted to the developing roller 532 not through the driving side flange 63. FIG. 44 is a partial perspective view of the cartridge B showing a drive train to the developing roller 532. For the sake of better illustration, a part of the frame of the cartridge B is not shown.

As shown in FIG. 44, the developing roller 532 is not structured to received the driving force from the driving side flange 63, but is structured to received the driving force by way of another path. Specifically, the cartridge B is provided with a development coupling member 89 which can be engaged with a coupling member (not shown) of the apparatus main assembly A for driving the developing roller. Further, the cartridge B is provided with idler gears 90 and 91 which mesh with the gear portion 89*a* of the development coupling member 89, and is provided with a developing roller gear 530 which meshes with the idler gear 91 at one end of the shaft of the developing roller 532. With this structure, the developing roller 530 is driven by transmitting the driving force received by the development coupling member 89 by way of the idler gears 90 and 91 and the developing roller gear 530. Therefore, the driving of the development coupling member 89 can be controlled separately from the drive of the driving side flange 63, and the development coupling member 89 can be driven while the driving side flange 63 is not, for example.

<Application to Drive Transmission Structure to Rotatable Members Other than Drums>

The driving side flange 63 is mounted to the end of the drum 62, but it is possible that the developing roller gear 30 is provided with the first gear portion 63*c*, the second gear portion 63*d*, and the cylindrical portion 63*e*, and the drive transmission gear 81 drives the developing roller 30. Further, the object to be driven by the drive transmission gear 81 is not limited to a developer carrier such as a drum 62 and a developing roller 30 which carries the toner (developer). The object to be driven by the drive transmission gear 81 may be, a feed member (or agitator member) 43 for transporting (or stirring) toner, a charging roller 66, or a supply member for supplying toner to the developing roller 30, for example. Further, when the object to be driven by the drive transmission gear 81 is a member other than the drum 62 included in the cartridge B, the cartridge B may be a cartridge including no photosensitive member such as the drum 62.

Embodiment 2

Next, referring to FIG. 31, Embodiment 2 will be described below. In this embodiment, the structures of the first gear portion and the second gear portion provided on the driving side flange are different from those in Embodiment 1. Since the other points are the same as those in Embodiment 1, the description thereof will be omitted.

Figure 31:
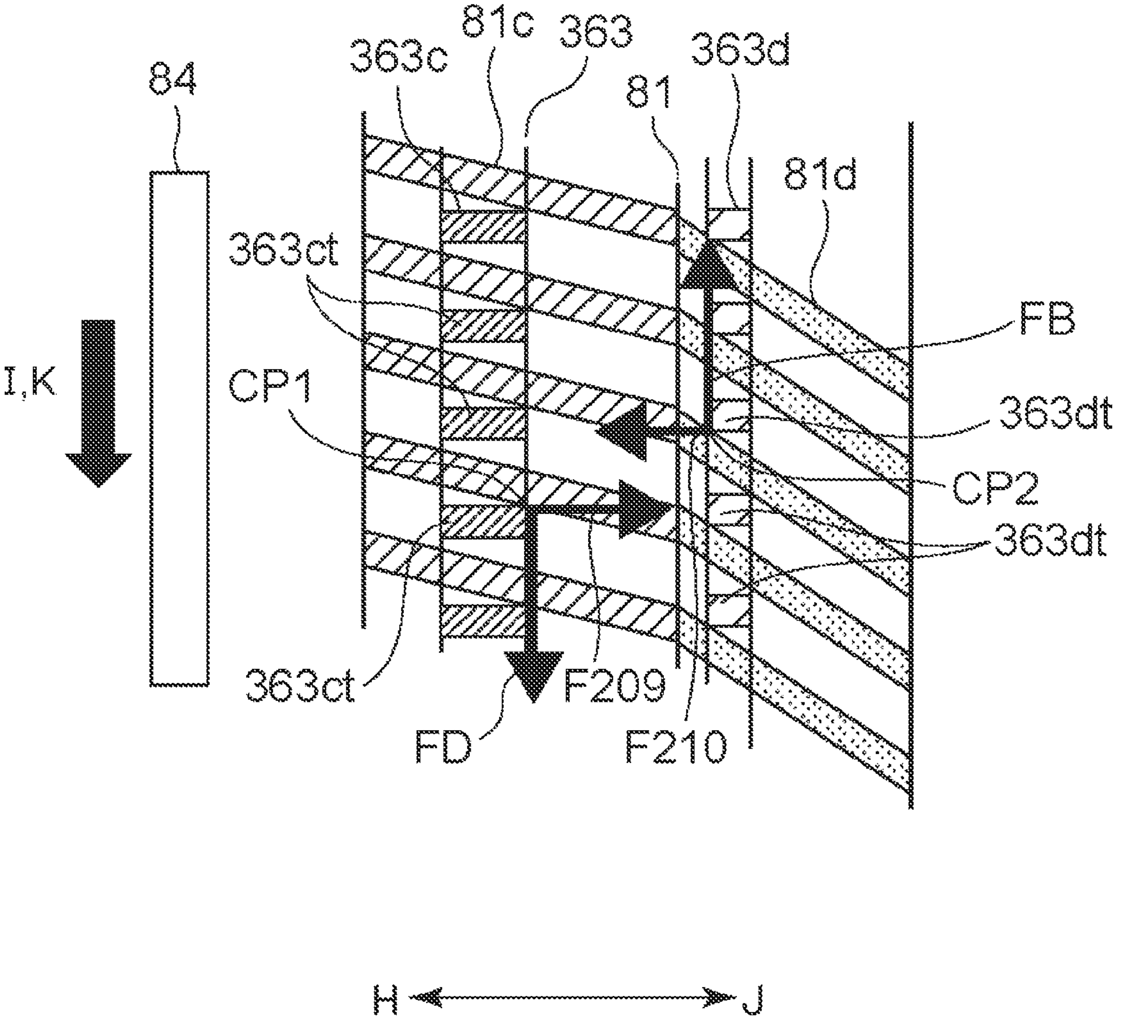
FIG. 31 is a sectional view of the drive transmission gear and the driving side flange.

FIG. 31 is a sectional view of a meshing engagement portion between the drive transmission gear 81 and the driving side flange 263, and the sectional plane is in contact with meshing pitch circles therebetween. The driving side flange 263 is provided with a first gear portion (first unit side gear portion) 263*c* and a second gear portion (second unit side gear portion) 263*d*. The first gear portion 263*c* includes a plurality of first flat teeth (first projections) 263*ct* having a tooth width which is sized so as to be insertable between the teeth of the first main assembly gear portion 81*c*. The second gear portion 263*d* includes a plurality of second flat teeth (second projections) 263*dt* having a tooth width which is sized so as to be insertable between the teeth of the second main assembly gear portion 81*d*. In addition, the width (tooth width) of the first flat tooth 263*ct* measured in the direction of the rotational axis L1 is larger than the width (tooth width) of the second flat tooth 263*dt* measured in the direction of the rotational axis L1. The plurality of first flat teeth and the plurality of second flat teeth are projections projecting in the radial direction with respect to the rotational axis L1 and are arranged at positions different in the circumferential direction about the rotational axis L1.

Also when such a driving side flange 263 is used, by the drive transmission gear 81 rotating in the I direction, the drive transmission gear 81 is moved to the balanced position and establishes a backlashless state as in Embodiment 1. That is, the first main assembly gear portion 81*c* meshes with the first gear portion 263*c* and receives the reaction force of the driving force FD and the thrust force F209 in the J direction from the contact point (contact portion) CP1 of the first gear portion 263*c*. The second main assembly gear portion 81*d* meshes with the second gear portion 263*d* and receives the reaction force of the restricting force FB and the thrust force F210 in the H direction from the contact point (contact portion) CP2 of the second gear portion 263*d*. Also with this, the drive transmission gear 81 is sandwiched between the first gear portion 263*c* and the second gear portion 263*d* of the driving side flange 263 in the rotational direction in the axial direction, so that the backlashless state is provided as in Embodiment 1.

Embodiment 3

Next, referring to FIG. 32, Embodiment 3 will be described. In this embodiment, the structures of the first gear portion and the second gear portion provided on the driving side flange are different from those in Embodiment 1. Since the other points are the same as those in Embodiment 1, the description thereof will be omitted.

Figure 32:
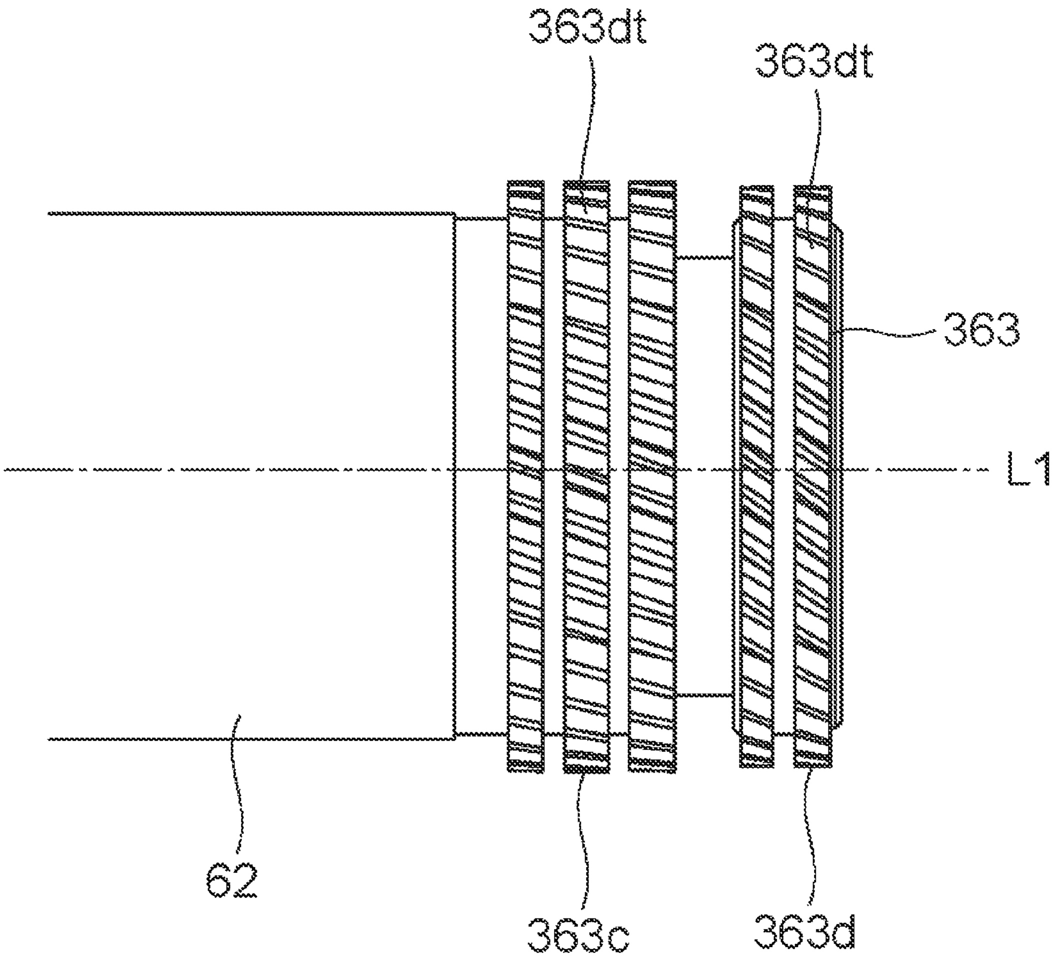
FIG. 32 is an illustration of a driving side flange.

FIG. 32 is an illustration of a driving side flange 363. The driving side flange 363 is provided with a first gear portion 363*c* and a second gear 363*d*1. The first gear portion (first unit side gear portion) 363*c* includes a plurality of first helical tooth gears (first projections) 363*ct* provided by being divided into a plurality of portions in the direction of the rotational axis L1. Although the plurality of first helical tooth gears (projections) 363*ct* are provided by dividing in the direction of the rotational axis L1, they function as one helical tooth substantially extending in the direction of the rotational axis L1 with respect to the first main assembly gear portion 81*c*. Further, the tooth surface of the plurality of first helical tooth gears (projections) 363*ct* is a plurality of force receiving portions which receive force from the first main assembly gear portion 81*c*. Therefore, it can be said that the plurality of force receiving portions which receive the force from the first main assembly gear portion 81*c* are provided over the plurality of first helical tooth gears (first projections) 363*ct*. It can be said that the tooth surfaces of the plurality of first helical tooth gears (projections) 363*ct* constitute helical tooth surfaces provided by dividing into a plurality portions in the direction of the rotational axis L1, or they constitute a plurality of helical tooth surfaces which are provided by dividing in the circumferential direction centered on the rotational axis L1 of the driving side flange 363. As described above, the plurality of helical tooth-shaped projections 363*ct* constitute one tooth of the first main assembly gear portion 81*c* and one tooth of the corresponding helical tooth gear.

The tooth surfaces of the plurality of second helical tooth gears (projections) 363*dt* are force receiving portions which receive force from the second main assembly gear portion 81*d*. Therefore, it can be said that the plurality of force receiving portions which receive the force from the second main assembly gear portion 81*d* are provided over the plurality of second helical tooth gears (second projections) 363*dt*. The second gear portion (second unit side gear portion) 363*d* includes a plurality of second helical tooth gears (projections) 363*dt* provided by being divided into a plurality of portions in the direction of the rotational axis L1. Although the plurality of second helical tooth gears (second projections) 363*dt* are provided by dividing in the direction of the rotational axis L1, they function substantially as one helical tooth extending in the direction of the rotational axis L1, with respect to the second main assembly gear portion 81*d*. In addition, it can be said that the tooth surfaces of the plurality of second helical tooth gears (projections) 363*dt* constitute a plurality of helical tooth surfaces provided by dividing in the direction of the rotational axis L1, or they constitute helical tooth surfaces which are provided by dividing in the circumferential direction with respect to the rotational axis L1 of the driving side flange 363. As described above, the plurality of helical tooth-shaped projections 363*dt* constitute one helical tooth corresponding to one tooth of the second main assembly gear portion 81*d*.

Therefore, also when such a driving side flange 363 is used, by the drive transmission gear 81 rotating in the I direction, the drive transmission gear 81 is moved to the balanced position and establishes a backlashless state as in Embodiment 1.

Embodiment 4

Figure 33:
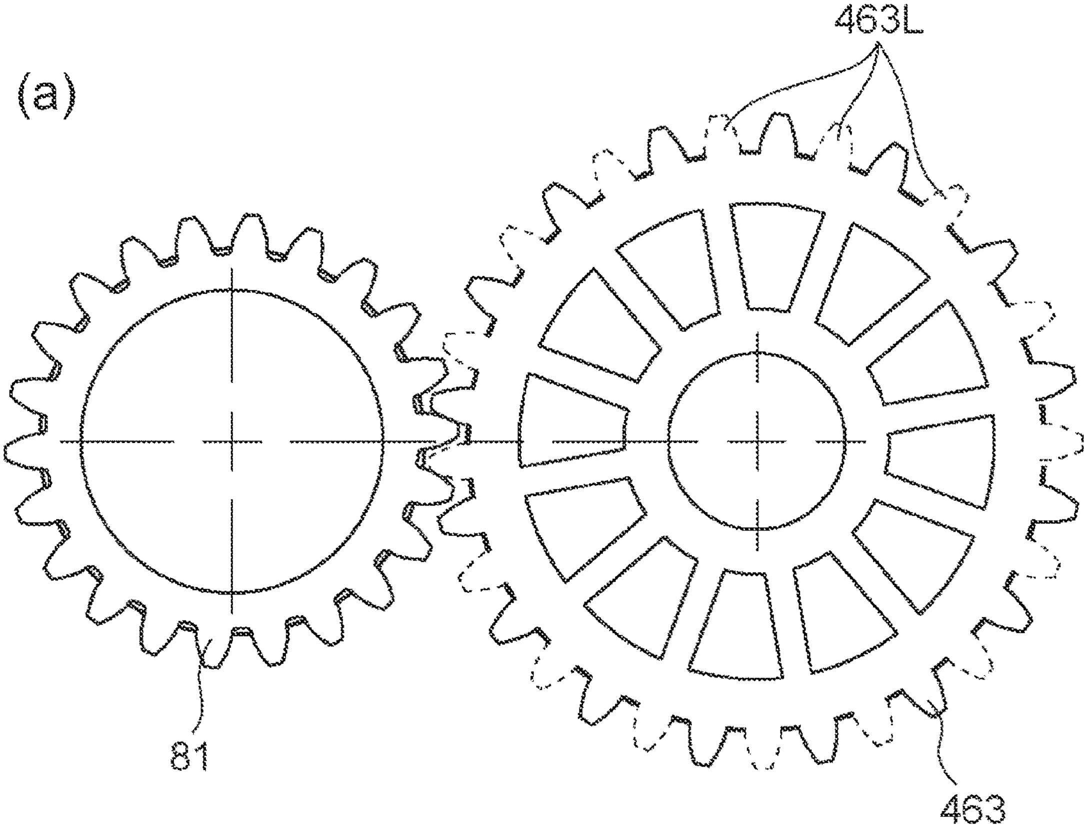
FIG. 33 is a cross-sectional view of the driving side flange and the drive transmission gear, and a graph showing change of the number of meshing teeth.
Figure 33:
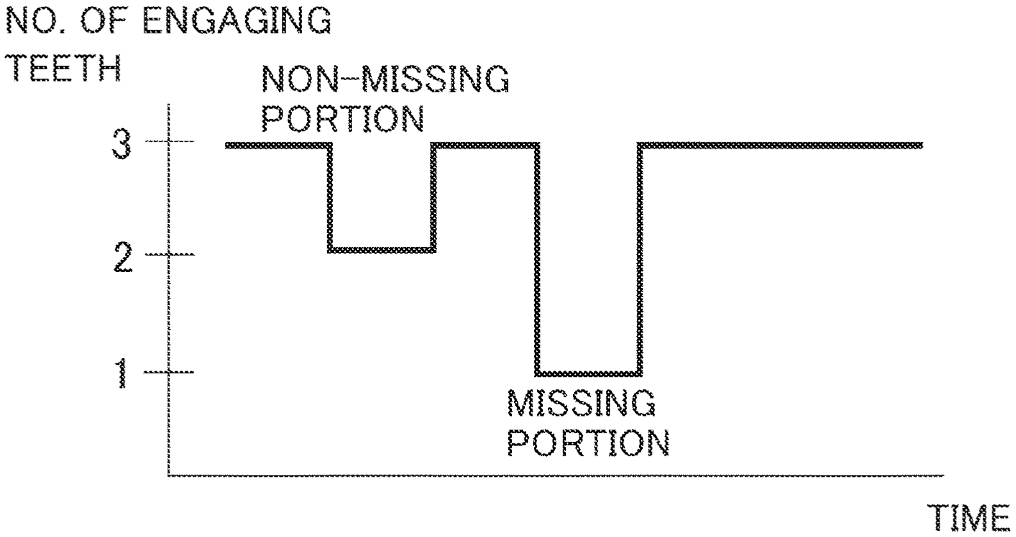

Next, referring to FIG. 33, Embodiment 4 will be described. In this embodiment, the structures of the first gear portion and the second gear portion provided on the driving side flange are different from those in Embodiment 1. Since the other points are the same as those in Embodiment 1, the description thereof will be omitted.

The driving side flange 463 has two gear portions (first unit side gear portion and second unit side gear portion) as with the first gear portion 63*c* and the second gear portion 63*d* of the driving side flange 63 of Embodiment 1. At least one of the two gear portions has a missing tooth portion (apparently, a portion where the teeth of the gear are intermittently missing) 463L. Part (a) of FIG. 33 is a view of the driving side flange 463 and the drive transmission gear 81 meshing with each other in a cross-section perpendicular to the rotational axis L1. Part (b) of FIG. 33 is a graph showing the change in the number of teeth of the meshing gear. When the meshing ratio between the gear portion of the driving side flange 463 and the gear portion of the drive transmission gear 81 is N teeth with truncating after the decimal point, the gear portion of the driving side flange 463 may have tooth missing portion 463L at every N−1 tooth at the maximum. By satisfying this condition, even if the tooth missing portion 463L is provided, there are one or more teeth which are in meshing engagement with the drive transmission gear 81 (the meshing ratio is 1 or more). With such a structure, by the drive transmission gear 81 rotating in the I direction, the drive transmission gear 81 moves to the balanced position to establish a backlashless state as in Embodiment 1. As shown in part (b) of FIG. 33, the number of gear teeth of the driving side flange 463 which meshes with each gear portion of the drive transmission gear 81 changes during driving.

Embodiment 5

Figure 34:
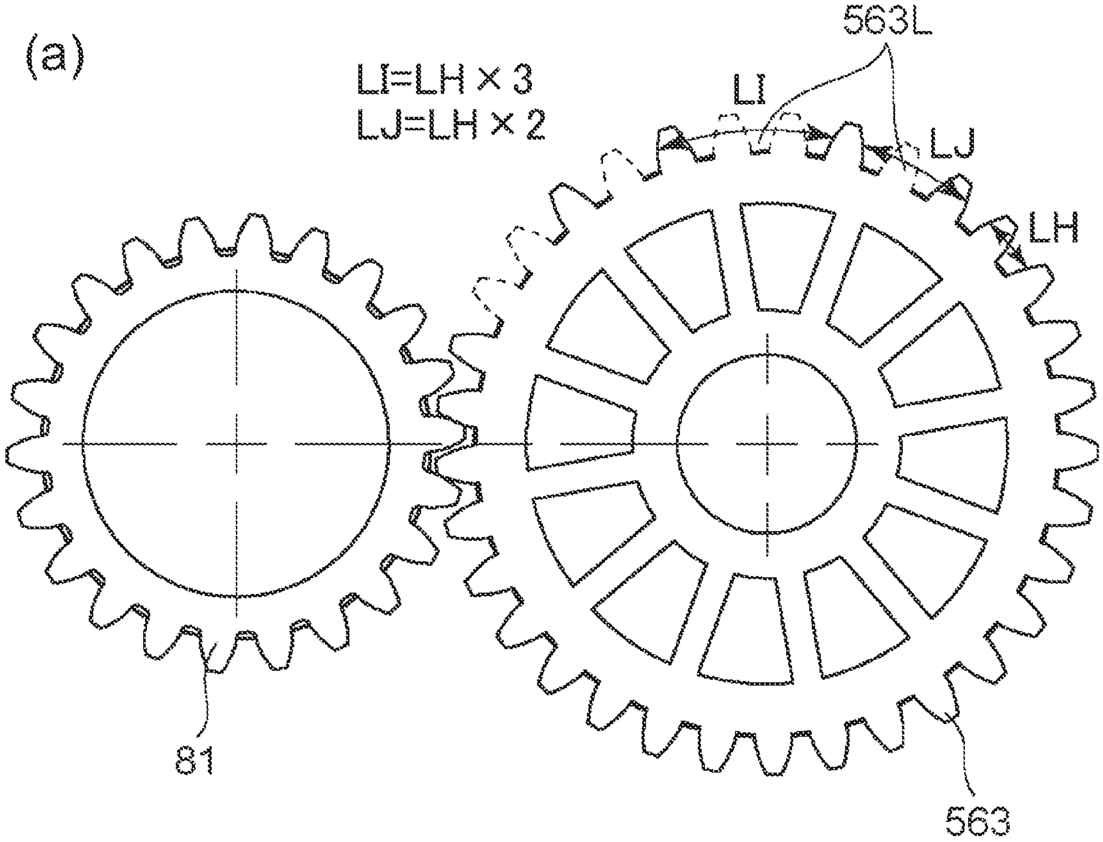
FIG. 34 is a cross-sectional view of the driving side flange and the drive transmission gear, and a graph showing change of the number of meshing teeth.
Figure 34:
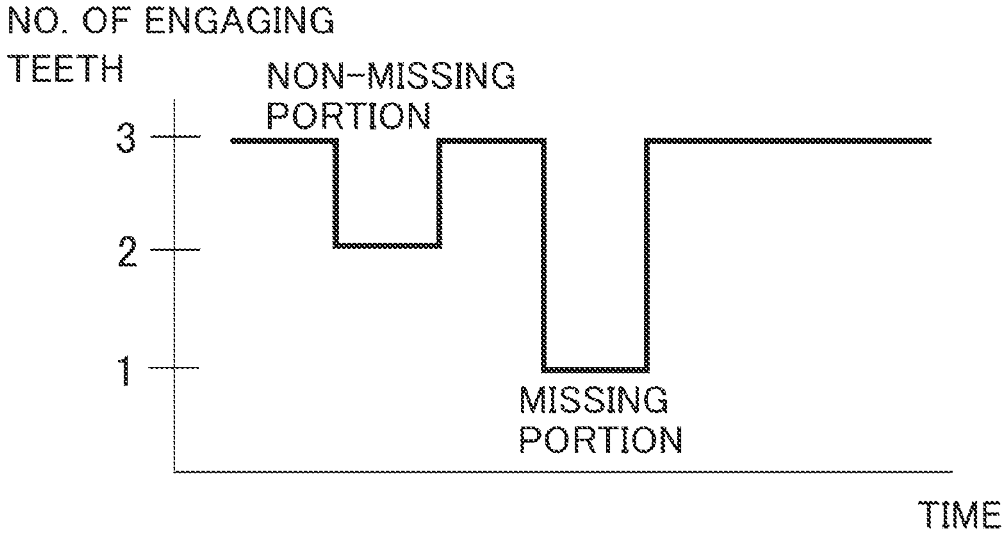

Next, referring to FIG. 34, Embodiment 5 will be described. In this embodiment, the structures of the first gear portion and the second gear portion which are provided on the driving side flange are different from those in Embodiment 1. Since the other points are the same as those in Embodiment 1, the description thereof will be omitted.

The driving side flange 563 is provided with two gear portions (first unit side gear portion and second unit side gear portion) as with the first gear portion 63*c* and the second gear portion 63*d* of the driving side flange 63 of Embodiment 1. At least one of the two gear portions has a tooth missing portion 563L. Part (a) of FIG. 34 is a view of the driving side flange 563 and the drive transmission gear 81 meshing with each other in a cross-section perpendicular to the rotational axis L1. Part (b) of FIG. 34 is an illustration showing changes in the number of teeth of the meshing gears. As shown in part (a) of FIG. 34, as is different from the driving side flange 463 of Embodiment 4, the teeth of the driving side flange 563 are not arranged at regular intervals in the circumferential direction. That is, it can be said that the size of the plurality of tooth missing portions 563 in the circumferential direction is not constant, or the apparent amount of all the tooth missing portions 563 is not the same. In other words, it will suffice if they are arranged in the rotational direction at intervals LI, LJ which are natural number (1, 2, . . . ) multiple of the minimum pitch LH between adjacent teeth. Even if such a tooth missing portion 563 is provided, it will suffice if there is at least one meshing tooth (the meshing ratio is 1 or more). With such a structure, by the drive transmission gear 81 rotating in the I direction, the drive transmission gear 81 moves to the balanced position to establish a backlashless state as in Embodiment 1. As shown in part (b) of FIG. 34, the number of gear teeth of the driving side flange 463 which mesh with each gear portion of the drive transmission gear 81 changes.

Embodiment 6

Next, referring to FIG. 35, Embodiment 6 will be described below.

In this embodiment, the structures of the first gear portion and the second gear portion provided on the driving side flange are different from those in Embodiment 1. Specifically, the first gear portion 63*c* and the second gear portion 63*d* of Embodiment 1 each have an involute tooth profile helical tooth, but this embodiment is different, in that the helical tooth does not have an involute tooth profile. Since the other points are the same as those in Embodiment 1, the description thereof will be omitted.

Figure 35:
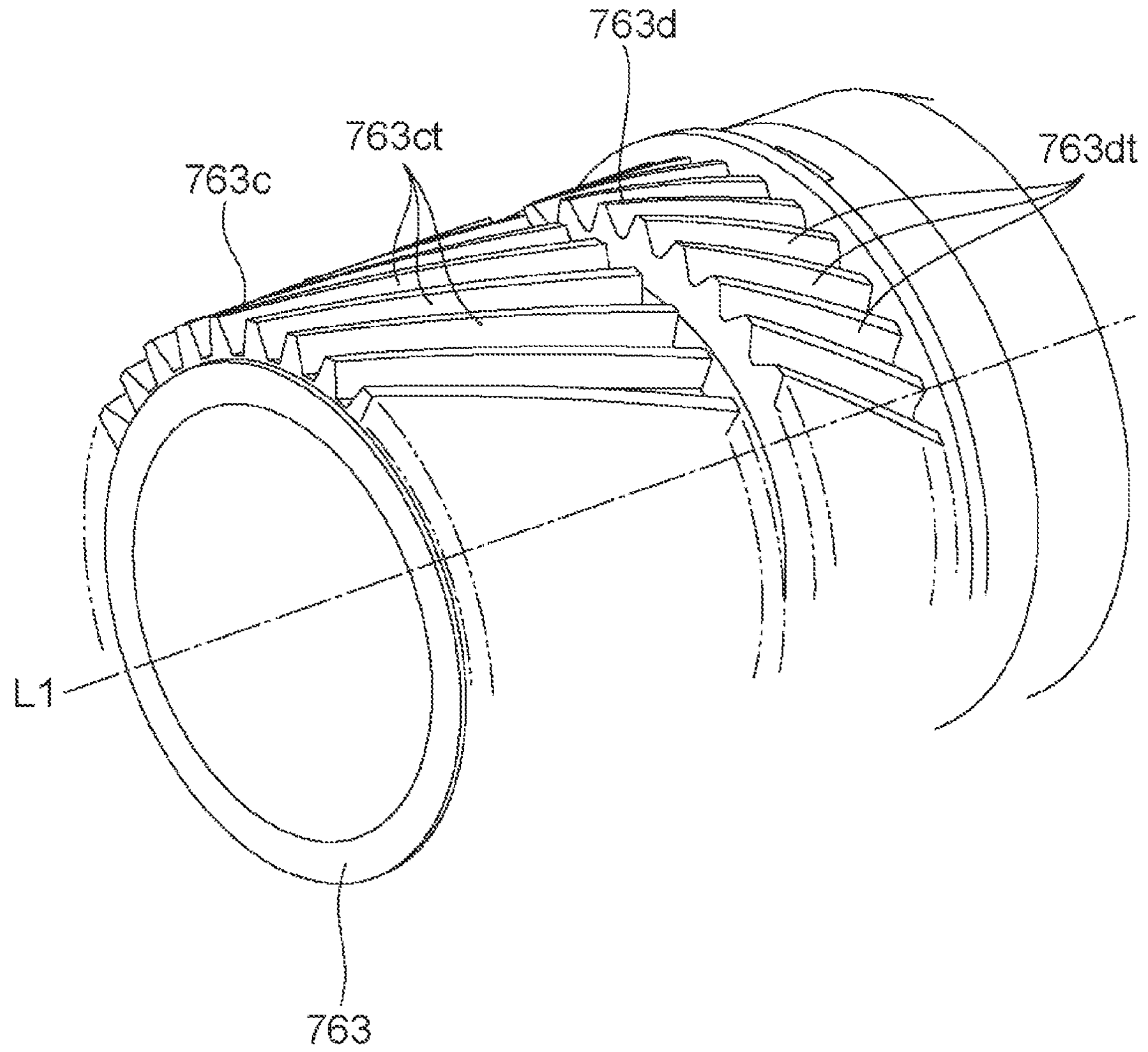
FIG. 35 is a perspective view of the driving side flange.

FIG. 35 is a perspective view of the driving side flange 763. The driving side flange 763 has a first gear portion (first unit side gear portion) 763*c* and a second gear portion (second unit side gear portion) 763*d*. The first gear portion 763*c* includes a plurality of first projections 763*ct*, and the second gear portion 63*d* includes a plurality of second projections 763*dt*. The first projection 763*ct* and the second projection 763*dt* are projections projecting in the radial direction relative to the rotational axis L1, and the cross-sectional shape in the cross-section perpendicular to the rotational axis L1 is trapezoidal having a width narrowing toward the free end. In addition, the first projection 763*ct* and the second projection 763*dt* are helical teeth which are twisted around the rotational axis L1. Even with such a structure, the first gear portion 763*c* and the second gear portion 763*d* function as helical tooth gears in the meshing engagement with the drive transmission gear 81. Therefore, by the drive transmission gear 81 rotating in the I direction, the drive transmission gear 81 moves to the balanced position to establish a backlashless state as in Embodiment 1.

The cross-sectional shape of the first projection 763*ct* and the second projection 763*dt* is not limited to the trapezoid, but may be a projection shape such as a rectangle, a triangle, or a curved shape, or a shape with chamfered corners.

Embodiment 7

Next, referring to FIG. 36, Embodiment 7 will be described. In this embodiment, the structures of the first gear portion and the second gear portion provided on the driving side flange are different from those in Embodiment 1. Specifically, the twisting directions are reversed as compared with the first gear portion 63*c* and the second gear portion 63*d* of Embodiment 1. In harmonization with this structure, the twisting directions of the first main assembly gear portion and the second main assembly gear portion of the drive transmission gear are also reversed as compared with Embodiment 1. Since the other points are the same as those in Embodiment 1, the description thereof will be omitted.

Figure 36:
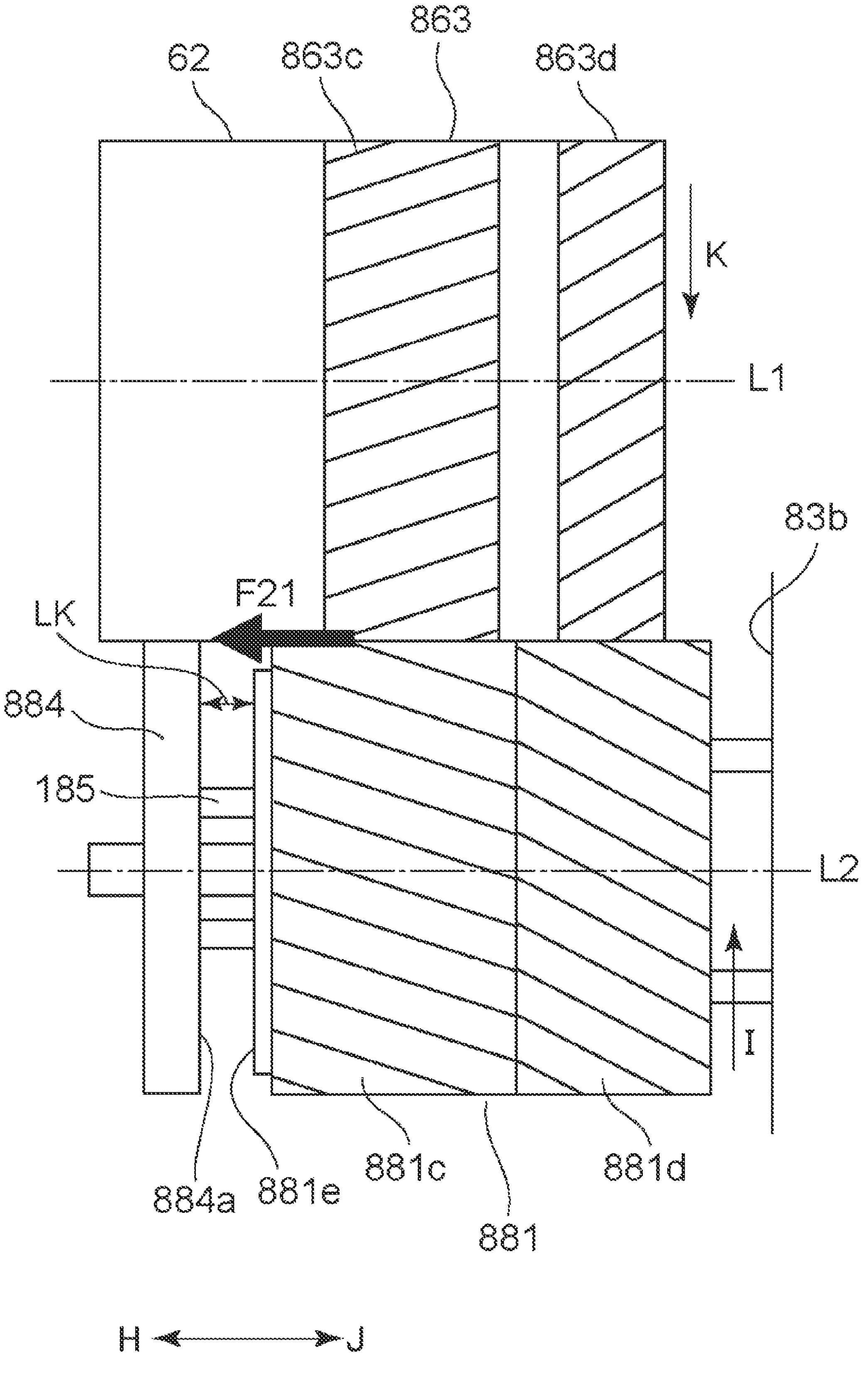
FIG. 36 is a schematic view illustrating the engagement between the drive transmission gear and the driving side flange.

FIG. 36 is a schematic view illustrating the engagement between the drive transmission gear 881 and the driving side flange 863. As shown in FIG. 36, the twisting directions of the first gear portion (first unit side gear portion) 863*c* and the second gear portion (second unit side gear portion) 863*d* of the driving side flange 863 are such that the tooth surface shift in the I direction as go in the J direction. The twisting directions of the first gear portion 881*c* and the second gear portion 881*d* of the drive transmission gear 881 is such that the tooth surface shift in the K as go in the J direction.

Since the twisting direction is opposite to that of Embodiment 1, the direction of the thrust force F21 applied to the drive transmission gear 881 by the meshing engagement during driving of the drive transmission gear 881 is also opposite to that of Embodiment 1. Therefore, in moving to the balanced position in the axial direction, a space having a width LK for the drive transmission gear 881 to move in the H direction is required. For this reason, a compression spring 185 for urging the drive transmission gear 881 in the J direction is provided, so that the drive transmission gear 881 is placed in abutment against the positioning portion 83*b* of the second driving side plate 83 before mounting the cartridge B.

Also with such a structure, by the drive transmission gear 881 rotating in the I direction, the drive transmission gear 881 moves to the balanced position to establish a backlashless state as in Embodiment 1.

Embodiment 8

Next, referring to FIG. 37, Embodiment 8 will be described. This embodiment has a different structure in which the cartridge B is mounted to the main assembly of the apparatus as compared with Embodiment 1. Since the other points are the same as those in Embodiment 1, the description thereof will be omitted.

Figure 37:
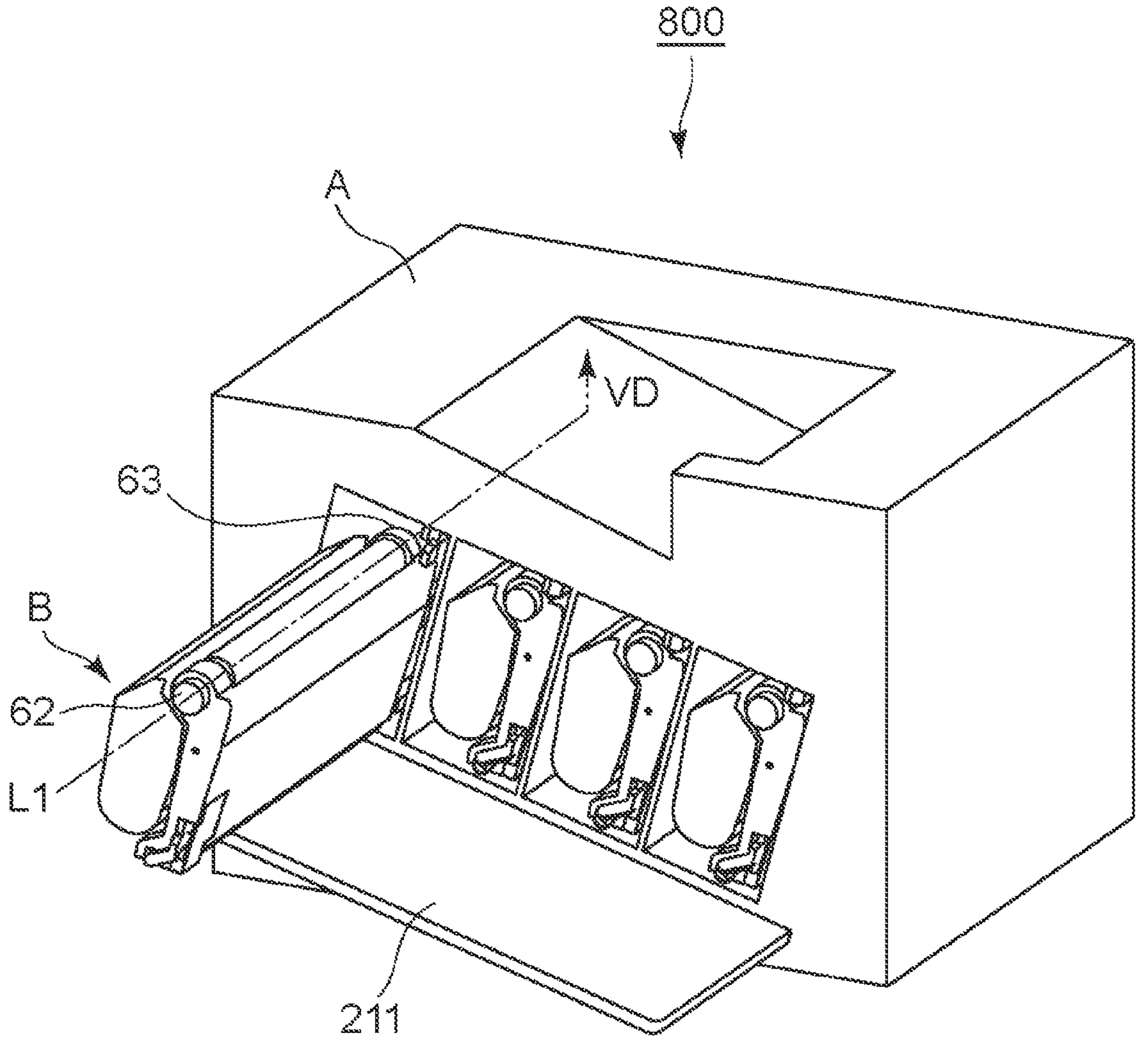
FIG. 37 is a perspective view of an image forming apparatus.

FIG. 37 is a perspective view of an image forming apparatus 800. In the image forming apparatus 800, the inserting direction for inserting the cartridge B into the apparatus main assembly A is parallel to or substantially parallel to the rotational axis L1 of the drum 62. Even if the cartridge B is completely inserted in the direction parallel to the rotational axis L1, the driving side flange 63 and the drive transmission gear (not shown) of the apparatus main assembly A cannot mesh with each other because there is a distance between them in the direction perpendicular to the rotational axis L1. Thereafter, by closing the door 211, the cartridge B is displaced at least in the direction VD perpendicular to the rotational axis L1 by the lift-up mechanism (not shown) provided in the apparatus main assembly A in connection with the door 211, and the driving side flange 63 and the drive transmission gear (not shown) of the apparatus main assembly A are meshed with each other.

The drive operation after the driving side flange 63 and the drive transmission gear (not shown) meshing engagement with each other is the same as in Embodiment 1, and the drive transmission gear moves to the balanced position to establish the backlashless state as in Embodiment 1.

When the cartridge B is displaced at least in the direction VD perpendicular to the rotational axis L1 by the lift-up mechanism, the cartridge B may be displaced not only in the direction perpendicular to the rotational axis L1 but also in the direction of the rotational axis L1. Further, the lift-up mechanism may be structured to rotate the cartridge B around an axis perpendicular to the rotational axis L1 and displace the driving side flange 63 in the direction VD perpendicular to the rotational axis L1.

Further, instead of the structure in which the door 211 is closed to operate the lift-up mechanism after the cartridge B is inserted into the apparatus main assembly A, the cartridge B may be displaced at least in the direction VD perpendicular to the rotational axis L1 in the process of inserting the cartridge B into the apparatus main assembly A. Specifically, at the initial stage of the insertion stroke of the cartridge B into the apparatus main assembly A, the cartridge B is guided by a guide (not shown) so as to move the cartridge B in a direction parallel to the rotational axis L1. Then, at the final stage of the insertion stroke, the cartridge B is guided by a guide (not shown) so as to displace the cartridge B in a direction VD perpendicular to at least the rotational axis L1. In this manner, the structure may be such that the moving direction (mounting direction) of the cartridge B changes during the insertion process.

Embodiment 9

Next, referring to FIG. 38, Embodiment 9 will be described. In this embodiment, the structures of the first gear portion and the second gear portion provided on the driving side flange are different from those in Embodiment 1. Specifically, in this embodiment, the arrangement of a first gear portion 963*c* and a second gear portion 963*d* in the direction of the rotational axis L1 is reversed as compared with that of the first gear portion 63*c* and the second gear portion 63*d* of Embodiment 1. In harmonization with this structure, the positions of the first main assembly gear portion and the second main assembly gear portion of the drive transmission gear in the direction of the rotational axis L1 are also reversed as compared with Embodiment 1. Since the other points are the same as those in Embodiment 1, the description thereof will be omitted.

Figure 38:
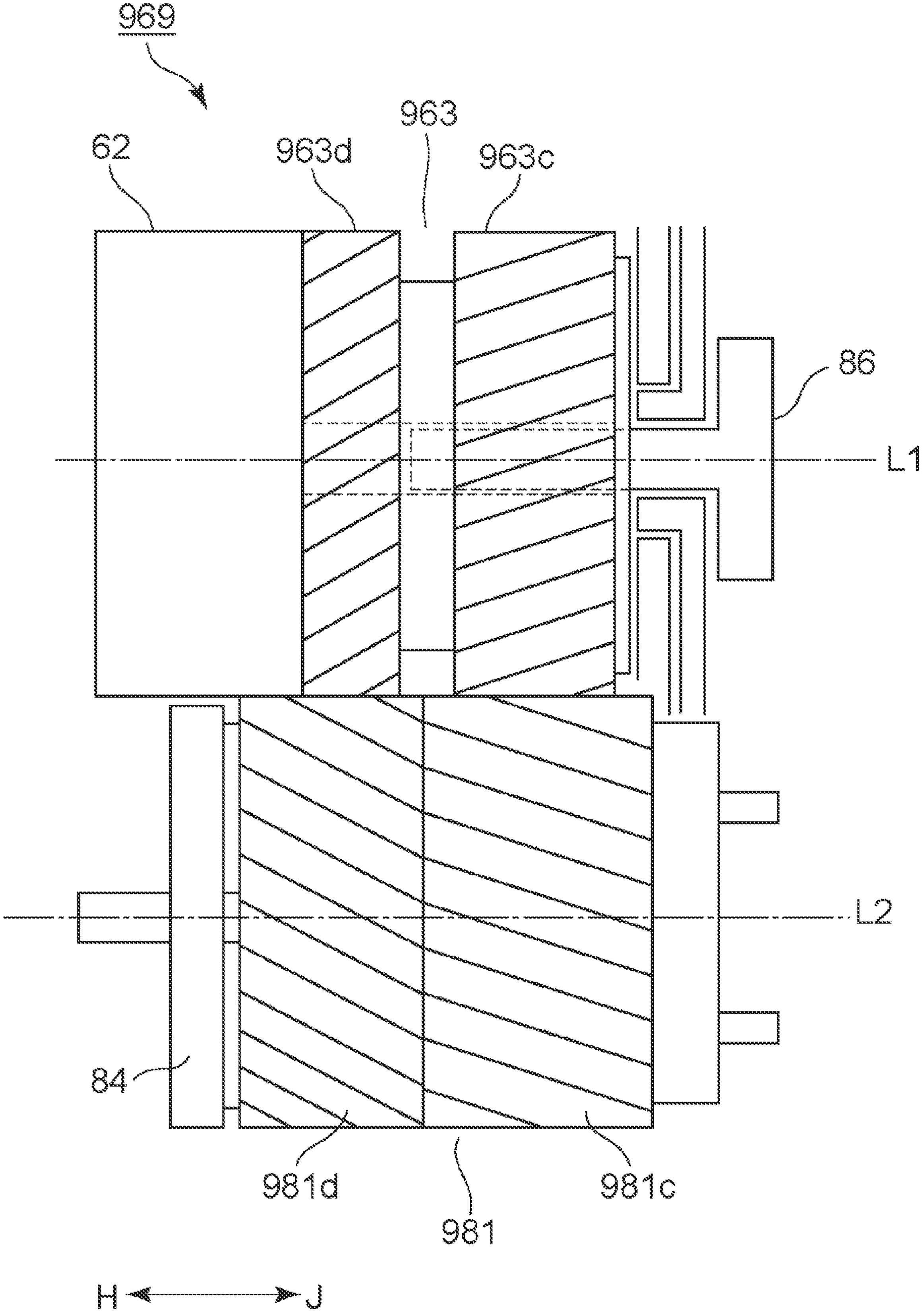
FIG. 38 is a schematic view illustrating meshing engagement between the drive transmission gear and the driving side flange.

FIG. 38 is a schematic view illustrating the meshing engagement between the drive transmission gear 981 and the driving side flange 963. The driving side flange 963 is provided with the first gear portion (first unit side gear portion) 963*c* and the second gear portion (second unit side gear portion) 963*d*. The helix angle of the second gear portion 963*d* is larger than that of the first gear portion 963*c*. The first gear portion 963*c* is arranged on the downstream side (driving side), in the J direction, of the second gear portion 963*d*. That is, the second gear portion 963*d* is disposed between the first gear portion 963*c* and the drum 62 in the direction of the rotational axis L1. Similarly, the drive transmission gear 981 is provided with a first gear portion 981*c* which meshes with the first gear portion 963*c* and a second gear portion 981*d* which meshes with the second gear portion 963*d*. The positions of them in the direction of the rotational axis L1 is opposite to that in Embodiment 1.

Also with such a structure, by the drive transmission gear 981 being driven, the drive transmission gear 981 moves to the balanced position. During the subsequent driving operation, the first gear portion 963*c* receives the driving force FD (see part (d) of FIG. 17) and the second gear portion 963*d* receives the restricting force FB (see part (d) of FIG. 17) as in Embodiment 1, so that the backlashless state is established.

Here, the end portion, on the driving side (downstream side in the J direction), of the drum unit 969 in which the driving side flange 963 and the drum 62 are integrated is rotatably supported by the shaft member 86 (see also FIG. 4). Further, the first gear portion 963*c* is disposed at a position closer to a root portion of the shaft member 86 than the second gear portion 963*d*. Further, in the driving side flange 963, the force applied to the tooth surface of the first gear portion 963*c* which receives the drive force FD is larger than that of the second gear portion 963*d* which receives the restricting force FB. Therefore, the driving force FD may act so as to cause the rotational axis L1 of the drum unit 969 to tilt, and therefore, the drum 62 may be tilted with respect to the ideal rotational axis L1. However, as in this embodiment, by disposing the first gear portion 963*c* which receives the driving force FD at a position closer to the root portion of the shaft member 86 than the second gear portion 963*d*, the tilting of the rotational axis L1 of the drum unit 969 nine six nine attributable to the reception of the driving force FD can be suppressed.

Embodiment 10

Next, referring to FIG. 39, Embodiment 10 will be described below. In this embodiment, the structures of the first gear portion and the second gear portion provided on the driving side flange are different from those in Embodiment 1. Specifically, the positions and widths of the first gear portion 63*c* and the second gear portion 63*d* of Embodiment 1 in the direction of the rotational axis L1 are the same, but in this embodiment, the positions and widths, in the direction of the rotational axis L1, of the teeth are not the same, as is different from embodiment 1. Since the other points are the same as those in Embodiment 1, the description thereof will be omitted.

Figure 39:
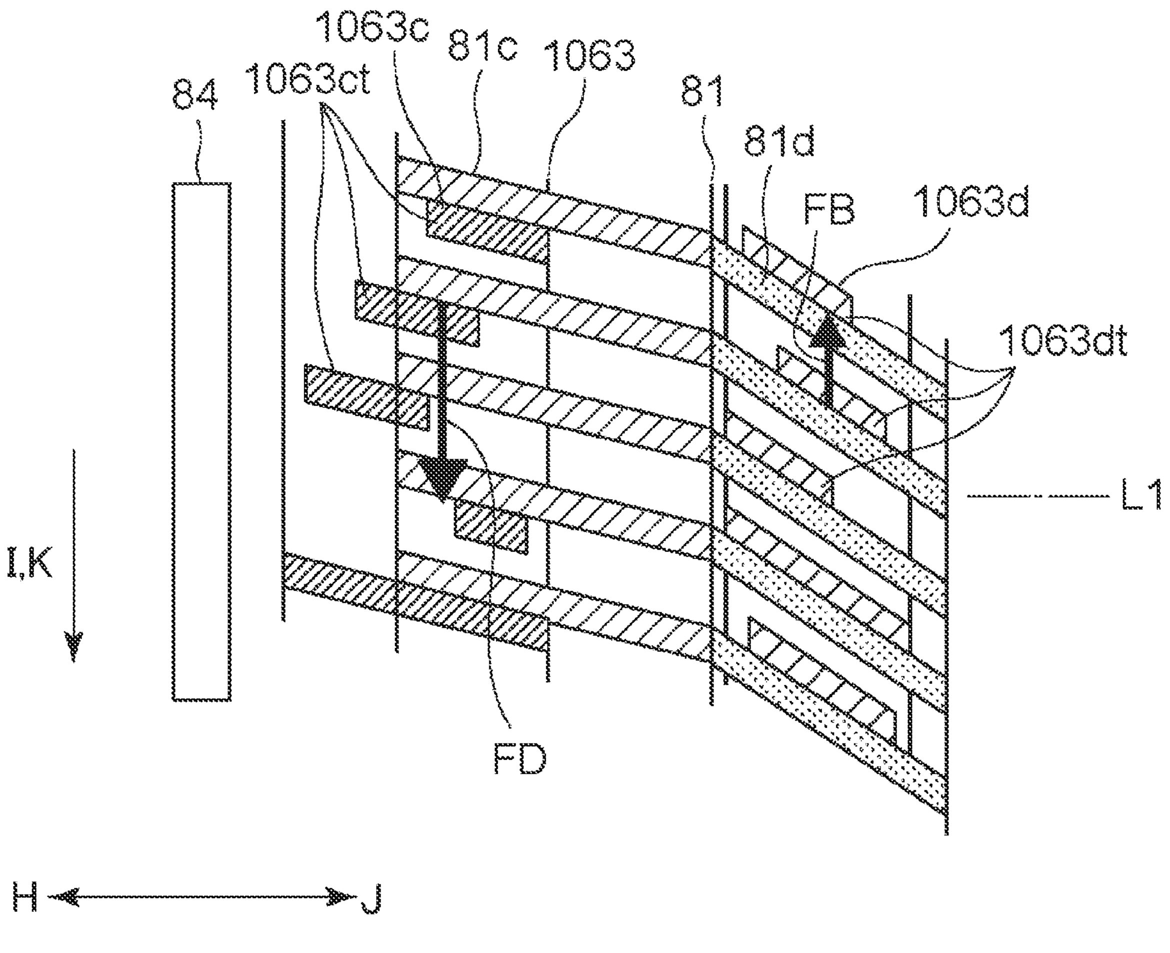
FIG. 39 is a sectional view of the drive transmission gear and the driving side flange.

FIG. 39 is a sectional view of the meshing engagement portion between the drive transmission gear 81 and the driving side flange 1063, and the sectional plane is in contact with the meshing pitch circles therebetween. The driving side flange 1063 is provided with a first gear portion (first unit side gear portion) 1063*c* and a second gear portion (second unit side gear portion) 1063*d*. The first gear portion 1063*c* includes a plurality of first helical teeth (first projections) 1063*ct* having different widths and positions in the direction of the rotational axis L1. The second gear portion 1063*d* includes a plurality of second helical teeth (second projections) 1063*dt* having different widths and positions in the direction of the rotational axis L1.

In the case of this structure, the meshing ratio is different from that in the case where the driving side flange 63 of Embodiment 1 is used, but the first gear portion 1063*c* and the second gear portion 1063*d* function as helical gears similarly to the first gear portion 63*c* and the second gear portion 63*d*, respectively. Therefore, as the drive transmission gear 81 rotating in the I direction, the drive transmission gear 81 moves to the balanced position so that the backlashless state is established as in Embodiment 1.

Embodiment 11

Next, referring to FIG. 40, Embodiment 11 will be described. In this embodiment, the structure of the second gear portion provided on the driving side flange is different from that in Embodiment 1. Specifically, the second gear portion 63*d* of Embodiment 1 is an helical tooth gear, but in this embodiment, it is a spur tooth gear, as is different from embodiment 1. Since the other points are the same as those in Embodiment 1, the description thereof will be omitted.

Figure 40:
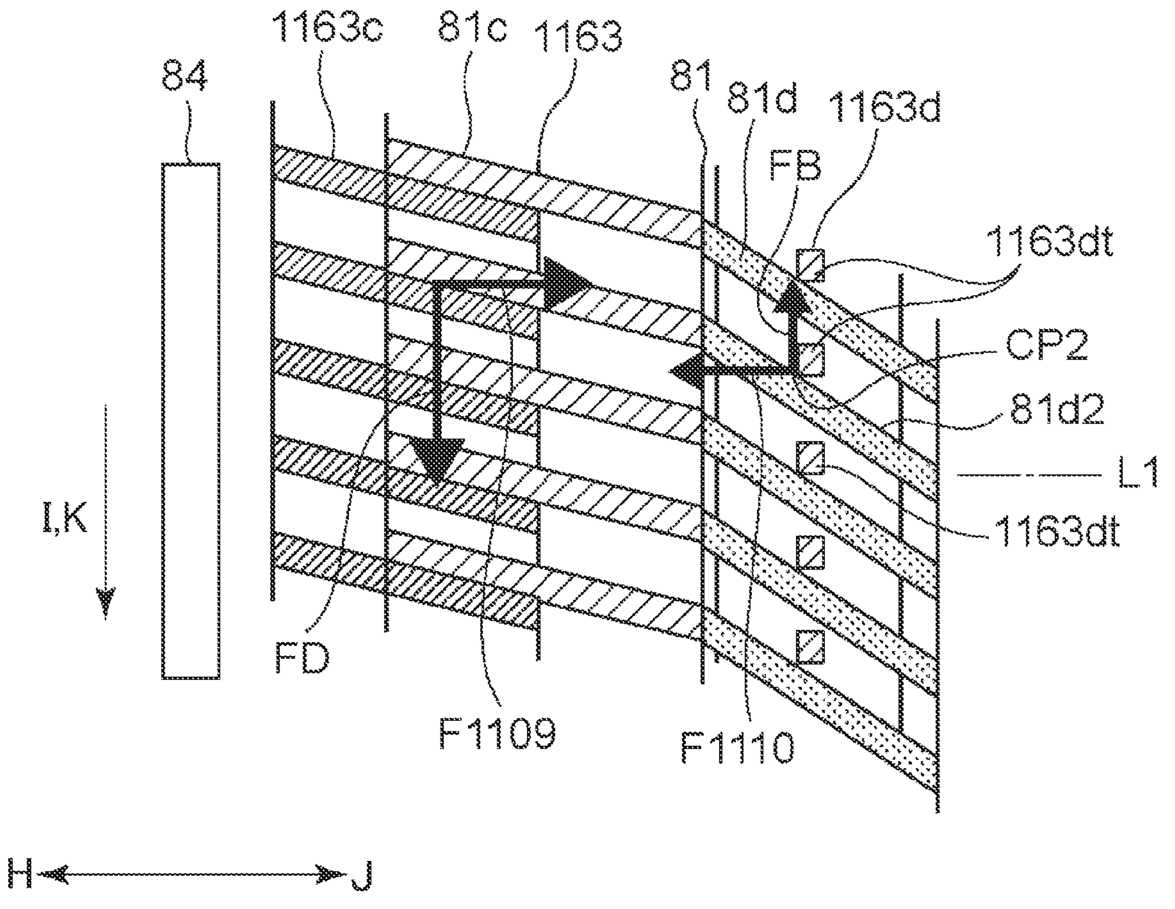
FIG. 40 is a sectional view of the drive transmission gear and the driving side flange.

FIG. 40 is a sectional view of the meshing engagement portion between the drive transmission gear 81 and the driving side flange 1163, and the sectional plane is in contact with the meshing pitch circles therebetween. The driving side flange 1163 is provided with a first gear portion (first unit side gear portion) 1163*c* and a second gear portion (second unit side gear portion) 1163*d*. The first gear portion 1163*c* is the same as the first gear portion 63*c* of Embodiment 1. The second gear portion 1163*d* includes a plurality of second flat teeth (teeth, second projections) 1163*dt*. The plurality of second flat teeth 1163*dt* are flat teeth having a tooth width and a tooth thickness which are sized so as to be insertable between the teeth (intertooth portion) of the second main assembly gear portion 81*d* of the drive transmission gear 81. Therefore, the width (tooth width) of the second flat tooth (second projection) 1163*dt* in the direction of the rotational axis L1 is smaller than the width (tooth width) of the first gear portion 1163*c* in the direction of the rotational axis L1. In other words, the second gear portion 1163*d* has a second flat tooth (second projection) 1163*dt* having a narrower width than the first helical tooth having a largest width (tooth width), in the direction of the rotational axis L1, of the first gear portion 1163*c*.

The rotational direction (I direction) or circumferential width (length) of the second projection 1163*dt* is smaller than the rotational direction (I direction) or circumferential width (length) of one tooth of the first gear portion 1163*c*. In other words, the second gear portion 1163*d* includes a second projection 1163*dt* which is narrower in the rotational direction (I direction) or the circumferential direction as compared with the first helical tooth having the largest rotational direction (I direction) or circumferential direction width (length) of the first gear portion 1163*c*.

Further, the second projection 1163*dt* has a contact portion CP2 which contacts the second main assembly gear portion 81*d*. As shown in FIG. 40, the contact portion CP2 is provided at the corner portion of the second projection 1163*dt*. The corner portion (contact point CP2) is provided so that the corner portion (contact point CP2) comes into contact with one tooth of the second main assembly gear portion 81*d* only at one point in the direction of the rotational axis L1. The radius of curvature of this corner portion can be set to a desired value, and the corner portion may have a sharper shape by making the radius of curvature smaller, or a less sharp corner may be formed by increasing the radius of curvature, as in the second projection 1363*dt* shown in Embodiment 13 which will be described hereinafter.

When the drive transmission gear 81 is driven, the drive transmission gear 81 receives a thrust force F1109 in the J direction and moves in the J direction in the same manner as in Embodiment 1. Then, the surface 81*d*2 on the upstream side in the I direction of the second main assembly gear portion 81*d* comes into contact with the contact portion CP2 of the second flat tooth 1163*dt* of the second gear portion 1163*d*, and receives the thrust force F1110 in the H direction. Therefore, the drive transmission gear 81 is positioned at the balanced position in the same principle as in Embodiment 1 to establish the backlashless state. Further, in the backlashless state, with respect to the driving in the rotational direction, the first gear portion 1163*c* receives the driving force FD and the second gear portion 1163*d* receives the restricting force FB at the contact portion CP2 of the second flat tooth 1163*dt*.

Embodiment 12

Next, referring to FIG. 41, Embodiment 12 will be described. In this embodiment, the structure of the second gear portion provided on the driving side flange is different from that in Embodiment 1. Specifically, the helix angle of the second gear portion 63*d* of Embodiment 1 is larger than the helix angle of the first gear portion 63*c*, but such is not the case in the helix angle of the second gear portion 1263*d* of this embodiment. Since the other points are the same as those in Embodiment 1, the description thereof will be omitted.

Figure 41:
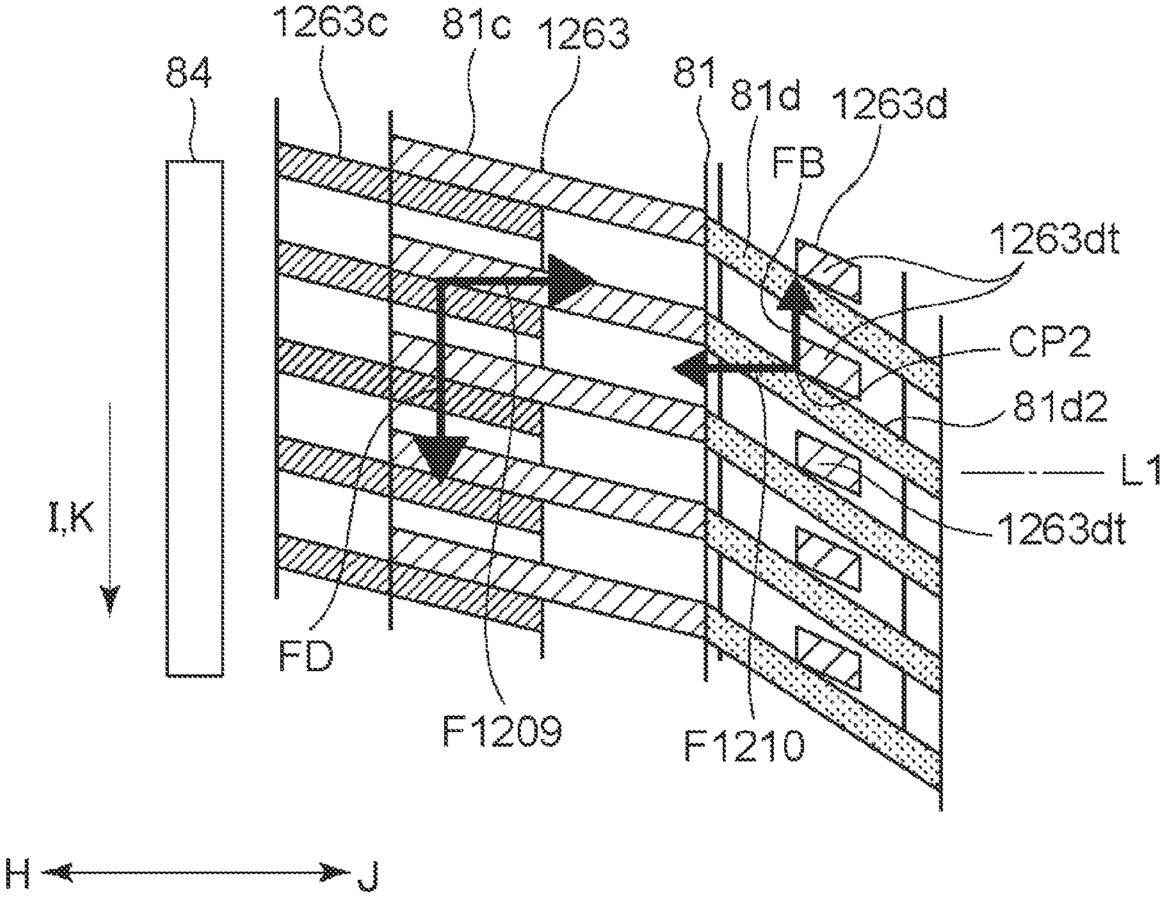
FIG. 41 is a sectional view of the drive transmission gear and the driving side flange.

FIG. 41 is a sectional view of the meshing engagement portion between the drive transmission gear 81 and the driving side flange 1263, and the sectional plane is in contact with the meshing pitch circles therebetween. The driving side flange 1263 is provided with a first gear portion (first unit side gear portion) 1263*c* and a second gear portion (second unit side gear portion) 1263*d*. The first gear portion 1263*c* is the same as the first gear portion 63*c* of Embodiment 1. The second gear portion 1263*d* includes a plurality of second helical teeth (teeth, second projections) 1263*dt*. The helix angle of the plurality of second helical teeth 1263*dt* is the same as the helix angle of the helical teeth of the first gear portion 1263*c*. Further, similarly to the plurality of second helical teeth 1163*dt* of Embodiment 11, the plurality of second helical teeth 1263*dt* have tooth widths and tooth thicknesses which are sized so as to be insertable between the teeth (intertooth portion) of the second main assembly gear portion 81*d* of the drive transmission gear 81. Therefore, the width (tooth width) of the second helical tooth (second projection) 1263*dt* measured in the direction of the rotational axis L1 is smaller than the width (tooth width) of the first gear portion 1263*c* measured in the direction of the rotational axis L1. In other words, the second gear portion 1263*d* includes a second helical tooth (second projection) 1263*dt* having a narrower width than that of the first helical tooth having a largest width (tooth width) in the direction of the rotational axis L1 of the first gear portion 1263*c*.

Further, the rotational direction (I direction) or the circumferential width (length) of the second projection 1263*dt* is smaller than the rotational direction (I direction) or the circumferential width (length) of one tooth of the first gear portion 1263*c*. In other words, the second gear portion 1263*d* includes a second projection 1263*dt* having a rotational direction (I direction) or circumference width narrower than that of the first helical tooth having a largest rotational direction (I direction) or circumferential direction width (length) of the first gear portion 1263*c*.

Further, the second projection 1263*dt* has a contact portion CP2 which contacts the second main assembly gear portion 81*d*. As shown in FIG. 40, the contact portion CP2 is provided at the corner portion of the second projection 1263*dt*. The corner portion (contact point CP2) is provided so that the corner portion (contact point CP2) contacts one tooth of the second main assembly gear portion 81*d* only at one point in the direction of the rotational axis L1. The radius of curvature of this corner portion can be set to a desired value, and the corner portion may have a sharper shape by making the radius of curvature smaller, or less sharp corner may be formed by increasing the radius of curvature, as in the second projection 1363*dt* shown in Embodiment 13 which will be described hereinafter.

By the drive transmission gear 81 being driven, the drive transmission gear 81 receives the thrust force F1209 in the J direction and moves in the J direction as in the first embodiment. Then, the surface 81*d*2, on the upstream side in the I direction, of the second main assembly gear portion 81*d* comes into contact with the contact portion CP2 of the second helical tooth 1163*dt* of the second gear portion

1263*d*, and receives the thrust force F1210 in the H direction. Therefore, the drive transmission gear 81 is positioned at the balanced position in the same principle as in Embodiment 1, so that the backlashless state is established. Further, in the backlashless state with respect to the driving in the rotational direction, the first gear portion 1263*c* receives the driving force FD and the second gear portion 1263*d* receives the restricting force FB at the contact portion CP2 of the second helical tooth 1263*dt.*

Embodiment 13

Next, referring to FIG. 42, Embodiment 13 will be described below. In this embodiment, the structure of the portion corresponding to the second gear portion provided on the driving side flange is different from that in Embodiment 1. Specifically, the second gear portion 63*d* of Embodiment 1 is an helical tooth gear, but in this embodiment, it is a plurality of cylindrical projections, as is different from embodiment 1. Since the other points are the same as those in Embodiment 1, the description thereof will be omitted.

Figure 42:
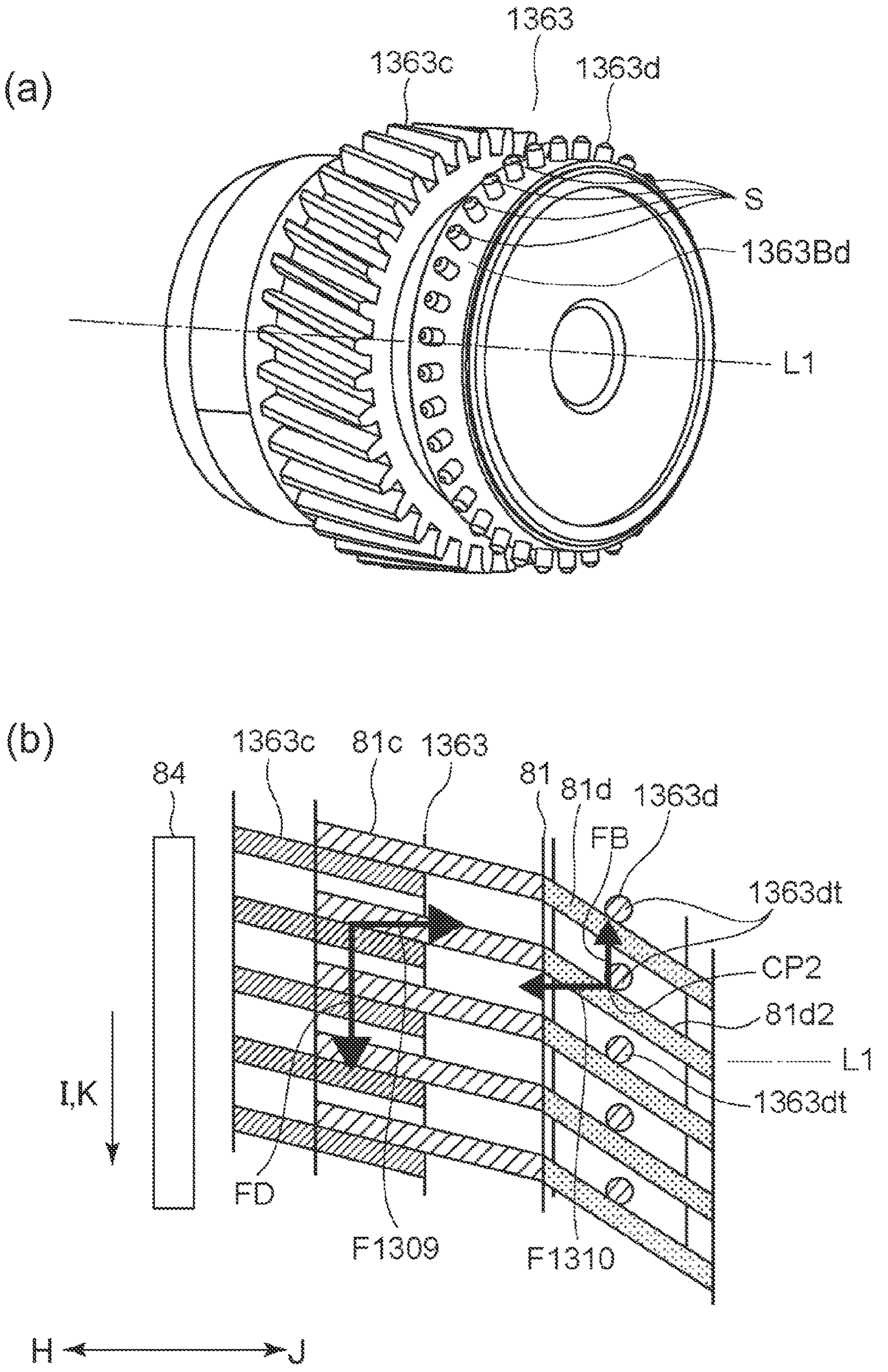
FIG. 42 is a perspective view of the driving side flange and a sectional view of the drive transmission gear and the driving side flange.

Part (a) of FIG. 42 is a perspective view of the driving side flange 1363. Part (b) of FIG. 42 is a sectional view of the meshing engagement portion between the drive transmission gear 81 and the driving side flange 1363, and the sectional plane is in contact with the meshing pitch circles therebetween.

The driving side flange 1363 is provided with a first gear portion (first unit side gear portion) 1363*c* and a second gear portion (second unit side gear portion) 1363*d*. The first gear portion 1363*c* is the same as the first gear portion 63*c* of Embodiment 1.

The second gear portion 1363*d* includes a plurality of cylindrical second projections (teeth) 1363*dt* projecting in the radial direction of the rotational axis L1 from the tooth bottom cylindrical portion (base cylinder portion) 1363Bd extending along the rotational axis L1. The second gear portion 1363*d* is a rotating portion which rotates integrally with the first gear portion 1363*c*. The plurality of second projections 1363*dt* are arranged at the same position (on the same plane perpendicular to the rotational axis L1) with respect to the direction of the rotational axis L1.

Further, the tips S of the plurality of second projections 1363*dt* are arranged on a predetermined circumference centered on the rotational axis L1 as viewed along the rotational axis L1, and are arranged at equal intervals in the circumferential direction. The addendum circle of the second gear portion 1363*d* is a circle as a rotation locus drawn by the free end S that is most remote from the rotational axis (rotational axis L1) of the second gear portion 1363*d* among the free ends S of the plurality of second projections 1363*dt* when the driving side flange 1363 rotates. In this embodiment, the shapes of all the second projections 1363*dt* are the same, and therefore, the distances of the free ends S of all the second projections 1363*dt* from the rotational axis L1 are the same, so that all the free ends S draw the same rotation locus. Further, the diameter/radius of the circle of this rotation locus is the addendum circle diameter/addendum circle radius of the second gear portion 1363*d.*

The plurality of second projections 1363*dt* are projections having a width in the direction of the rotational axis L1 and a width in the rotational direction (I direction) which are sized so as to be insertable between the teeth (intertooth portion) of the second main assembly gear portion 81*d* of the drive transmission gear 81. Therefore, the width of the second projection 1363*dt* measured in the direction of the rotational axis L1 is smaller than the width (tooth width) of the first gear portion 1363*c* measured in the direction of the rotational axis L1. In other words, the second gear portion 1363*d* has the second projection 1363*dt* having a width in the direction of the rotational axis L1 narrower than that of the first helical tooth having the largest width (tooth width), in the direction of the rotational axis L1, of the first gear portion 1363*c*. The rotational direction (I direction) or circumferential direction width (length) of the second projection 1363*dt* is larger than the rotational direction (I direction) or circumferential width (length) of one tooth of the first gear portion 1363*c*. In other words, the second gear portion 1363*d* includes a second projection 1363*dt* having a rotational direction (I direction) or circumferential width smaller than that of the first helical tooth having the largest rotational direction (I direction) or circumferential direction width (length) of the first gear portion 1363*c*.

Further, the second projection 1363*dt* has a contact portion CP2 which contacts the second main assembly gear portion 81*d*. As shown in part (b) of FIG. 42, the contact portion CP2 is on the curved portion of the surface of the second projection 1363*dt*. The curved portion of the surface of the second projection 1363*dt* can be said to be a corner portion. The corner portion (contact point CP2) is provided so that the corner portion (contact point CP2) contacts one tooth of the second main assembly gear portion 81*d* only at one point in the direction of the rotational axis L1. The radius of curvature of this corner can be set to a desired value, and the radius of curvature may be made smaller to form a corner with a sharper shape, or the radius of curvature may be made larger to form a less sharp corner.

When the drive transmission gear 81 is driven, the drive transmission gear 81 receives a thrust force in the J direction and moves in the J direction, as in Embodiment 1. Then, the surface 81*d*2 on the upstream side in the I direction of the second main assembly gear portion 81*d* comes into contact with the contact portion CP2 of the second projection 1363*dt* of the second gear portion 1163*d*, and receives the thrust force F1310 in the H direction. Therefore, the drive transmission gear 81 is positioned at the balanced position in the same principle as in Embodiment 1, and the backlashless state is established. Further, in the backlashless state, the first gear portion 1363*c* receives the driving force FD, and the second gear portion 1363*d* receives the restricting force FB at the contact portion CP2 of the second projection 1363*dt* with respect to the driving in the rotational direction.

Thus, the second gear portion 1363*d* can engage with other gears such as the second main assembly gear portion 81*d* by using the plurality of second projections 1363*dt* and can receive the rotational driving force and/or the thrust force, and therefore, in this respect, it can be regarded as a kind of gear.

Further, the plurality of second projections 1363*dt* are not limited to a cylindrical shape, and may have at least a shape which projects in the radial direction relative to the rotational axis L1 and may be a polygonal column shape, for example. Further, all the plurality of second projections 1363*dt* do not have to have the same shape.

Embodiment 14

Next, referring to FIG. 43, Embodiment 14 will be described. In this embodiment, the structure of the portion corresponding to the second gear portion provided on the driving side flange is different from that in Embodiment 1. Specifically, the second gear portion 63*d* of Embodiment 1 is an helical tooth gear, but in this embodiment, it is a plurality of cylindrical projections, as is different from embodiment 1. Since the other points are the same as those in Embodiment 1, the description thereof will be omitted. Further, in the comparison with Embodiment 13, this embodiment is different therefrom only in the arrangement of the plurality of cylindrical projections.

Figure 43:
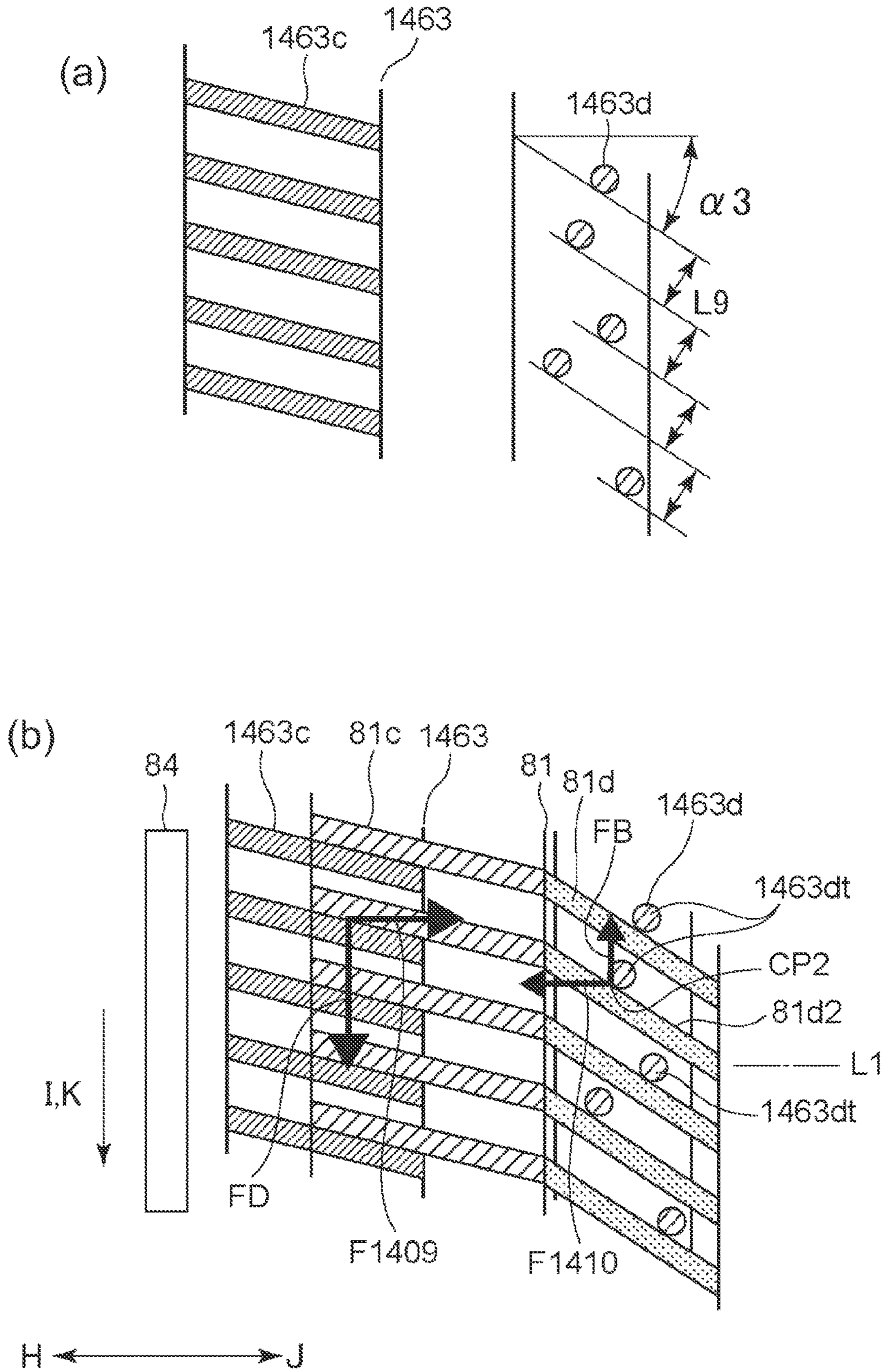
FIG. 43 is a sectional view of the driving side flange and a sectional view of the drive transmission gear and the driving side flange.

Part (a) of FIG. 43 is a sectional view of the teeth and projections of the driving side flange 1463, and the sectional plane thereof is in contact with a circle centered on the rotational axis L1. Part (b) of FIG. 43 is a sectional view of the meshing engagement portion between the drive transmission gear 81 and the driving side flange 1463, and the sectional plane thereof is in contact with the meshing pitch circles therebetween.

The driving side flange 1463 is provided with a first gear portion (first unit side gear portion) 1463*c* and a second gear portion (second unit side gear portion) 1463*d*. The first gear portion 1463*c* is the same as the first gear portion 63*c* of Embodiment 1.

The second gear 1463*d* includes a plurality of cylindrical second projections 1463*dt* projecting in the radial direction relative to the rotational axis L1. The second gear portion 1463*d* is a rotatable portion which is rotatable integrally with the first gear portion 1463*c*. The plurality of second projections 1463*dt* are arranged at positions shifted in the direction of the rotational axis L1.

Further, the free end S (see part (a) of FIG. 42) of the plurality of second projections 1463*dt* are arranged on a predetermined circumference centered on the rotational axis L1 as viewed along the rotational axis L1. The plurality of second projections 1463*dt* are projections having a width measured in the direction of the rotational axis L1 and a width measured in the rotational direction (I direction) which are sized such that it can be inserted between the teeth (intertooth portion) of the second main assembly gear portion 81*d* of the drive transmission gear 81. Further, the plurality of second projections 1463*dt* are inserted between the teeth (intertooth portion) of the second main assembly gear portion 81*d* of the drive transmission gear 81, and are placed at positions where they can receive the restricting force FB from the second main assembly gear portion 81*d* in the backlashless state. Specifically, as shown in part (a) of FIG. 43, a plurality of imaginary twisted lines (helical lines) L9 twisted at the same angle as the helix angle α2 of the second main assembly gear portion 81*d* are drawn on the cylindrical surface centered on the rotational axis L1 at a predetermined pitch P9. This pitch P9 is the same as the pitch of the drive transmission gear 81 in the direction perpendicular to the tooth surface of the plurality of second helical teeth 81*dt* of the second main assembly gear portion 81*d*. Then, the plurality of second projections 1463*dt* are arranged so as to satisfy the following conditions in relation to the plurality of twisted lines L9. The condition is that a plurality of twisted lines L9 can be arranged such that some of the plurality of twisted lines L9 are in contact with some of the plurality of second projections 1463*dt*, and none of the plurality of twisted lines L9 passes through the cross-section of the plurality of second projections 1463*dt*. This embodiment can perform the same function as the plurality of second projections 1363*dt* of Embodiment 13, that is, by arranging the plurality of second projections 1463*dt* so as to satisfy such the condition, the plurality of second projections 1463*dt* receive the restricting force FB from the second main assembly gear portion 81*d* in a backlashless state. In addition, similarly to Embodiment 13, the corner portion (contact point CP2) of the second projection 1463*dt* is provided such that at only one corner portion (contact point CP2) in the direction of the rotational axis L1, it can contact with one tooth of the second main assembly gear portion 81*d.*

When the drive transmission gear 81 is driven, as shown in part (b) of FIG. 43, the drive transmission gear 81 receives the thrust force F1409 and moves in the J direction as in embodiment 1. And, the surface 81*d*2, on the upstream side in the I direction, of the second main assembly gear portion 81*d* comes into contact with the contact portion CP of the second projection 1463*dt* of the second gear portion 1463*d*, and receives the thrust force F1410 in the H direction. Therefore, the drive transmission gear 81 is positioned at the balanced position in the same principle as in Embodiment 1 to establish the backlashless state. In addition, in the backlashless state, the first gear portion 1463*c* receives the driving force FD, and the second gear portion 1463*d* receives the restricting force FB at the contact portion CP2 of the second projection 1463*dt*, with respect to the driving in the rotational direction.

Since the second gear portion 1463*d* can engage with other gears such as the second main assembly gear portion 81*d* and can receive the rotational driving force and/or the thrust force by using the plurality of second projections 1463*dt*, it can be regarded as a kind of gear, in this respect.

Further, the shapes of the plurality of second projections 1463*dt* are not limited to a cylindrical shape, and may have a shape which projects at least in the radial direction relative to the rotational axis L1, and all the plurality of second projections 1463*dt* do not have to have the same shape.

Embodiment 15

Figure 45:
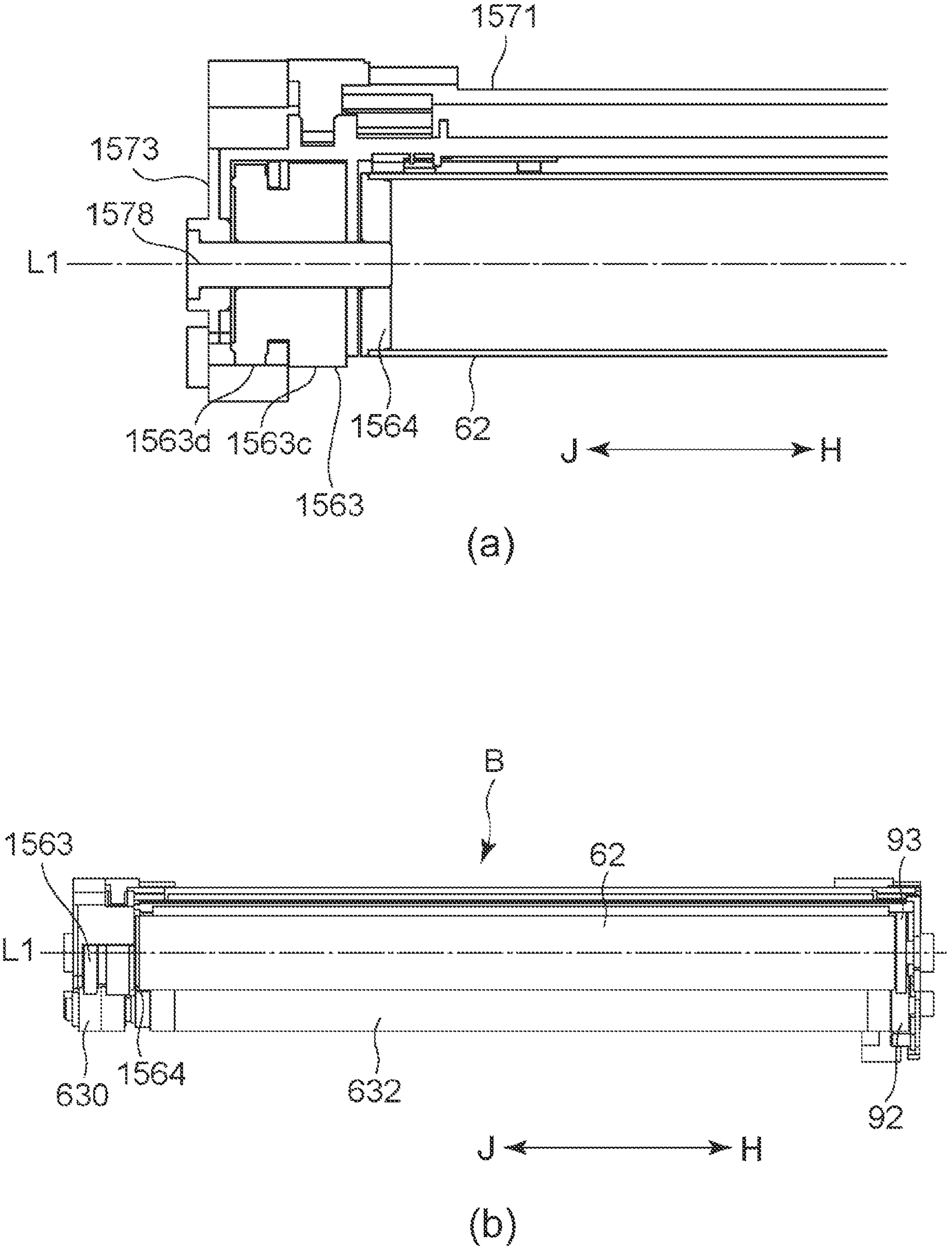
FIG. 45 is a partial sectional view of a neighborhood of the drum of the cartridge, and is an illustration showing the drum and the developing roller.

Next, referring to FIG. 45, Embodiment 15 will be described. The drive transmission structure in the cartridge B is different from that of Embodiment 1. Part (a) of FIG. 45 is a partial sectional view of the cartridge B in the neighborhood of the drum 62, taken along a line including the rotational axis L1. Part (b) of FIG. 45 is a view of the drum 62 and the developing roller 632 of the cartridge B as viewed in a direction perpendicular to the rotational axis L1.

The gear that meshes with the drive transmission gear 81 does not have to be integrally fixed to the end of the drum 62. As shown in part (a) of FIG. 45, the driven gear 1563 which meshes with the drive transmission gear 81 is rotatably supported at both end portions by a shaft 1578 fixed to one end of the cleaning frame 1571. That is, the shaft 1578 supports the driven gear 1563 in a state of penetrating the driven gear 1563. The driven gear 1563 is a first gear portion (first unit side gear portion) 1563*c* which is an helical tooth gear having a helix angle α1 and a second gear portion (second unit side gear portion) 1563*d* which is an helical tooth gear having a helix angle α2, similarly to the first gear portion 63*c* and the second gear portion 63*d* provided on the driving side flange 63 of Embodiment 1. In addition, a developing roller gear 632 is provided integrally with a developing gear 630 in meshing engagement with the second gear portion 1563*d* of the driven gear 1563 at one end of the developing roller 632, and a drum drive gear 92 is provided integrally with the developing roller 632 at the other end of the developing roller 632. Further, a drum gear 93 which meshes with the drum drive gear 92 is integrally mounted to one end of the drum 62 by clamping or the like, and is rotatably supported by the drum shaft. Furthermore, a drum flange 1564 is mounted to the other end of the drum by clamping or the like, and is rotatably supported by a shaft 1578. With such a structure, the driving force received by the driven gear 1563 from the drive transmission gear 81 is transmitted to the drum 62 in the order of the developing roller gear 630, the developing roller 632, the drum drive gear 92, and the drum gear 93.

Embodiment 16

Next, referring to FIG. 48, Embodiment 15 will be described. In this embodiment, the structures of the portions corresponding to the first gear portion and the second gear portion provided on the driving side flange, as is different from those in Embodiment 1. Specifically, the first gear portion 63*c* and the second gear portion 63*d* of Embodiment 1 are helical tooth gears, but in this embodiment, each gear portion is provided by a plurality of projections (projections form each tooth of the gears), as is different therefrom. Since the other points are the same as those in Embodiment 1, the description thereof will be omitted.

Figure 48:
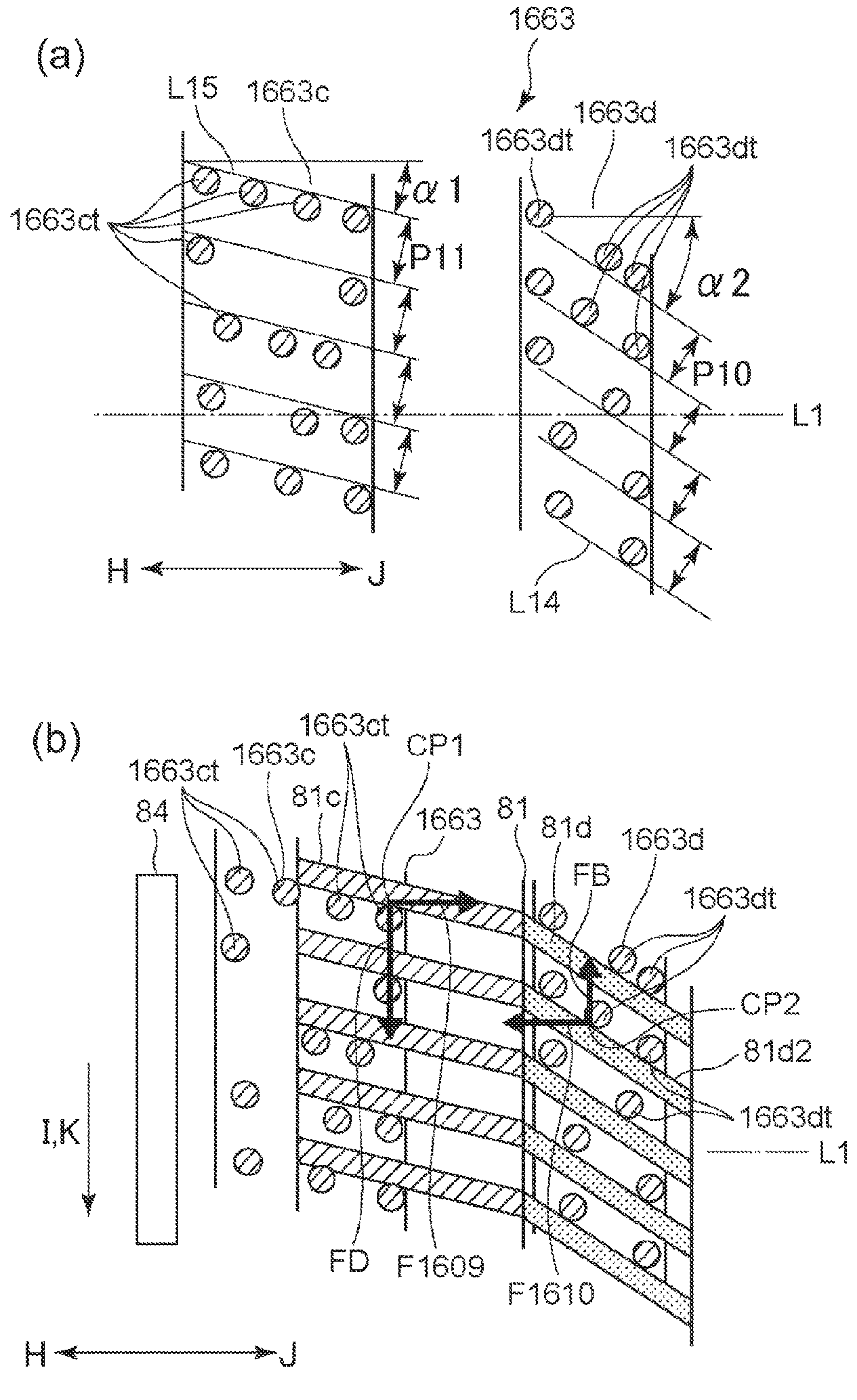
FIG. 48 is a sectional view of the driving side flange, and a sectional view of the drive transmission gear and the driving side flange.

Part (a) of FIG. 48 is a sectional view of the teeth and projections of the driving side flange 1663, and the sectional plane thereof is in contact with a circle centered on the rotational axis L1. Part (b) of FIG. 48 is a sectional view of the meshing engagement portion between the drive transmission gear 81 and the driving side flange 1663, and the sectional plane is in contact with the meshing pitch circles therebetween.

The first gear portion (first unit side gear portion, first unit side helical tooth gear portion) 1663*c* includes a plurality of cylindrical first projections 1663*ct* projecting in the radial direction with respect to the rotational axis L1 from the tooth bottom cylindrical portion (base cylinder portion) extending along the rotational axis L1. The plurality of first projections 1663*ct* are arranged at the same position and at different positions with respect to the direction of the rotational axis L1.

In addition, the free ends S (see part (a) of FIG. 42) of the plurality of first projections 1663*ct* are arranged on a predetermined circumference centered on the rotational axis L1 as viewed along the rotational axis L1. The plurality of first projections 1663*ct* are projections having a width in the direction of the rotational axis L1 and a width in the rotational direction (I direction) having which are sized such that it can be inserted between the teeth (intertooth portion) of the first main assembly gear portion 81*c* of the drive transmission gear 81. In addition, the plurality of first projections 1663*ct* are disposed at the positions so that they are inserted between the teeth (intertooth portion) of the first main assembly gear portion 81*c* of the drive transmission gear 81, and to receive the driving force FD from the first main assembly gear portion 81*c* in the backlashless state. Specifically, as shown in part (a) of FIG. 48, a plurality of imaginary twisted lines L15 twisted at the same angle as the helix angle α1 of the first main assembly gear portion 81*c* on the cylindrical surface centered on the rotational axis L1 (helical line) are drawn at the predetermined pitch P11. This pitch P11 is the same as the pitch in the direction perpendicular to the tooth surface of the plurality of first helical teeth 81*ct* of the first main assembly gear portion 81*c* of the drive transmission gear 81. Then, the plurality of first projections 1663*dt* are arranged so as to satisfy the following conditions in relation to the plurality of twisted lines L5. The condition is that the plurality of twisted lines L11 can be arranged so that some of the plurality of twisted lines L15 are in contact with some of the plurality of first projections 1663*ct*, and none of the plurality of twisted lines L11 pass through the cross-sections of the plurality of first projections 1663*ct*. By arranging the plurality of first projections 1663*ct* so as to satisfy such a condition, the plurality of first projections 1663*ct* mesh with the first main assembly gear portion 81*c* in the backlashless state and rotate to receive the driving force FB.

The second gear portion (second unit side gear portion, second unit side helical tooth gear portion) 1663*d* includes a plurality of cylindrical second projections 1663*dt* projecting in the radial direction relative to the rotational axis L1. The second gear portion 1663*d* is a rotatable portion which rotates integrally with the first gear portion 1663*c*. The plurality of second projections 1663*dt* are arranged at positions shifted with respect to the direction of the rotational axis L1.

Further, the free ends S (see part (a) of FIG. 42) of the plurality of second projections 1663*dt* are arranged on a predetermined circumference centered on the rotational axis L1 as viewed along the rotational axis L1. The plurality of second projections 1663*dt* are projections having a width in the direction of the rotational axis L1 and a width in the rotational direction (I direction) which are sized such that that they can be inserted between the teeth (intertooth portion) of the second main assembly gear portion 81*d* of the drive transmission gear 81. In addition, the plurality of second projections 1663*dt* are disposed at the positions such that they can be inserted between the teeth (intertooth portion) of the second main assembly gear portion 81*d* of the drive transmission gear 81, and can receive the restricting force FB from the second main assembly gear portion 81*d* in a backlashless state. Specifically, as shown in part (a) of FIG. 48, a plurality of imaginary twisted lines L14 twisted at the same angle as the helix angle α2 of the second main assembly gear portion 81*d* on the cylindrical surface centered on the rotational axis L1 (helical line) are drawn at a predetermined pitch P10. This pitch P10 is the same as the pitch in the direction perpendicular to the tooth surface of the plurality of second helical teeth 81*dt* of the second main assembly gear portion 81*d* of the drive transmission gear 81. And, the plurality of second projections 1663*dt* are arranged so as to satisfy the following conditions in relation to the plurality of twisted lines L14. The condition is that a plurality of the twisted lines L14 can be arranged such that some of the plurality of twisted lines L14 are in contact with some of the plurality of second projections 1663*dt*, and none of the plurality of twisted lines L14 pass through the cross-section of the plurality of second projections 1663*dt*. By arranging a plurality of second projections 1663*dt* so as to satisfy such a condition, the plurality of second projections 1663*dt* can perform the same function as the plurality of second projections 1363*dt* of Embodiment 13 can be performed, that is, the projections makes the meshing engagement with the second main assembly gear portion 81*d* to rotate in a backlashless state and receives the restricting force FB.

As shown in part (b) of FIG. 48, when the drive transmission gear 81 is driven, the drive transmission gear 81 moves in the J direction as in Embodiment 1. This is because the first main assembly gear portion 81*c* comes into contact with the plurality of first projections 1663*ct* and receives a thrust force in the J direction. In the drive transmission gear 81 which has moved in the J direction, the surface 81*d*2 on the upstream side in the I direction of the second main assembly gear portion 81*d* finally comes into contact with the contact portion CP2 of the second projection 1663*dt* of the second gear portion 1663*d*, and receives the thrust force F1610 in the H direction. In addition, the surface 81*c*1 on the downstream side in the I direction of the first main assembly gear portion 81*c* comes into contact with the contact portion CP1 of the first projection 1663*ct* of the first gear portion

1663*c* and receives the thrust force F1609 in the J direction. Therefore, the drive transmission gear 81 is positioned at the balanced position in the same principle as in Embodiment 1, and the backlashless state is established. Further, in the backlashless state, the first gear portion 1663*c* receives the driving force FD and the second gear portion 1663*d* receives the restricting force FB at the contact portion CP of the second projection 1463*dt* with respect to the driving in the rotational direction.

The first gear portion 1663*c* can engage with other gears such as the first main assembly gear portion 81*d* by using the plurality of first projections 1663*ct*, it can receive a rotational driving force and/or the thrust force, and therefore, in this respect, it can be regarded as a kind of gear (helical tooth gear). That is, it can be said that the surfaces of the plurality of first projections 1663*ct* (plural contact portions CP1) constitute a plurality of helical tooth surfaces provided by division in the direction of the rotational axis L1, or constitute the helical tooth surfaces provided by division into a plurality of parts in the circumferential direction and centered on the rotational axis L1 of the driving side flange 1663.

Therefore, by connecting the plurality of contact portions CP1, the twisted line L15 can be defined. The plurality of first projections 1663*ct* are arranged so as to be contactable with one tooth of the first main assembly gear portion 81*c* at a plurality of positions separated from each other in the direction of the rotational axis L1. It can be said that the plurality of contact portions CP1 capable of simultaneously contacting one tooth of the first main assembly gear portion 81*c* are provided at positions separated from each other with respect to the direction of the rotational axis L1. In this manner, it can be said that the plurality of first projections 1663*ct* separately arranged in the direction of the rotational axis L1 constitute one tooth (helical tooth) which meshes with one tooth of the first main assembly gear portion 81*c*. Therefore, the plurality of first projections 1663*ct* function as helical tooth gears, and the first gear portion 1663*c* is the first helical tooth gear portion.

In addition, a circle drawn as the rotation locus when the free end (point) most remote from the rotational axis L1 among the free ends of the plurality of first projections 1663*ct* is rotated is the addendum circle of the first gear portion 1663*c*, and the diameter of the circle is the addendum circle.

Similarly, the second gear portion 1663*d* can engage with other gears such as the second main assembly gear portion 81*d* by using the plurality of second projections 1663*dt*, and can receive a rotational driving force and/or a thrust force, and therefore, in this respect, it can be regarded as a kind of gear. That is, it can be said that the surfaces of the plurality of second projections 1663*dt* (plural contact portions CP2) constitute a plurality of helical tooth surfaces provided by division in the direction of the rotational axis L1, or constitute the helical tooth surfaces provided by division into a plurality of parts in the circumferential direction and centered on the rotational axis L1 of the driving side flange 1663.

Therefore, by connecting the plurality of contact portions CP2, the twisted line L14 can be defined. The plurality of second projections 1663*dt* are arranged so as to be contactable with one tooth of the second main assembly gear portion 81*d* at the plurality of positions separated from each other in the direction of the rotational axis L1. It can be said that the plurality of contact portions CP2 capable of simultaneously contacting one tooth of the second main assembly gear portion 81*d* are provided at positions separated from each other in the direction of the rotational axis L1. In this manner, it can be said that the plurality of second projections 1663*dt* separately arranged in the direction of the rotational axis L1 constitute one tooth (helical tooth) which meshes with one tooth of the second main assembly gear portion 81*d*. Therefore, the plurality of second projections 1663*dt* function as a helical tooth gear, and the second gear portion 1663*d* is a second helical tooth gear portion.

Further, a circle drawn as the rotation locus when the free end (point) most remote from the rotational axis L1 among the free ends of the plurality of second projections 1663*dt* is the addendum circle of the second gear portion 1663*d*, and the diameter of the circle is the addendum circle.

Further, each of the plurality of first projections 1663*ct* and the plurality of second projections 1663*dt* is not limited to a cylindrical shape, and may have a shape that projects at least in the radial direction relative to the rotational axis L1. Further, the plurality of first projections 1663*ct* do not have to be a plurality of completely separated projections, and may include a plurality of contact portions CP1. For example, the cross-sectional shape in the tangential direction perpendicular to the radial direction relative to the rotational axis L1 may have a shape like a staircase in which parts of the cross-sectional shape portions are connected. The same applies to the plurality of second projections 1663*dt*. Further, all the plurality of first projections 1663*ct* may not have the same shape, and all the plurality of second projections 1663*dt* may not have the same shape.

Embodiment 17

Embodiment 17 differs from Embodiment 1 in the following points. First, the layout of the structure in the apparatus main assembly A to which the cartridge B is mountable is different. As a result, the attitude of the cartridge B in the apparatus main assembly A is different. In addition, the support structure of a driving side flange 1763 and an engagement structure of a drive transmission gear 1781 and an idler gear 1780 are different. A drive transmission structure to a developing roller 1732 is the same as that of other Modified Example of Embodiment 1. Further, the positional relationship between the first gear portion which receives the driving force FD and the second gear portion which receives the restricting force FB in the axial direction is the same as those of Embodiment 9. Other points are the same as in Embodiment 1, and detailed description thereof will be omitted. Further, among the elements in this embodiment, the element corresponding to the element of Embodiment 1 (example: drum 62) (example: drum 1762) is associated with the corresponding element of Embodiment 1 (for example, reference numeral "1762" corresponds to "62"). Regarding these elements, the matters not specifically explained are the same as the corresponding elements of Embodiment 1.

<Configuration of Main Assembly of Apparatus>

Figure 50:
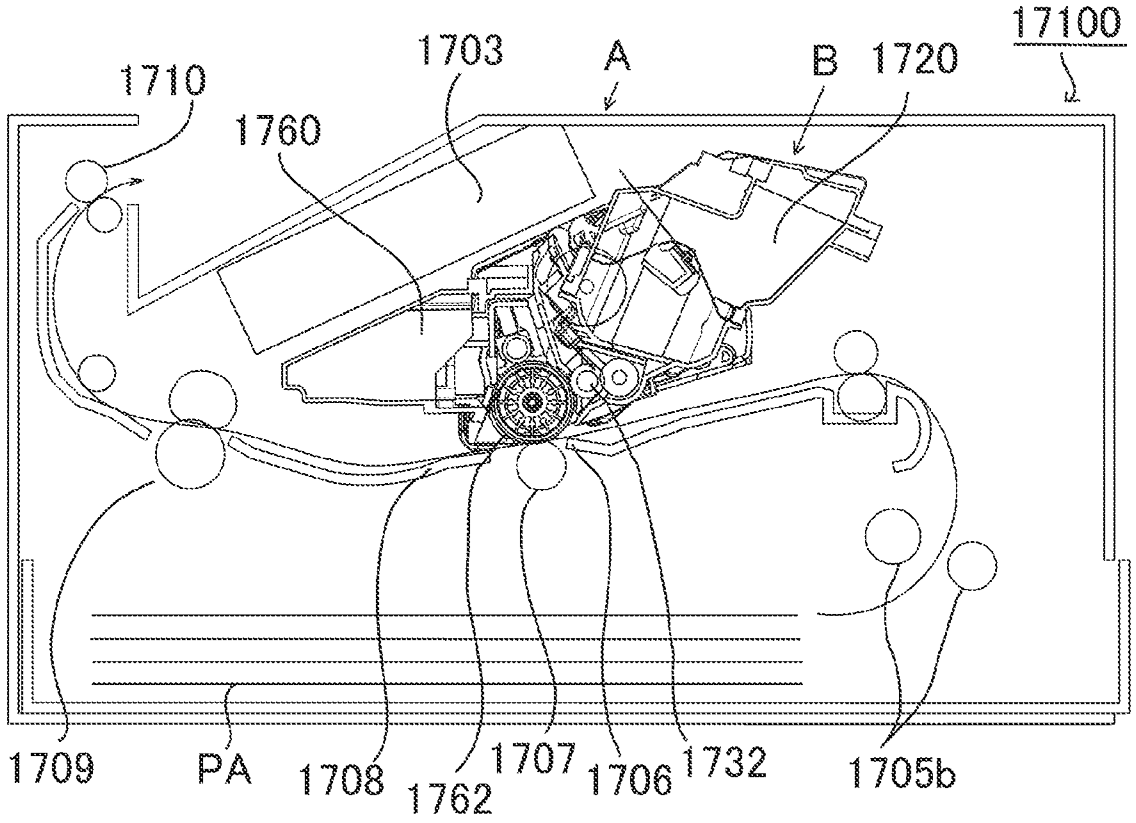
FIG. 50 is a schematic sectional view of an apparatus main assembly and a cartridge.

FIG. 50 is a cross-sectional view of the apparatus main assembly A to which the cartridge B is mounted (the cross-sectional plane is perpendicular to the rotational axis L1). The apparatus main assembly A of the image forming apparatus 17100 comprises an exposure device (laser scanner unit) 1703 and a sheet tray 1704 for accommodating the sheet material PA. Further, the apparatus main assembly A comprises a pickup roller (not shown), a feeding roller pair 1705*b*, a transfer guide 1706, a transfer roller 1707, a feeding guide 1708, a fixing device 1709, a discharge roller pair 1710, and a discharge tray 1711, provided along a transfer path of the sheet material PA.

<Attitude of Cartridge B in Apparatus Main Assembly A>

As shown in FIG. 50, the cartridge B is positioned in the apparatus main assembly A with the cleaning unit 1760 and the developing unit 1720 placed substantially horizontally. At this time, the transfer roller 1707 is below the drum 1762.

<Support Structure for Drum Unit 1769 by Cleaning Unit 1760>

Figure 58:
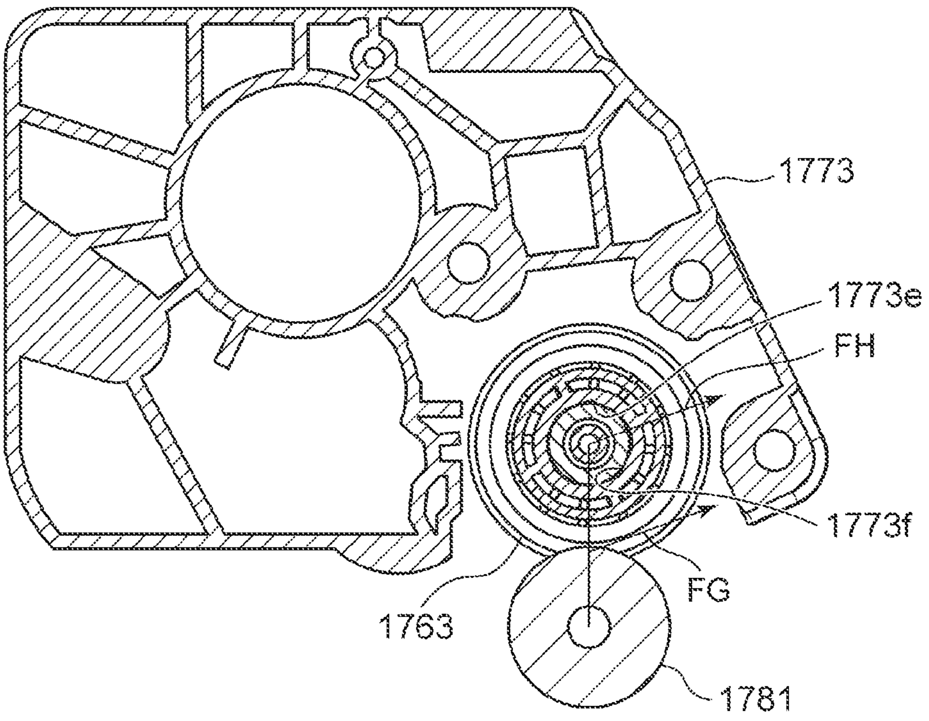
FIG. 58 is a cross-sectional view of the cleaning unit and the drive transmission gear.
Figure 59:
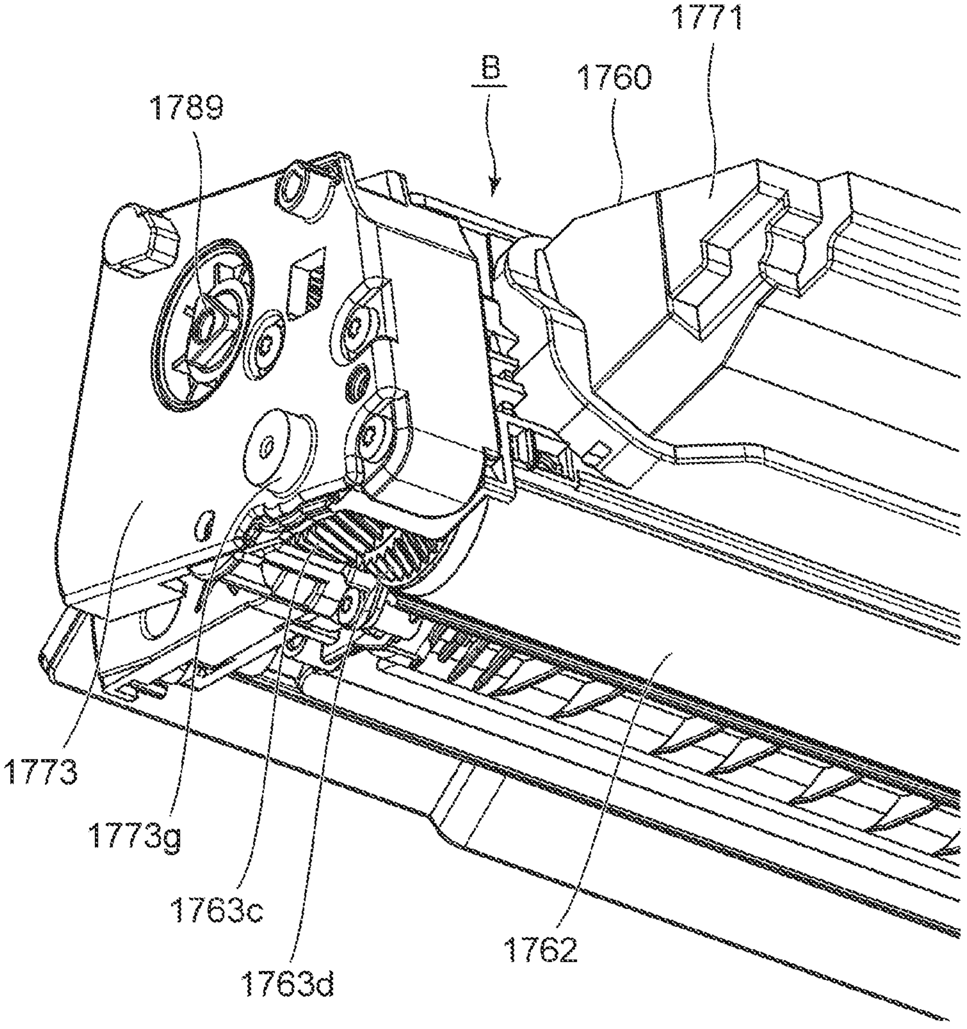
FIG. 59 is a partial perspective view of the cartridge.

Next, referring to part (a) of FIG. 51, part (b) of FIG. 51, part (a) of FIG. 52, part (b) of FIG. 52, part (c) of FIG. 52, FIG. 58, and FIG. 59, the support structure of the drum unit 1769 by the cleaning unit 1760 will be described.

Figure 51:
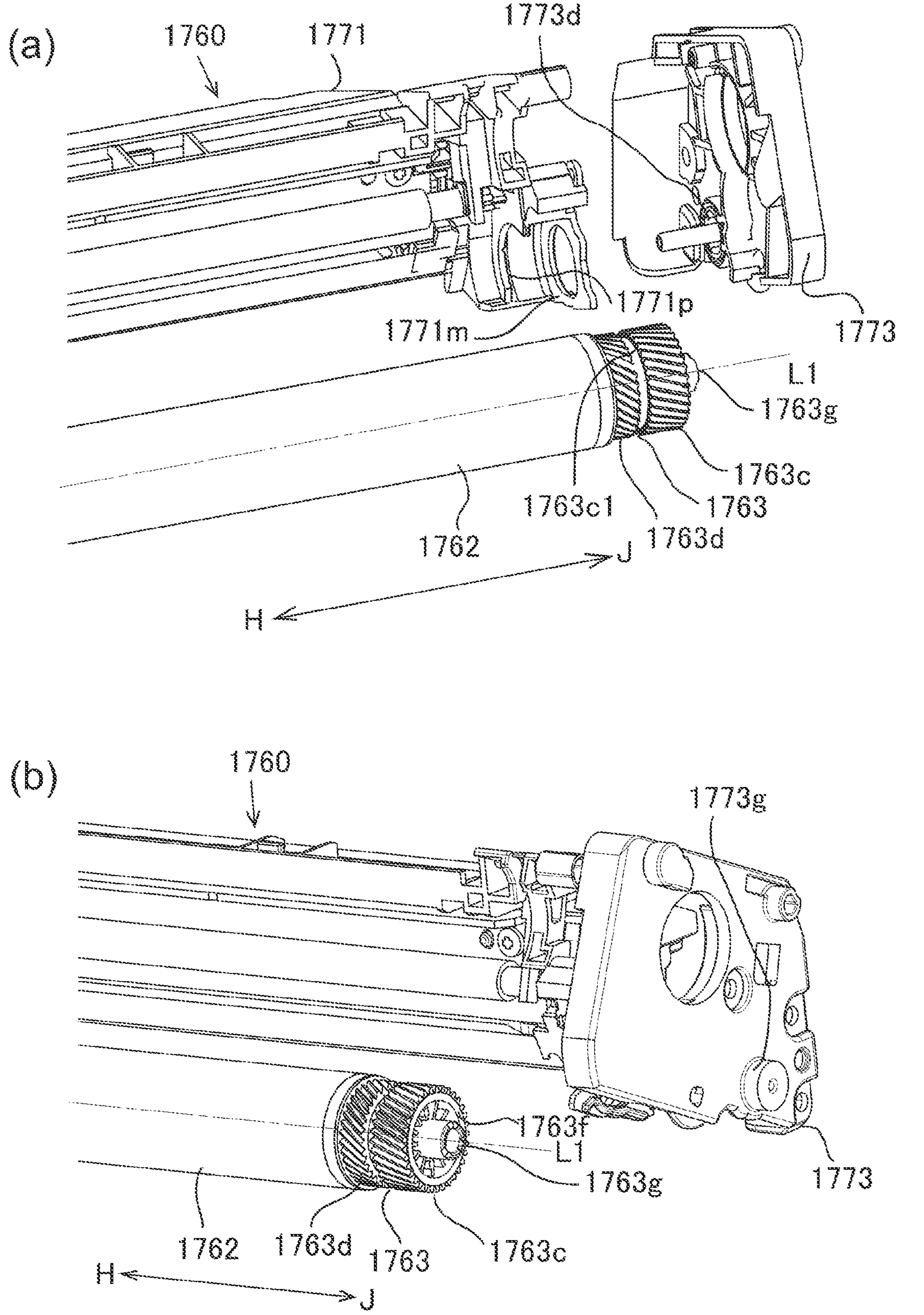
FIG. 51 is exploded perspective views of a cleaning unit.

Part (a) of FIG. 51 is an exploded perspective view of the cleaning unit 1760, and shows a state in which the cleaning unit 1760 is viewed from the developing unit side so that the inside of the drum bearing member 1773 can be seen. Part (b) of FIG. 51 is an exploded perspective view of the cleaning unit 1760, and shows a state in which the cleaning unit 1760 is viewed from the developing unit side so that the outside of the drum bearing member 1773 can be seen. Part (a) of FIG. 52 is a perspective view of the drum bearing member 1773 as viewed from the inside. Part (b) of FIG. 52 is a cross-sectional view of a guided portion **1773*g* of the drum bearing member 1773 which supports the driving side flange 1763 taken along a cross-sectional plane perpendicular to the rotational axis L1. Here, this cross-sectional view shows a state in which the cross-section is viewed from the inside of the drum bearing member 1773. Part (c) of FIG. 52 is a sectional view of, the portion adjacent to the driving side flange 1763 of the cartridge B mounted on the apparatus main assembly A, taken along a plane including rotational axis L1 and perpendicular to the mounting direction M (see FIG. 57) of the cartridge B to the apparatus main assembly A. FIG. 58 is a cross-sectional view of the cleaning unit 1760 and the drive transmission gear 1781 as viewed from the outside of the drum bearing member 1773, and the cross-sectional plane thereof passes through a hole 1773*d* of the drum bearing member 1773 which supports the driving side flange 1763 and perpendicular to the rotational axis L1. FIG. 59 is a partial perspective view of the neighborhood of the driving side flange 1763** of the cartridge B.

As shown in part (a) of FIG. 51 and part (b) of FIG. 51, the cleaning unit 1760 includes a frame member 1771 and a drum bearing member 1773 fixed to the frame member 1771, which constitute a drum frame which supports the drum 1762. The driving side flange 1763 is provided with a cylindrical projection (supported portion) **1763*g* centered on the rotational axis L1 and projecting outward (downstream in the J direction) from the end surface of the first gear portion 1763*c* in the rotational axis L1 so as to project from the end of the driving side flange 1763 toward the downstream side in the J direction. The drum bearing member 1773 is provided with a hole 1773*d* recessed in the direction of the rotational axis L1 (J direction) for supporting the projection 1763*g*. As shown in part (a) of FIG. 52 and part (b) of FIG. 52, the inner peripheral surface of the hole 1773*d* has surfaces 1773*e* and 1773*f* and two circumferential surfaces 1773*h* and 1773*i*, each of which is parallel to the rotational axis L1. In addition, the two surfaces 1773*e* and 1773*f* are not parallel to each other and are arranged so as to provide a substantially V-shaped recess shape as viewed in the rotational axis L1 direction. The surface 1773*e* and the surface 1773*f* are support surfaces (support portions) having supporting points which contact and support the projections 1763*g*. As shown in FIG. 58, the substantially V-shaped recess shape provided by the two surfaces 1773*e* and 1773*f* is oriented against a force FH parallel to a force FG starting at the rotational axis L1 so as to receive the meshing engagement force FG between the tooth surfaces of the gears when the driving force is transmitted from the driving transmission gear 1781 to the driving side flange 1763. Specifically, a bisector of an angle formed by the extension line of the surface 1773*e* and the extension line of the surface 1773*f* as viewed along the rotational axis L1 and the force FH is substantially parallel with the force FH. The orientations of the two surfaces 1773*e* and 1773*f* are not limited to this example, and may be selected, taking into account various forces which apply loads to the driving side flange 1763**.

After the drum unit 1769 is incorporated inside the frame member 1771, the drum bearing member 1773 is mounted to the frame member 1771 and fixed, so that the projection **1763*g* of the driving side flange 1763 fits the hole 1773*d* of the drum bearing member 1773. By this, the drum unit 1769 is rotatably supported by the frame member 1771 and the drum bearing member 1773. In addition, as shown in FIG. 59 and part (b) of FIG. 114, in the completed state as the cartridge B, parts of the driving side flange 1763 (a part of the first gear portion 1363*c* and the second gear portion 1363*d*) and the drum 1762 are not covered by the drum frame (drum bearing member 1773 and frame member 1771) but is exposed to an outside of the cartridge B. That is, it can be said that the drum frame has an opening to expose a part of the driving side flange 1763 (a part of the first gear portion 1363*c*, a part of the second gear portion 1363*d*, and so on) and a part of the drum 1762** toward the outside.

Figure 52:
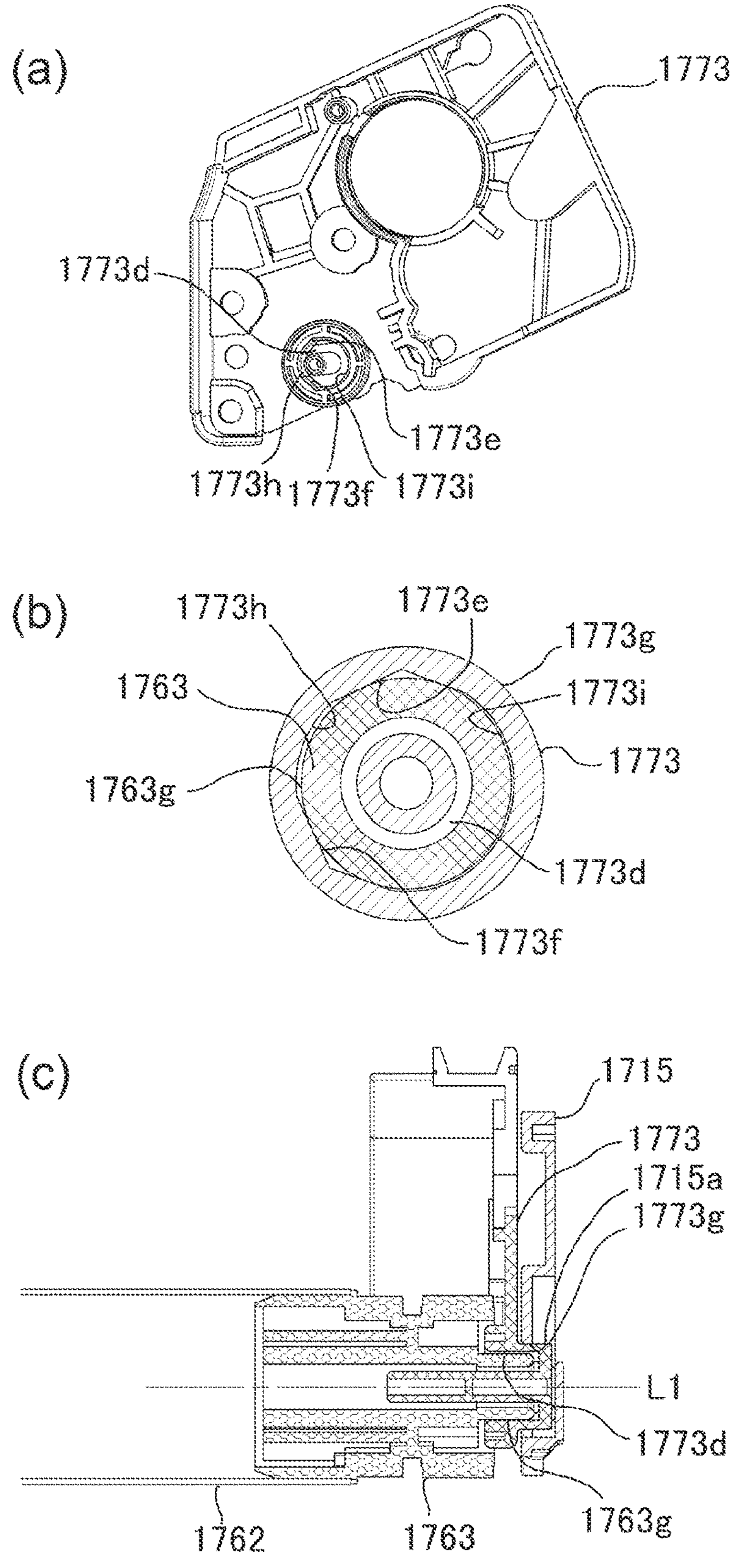
FIG. 52 is a perspective view of the drum bearing member, a cross-sectional view of the driving side flange and the drum bearing member, and a partial cross-sectional view of the cartridge.
Figure 57:
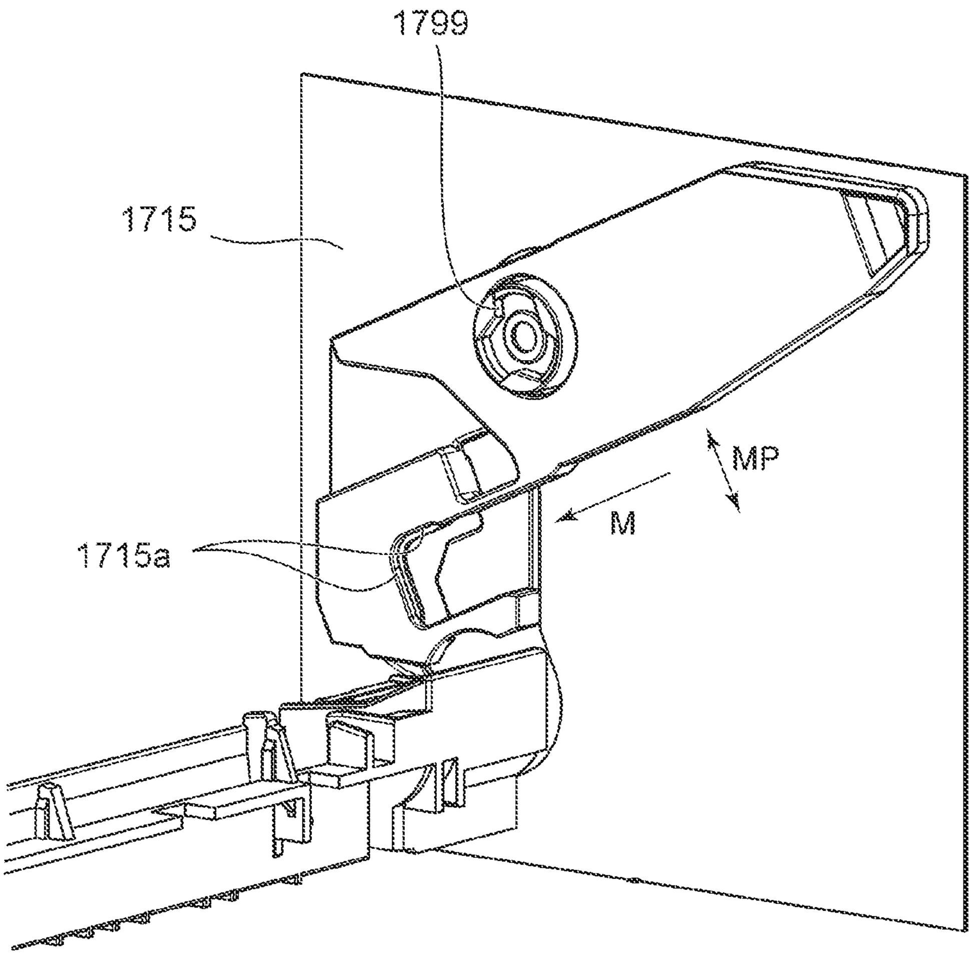
FIG. 57 is a partial perspective view of the main assembly of the apparatus.

As shown in part (c) of FIG. 52, when the cartridge B is mounted in the apparatus main assembly A, the arc surface of the guided portion **1773*g* contacts two positioning portions 1715*a* of a first driving side plate 1715 of the apparatus main assembly A, and the position of the rotational axis L1 of the cartridge B with respect to the apparatus main assembly A is determined in two directions perpendicular to the rotational axis (the mounting direction M and the orthogonal direction MP perpendicular to the mounting direction M) (see FIG. 57). The guided portion 1773*g* is a projecting portion having a shape projecting outward (J direction) in the direction of the rotational axis L1, and the above-mentioned hole 1773*d* is provided inside the projecting portion. The apparatus main assembly A is provided with a pressing member (not shown) which presses the cartridge B so as to press the guided portion 1773*g* toward the two positioning portions 1715*a*. In addition, the meshing force FG on the tooth surface of the gears at the time of transmitting the driving force from the driving transmission gear 1781 to the driving side flange 1763 also acts to press the guided portion 1773*g* toward the two positioning portions 1715*a*. Further, the force of the transfer roller 1707 (see FIG. 50) to press the drum 1762 also acts to press the guided portion 1773*g* toward the positioning portions 1715*a*** in the orthogonal direction MP.

At least a part of the guided portion **1773*g*, at least a part of the two flat surface portions 1773*f* and 1773*e*, and at least a part of the projection 1763*g* are placed at the same position in the direction of the rotational axis L1. In other words, at least a part of the guided portion 1773*g*, at least a part of the two flat portions 1773*f* and 1773*e*, and at least a part of the projection 1763*g* are arranged on one surface perpendicular to the rotational axis L1. By such an arrangement relationship, it is possible to suppress such deformation that the drum bearing member 1773 is inclined with respect to the rotational axis L1, and it is possible to suppress inclination (tilt) of the driving side flange 1763 with respect to the rotational axis L1. As a result, deterioration of the meshing engagement accuracy between the driving side flange 1763 and the drive transmission gear 1781 can be suppressed. Further, by abutting the projections 1763***g* against the two flat surface portions 1773*f* and 1773*e*, the play of the fitting is gathered in one direction (the direction along the bisector of the angle formed between the extension line of the flat surfaces 1773*e* and 1773*f* as viewed along the rotational axis L1), by which the positional accuracy of the driving side flange 1763 in the direction perpendicular to the rotational axis L1 is improved, and the deterioration of the meshing engagement accuracy with the drive transmission gear 1781 can be suppressed.

In this embodiment, the projection 1763*g* is integrally formed with the driving side flange 1763, but the projection 1763*g* may be formed of another part of metal or the like and press-fitted into the driving side flange 1763.

Next, positioning of the driving side flange 1763 in the axial direction will be described. As shown in part (a) of FIG. 51 and part (b) of FIG. 51, the first gear portion 1763*c* of the driving side flange 1763 is provided with a projecting portion 1763*c*1 slightly projecting in the H direction on the end surface on the downstream side in the H direction, and is provided with a projection 1763*f* slightly projecting in the J direction is provided on the end surface on the downstream side (upstream side in the H direction) in the J direction. Further, the frame member 1771 includes a rib 1771*p* and a side wall 1771*m* provided so as to extend in a direction perpendicular to the rotational axis L1. The projecting portion 1763*c*1 is in contact with the side surface of the rib 1771*p*, and the projection 1763*f* is in contact with the side surface of the side wall 1771*m*. The driving side flange 1763 is slidably fitted and held between the rib 1771*p* and the side wall 1771*m* in the direction of the rotational axis L1. By this, the driving side flange 1763 is positioned on the frame member 1771 in the direction of the rotational axis L1, and as a result, the position of the drum unit 1769 in the frame member 1771 is determined.

<Mounting and Dismounting of Cartridge B Relative to Apparatus Main Assembly a, and Positioning within Apparatus Main Assembly A>

Figure 113:
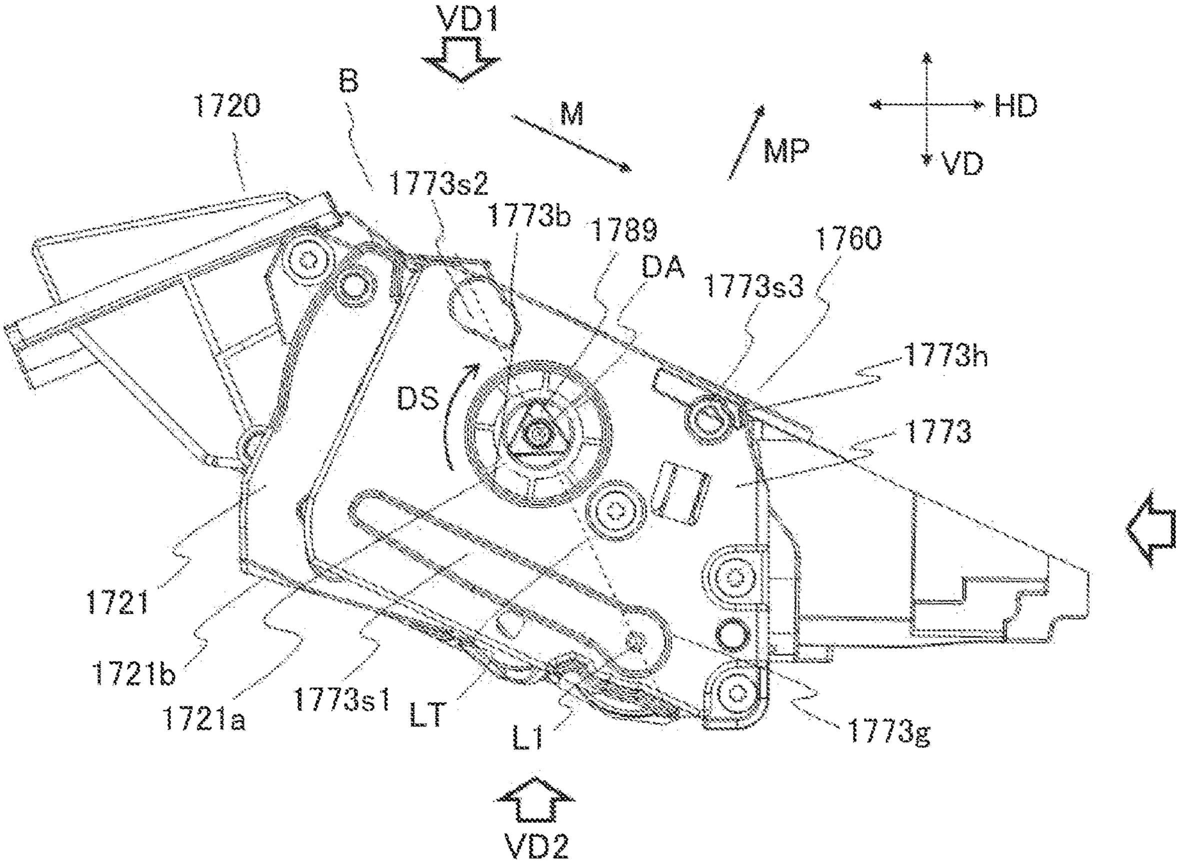
FIG. 113 is illustrations of a cartridge.
Figure 113:
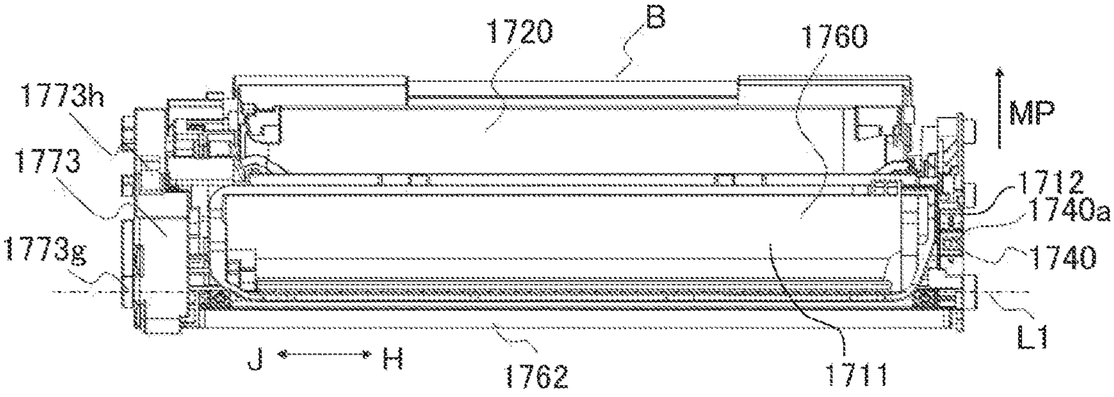
Figure 114:
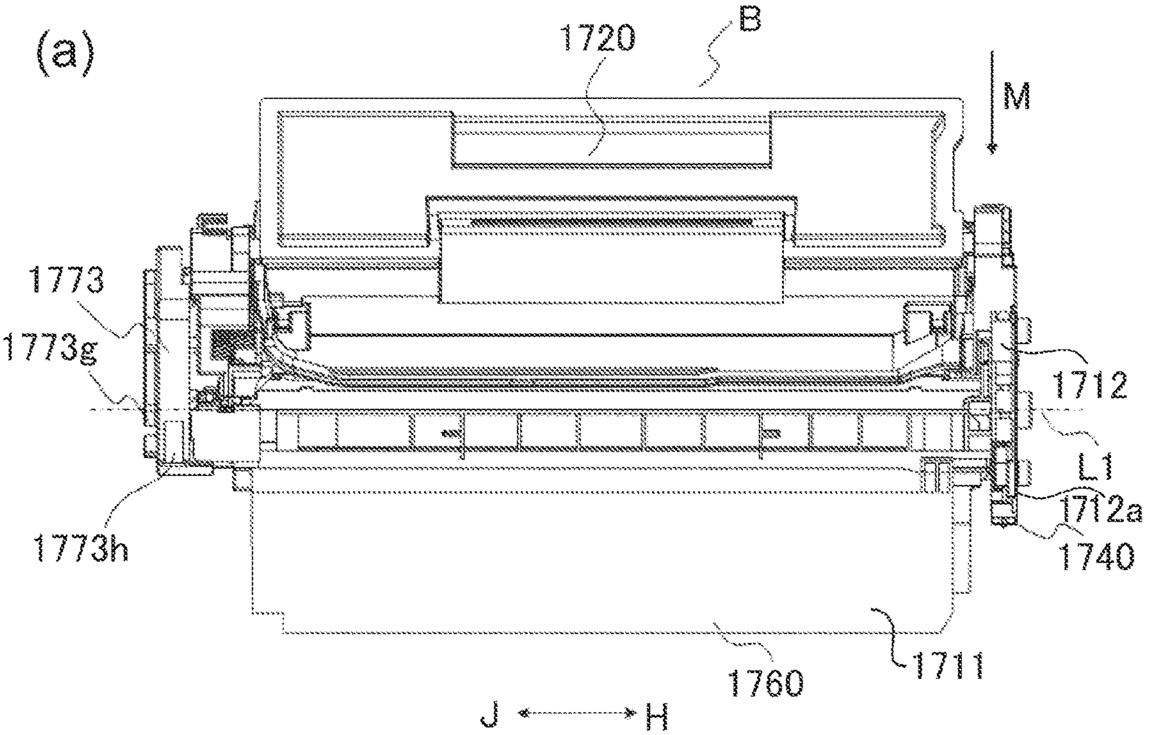
FIG. 114 is illustrations of a cartridge.
Figure 114:
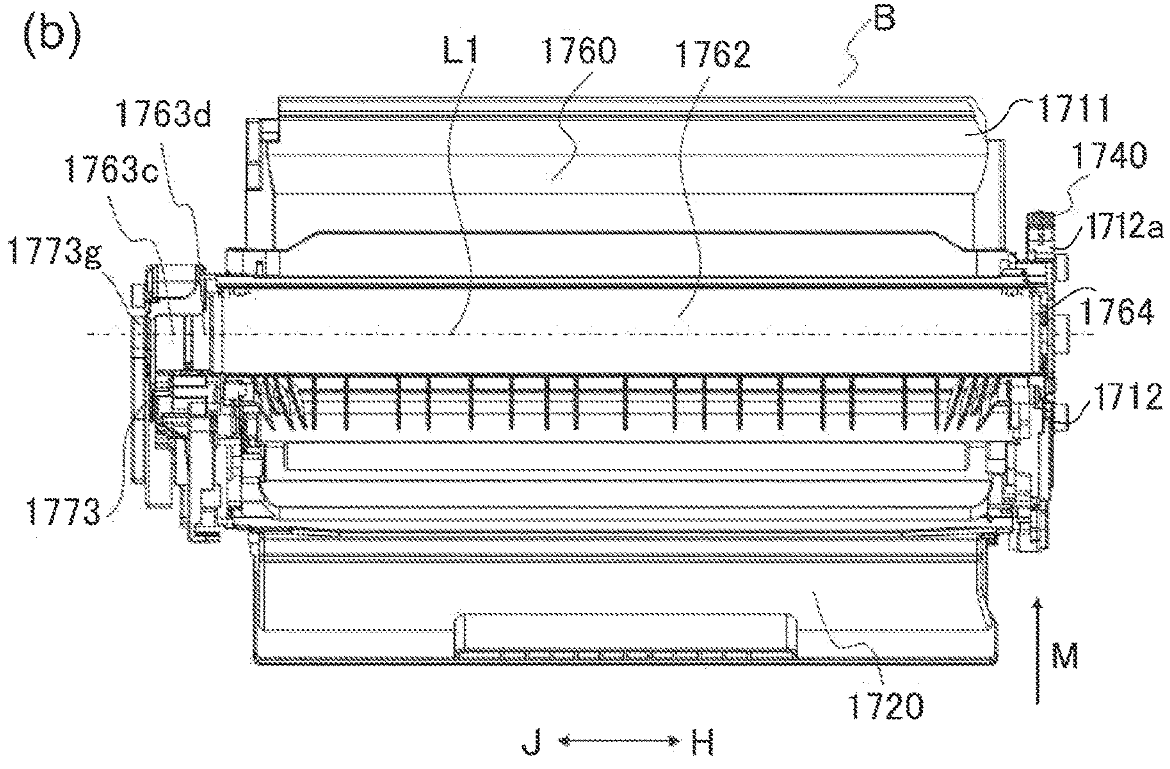

Part (a) of FIG. 113 is a view of the cartridge B mounted in the apparatus main assembly A installed on the horizontal installation surface, as viewed in the direction (K direction) along the rotational axis L1, and the horizontal direction is HD and the vertical direction is VD. A plane perpendicular to the rotational axis L1 is parallel to the vertical direction VD. Part (b) of FIG. 113 is a view of the cartridge B as viewed along the HD1 direction parallel to the horizontal HD shown in part (a) of FIG. 113. Part (a) of FIG. 114 is a view of the cartridge B as viewed along the VD1 direction parallel to the vertical VD shown in part (a) of FIG. 113. Part (b) of FIG. 114 is a view of the cartridge B as viewed along the VD2 direction parallel to the vertical VD shown in part (a) of FIG. 113. As will be understood from FIG. 50 as viewed along the direction of the rotational axis L1, a straight line connecting the rotation center of the developing roller 1732 and the rotation center of the photosensitive drum 1762 (rotational axis L1) are substantially parallel to the mounting direction M. Therefore, the mounting direction M in the following description can be read as a direction perpendicular to the rotational axis L1 and parallel to the straight line connecting the rotation center of the developing roller 1732 and the rotation center of the photosensitive drum 1762 (rotational axis L1).

Similar to Embodiment 1, the mounting direction M of the cartridge B to the apparatus main assembly A and the removing direction from the apparatus main assembly A (the direction opposite to the mounting direction M) are directions substantially perpendicular to the rotational axis L1. In addition, the mounting direction of the drum unit 69 to the apparatus main assembly A and the dismounting direction from the apparatus main assembly A are the same as the mounting direction M of the cartridge B to the apparatus main assembly A and the dismounting direction from the apparatus main assembly A, respectively.

As shown in part (a) of FIG. 113, the drum bearing member 1773 is provided with a guided portion 1773*s*1, a guided portion 1773*s*2, and a guided portion 1773*s*3 in addition to the guided portion 1773*g* described above. These guided portions are projections having shapes projecting in the direction of the rotational axis L1 from the main assembly portion of the drum bearing member 1773. When the cartridge B is mounted on the apparatus main assembly A and taken out from the apparatus main assembly A, it comes into contact with and guided by a guide portion (not shown) provided on the apparatus main assembly A. As shown in other Figures, the guided portion 1773*s*1 may be omitted. The guided portion 1773*s*3 may also be omitted in consideration of necessity. However, it is made more stable to mount and dismount the cartridge B by providing the guided portion 1773*s*1 and the guided portion 1773*s*3. In addition, the guided portion 1773*s*1 is a projection which is long in the mounting direction M (or is long in the direction perpendicular to the rotational axis L1 and parallel to the straight line connecting the rotation center of the developing roller 1732 and the rotation center of the photosensitive drum 1762 (rotational axis L1). By making the guided portion 1773*s*1 a long projection in this manner, the stiffness of the drum bearing member 1773 is enhanced. Further, although the guided portion 1773*s*1 and the guided portion 1773*g* are provided as one connected projection, they may be provided as separate projections. However, the stiffness of the drum bearing member 1773 is enhanced when it is provided as one connected projection.

In addition, as described above, in the state that the cartridge B is mounted in the apparatus main assembly A, the guided portion 1773*g* contacts the two positioning portions 1715*a* of the apparatus main assembly A and the position of the rotational axis L1 of the cartridge B with respect to the apparatus main assembly A is determined in two directions perpendicular to the rotational axis L1 (mounting direction M and the orthogonal direction MP) (see part (c) of FIG. 52 and FIG. 57). Further, by the guided portion 1773*s*2 being brought into contact with the positioning portion of the apparatus main assembly A (not shown), the position (attitude) of the cartridge B with respect to the apparatus main assembly A is determined in the rotational direction about the rotational axis L1.

Furthermore, the positioning of the cartridge B with respect to the apparatus main assembly A in the direction of the rotational axis L1 is the same as that of Embodiment 1. Specifically, as shown in part (b) of FIG. 113 and part (a) of FIG. 114, the drum bearing member 1773 has a recess fitted portion 1773*h* recessed along the mounting direction M, and into the fitted portion 1773*h*, the projection fitting portion projecting along the mounting direction M (not shown) of the apparatus main assembly A is fitted, so that the position of the cartridge B with respect to the apparatus main assembly A in the direction of the rotational axis L1 is determined.

Further, as shown in part (a) of FIG. 113, the drum bearing member 1773 is provided with a substantially cylindrical developing unit support portion 1773*b* extending in the direction of the rotational axis L1. The developing unit support portion 1773*b* supports a cylindrical portion 1721*a* which is placed surrounding a development coupling member 1789 and the coupling portion 1789*a* of the frame 1721 of the developing unit 1720, so as to be rotatable (swingable) around the rotational axis DA. The rotational axis DA is coaxial with the rotational axis of the development coupling member 1789 and parallel to the rotational axis L1. The developing unit 1720 can rotate (swing) about the rotational axis DA in the DS direction relative to the cleaning unit 1760, by receiving a force from a force applying portion (not shown) of the apparatus main assembly A at the force receiving portion 1721*b* of the frame 1721 of the developing unit 1720. By this rotation, the developing roller 1732 can be spaced from the drum 1762.

Further, as shown in part (a) of FIG. 113, as the cartridge B is viewed in the direction of the rotational axis L1, the guided portion 1773*s*2 is disposed on the straight line LT passing through the rotational axis L1 and the rotational axis DA, and in a direction parallel with the line LT, the developing unit support portion 1773*b* and the rotational axis DA are disposed between the rotational axis L1 and the guided portion 1773*s*2. Therefore, the cleaning unit 1760 can securedly support the relatively heavy developing unit 1760. Thus, it can be said that the developing unit support portion 1773*b* and the rotation axis DA are disposed between the rotational axis L1 and the guided portion 1773*s*2, in any of the mounting direction M (or the longitudinal direction of the guided portion 1773*s*1), the orthogonal direction MP perpendicular to the mounting direction M (or the direction perpendicular to the longitudinal direction of the guided portion 1773*s*1), the horizontal direction HD, and the vertical direction VD.

Further, when the region are divided into two regions by a straight line LT, as the cartridge B is viewed in the direction of the rotational axis L1, the guided portion 1773*s*1 is disposed in one region and the guided portion 1773*s*3 is disposed in the other region, and therefore, the attitude of the cartridge B during mounting and dismounting of the cartridge B is stabilized.

Further, as shown in part (b) of FIG. 113, part (a) of FIG. 114 and part (b) of FIG. 114, the drum frame of the cleaning unit 1760 includes the above-mentioned drum bearing member (first bearing member) 1773 and the frame member 1711, and in addition, it includes a non-driving side drum bearing member (second bearing member) 1712 mounted to the frame member 1711. In the drum unit 1769, the driving side flange 1763 (first flange member) is rotatably supported by the drum bearing member 1773 as described above. On the other hand, the non-driving side flange (second flange member) 1764 of the drum unit 1769 is rotatably supported by the non-driving side drum bearing member 1712. The non-driving side flange 1764 is a member fixed to the downstream end portion of the drum 1762 in the H direction. That is, the drum bearing member (first bearing member) 1773 is placed at the first end of the frame in the direction of the rotational axis L1 of the drum frame, and the non-driving side drum bearing member (secondly bearing member) 1712 is placed at the second end opposite to the first end. Of the two ends of the drum 62 in the direction of the rotational axis L1, the first end of the photosensitive member is an end located closer to the first end of the frame than the second end of the frame, and the second end of the photosensitive member on the opposite side of the first end is an end located at a position closer to the second end of the frame than the first end of the frame. As will be understood from part (a) of FIGS. 114 and 114 (*b*) a non-driving side drum bearing member 1712 includes a projecting shape portion 1712*a* having a shape projecting downstream in the mounting direction M. Here, as will be understood from FIG. 50, as viewed along the direction of the rotational axis L1, a straight line connecting the rotation center of the developing roller 1732 and the rotation center of the photosensitive drum 1762 (rotational axis L1) is parallel with the mounting direction M. Therefore, the projecting shape portion 1712*a* has a shape projected toward the downstream of the drum bearing member 1773 or the drum 1762, with respect to a direction which is perpendicular to the rotational axis L1 and which is directed from the rotation center of the developing roller 1732 toward the rotation center of the photosensitive drum 1762 (direction substantially parallel to the mounting direction M). A memory board 1740 on which a non-volatile memory chip is mounted is mounted to the projecting shape portion 1712*a*. The memory board 1740 is provided with an electrode portion (electrode surface) 1740*a* which is a surface that is electrically connected with the non-volatile memory chip and is electrically connectable by contacting an electrode portion on the main assembly side (not shown) of the apparatus main assembly A. With respect to the direction of the rotational axis L1, the electrode portion 1740*a* is provided at a position close to the end portion (the end portion of the second frame) on the side (non-driving side) opposite to the end portion (first frame end portion) on the side (driving side) where the drum bearing member 1773 and the driving side flange 1763 are provided. Specifically, with respect to the direction of the rotational axis L1, the region where the electrode portion 1740*a* is provided is a region including a position of the end portion (second end portion of the photosensitive member) on the downstream side in the H direction of the drum 1762. However, with respect to the direction of the rotational axis L1, the region where the electrode portion 1740*a* is provided may be located close to the outside the drum frame (or outside of the cartridge B) than the position of the end portion (second end portion of the photosensitive member), on the downstream side in the H direction, of the drum 1762. Further, with respect to the direction of the rotational axis L1, of the region where the electrode portion 1740*a* is provided and the region where the non-driving side flange 1764 is provided are at least partly at the same position (at least partly overlap). However, with respect to the direction of the rotational axis L1, the region where the electrode portion 1740*a* is provided is closer to the outside of the drum frame (or the outside of the cartridge B) than the region where the non-driving side flange 1764 is disposed (downstream side position in the H direction). In addition, the electrode portion 1740*a* is disposed on the downstream side of the rotational axis L1 and the photosensitive drum 1762 with respect to the mounting direction M. Further, the electrode portion 1740 is disposed on the downstream side of the rotational axis L1 or the photosensitive drum 1762 with respect to the direction which is perpendicular to the rotational axis L1 and which is directed from the rotation center of the developing roller 1732 toward the rotation center of the photosensitive drum 1762 (direction substantially parallel to the mounting direction M). Furthermore, the memory board 1740 is supported by the cleaning unit 1760 in an attitude in which the electrode portion (electrode surface) 1740*a* is oriented perpendicular to the mounting direction M.

<Driving Side Flange 1763>

Figure 54:
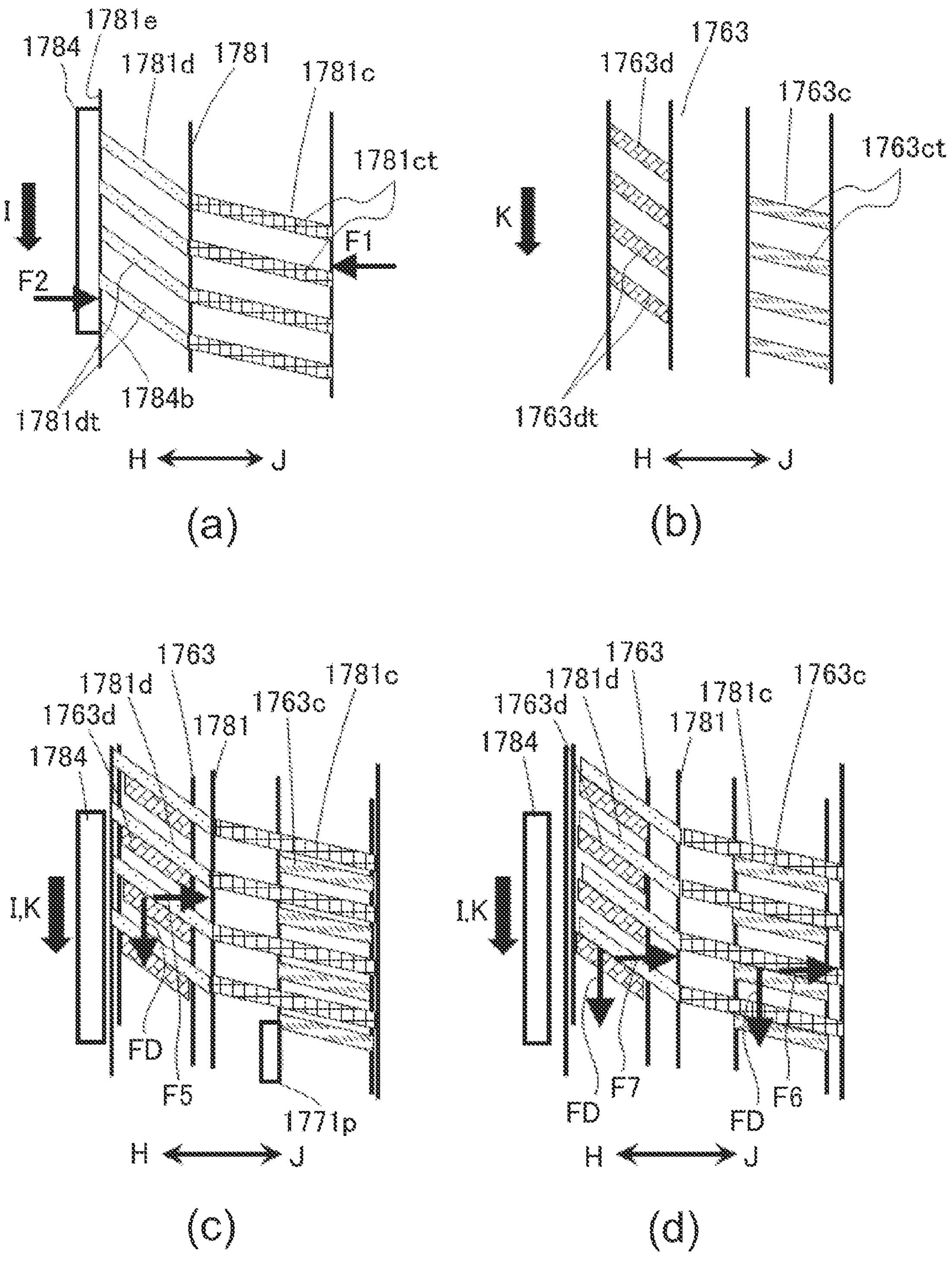
FIG. 54 is a schematic sectional view of the gear portion of the drive transmission gear, a schematic sectional view of the gear portion of the driving side flange, and a schematic sectional view of the gear portion of the drive transmission gear and the gear portion of the driving side drum flange.

Next, referring to part (b) of FIG. 54 and FIG. 60, the driving side flange 1763 will be described. Part (b) of FIG. 54 is a schematic cross-sectional view of the gear portion of the driving side flange 1763. The cross-section is a plane in contact with a meshing pitch circle at the time of meshing with the drive transmission gear 1781. Part (a) of FIG. 60 and part (b) of FIG. 60 are sectional views of the drum unit 1769 in the neighborhood of the driving side flange 1763, taken along a plane including the rotational axis L1.

The driving side flange 1763 includes a first gear portion (first unit side gear portion, first unit side helical tooth gear portion) 1763*c* and a second gear portion (second unit side gear portion, second unit side helical tooth gear portion) 1763*d* as helical tooth gear portions, and they are coaxial with each other. The first gear portion 1763*c* is disposed on the upstream side in the H direction (downstream side in the J direction) with respect to the second gear portion 1763*d*. That is, the second gear portion 1763*d* is disposed between the first gear portion 1763*c* and the drum 1762 in the direction of the rotational axis L1. The first gear portion 1763*c* includes a plurality of first helical teeth (teeth, first projections) 1763*ct* arranged at different positions in the circumferential direction about the rotational axis L1, and the second gear portion 1763*d* includes a plurality of second helical teeth (teeth, second projections) 1763*dt* arranged at different positions in the circumferential direction about the rotational axis L1. The first helical tooth 1763*ct* and the second helical tooth 1763*dt* both have involute tooth profiles, and are projections projecting in the radial direction with respect to the rotational axis L1. The first gear portion 1763*c* and the second gear portion 1763*d* are integrally resin-molded and integrally rotatable, and therefore, it can be said that the first gear portion 1763*c* and the second gear portion 1763*d* are integrally rotatable first and second rotatable portions. The first gear portion 1763*c* meshes with the first main assembly gear portion 1781*c* of the drive transmission gear 1781, and the second gear portion 1763*d* meshes with the second main assembly gear portion 1781*d* of the drive transmission gear 1781.

The twisting directions of the first gear portion 1763*c* and the second gear portion 1763*d* of the driving side flange 1763 is the same, and the tooth surface is twisted so as to go in the K direction as goes in the J direction. The twisting direction of the first gear portion 1763*c* and the second gear portion 1763*d* is opposite to the twisting direction of the first main assembly gear portion 1781*c* and the second main assembly gear portion 1781*d* of the drive transmission gear 1781. In addition, as in Embodiment 1, the helix angle of the second gear portion 1763*d* is larger than the helix angle of the first gear portion 1763*c*. The helix angle of the first gear portion 1763*c* is the same as the helix angle of the first main assembly gear portion 1781*c* which will be described hereinafter, and the helix angle of the second gear portion 1763*d* is the same as the helix angle of the second main assembly gear portion 1781*d* which will be described hereinafter. Further, the numbers of teeth of the first gear portion 1763*c* and the second gear portion 1763*d* of the driving side flange 1763 are the same.

Figure 60:
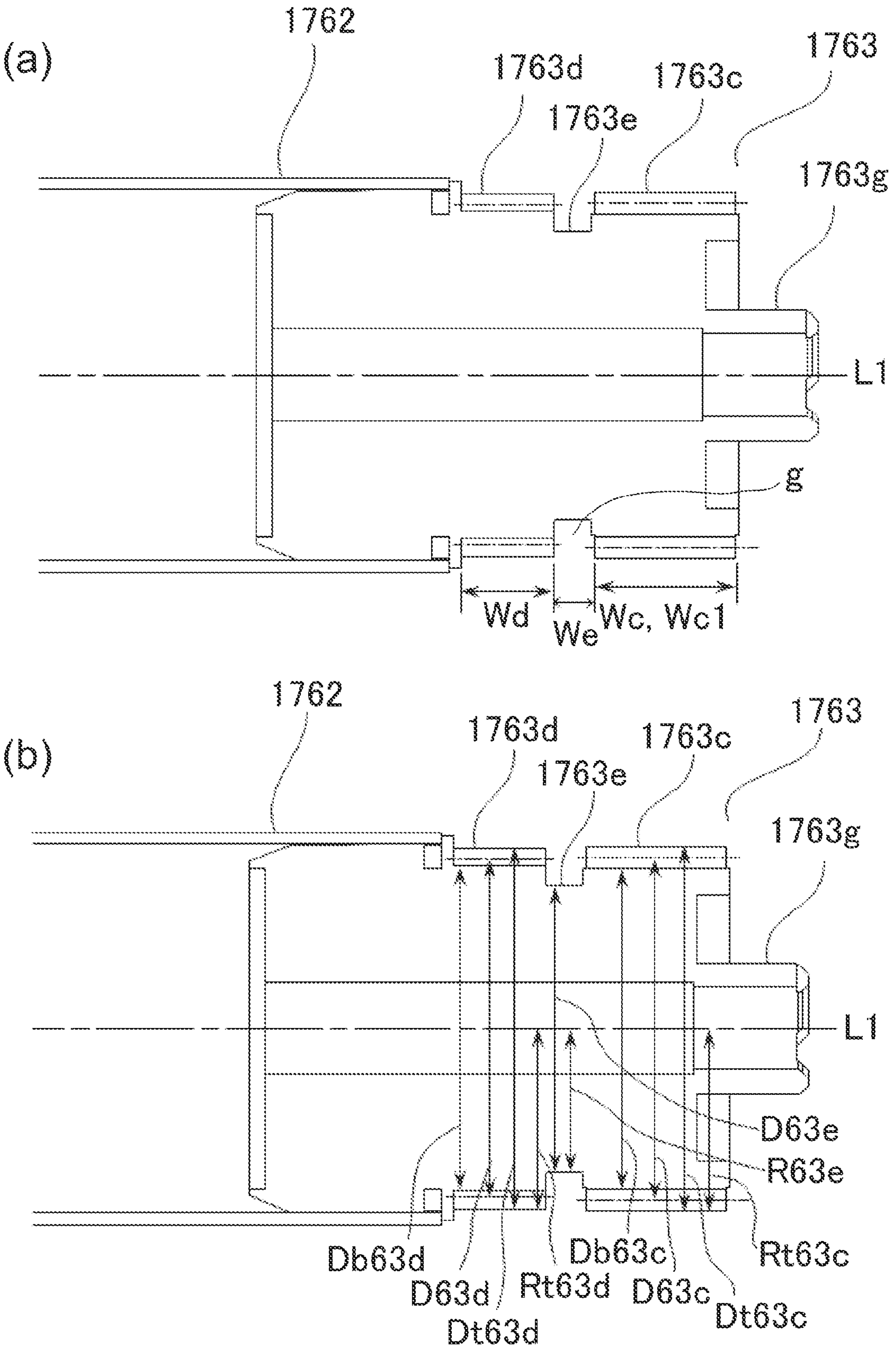
FIG. 60 is sectional views of the drum unit.

Further, as shown in part (a) of FIG. 60, the width (tooth width) Wc of the first helical tooth (tooth, first projection) 1763*ct* measured in the direction of the rotational axis L1 is larger than the width (tooth width) Wd of the second helical tooth (tooth, second projection)1763*dt* measured in the direction of the rotational axis L1. That is, each of the first gear portion 1763*c* and the second gear portion 1763*d* has at least one tooth satisfying the following formula A1, wherein Wc is tooth width of the first helical tooth 1763*ct* (tooth, first projection) in the direction of the rotational axis L1, and Wd is tooth width of the second helical tooth 1763*dt* in the direction of the rotational axis L1:Wc>Wd. (Formula A1). While the driving side flange 1763 is being driven by the drive transmission gear 1781 in a balanced state, the driving force FD received by the first gear portion 1763*c* is larger than the restricting force FB received by the second gear portion 1763*d*, and therefore, it is preferable to satisfy such a relationship.

Further, the width (engagement width), in the rotational axis L1, of the portion where the first gear portion 1763*c* meshes (contacts) with the first main assembly gear portion 1781*c* and the engagement width of the second helical tooth gear portion 1763*c* with the second main assembly gear portion 1781*d* are preferably larger since then the drive transmission accuracy is better. However, if the meshing width is set to be larger than necessary, the widths of the first gear portion 1763*c* and the second gear portion 1763*d* in the direction of the rotational axis L1 is large, and the driving side flange 1763, the drum unit 1769, the cartridge B, and eventually the apparatus main assembly A will be upsized. Therefore, the tooth width Wc1 of the first helical tooth (teeth) 1763*ct* having the widest tooth width in the first gear portion 1763*c* and the tooth width Wd1 of the second helical tooth (teeth) 1763*dt* having the widest tooth width in the second gear portion 1763*d* preferably satisfy preferably satisfies the following Formula A2, further preferably formula A3.

$$Wd1 \leq (4/5) \cdot Wc1 \qquad \text{(Formula A2)}$$

$$Wd1 \leq (3/4) \cdot Wc1 \qquad \text{(Formula A3).}$$

Further, from the standpoint of the strength of the second helical tooth (teeth) 1763*dt* of the second gear portion 1763*d*, it is preferable that the second helical tooth (teeth) 1763*dt* has a tooth width of a certain level or more, and the tooth width Wc1 and the tooth width Wd1 satisfy the following formula A4.

$$Wd1 \geq (1/10) \cdot Wc1 \qquad \text{(Formula A4).}$$

Further, the width (length) We of the cylindrical portion 1763*e* (or the gap g) in the direction of the rotational axis L1 is selected so as to satisfy the formulas B1, B2 and B3 with reference to the widths Wc and Wd, as in Embodiment 1.

When the tooth width Wc of the first gear portion 1763*c* is not constant, it is assumed that the tooth width Wc1 of the tooth having the widest tooth width is taken as the tooth width.

$$We \geq Wc/5 \qquad \text{(Formula B1)}$$

$$We \leq Wc \qquad \text{(Formula B2)}$$

$$We \leq Wd \qquad \text{(Formula B3).}$$

In this embodiment, the tooth width of each tooth of the first gear portion 1763*c* is the same, the tooth width of each tooth of the second gear portion 1763*d* is also the same, the tooth width Wc is 8.2 mm, and the tooth width Wd is 5.2 mm. The width We is 3.1 mm.

In addition, as shown in part (b) of FIG. 60, the meshing pitch circle diameters D63*c* and D63*d* of the first gear portion 1763*c* and the second gear portion 1763*d* in the meshing between the driving side flange 1763 and the drive transmission gear 1781 are substantially the same. Similarly, the meshing pitch circle diameters of the first main assembly gear portion 1781*c* and the second main assembly gear portion 1781*d* are substantially the same. By this, the meshing between the first gear portion 1763*c* and the first main assembly gear portion 1781*c* and the meshing between the second gear portion 1763*d* and the second main assembly gear portion 1781*d* can be appropriate without tooth tip hitting.

Further, as in Embodiment 1, the addendum circle diameter Dt63*c* of the first gear portion 1763*c* and the dedendum circle diameter Db63*d* of the second gear portion 1763*d* are substantially the same such that the meshing with the first main assembly gear portion 1781*c* and the second main assembly gear portion 1781*d* establishes an proper meshing engagement without tooth top hitting.

Specifically, it is preferable that the size of the addendum circle diameter Dt63*c* of the first gear portion 1763*c* is larger than that of the dedendum circle diameter Db63*d* of the second gear portion 1763*d*, or larger than 0.8 times (further preferably 0.9 times) than the addendum circle diameter Dt63*d* of the second gear portion 1763*d*. In addition, the size of the addendum circle diameter Dt63*c* of the first gear portion 1763*c* is preferably smaller than 1.1 times the addendum circle diameter Dt63*d* of the second gear portion 1763*d*.

Further, it is preferable that the size of the dedendum circle diameter Db63*c* of the first gear portion 1763*c* is smaller than that of the addendum circle diameter Dt63*d* of the second gear portion 1763*d*. Further, the size of the dedendum circle diameter Db63*c* of the first gear portion 1763*c* is preferably larger than that of 0.9 times the dedendum circle diameter Db63*d* of the second gear portion 1763*d*.

Furthermore, the size of the addendum circle diameter Dt63*d* of the second gear portion 1763*d* is larger than that of the dedendum circle diameter Db63*c* of the first gear portion 1763*c*, or larger than 0.8 times (further preferably 0.9 times) of the addendum circle diameter Dt63*c* of the first gear portion 1763*c*. Further, the size of the addendum circle diameter Dt63*d* of the second gear portion 1763*d* is preferably smaller than 1.1 times the addendum circle diameter Dt63*c* of the first gear portion 1763*c*.

Further, it is preferable that the size of the dedendum circle diameter Db63*d* of the second gear portion 1763*d* is smaller than that of the addendum circle diameter Dt63*c* of the first gear portion 1763*c*. Further, the size of the dedendum circle diameter Db63*d* of the second gear portion 1763*d* is preferably larger than 0.9 times the dedendum circle diameter Db63*c* of the first gear portion 1763*c*.

In this embodiment, the addendum circle diameter Dt63*c*, the pitch circle diameter D63*c*, and the dedendum circle diameter Db63*c* of the first gear portion 1763*c* are 22.3 mm, 21.1 mm, and 19.6 mm, respectively. The addendum circle diameter Dt63*d*, pitch circle diameter D63*d*, and dedendum circle diameter Db63*d* of the second gear portion 1763*d* are 22.1 mm, 21.1 mm, and 19.8 mm, respectively. The diameter of the cylindrical portion 1763*e* is 17.5 mm Further, the modules and/or amounts of addendum modification are made different between the first gear portion 1763*c* and the second gear portion 1763*d* such that the meshing pitch circle diameters D63*c* and D63*d* are the same while making the helix angles of the first gear portion 1763*c* and the second gear portion 1763*d* different from each other. Similarly, as for the drive transmission gear 1781, the modules and/or amounts of addendum modification are made different between the first main assembly gear portion 1781*c* and the second main assembly gear portion 1781*d*.

In addition, the driving side flange 1763 is provided with a cylindrical portion (intermediate portion, small diameter portion, shaft portion) 1763*e* between the first gear portion 1763*c* and the second gear portion 63*d* in the direction of the rotational axis L1. The maximum diameter D63*e* centered on the rotational axis L1 of the cylindrical portion 1763*e* is smaller than the addendum circle diameter Dt63*c* of the first gear portion 1763*c* and the addendum circle diameter Dt63*d* of the second gear portion 1763*d*. Further, in this embodiment, the maximum diameter D63*e* centered on the rotational axis L1 of the cylindrical portion 1763*e* is smaller than the dedendum circle diameter Db63*c* of the first gear portion 1763*c* and the dedendum circle diameter Db63*d* of the second gear portion 1763*d*. However, the maximum diameter D63*e* centered on the rotational axis L1 of the cylindrical portion 1763*e* is not limited to such a condition if there is no contact with the drive transmission gear 1781 while the driving side flange 1763 is being driven by the drive transmission gear 1781. As will be described hereinafter in Embodiments 22 and 23, the structure may be such that a distance (radius) R63*e* from the rotational axis L1 to the outer diameter of the cylindrical portion 1763*e* is at least temporarily smaller than the addendum circle radius Rt63*ct* of the first gear portion 1763*c* or the addendum circle radius Rt63*d* of the second gear portion 1763*d* so that the driving side flange 1763 and the drive transmission gear 1781 are engaged with each other to transmit the drive force.

It is self-evident that the portions showing the relationship between these dimensions using various diameters of the first gear portion 1763*c*, the second gear portion 1763*d*, and the cylindrical portion 1763*e* apply also when the diameter is replaced with a radius.

<Drive Transmission Gear 1781>

Figure 53:
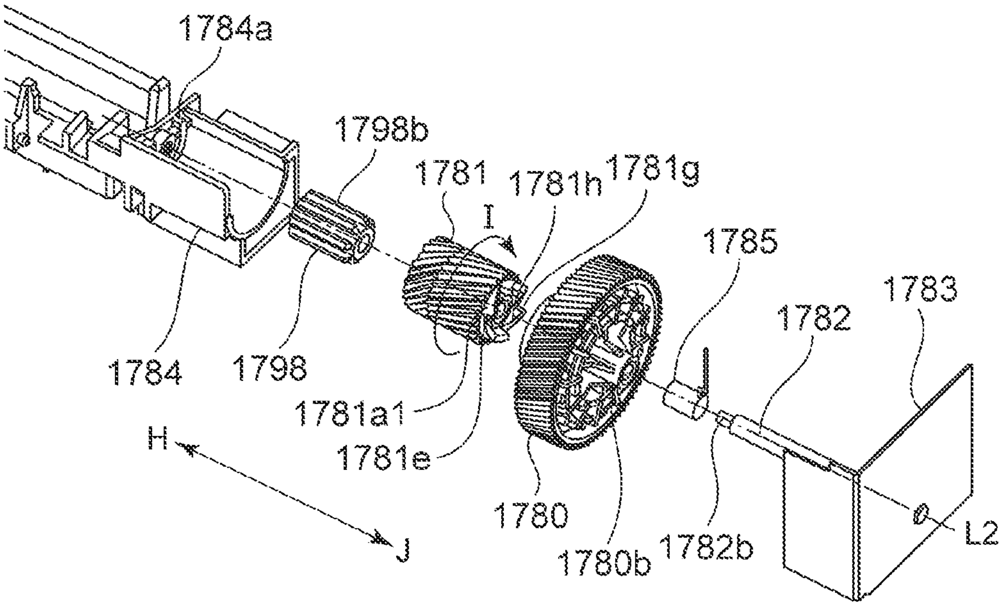
FIG. 53 is exploded perspective views of the main assembly of the apparatus.
Figure 53:
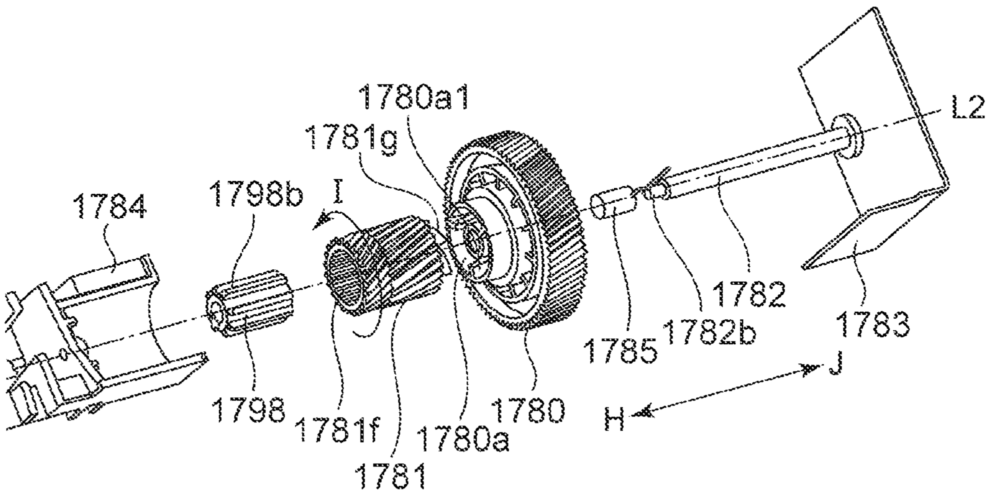

Next, referring to FIG. 53 and part (a) of FIG. 54, the drive transmission gear 1781 of the apparatus main assembly A which meshes with the driving side flange 1763 will be described. Part (a) of FIG. 53 and part (b) of FIG. 53 are exploded perspective views of the peripheral portion of the drive transmission gear 1781 of the apparatus main assembly A, in which part (a) is a view as seen from the second driving side plate 1783 side, and part (b) is a view as seen from the main frame 1784 side. Part (a) of FIG. 54 is a schematic sectional view of the gear portion of the drive transmission gear 1781. The sectional plane is in contact with the meshing pitch circle at the time of meshing with the driving side flange 1763.

The drive transmission gear 1781 coaxially includes a first main assembly gear portion (first main assembly helical tooth gear portion) 1781*c* and a second main assembly gear portion (second main assembly helical tooth gear portion) 1781*d* as helical tooth gear portions. The first main assembly gear portion 1781*c* is arranged on the upstream side in the H direction (downstream side in the J direction) with respect to the second main assembly gear portion 1781*d*. The first main assembly gear portion 1781*c* includes a plurality of first main assembly helical teeth 1781*ct*, and the second main assembly gear portion 1781*d* includes a plurality of second main assembly helical teeth 1781*dt*. The first main assembly helical tooth 1781*ct* and the second main assembly helical tooth 1781*dt* have both involute tooth profiles. The first main assembly gear portion 1781*c* and the second main assembly gear portion 1781*d* are integrally resin-molded and integrally rotatable. In addition, the twisting directions of the first main assembly gear portion 81*c* and the second main assembly gear portion 81*d* are the same, and the tooth surface is twisted so as to be displaced in the I direction as goes in the J direction. Further, similarly to Embodiment 1, the helix angle of the second main assembly gear portion 1781*d* is larger than the helix angle of the first main assembly gear portion 1781*c*. Furthermore, the number of teeth of the first main assembly gear portion 81*c* and the second main assembly gear portion 81*d* are the same. In the state that the cartridge B is mounted on the apparatus main assembly A, the first gear portion 1763*c* meshes with the first main assembly gear portion 1781*c*, and the second gear portion 1763*d* meshes with the second main assembly gear portion 1781*d*.

Figure 112:
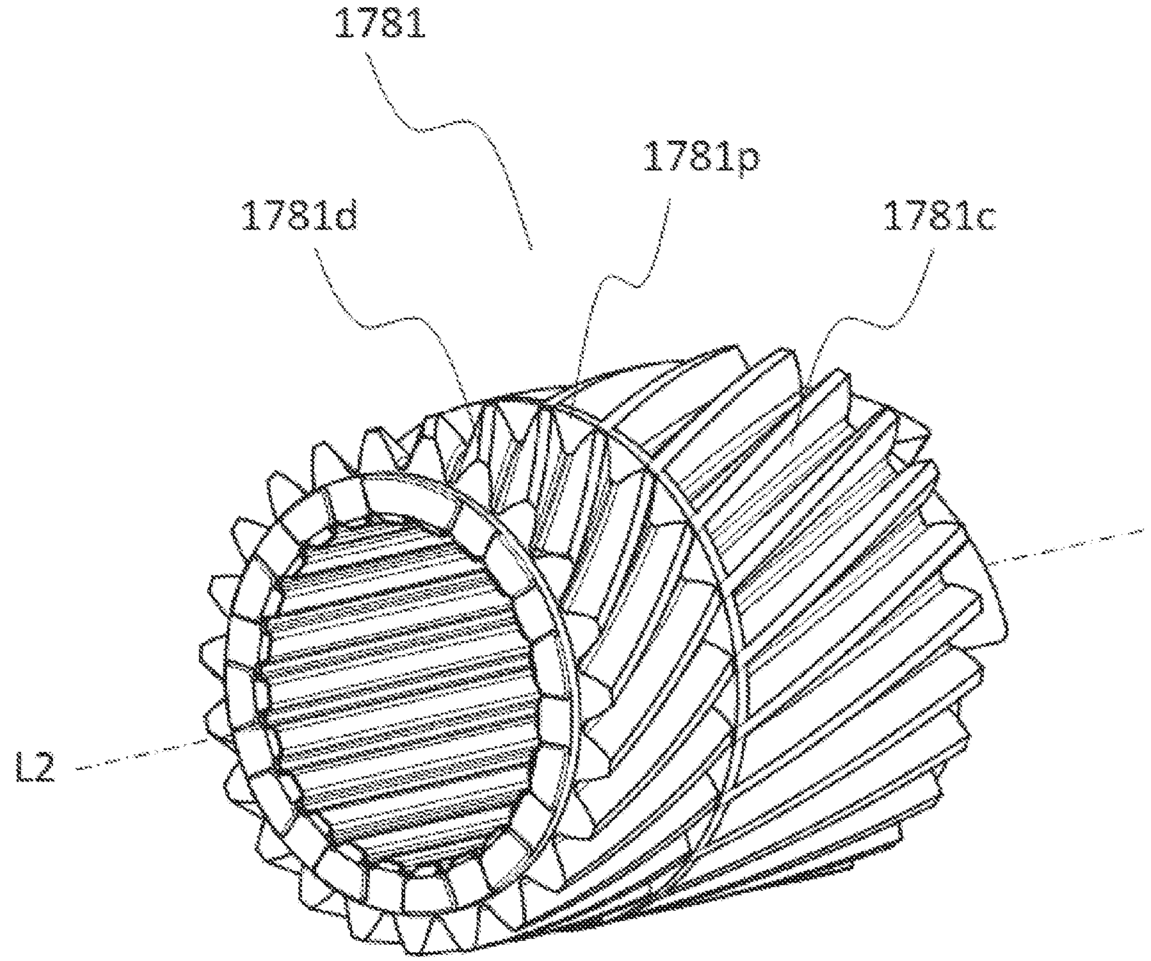
FIG. 112 is a perspective view of another structure example of the drive transmission gear.

FIG. 112 is a perspective view of another structure example of the drive transmission gear 1781. As shown in FIG. 112, a rib-shaped portion (projecting portion, radial projection main portion) 1781*p* projecting in the radial direction with respect to the rotational axis L2 may be provided between the first main assembly gear portion 1781*c* and the second main assembly gear portion 1781*d* in the direction of the rotational axis L2. Depending on the manufacturing method of the drive transmission gear 1781, it may be possible to improve the molding accuracy, suppress the deterioration, or reduce the manufacturing cost, by providing the rib-shaped portion 1781*p*. The diameter of the rib-shaped portion 1781*p* is about the same as the diameter of the addendum circle of the first main assembly gear portion 1781*c* and the diameter of the addendum circle of the second main assembly gear portion 1781*d*. The rib-shaped portion 1781*p* may be provided over the entire circumference or may be provided only partially in the circumferential direction centered on the rotational axis L2. Here, by providing the driving side flange 1763 with the cylindrical portion 1763*e*, a gap g is formed between the first gear portion 1763*c* and the second gear portion 1763*d* in the direction of the rotational axis L1 (see FIG. 60 and so on). Because of the provision of this gap g, even when the drive transmission gear 1781 has the rib-shaped portion 1781*p*, the rib-shaped portion 1781*p* and the driving side flange 1763 are prevented from coming into contact with each other, and the drive transmission gear 1781 and the gear portions of the driving side flange 1763 can be properly meshed with each other. At this time, the rib-shaped portion 1781*p* is inserted (entered) into the gap g between the first gear portion 1763*c* and the second gear portion 1763*d*.

As shown in part (a) of FIG. 53 and part (b) of FIG. 53, the apparatus main assembly A comprises a motor (not shown), an idler gear 1780, a drive transmission gear 1781, a second driving side plate 1783, a main frame 1784, a driving shaft 1782, a reinforcing member 1798 and a compression spring 1785. The second driving side plate 1783 is a member corresponding to the second driving side plate 83 of Embodiment 1. The driving force from the motor is transmitted to the drive transmission gear 1781 by way of the idler gear 1780. The idler gear 1780, the drive transmission gear 1781, and the reinforcing member 1798 are supported by the driving shaft 1782 which is a fixed shaft, so as to be rotatable coaxially with the rotational axis L2 as the rotational axis and movable in the direction of the rotational axis L2. One end of the driving shaft 1782 is fixed to the second driving side plate 1783, and the other end 1782*b* is fitted in and supported by a hole 1784*a* of the main frame 1784. The driving shaft 1782 is provided so that the rotational axis L2 of the drive transmission gear 1781 is parallel to the rotational axis L1 of the drum 62 in a state where the cartridge B is mounted on the apparatus main assembly A.

A compression spring 1785 is provided between the other end 1780*b* of the idler gear 1780 and the second driving side plate 1783, and the idler gear 1780 is urged (H direction) toward the main frame 1784 with respect to the direction of the rotational axis L2. A recess portion 1780*a* recessed in the direction of the rotational axis L2 is provided at the end of the idler gear 1780 opposing the drive transmission gear 1781, and a projection (driving force transmission portion) 1780*a*1 is provided inside the recess portion 1780*a*.

At the end of the drive transmission gear 1781 opposing the idler gear 1780, a projection 1781*a*1 projecting in the direction of the rotational axis L2 is provided at a position opposing the recess 1780*a*1 of the idler gear 1780. The projection 1781*a*1 has a surface 1781*e* at the upstream end and a slope 1781*h* at the downstream end, in the rotational direction I. The surface 1781*e* is perpendicular to the plane perpendicular to the rotational axis L2, and the slope 1781*h* is inclined with respect to the plane perpendicular to the rotational axis L2. By engaging the projection 1780*a*1 of the idler gear 1780 and the surface 1781*e* of the projection 1781*a*1 with each other, the driving force is transmitted from the idler gear 1780 to the drive transmission gear 1781, so that they rotate integrally in the rotational direction I.

On the other hand, when the drive transmission gear 1781 rotates relative to the idler gear 1780 in the rotational direction I, the slope 1781*h* of the projection 1781*a*1 of the drive transmission gear 1781 is brought into contact with the projection 1780*a*1 of the idler gear 1780. By this, a force acts tending to separate the idler gear 1780 from the drive transmission gear 1781 in the rotational axis L2 direction, and the idler gear 1780 moves in the J direction against the spring force of the compression spring 1785, and the projection 1780*a*1 rides over the projection 1781*a*1, and therefore, the structure is such that the driving force in the rotational direction I is not transmitted from the drive transmission gear 1781 to the idler gear 1780. In the process of mounting the cartridge B inn the apparatus main assembly A, the drive transmission gear 1781 may be rotated in the rotational direction I by engagement with the driving side flange 1763, but on such occasion, the driving force in the rotational direction I is not transmitted to the idler gear 1780 from the drive transmission gear 1781 due to the above-described structure. Therefore, when the user mounts the cartridge B, it is not necessary to rotate the motor for driving the idler gear 1780 or the photosensitive drum 1762, so that the load required when mounting the cartridge B in the apparatus main assembly A can be reduced.

Further, the drive transmission gear 1781 is provided with a hole 1781*f*, and an engaging portion 1781*g* having a shape of a plurality of recesses and projections is provided on the inner peripheral portion thereof. The reinforcing member 1798 is provided with an engaging portion 1798*b* having a shape of a plurality of recesses and projections on an outer peripheral portion thereof, and is inserted into the hole 1781*f*. The engaging portion 1781*g* of the drive transmission gear 1781 and the engaging portion 1798*b* of the reinforcing member 1798 are in meshing engagement with each other. The reinforcing member 1798 contacts the driving shaft 1782 and is directly supported by the driving shaft 1782, and the drive transmission gear 1781 is indirectly supported by the driving shaft 1782 by way of the reinforcing member 1798. However, the drive transmission gear 1781 may be structured to be directly supported by the driving shaft 1782.

However, in the case of manufacturing the drive transmission gear 1781 having a relatively large diameter by resin molding as in this embodiment, it is preferable that the drive transmission gear 1781 is supported by the driving shaft 1782 by way of the reinforcing member 1798, because it is advantageous from the standpoint of both molding accuracy and strength. This is because when a gear having a relatively large radial wall thickness (radial distance from the inner peripheral surface of the hole through which the shaft passes to the dedendum circle of the gear) is produced in one resin molded member, it is necessary to provide a lightening shape in order to avoid deterioration of gear molding accuracy due to the resin sink marks and so on. When the lightening shape is provided, the strength of the gear may decrease. Therefore, in this embodiment, without the drive transmission gear 1781 being directly supported by the driving shaft 1782, a separate resin-molded reinforcing member 1798 is provided to provide a resin-molded drive transmission gear 1781, by which while suppressing the deterioration of the molding accuracy of the above, it is possible to suppress the decrease in strength.

<Drive Transmission Operation>

Figure 55:
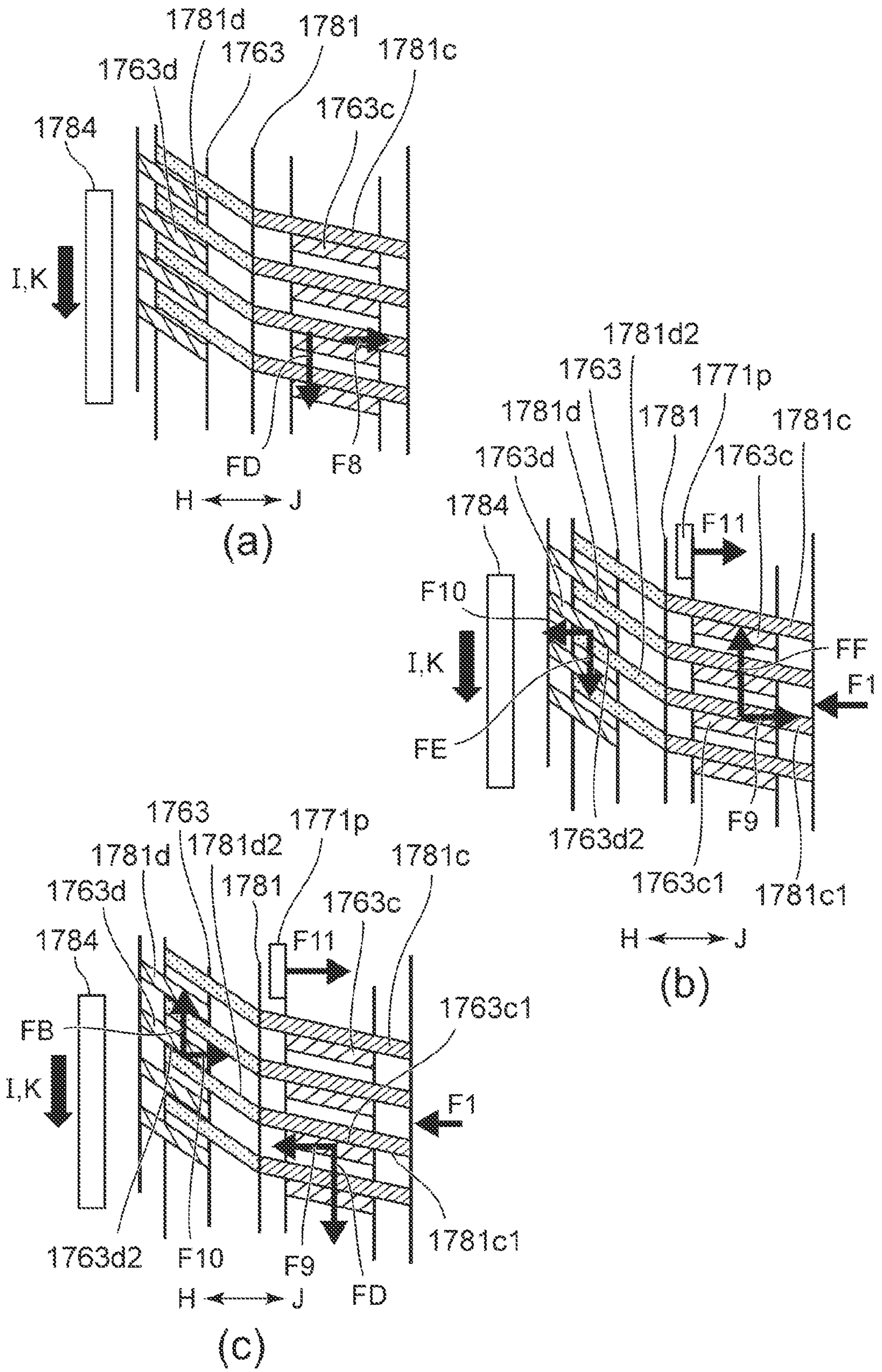
FIG. 55 is schematic sectional views of the gear portion of the drive transmission gear and the gear portion of the driving side drum flange.

Next, referring to FIGS. 54 and 55, the meshing operation between the drive transmission gear 1781 and the driving side flange 1763 will be described. Part (c) of FIG. 54, part (d) of FIG. 54, part (a) of FIG. 55, part (b) of FIG. 55 and part (c) of FIG. 55 are schematic sectional views in the meshing engagement portion between the gear portion of the drive transmission gear 1781 and the gear portion of the driving side drum flange 1763. The sectional plane is in contact with the meshing pitch circle between the drive transmission gear 1781 and the driving side flange 1763. Part (c) of FIG. 54, part (d) of FIG. 54, part (a) of FIG. 55, part (b) of FIG. 55, and part (c) of FIG. 55 all show states after the drive transmission gear 1781 is started, with elapse of time.

First, in a state where the cartridge B is not mounted to the main assembly A, the drive transmission gear 1781 is urged in the H direction by the compression spring 1785 and abuts against the main frame 1784 as shown in part (a) of FIG. 54.

<Operation after Starting Drive>

After the cartridge B is mounted in the main assembly A, the drive transmission gear 1781 is driven by a motor (not shown) of the apparatus main assembly A by way of the idler gear 1780 (see FIG. 53) to rotate in the I direction. The driving side flange 1763 receives a driving force from the drive transmission gear 1781 that rotates in the I direction and rotates in the K direction.

The case will be described in which the force FD is first transmitted through the meshing engagement between the second main assembly gear portion 1781*d* of the drive transmission gear 1781 and the second gear portion 1763*d* of the driving side flange 1763, immediately after the start of rotation of the drive transmission gear 1781 in the I direction, as shown in part (c) of FIG. 54. The second main assembly gear portion 1781*d* produces a thrust force which pushes the second gear portion 1763*d* in the H direction. However, the driving side flange 1763 is constrained from moving in the H direction by the rib 1771*p* (see part (a) of FIG. 51), and receives a reaction force in the J direction corresponding to the thrust force in the H direction. Therefore, the second main assembly gear portion 1781*d* receives a thrust force F5 in the J direction due to the action of the reaction force received from the second gear portion 1763*d*. This thrust force F5 moves the drive transmission gear 1781 in the J direction.

When the drive transmission gear 1781 moves in the J direction while with further rotation continued, as shown in part (d) of FIG. 54, the first gear portion 1763*c* is also brought into meshing engagement with the first main assembly gear portion 1781*c* to transmit the drive force FD, and at the same time, a thrust force F6 is generated in the first main assembly gear portion 1781*c*. The thrust force F6 is the same thrust force in the J direction as the thrust force F5 previously received by the second main assembly gear portion 1781*d* by meshing with the second gear portion 1763*d*. By this, the drive transmission gear 1781 further moves in the J direction.

When the drive transmission gear 1781 further rotates and moves in the J direction, the second main assembly gear portion 1781*d* becomes out of meshing engagement with the second gear portion 1763*d*, as shown in part (a) of FIG. 55. On the other hand, the meshing engagement between the first gear portion 1781*c* and the first gear portion 1763*c* is maintained, and the first gear portion 1781*c* receives the thrust force F8 in the J direction. At this time, the drive transmission gear 81 transmits the drive force FD only by the engagement between the first main assembly gear portion 1781*c* and the first gear portion 1763*c*, to rotate the driving side flange 1763.

When the drive transmission gear 1781 further rotates and moves in the J direction, the second main assembly gear portion 1781*d* finally brought into contact with the downstream side (in I direction) of the tooth surface (contact portion) 1763*d*2 of the second gear portion 1763*d* as shown in part (b) of FIG. 55 and part (c) of FIG. 55. The surface 1781*c*1 of the first main assembly gear portion 1781*c* and the surface 1763*c*1 of the first gear portion 1763*c* maintain in contact with each other. That is, the teeth of the first gear portion 1763*c* contacts the first main assembly gear portion 1781*c* disposed on the upstream side in the I direction, and the teeth of the second gear portion 1763*d* contacts the second main assembly gear portion 1781*d* disposed on the downstream side in the I direction. In addition, the first gear portion 1763*c* and the second gear portion 1763*d* are integrally molded with resin, and therefore, the teeth of the first gear portion 1763*c* are fixed so as not to move (rotate) in the I direction relative to the teeth of the second gear portion 1763*d*, and the teeth of the second gear portion 1763*d* are fixed so as not to move (rotate) in the I direction relative to the teeth of the first gear portion 1763*c*. Therefore, in this state, the first main assembly gear portion 1781*c* of the drive transmission gear 1781 presses the tooth surface (contact portion) 1763*c*1 on the tooth surface 1781*c*1 to rotate the driving side flange 1763, and the tooth surface 1781*d*2 of the second main assembly gear portion 1781*d* of the drive transmission gear 1781 contacts with the tooth surface 1763*d*2, it is sandwiched by the driving side flange 1763. Then, the movement of the drive transmission gear 1781 in the direction of the rotational axis L1 stops. The position of the drive transmission gear 1781 at this time in the direction of the rotational axis L1 is a balanced position.

In the balanced state, as shown in part (b) of FIG. 55, a force F9, a force F10, and a force F1 are applied to the drive transmission gear 1781 with respect to the direction of the rotational axis L1. The force F9 is a thrust force in the J direction received by the first main assembly gear portion 1781*c* by the meshing engagement force with the first gear portion 1763*c*, the force F10 is a thrust force in the H direction received by the second main assembly gear portion 1781*d* by the meshing engagement force with the second gear portion 6173*d*, and the force F1 is an urging forces of the compression spring 1785 received by way of the idler gear 1780. In addition, the driving side flange 1763 receives a force from the drive transmission gear 1781, to abut to the rib 1771*p* or the side wall 1771*m*, so that it, is positioned with respect to the direction of the rotational axis L1, and a reaction force F11 is produced, in the direction of the rotational axis L1, which balances with the thrust force received from the drive transmission gear 1781. Part (b) of FIG. 55 shows a case where the driving side flange 1763 is positioned in contact with the rib 1771*p*. In the balanced state, with respect to the direction of the rotational axis L1, if frictions are ignored, the force F9, the force F10, the force F1, and the force F11 are balanced, so that the drive transmission gear 1781 and the driving side flange 1763 are in a state of being positioned in the direction of the rotational axis L1.

Further, as shown in part (c) of FIG. 55, in the balanced state, the driving side flange 1763 is sandwiched (contacted) between the first main assembly gear portion 1781*c* and the second main assembly gear portion 1781*d* of the drive transmission gear 1781 in the K direction (rotational direction), so that it is in a state of receiving the following forces. That is, the tooth surface (contact portion) 1763*c*1 of the first gear portion 1763*c* contacts the first main assembly gear portion 1781*c* disposed on the upstream side in the K direction (first circumferential direction), by which it receives the driving force FD as the force having a component in the direction of rotating the driving side flange 1763 in the K direction (predetermined direction). At the same time, the tooth surface (contact portion) 1763*d*2 of the second gear portion 1763*d* contacts the second main assembly gear portion 1781*d* disposed on the downstream side in the K direction (first circumferential direction), by which it receives the restricting force (braking force) FB as the force having a component in the direction which suppresses (restricts) the rotation of the driving side flange 1763 in the K direction. Therefore, it can be said that the first gear portion 1763*c* is a driving force receiving portion which receives the driving force 1-D, and the second gear portion 1763*d* is a restricting force receiving portion which receives the restricting force FB. Part (b) of FIG. 55 shows the reaction force FF of the driving force FD received by the first main assembly gear portion 1781*c* and the reaction force FE of the restricting force FB received by the second main assembly gear portion 1781*d*.

Further, when the first main assembly gear portion 1781*c* of the drive transmission gear 1781 first meshes with the first gear portion 1763*c* of the driving side flange 1763 and transmits the driving force FD immediately after the start of rotation of the drive transmission gear 1781 in the I direction, the state shown in part (d) of FIG. 54 or part (a) of FIG. 55 results. Thereafter, the drive transmission gear 1781 moves in the J direction toward the driving side while transmitting the drive force FD to the first gear portion 1763*c* in the same manner as described above, and the state changes to the balanced state shown in part (b) of FIG. 55 and part (c) of FIG. 55.

As described above, also in this embodiment, the state in which the first gear portion 1763*c* receives the driving force FD and the second gear portion 1763*d* receives the restricting force FB is a backlashless state of no backlash (backlash) in the direction (I direction) between the driving side flange 1763 and the drive transmission gear 1781. In this manner, the driving side flange 1763 is rotationally driven in the K direction while maintaining the backlashless state. While the drive is transmitted by engaging with each other in the backlashless state, the drive transmission with high rotation accuracy is possible.

Further, with respect to the direction of the rotational axis L1, the first gear portion 1763*c* is arranged at a position closer to the projection 1763*g* which is a supported portion supported by the surface 1773*e* and the surface 1773*f* than the second gear portion 1763*d*. In the driving side flange 1763, a larger force applied to the tooth surface of the first gear portion 1763*c* which receives the driving force FD than that of the second gear portion 1763*d* which receives the restricting force FB. Therefore, the driving force FD acts to cause the rotational axis L1 of the drum unit 1769 to tilt, and the drum 1762 may be tilted with respect to the ideal rotational axis L1. However, as in this embodiment, by arranging the first gear portion 1763*c* which receives the driving force FD at a position closer to the projection 1763*g* which is the supported portion than the second gear portion 1763*d*, it is possible to suppress the tilting of the rotational axis L1 of the drum unit 1769 attributable to the driving force FD is received.

<Drive Transmission Structure Developing Roller 1732>

Further, the driving force transmission structure to the developing roller 1732 in this embodiment is similar to that described in other Modified Examples of Embodiment 1 to transmit the driving force referring to FIG. 44, which engages with the coupling member of the apparatus main assembly A so that the driving force is transmitted to the developing roller 532 by way of the input development coupling member 89.

Figure 56:
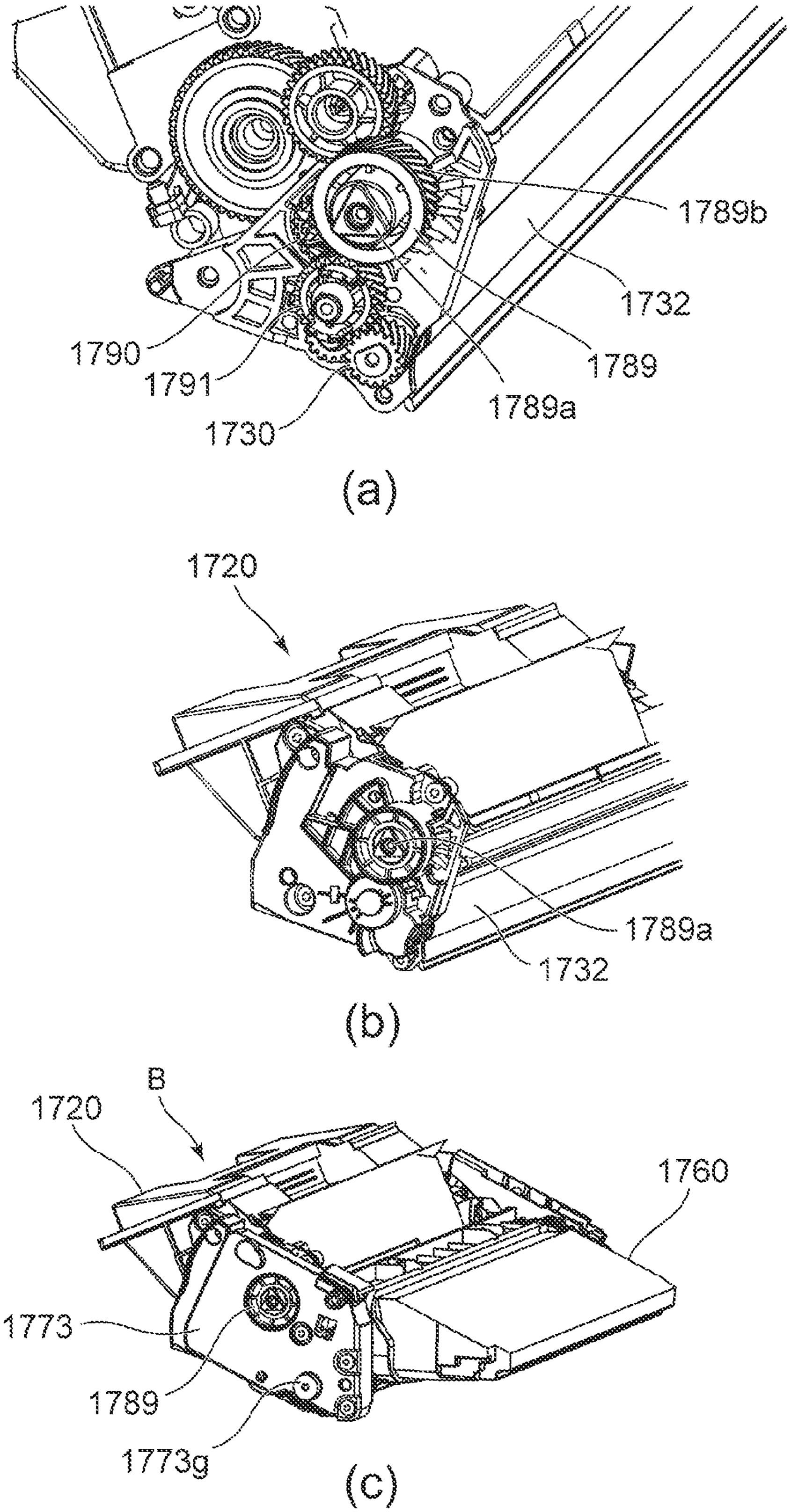
FIG. 56 is perspective views of a drive train for driving a developing roller, a partial perspective view of a developing unit, and a perspective view of the cartridge.

Referring to FIGS. 56 and 57 the specific structure will be described. Part (a) of FIG. 56 is a perspective view of a drive train which drives the developing roller 1732 of the developing unit 1720. Part (b) of FIG. 56 is a partial perspective view of the developing unit 1720 in the neighborhood of the coupling member 1789. Part (c) of FIG. 56 is a perspective view of the cartridge B. FIG. 57 is a partial perspective view of the apparatus main assembly A in the neighborhood of the main assembly side coupling member 1799.

The developing unit 1720 includes a development coupling member 1789 having a coupling portion 1789*a* and a gear portion 1789*b*, an idler gear 1790 which meshes with the gear portion 1789*b*, an idler gear 1791 which meshes with the idler gear 1790, and the developing roller gear 1730 which is fixed to one end of the shaft portion of the developing roller 1732 and meshes with the idler gear 1791, wherein they constitute a developing drive train for driving the developing roller 1732.

In the apparatus main assembly A, a main assembly side coupling member 1799 driven by a motor (not shown) is supported by a first driving side plate 1715. The main assembly side coupling member 1799 is provided so as to be movable in the direction of the rotational axis. The driving force is transmitted from the main assembly side coupling member 1799 to the development coupling member 1789 by integrally rotating the coupling portion 1789*a* of the main assembly side coupling member 1799 and the development coupling member 1789 in an engaged state. Then, the driving force is transmitted from the development coupling member 1789 to the developing roller 1732 in the order of the idler gears 1790, 1791, and the developing roller gear 1730.

Further, the developing unit 1720 is provided with a toner moving member (stirring member) (not shown) which stirs or conveys the toner in the toner accommodating container, and the driving force received by the development coupling member 1789 is transmitted, by way of another gear, to the toner moving member to drive the toner moving member.

The member driven by the driving force from the development coupling member 89 is not limited to the above-mentioned developing roller 1732 and the toner moving member (not shown), but it may be some member other than the drum unit 1769 included in the cartridge B (for example, a charging member, a seal member, a cleaning member, and so on). Therefore, the member to which the driving force is transmitted from the development coupling member 1789 (the member connected to the development coupling member 1789 so as to be able to transmit the driving force) is not limited to the developing roller 1732.

As described above, the apparatus main assembly A is provided with two systems of driving force output means, that is, the drive transmission gear 1781 and the main assembly side coupling member 1799 as the driving force output means to the cartridge B. By this, it possible to perform control such as drive-stopping one of the drive transmission gear 1781 and the main assembly side coupling member 1799 while driving the other. As a specific example, it is possible to control such that the developing roller 1732 is driven while the drum 1762 is stopped.

In addition, in the cartridge B, the driving side flange 1763 is not included in the development drive train for driving the developing roller 1732 or the member connected to the development coupling member 1789 so as to transmit the driving force. Therefore, even if the user rotates the drum 1762 in the state in which the cartridge B has been removed from the apparatus main assembly A, the member connected, for drive transmission, to the developing roller 1732 or the development coupling member 1789 is prevented from rotating in accordance with the rotation of is the drum 1762. Therefore, it is possible to reduce the possibility that the developing roller 1732 or the development coupling member 1789 and the member connected so as to be able to transmit the driving force are unnecessarily driven to cause toner leakage or the like.

As described above, in this embodiment, the developing roller 1732 is driven by the driving force inputted to the development coupling member 1789, but the driving force may be transmitted from the driving side flange 1763 to the developing roller gear 1730 as in Embodiment 1 to drive the developing roller 1732.

As described above, according to this embodiment, the same effect as that of the first embodiment can be provided. Further, the elements of each of the above-described embodiments can be applied to the structure of this embodiment. In particular, the structures of the first helical tooth (first projection) 1763*ct* of the first gear portion 1763*c* of the driving side flange 1763 and the second helical tooth (second projection) 1763*dt* of the second gear portion 1763*d* may be modified to Use the helical teeth, spur teeth, projections and the like shown in embodiment 2, 3, 4, 5, 6, 10, 11, 12, 13, 14, or 16.

Embodiment 18

This embodiment is different from embodiment 17 in that a ring-shaped elastic member is provided so as to cover the driving side flange 1763. The other points are the same as in Embodiment 17, and detailed description thereof will be omitted. In addition, among the elements in this embodiment, the elements corresponding to the elements of Embodiment 1 are assigned the reference numerals associated with the corresponding elements of Embodiment 1. Regarding these elements, the matters not specifically explained are the same as the corresponding elements of Embodiment 1.

Figure 61:
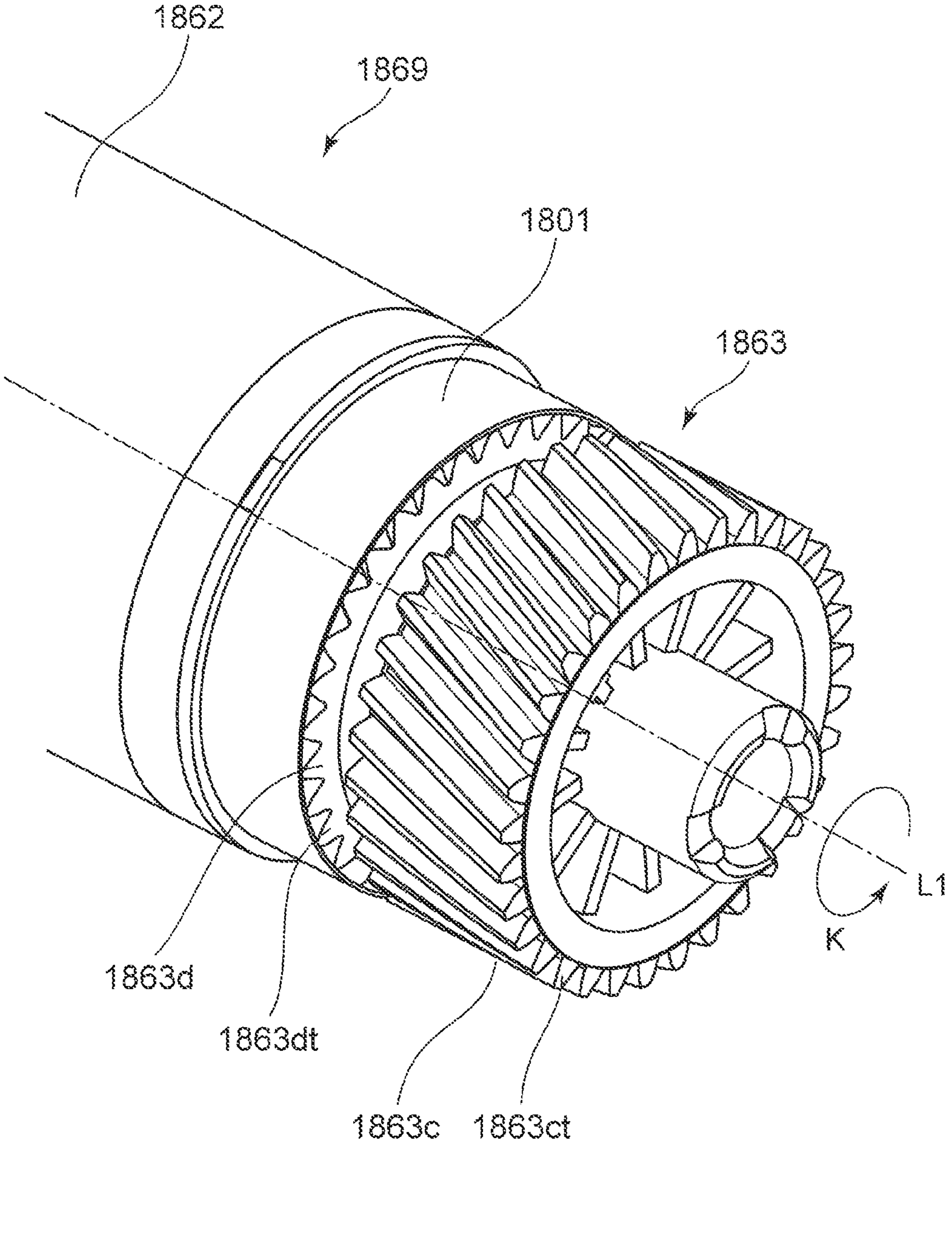
FIG. 61 is a partial perspective view of the drum unit.
Figure 62:
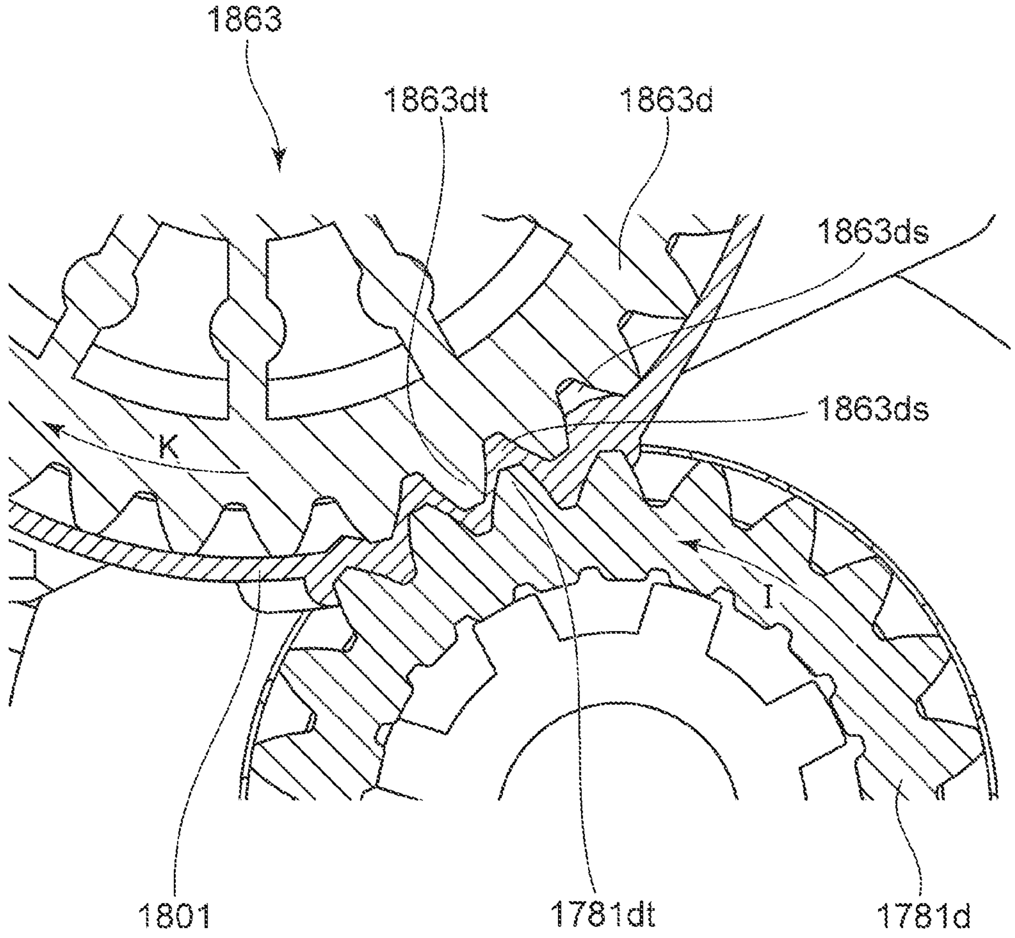
FIG. 62 is a cross-sectional view of a second gear portion and a second main assembly gear portion.

FIG. 61 is a partial perspective view of the drum unit 1869 in the neighborhood of the driving side flange 1863. FIG. 62 is a cross-sectional view of the second gear portion 1863*d* and the second main assembly gear portion 1881*d*, and the cross-sectional plane thereof is perpendicular to the rotational axis L1.

The driving side flange 1863 has the same shape as the driving side flange 1763 of embodiment 17. In this embodiment, the elastic ring 1801, which is the ring-shaped elastic member which can be elastically deformed, is provided so as to cover the entire outer or a part of the outer circumference of the second gear portion (second unit side gear portion) 1863*d*.

The elastic ring 1801 is a thin film rubber or sponge, and the thickness is preferably about 0.01 to 1 mm for rubber such as nitrile rubber and about 1 to 6 mm for sponge. Further, it is desirable that the inner diameter of the elastic ring before being mounted to the driving side flange 1863 is about 0.5 to 0.9 times the outer diameter of the second gear portion 1863*d*. In this embodiment, the outer diameter of the second gear portion 1863*d* is Φ20 mm, and an inner diameter of the elastic ring 1801 is Φ14 mm. When the outer diameter of the second gear portion 1863*d* is Φ20 mm, it is desirable that the inner diameter of the elastic ring 1801 is appropriately selected in the range of Φ10 mm to 18 mm, which is slightly smaller than Φ20 mm. If it is larger than Φ18 mm, it may disengage from the second gear portion 1863*d*, and if it is smaller than Φ10 mm, the force tightening the second gear portion 1863*d* is so strong that the second gear portion 1863*d* may be deformed.

As shown in FIG. 62, when the cartridge B is mounted to the apparatus main assembly A, the elastic ring 1801 is elastically deformed so as to follow the shapes of the second helical tooth 1863*dt* of the second gear portion 1863*d* and the second helical tooth 1781*dt* of the drive transmission gear 81, so that the second gear portion 1863*d* and the second main assembly gear portion 1781*d* are in meshing engagement with each other by way of the elastic ring 1801. Further, the first gear portion (first unit side gear portion) 1863*c* meshes with the first main assembly gear portion 1781*c*.

When the drive transmission gear 1781 rotates in the direction of the arrow I, a force is transmitted to the second gear portion 1863*d* from the second main assembly gear portion 1781*d* by way of the elastic ring 1801. Therefore, the second gear portion 1863*d* provides the same function as the second gear portion 1763*d* of embodiment 17. That is, when the drive transmission gear 1781 rotates in the arrow I direction, there is no backlash (backlash) in the rotational direction (I direction) between the driving side flange 1863 and the drive transmission gear 1781, that is, the backlash-less state results, as in the case of embodiment 17.

The elastic ring 1801 may be provided, at an inner peripheral portion of the driving side flange 1863, with a plurality of projections projecting in the direction toward the rotational axis L1 to fill the plurality of gaps 1863*ds* of the plurality of second helical teeth 1863*dt* of the second gear portion 1863*d* in a state in which the cartridge B is not in contact with the drive transmission gear 1781 such as before mounting the cartridge B to the apparatus main assembly A.

Further, in this embodiment, the elastic ring 1801 is provided on the outer periphery of the second gear portion 1863*d*, but the elastic ring 1801 may be provided on the entire or a part of the outer circumference of the first gear portion 1863*c*, or on the entire or parts of the outer circumferences of both of the second gear portion 1863*d* and the first gear portion 1863*c*. Also in these cases, the force is transmitted between the tooth surfaces of the respective gears by way of the elastic ring 1801. Therefore, the first gear portion 1863*c* and the second gear portion 1863*d* provide the same functions as the first gear portion 1763*c* and the second gear portion 1763*d* of the embodiment 17. In other words, when the drive transmission gear 1781 rotates in the arrow I direction, there is no backlash (backlash) in the rotational direction (I direction) between the driving side flange 1863 and the drive transmission gear 1781, that is, a backlash-less state results.

Further, the driving side flange 1863 has the same shape as the driving side flange 1763 of embodiment 17, but the addendum shape of the gear and the size of the gear may be appropriately changed in consideration of the thickness of the elastic ring 1801 and the like.

As described above, according to this embodiment, the same effect as that of embodiment 17 can be obtained. Further, the elements of each of the above-described embodiments can be applied to the structure of this embodiment. In particular, the structures of the first helical tooth (first projection) 1863*ct* of the first gear portion 1863*c* of the driving side flange 1863 and the second helical tooth (second projection) 1863*dt* of the second gear portion 1863*d* may be modified to use the helical teeth, the spur teeth, the projections and the like of Embodiment 2, 3, 4, 5, 6, 10, 11, 12, 13, 14, or 16.

Embodiment 19

In this embodiment, as compared with Embodiment 17, the difference is that the rotational axis (L19, and so on) of the first gear portion (external tooth gear portion 1902*b*, and so on) which receives the driving force FD and the rotational axis (L1) of the second gear portion (1963*d*) which receives the regulatory force FB are not coaxial but parallel. The other points are the same as in the embodiment 17, and the detailed description thereof will be omitted. In addition, among the elements in this embodiment, the elements corresponding to the elements of Embodiment 1 are assigned the reference numerals associated with the corresponding elements of Embodiment 1. Regarding these elements, the matters not specifically explained are the same as the corresponding elements of Embodiment 1.

<Drum Unit 1969>

Figure 63:
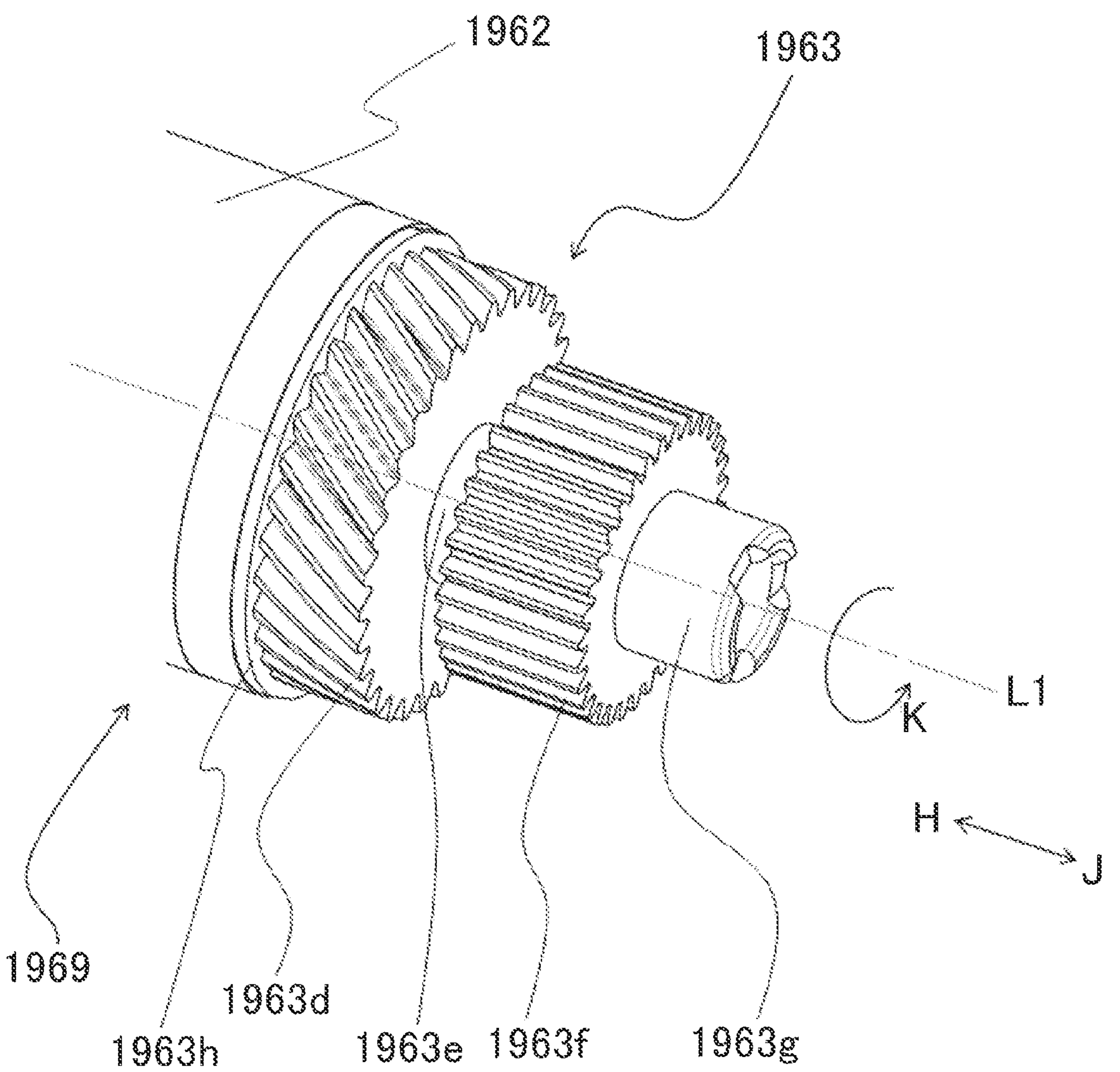
FIG. 63 is a partial perspective view of the drum unit.
Figure 65:
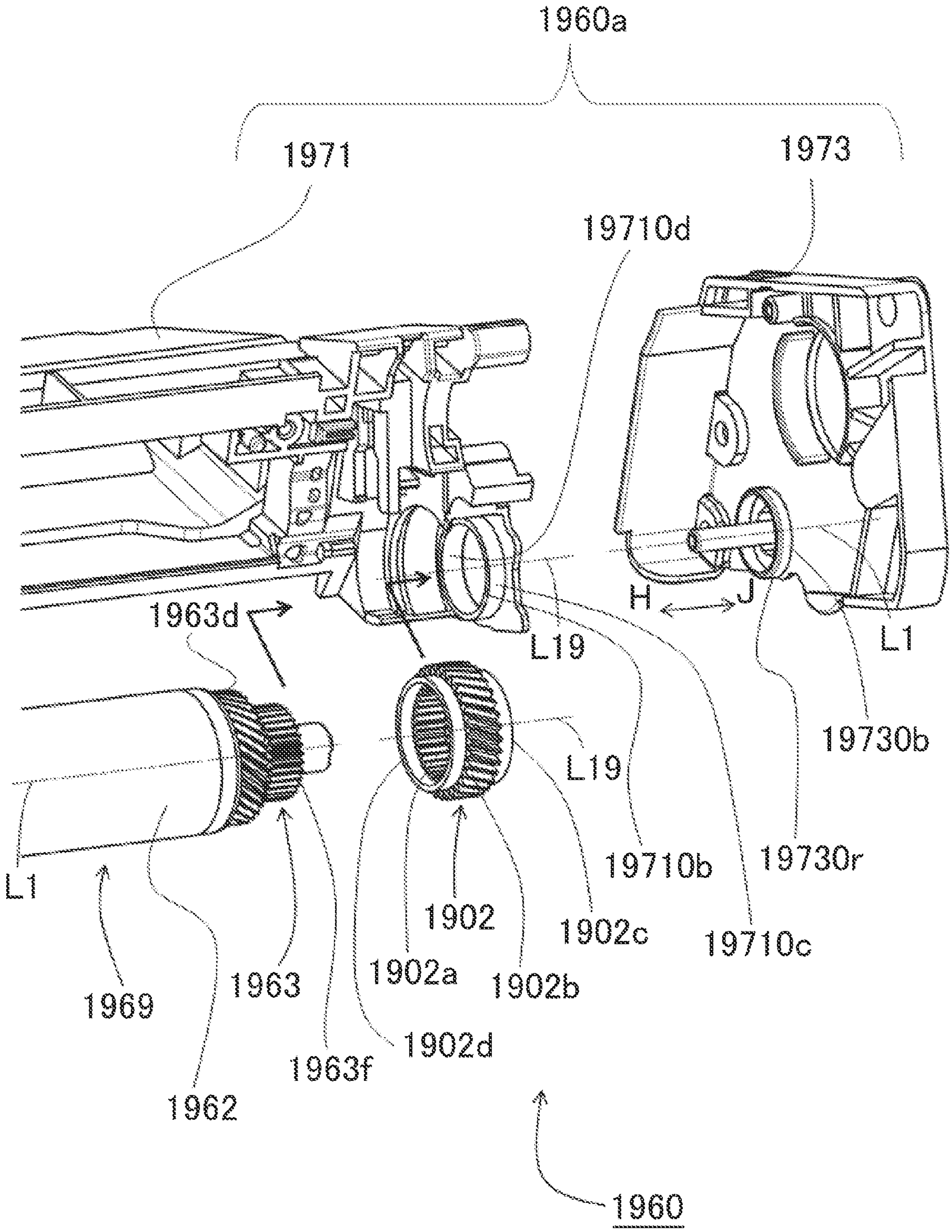
FIG. 65 is an exploded perspective view of the cleaning unit.

FIG. 63 is a partial perspective view of the drum unit 1969. As shown in FIG. 63, the driving side flange 1963 of the drum unit 1969 includes an internal gear portion 1963*f*, a second gear portion 1963*d*, a projection 1963*g*, a small diameter portion 1963*e*, and a flange portion 1963*h* with the drum rotational axis L1 as the center. The internal gear portion 1963*f* is a spur tooth gear. The drum unit 1969 further includes a gear 1902, which will be described in detail hereinafter (FIG. 65 and the like). The gear 1902 includes an external tooth gear portion 1902*b* as a first gear portion and an internal tooth gear portion 1902*a* which meshes with the internal gear portion 1963*f*.

The projection 1963*g* has a generally cylindrical shape, and is provided so as to project from the internal gear portion 1963*f* in the direction opposite to the drum 1962 side (downstream side with respect to the J direction) along the drum rotational axis L1. The small diameter portion (cylindrical portion) 1963*e* has a generally cylindrical shape, and is provided so as to project beyond the internal gear portion 1963*f* toward the drum side (downstream side in the H direction) 1962 along the drum rotational axis L1. The second gear portion 1963*d* is an helical tooth having a helix angle $\alpha$2 as in embodiment 17, and is provided on the drum 1962 side (downstream side in the H direction) of the small diameter portion 1963*e*. The flange portion 1963*h* has a thin disk shape having a diameter equal to or larger than the diameter of the drum 1962, and is provided on the drum 1962 side (downstream side in the H direction) of the second gear portion 1963*d*.

<Support Structure for Drum Unit 1969>

Next, referring to FIGS. 64, 65, 66, and 67, the structure for supporting the drum unit 1969 will be described.

Figure 64:
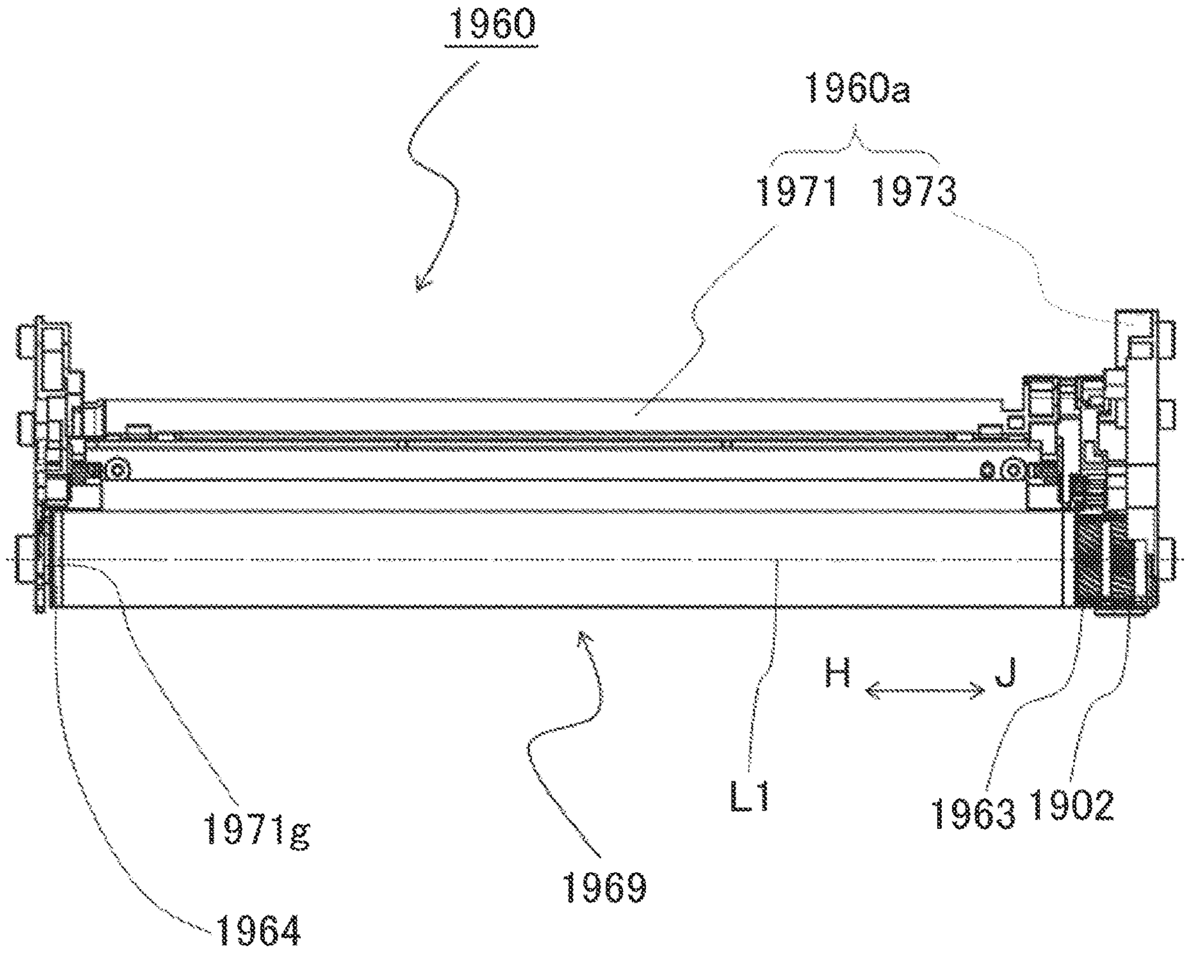
FIG. 64 is a side view of the cleaning unit.
Figure 66:
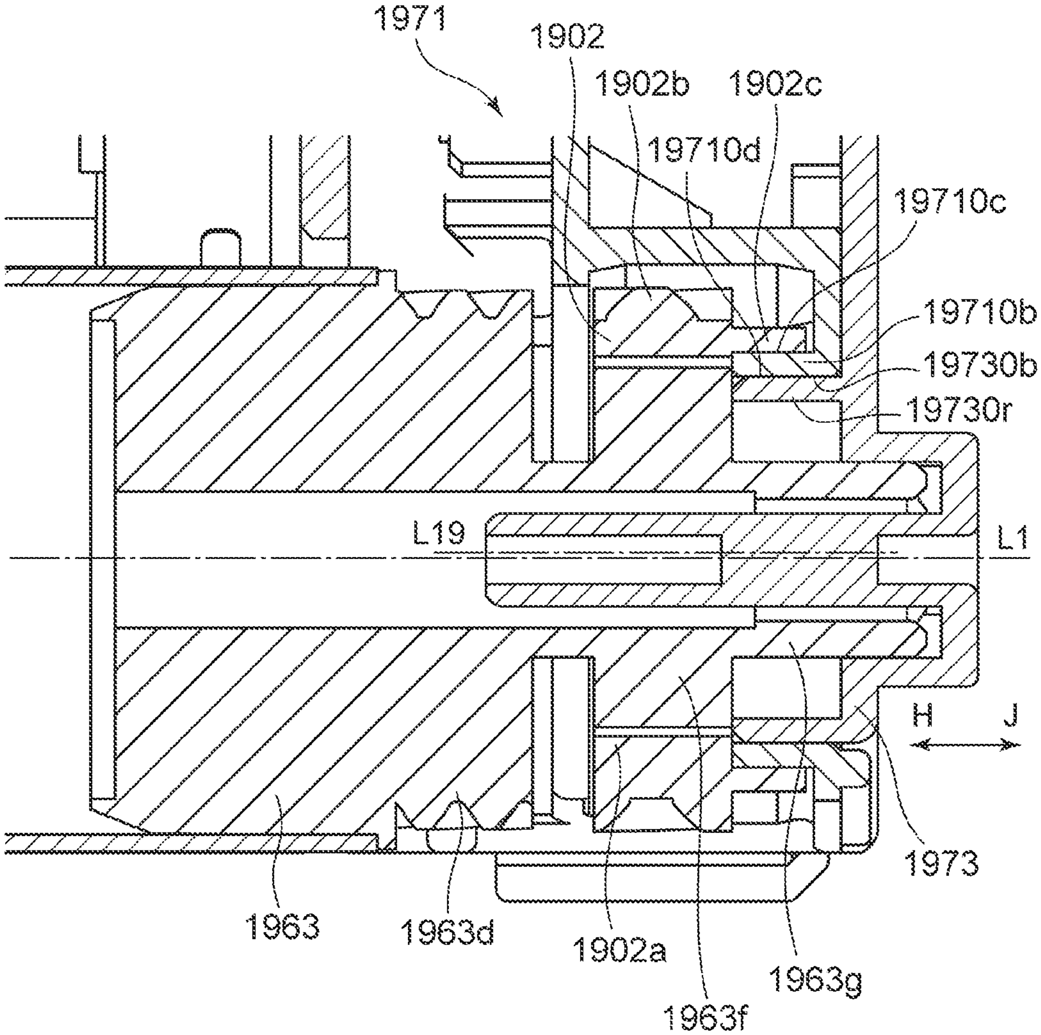
FIG. 66 is a partial sectional view of the cleaning unit.
Figure 67:
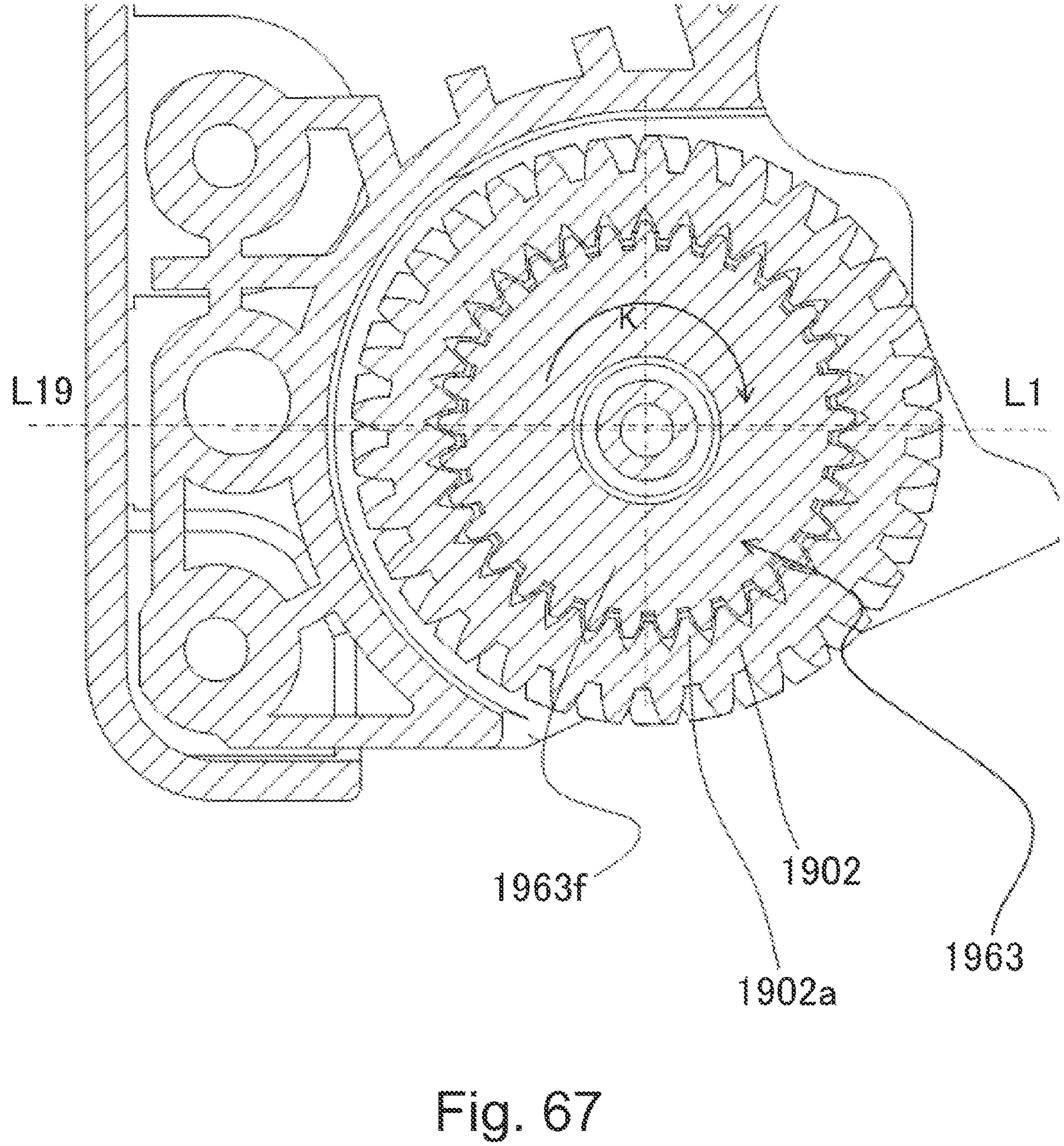
FIG. 67 is a partial cross-sectional view of the cleaning unit.

FIG. 64 is a side view (viewed in a direction perpendicular to the rotational axis L1) of the cleaning unit 1960 to which the drum unit 1969 is mounted. FIG. 65 is an exploded perspective view of a driving side portion of the cleaning unit 1960. FIG. 66 is a partial sectional view of the cleaning unit 1960 in the neighborhood of the driving side flange 1963, and the sectional plane thereof includes the rotational axis L1. FIG. 67 is a partial cross-sectional view of the cleaning unit 1960, which is a cross-section, as viewed along the J direction, of perpendicular to the rotational axis L1 and passing through the internal gear portion 1963*f*.

As shown in FIG. 64, the cleaning frame 1960*a* of the cleaning unit 1960 supports the drum unit 1969. The cleaning frame 1960*a* of the cleaning unit 1960 comprises a frame member 1971 and a drum bearing member 1973. The cleaning frame 1971 is provided with a drum sliding portion 1971*g*.

The driving side flange 1963 is rotatably supported by the drum bearing member 1973 in the same manner as in embodiment 17. Similarly to that described in Embodiment 17, when the drive transmission gear 1781 rotates in a predetermined direction after the driving side flange 1963 of the drum unit 1969 engages with the drive transmission gear 1781, the driving side flange 1963 rotates in interrelation with the drive transmission gear 1781, and as described above, and a thrust force in the H direction is produced in the drum unit 1969. By this thrust force, the non-driving side flange 1964 and the drum sliding portion 1971*g* are brought into contact with each other, and the movement of the drum unit 1969 in the H direction is restricted.

As shown in FIG. 65, the bearing member 1973 is supported by the frame member 1971. In the frame member 1971, a cylindrical portion 19710*b*, which is a positioning portion relative to the bearing member 1973, is provided so as to project toward the drum unit 1969 side. In the bearing member 1973, a cylindrical portion 19730*r*, which is a positioning portion relative to the frame member 1971, is provided so as to project toward the drum unit 1969 side.

The inner peripheral surface 19710*d* of the cylindrical portion 19710*b* is formed in an arc shape, and is provided at such a position that the center of the arc is on the drum rotational axis L1. In addition, the outer peripheral surface 19730*b* of the cylindrical portion 19730*r* is formed in an arc shape, and is provided at such a position that the center of the arc is on the drum rotational axis L1. On the other hand, the outer peripheral surface 19710*c* of the cylindrical portion 19710*b* is formed in the shape of an arc surface, but the central axis L19 of the arc surface (coaxial with the rotational axis L19 of the gear 1902) is provided, in parallelism with but not coaxial with the drum rotational axis L1. In other words, the outer peripheral surface 19710*c* of the cylindrical portion 19710*b* is provided at a position eccentric with respect to the inner peripheral surface 19710*d*.

The outer peripheral surface 19710*c* of the cylindrical portion 19710*b* rotatably supports the gear 1902 about the rotational axis L19. The gear 1902 has a generally cylindrical shape and includes, coaxially with the rotational axis L19 of the cylinder, the internal tooth gear portion 1902*a* on the inner peripheral side, and the external tooth gear portion 1902*b* as the first gear portion (first unit side gear portion) on the outer peripheral side. The internal tooth gear portion 1902*a* is a flat tooth, and the external tooth gear portion 1902*b* is an helical tooth having a helix angle $\alpha$1, and has the same the number of teeth as that of the second gear portion (second unit side gear portion) 1963*d* of the driving side flange 1963. In addition, a support portion 1902*c* is provided on one end side of the gear 1902, and a cylindrical portion 1902*d* is provided on the other end side. The support portion 1902*c* has a generally cylindrical shape, and is provided along the rotational axis L19 so as to project beyond the external tooth gear portion 1902*b* and the internal tooth gear portion 1902*a* in the direction away from the drum 1962 (downstream side in the J direction). The cylindrical portion 1902*d* has a generally cylindrical shape, and is provided along the rotational axis L19 so as to project beyond the external tooth gear portion 1902*b* and the internal tooth gear portion 1902*a* toward the drum 1962 side (downstream side in the H direction).

As shown in FIG. 66, the inner peripheral surface (supported portion) of the support portion 1902*c* engages with the outer peripheral surface 19710*c* of the cylindrical portion 19710*b*, and the gear 1902 is supported on the frame member 1971 rotatably about the rotational axis L19. In addition, the outer peripheral surface 19730*b* of the cylindrical portion 19730*r* engages with the inner peripheral surface 19710*d* of the cylindrical portion 19710*b*, and the bearing member 1973 is positioned and supported by the frame member 1971. The driving side flange 1963 penetrates the inner peripheral portion of the gear 1902 and is provided on the cleaning frame 1960*a*. In the driving side flange 1963, the projection 1963*g* is rotatably supported by the bearing member 1973 on the rotational axis L1 as with the case of the embodiment 17.

Further, as shown in FIG. 67, the internal gear portion 1963*f* of the driving side flange 1963 is a spur gear and has the same number of teeth as the internal gear portion 1902*a* of the gear 1902. The internal gear portion 1902*a* of the gear 1902 is provided so as to be fitted into the internal gear portion 1963*f*, and the tooth surfaces of the internal tooth gear portion 1902*a* and the internal gear portion 1963*f* engage with each other in the rotational direction. That is, the internal gear portion 1902*a* and the internal gear portion 1963*f* are in meshing engagement with each other so as to be able to transmit the rotational driving force.

As described above, the outer peripheral surface 19710*c* of the cylindrical portion 19710*b* of the frame member 1971 is provided at a position eccentric with respect to the inner peripheral surface 19710*d*. Therefore, the gear 1902 supported by the outer peripheral surface 19710*c* is engaged with the inner peripheral surface 19710*d* at an eccentric position with respect to the driving side flange 1963 supported by way of the bearing member 1973. That is, the gear 1902 and the driving side flange 1963 are rotatably arranged in a state that the rotational axis L19 and the rotational axis L1 are parallel and non-coaxial with each other, and the rotation driving force can be transmitted to each other. In FIG. 67, the positions of the rotational axis L19 and the rotational axis L1 are shown by the intersections between horizontal chain lines extend in left-right direction and a vertical line extending vertically, and the difference between the horizontal line corresponding to the rotational axis L19 and the horizontal line corresponding to the rotational axis L1 can be seen. In addition, the gear 1902 can also be referred to as a non-coaxial rotating member connected to the driving side flange 1963 so as to be able to transmit a driving force.

<Transmission of Driving Force to Drum Unit 1969>

Figure 68:
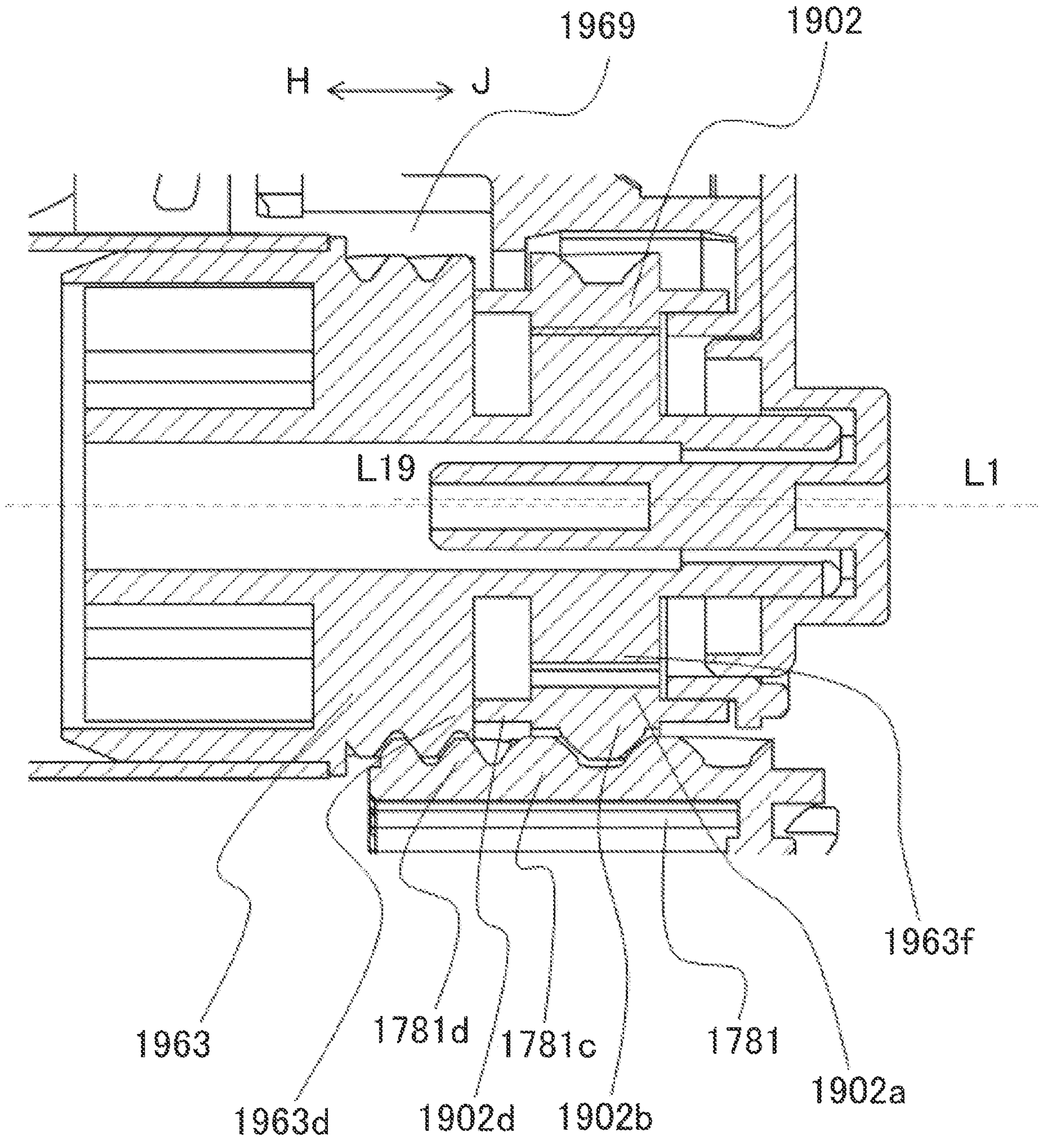
FIG. 68 is a sectional view illustrating an engaged state between the drum unit and the drive transmission gear.
Figure 69:
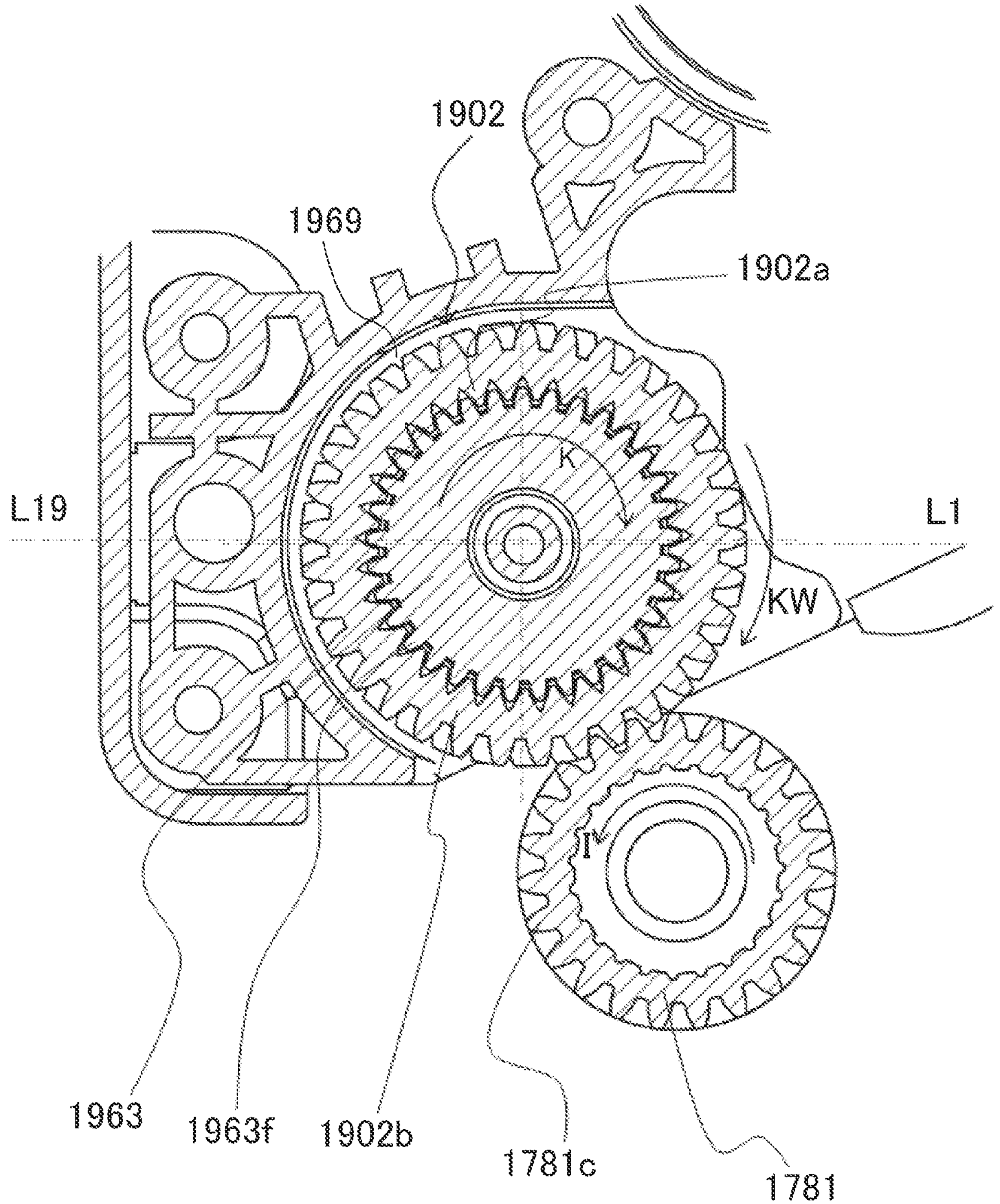
FIG. 69 is a cross-sectional view illustrating an engaged state between the drum unit and the drive transmission gear.

Next, referring to FIGS. 68 and 69, the driving force transmission to the drum unit 1969 will be described. FIG. 68 is a sectional view illustrating an engaged state between the drum unit 1969 and the drive transmission gear 1781, and the sectional plane thereof includes the rotational axis L1. FIG. 69 is a cross-sectional view illustrating the engaged state between the drum unit 1969 and the drive transmission gear 1781, taken along a plane perpendicular to the rotational axis L1 and passing through the internal gear portion 1963*f* the J direction of a cross-section, as viewed in the J direction.

As shown in FIG. 68, as in embodiment 17, the second main assembly gear portion 81*d* of the drive transmission gear 1781 meshes with the second gear portion 1963*d* of the driving side flange 1963. In addition, the first main assembly gear portion 1781*c* of the drive transmission gear 1781 meshes with the external tooth gear portion (first gear portion) 1902*b* of the gear 1902, and the internal gear portion 1902*a* of the gear 1902 engages with the internal gear portion 1963*f* of the driving side flange 1963.

As shown in FIG. 69, by rotation of the drive transmission gear 1781 in the direction of the arrow I, the gear 1902 receives the driving force by the meshing engagement between the external tooth gear portion 1902*b* and the first main assembly gear portion 1781*c*, so that the gear 1902 rotates in the direction of the arrow KW about the rotational axis L19. At this time, the internal gear portion 1902*a* engages with the internal gear portion 1963*f* of the driving side flange 1963 in the rotational direction, and transmits the driving force to the driving side flange 1963. By this, the driving side flange 1963 rotates in the direction of arrow K about the rotational axis L1.

By the rotation of the drive transmission gear 1781 in the direction of arrow I, the external tooth gear portion 1902*b* receives a thrust force in the direction of arrow H (see FIG. 68) because of the meshing with the first main assembly gear portion 1781*c*. For this reason, as shown in FIG. 68, the gear 1902 moves in the arrow H direction, the cylindrical portion 1902*d* abuts to the end surface of the second gear portion 1963*d* of the driving side flange 1963, and the movement of the gear 1902 in the arrow H direction is restricted (stopped).

On the other hand, the drive transmission gear 1781 receives a thrust force due to meshing with the external tooth gear portion 1902*b* and moves in the direction of arrow J. Then, similarly to embodiment 17, the second main assembly gear portion 1781*d* moves to the balanced position where it engages with the second gear portion 1963*d* of the driving side flange 1963, and the movement in the direction of the rotational axis L1 stops.

In this balanced state, the external tooth gear portion (first gear portion) 1902*b* receives the driving force FD from the first main assembly gear portion 1781*c*. The gear 1902 can be regarded as a rigid assembly, and therefore, this driving force FD is transmitted to the driving side flange 1963 by the meshing (engagement) between the internal gear portion 1902*a* and the internal gear portion 1963*f*. That is, the driving side flange 1963 is in a state of receiving the drive force FD by way of the gear 1902. In addition, the driving side flange 1963 is in a state that the second gear portion 1963*d* receives the restriction force (braking force) FB from the second main assembly gear portion 1781*d*. The teeth of the second gear portion 1963*d* are fixed so as not to move (rotate) in the direction opposite to the I direction relative to the teeth of the first gear portion 1902*b*. Therefore, the drum unit 1969 (drum 1962, driving side flange 1963, and gear 1902) is driven in a backlashless state. For this reason, the same effect as that of Embodiment 17 can be provided also when the structure of this Embodiment is used.

Immediately after the start of rotation of the drive transmission gear 1781, the driving side flange 1963 may rotate in the K direction due to the engagement between the second gear portion 1963*d* and the second main assembly gear portion 1781*d*, and the gear 1902 may be rotated in the KW direction due to the engagement between the internal gear portion 1902*a* and the internal gear portion 1963*f*. Also in this case, in the process of the drive transmission gear 1781 moving in the J direction, the first main assembly gear portion 1781*c* is brought into meshing engagement with the external tooth gear portion 1902*b*, and finally reaches the above-mentioned balanced state.

As described above, in this embodiment, the rotational axis L19 of the external gear portion 1902*b* (first gear portion) and the rotational axis L1 of the second gear portion 1963*d* are not coaxial but parallel, relative to each other. Then, in the balanced state, the gear 1902 has the following portions (i) to (iii). (i) input portion: At least a portion of the external gear portion 1902*b* which meshes with the drive transmission gear 1781 (at least a part of the first gear portion), (ii) transmission portion: such a part of the internal gear portion 1902*a* as meshes with the internal gear portion 1963*f* to transmit the driving force to the driving side flange 1963, (iii) output portion: a part between the input portion (i) and the output portion (ii). Since the portions (i) to (iii) of the gear are substantially rigid bodies in the K direction, they move integrally along the K direction. Therefore, in the balanced state, the portions (i) to (iii) of the gear 1902 and the second gear portion 1963*d* of the driving side flange 1963 are integrally moves in the K direction (rotational direction about the rotational axis L1). For this reason, a force corresponding to the driving force FD and the restricting force FB act on the driving side flange 1963, so that the driving in the backlashless state is accomplished, and the same effect as that of the driving embodiment 17 can be provided. In addition, this can be done as long as the first gear portion which receives the driving force FD, a rotational axis thereof and the second gear portion which receives the restricting force FB can move integrally in the K direction in the balanced state, as described above, and it is understood that the first gear portion and the second gear portion do not have to be fixed integrally to the driving side flange 1963 at all times as in embodiments 1-8.

Further, this embodiment is an example of a structure in which the rotational axis of the first gear portion which receives the driving force FD and the rotational axis of the second gear portion which receives the restricting force FB are not coaxial. That is, while the rotational axis of the second gear portion (1963*d*) which receives the restricting force FB is coaxial with the rotational axis (L1) of the driving side flange (1963), the rotational axis of the first gear portion (1902*b*) which receives the drive force FD is not coaxial with the rotational axis (L1) of the driving side flange (1963). Specifically, the first gear portion (1902*b*) is provided on the gear 1902 as a non-coaxial rotating member connected to the driving side flange 1963 so as to be able to transmit the driving force. However, the structure in which the rotational axis of the first gear portion which receives the driving force FD and the rotational axis of the second gear portion which receives the restricting force FB are not coaxial is not limited to such an example.

As another example, the rotational axis of the first gear portion which receives the driving force FD is coaxial with the rotational axis of the driving side flange, and the rotational axis of the second gear portion which receives the restricting force FB may not be coaxial with the rotational axis of the driving side flange. With such a case of the structure, specifically, the first gear portion is provided on the driving side flange, and the second gear portion is provided on the non-coaxial rotating member connected to the driving side flange for drive force transmission. As a more specific example of the structure, in the driving side flange 1763 of Embodiment 17, the first gear portion 1763*c* is employed as it is, and the gear 1902 provided with the second gear portion is provided in place of the second gear portion 1763*d* in the same manner as in this embodiment.

As a further example, the rotational axis of the first gear portion which receives the driving force FD, the rotational axis of the second gear portion which receives the restricting force FB, and the rotational axis of the driving side flange may not be coaxial one another. In the case of such a structure, specifically, the first gear portion is provided on the first non-coaxial rotating member connected to the driving side flange for driving force transmission, and the second gear portion is provided on the second non-coaxial rotating member which is connected to the driving side flange for driving force transmission and rotates non-coaxially with the non-coaxial rotating member. As a more specific example of this structure, in the driving side flange 1763 of embodiment 17, the gear 1902 provided with the first gear portion is provided place of the first gear portion 1763*c* in the same manner as in this embodiment, and the gear 1902 provided with the second gear portion is provided in place of the second gear portion 1763*d* in the same manner as in this embodiment.

The connection structure capable of transmitting the driving force between the driving side flange 1963 and the non-coaxial rotating member (gear 1902) is not limited to such a spur gear meshing structure as the internal tooth gear portion 1902*a* and the internal gear portion 1963*f*. For example, the connection structure may be such that the driving force can be transmitted by the helical tooth gear or a plurality of projections arranged in the circumferential direction. In addition, a non-coaxial driving force transmission joint such as an Oldham joint (detailed in Modified Example 2 of Embodiment 19) may be used as a connection structure capable of transmitting the driving force between the driving side flange 1963 and the non-coaxial rotating member (gear 1902).

Modified Example 1 of Embodiment 19

Figure 70:
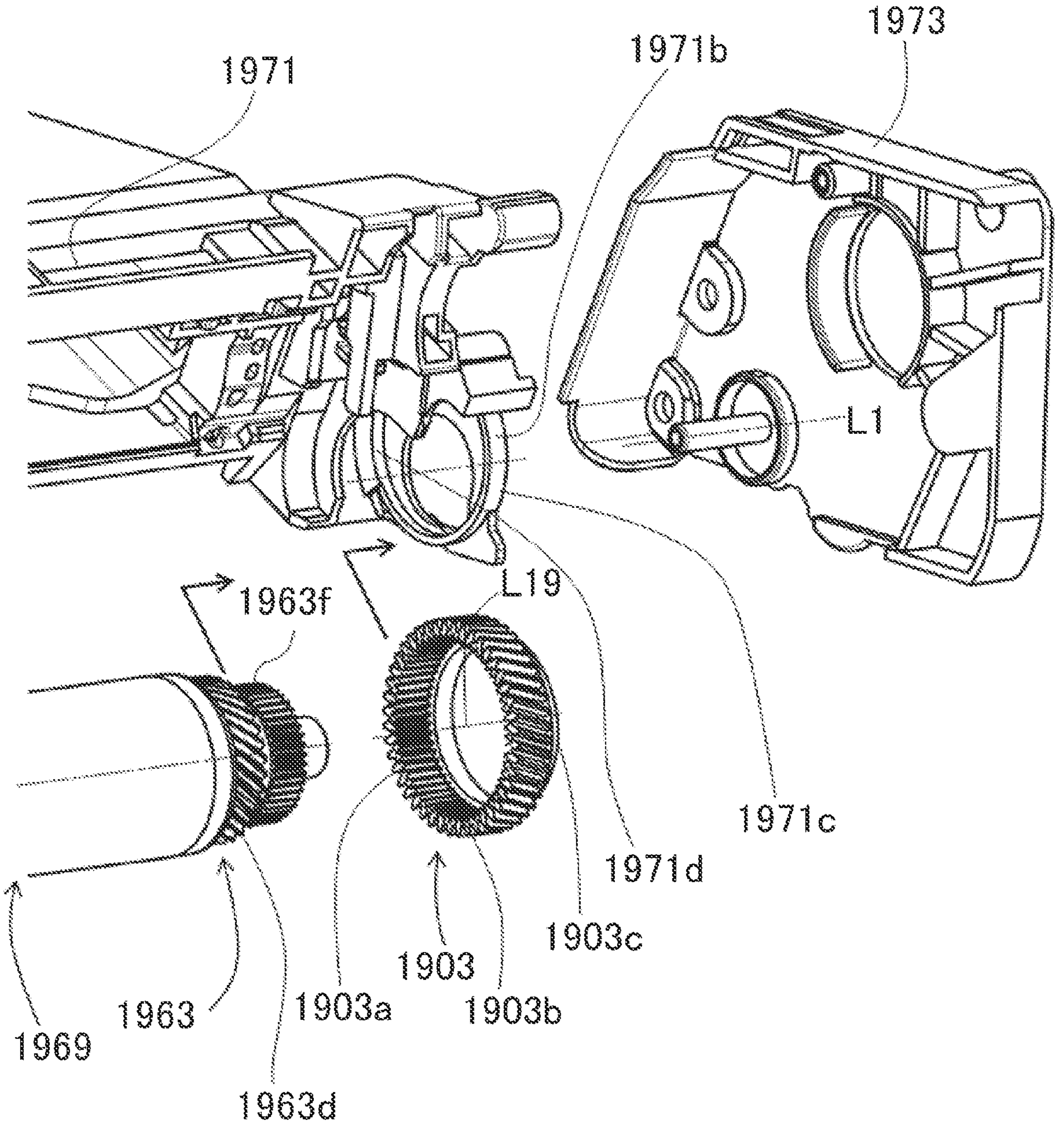
FIG. 70 is an exploded perspective view of the cleaning unit.
Figure 71:
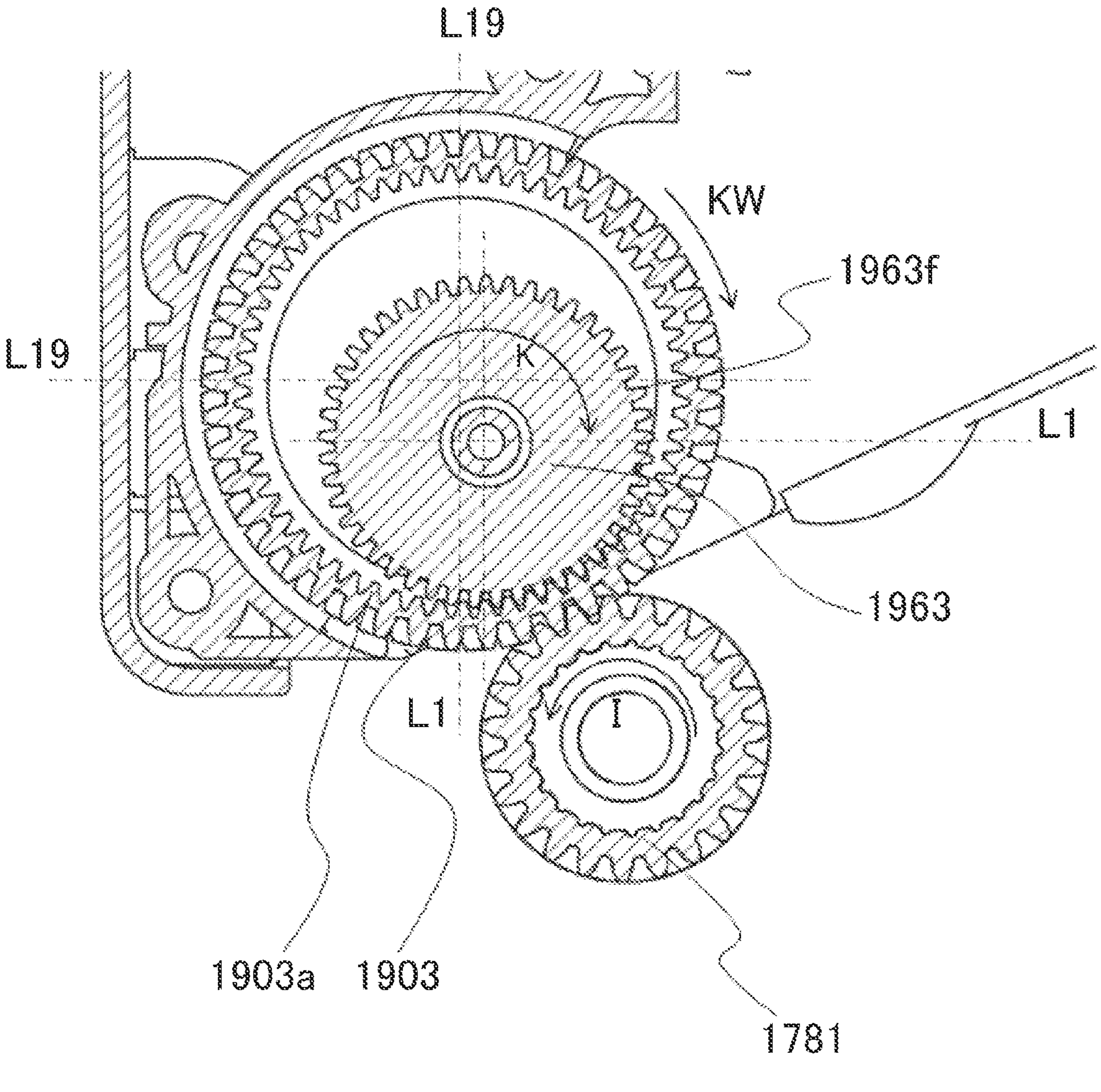
FIG. 71 is a cross-sectional view illustrating an engaged state between the drum unit and the drive transmission gear.

In above-described Embodiment 19, the internal gear portion 1963*f* of the driving side flange 1963 and the internal gear portion 1902*a* of the gear 1902 have the same number of teeth and rotate integrally, but in this Modified Example, the rotational speeds of the driving side flange 1963 and the gear 1902 are different from each other. FIG. 70 is an exploded perspective view of the driving side portion of the cleaning unit 1960. FIG. 71 is a cross-sectional view illustrating an engaged state between the drum unit 1969 and the drive transmission gear 1781 taken along a cross-sectional plane perpendicular to the rotational axis L1 and passing through the internal gear portion 1963*f*, as viewed in the J direction.

In place of the gear 1902 having the above-described structure, a gear 1903 is provided as a non-coaxial rotating member, and in place of the driving side flange 1963, the driving side flange 1963 is provided. Similarly to the structure described above, the gear 1903 is rotatably supported by the outer peripheral surface 1971*c* of the cylindrical portion 1971*b* of the cleaning frame 1971, and the driving side flange 1963 is rotatably supported by the bearing member 1973 through the gear 1903.

As shown in FIG. 71, the internal gear portion 1903*a* of the gear 1903 has a large structure with respect to the first gear portion 1963*c* of the driving side flange 1963, and is more eccentric than that in the above-described structure. In FIG. 71, the positions of the rotational axis L19 and the rotational axis L1 are indicated by intersections between horizontal chain lines and vertical chain lines.

In the balanced state, at least such a part of the gear 1903 as meshes with the drive transmission gear 1781 of the external tooth gear portion 1903*b* (at least a part of the first gear portion) and the second gear portion 1963*d* move integrally in the rotational direction about the rotational axis L1. Therefore, the same effect as that of Embodiment 19 described above can be provided.

In this embodiment, the first gear portion 1963*c* of the driving side flange 1963 and the internal tooth gear portion 1903*a* of the gear 1903 are spur tooth gears, but helical gears may be employed if the structure permits the eccentricity.

Modified Example 2 of Embodiment 19

Figure 72:
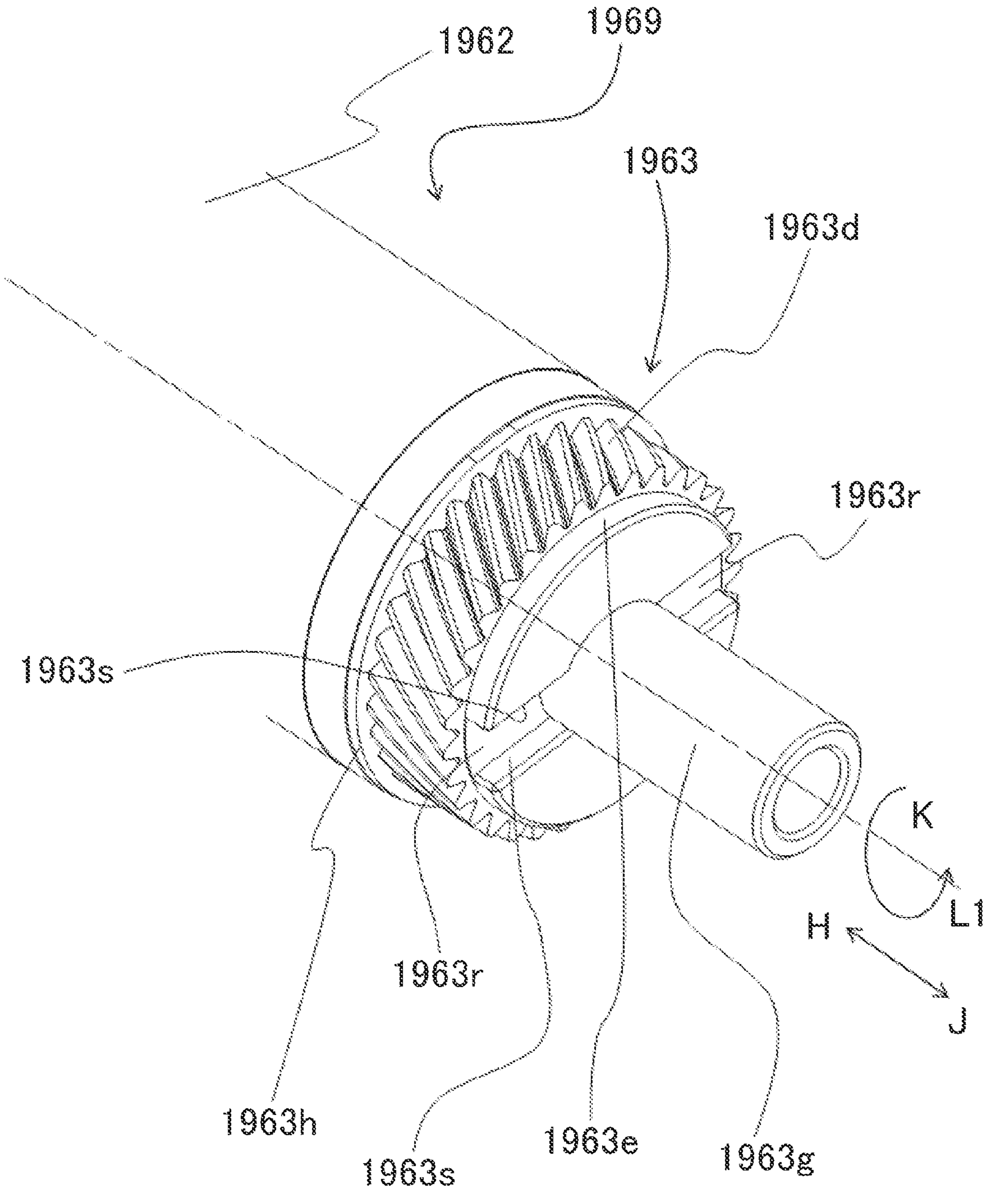
FIG. 72 is a partial perspective view of the drum unit.

A structure using an Oldham joint as a driving force transmission structure between the non-coaxial rotating member and the driving side flange 1963 will be described. FIG. 72 is a partial perspective view of the drum unit 1969. As shown in FIG. 72, the driving side flange 1963 includes a gear portion 1963*d*, a projection 1963*g*, a small diameter portion 1963*e*, and a flange portion 1963*h* which are provided centered on the drum rotational axis L1.

The small diameter portion 1963*e* has a substantially cylindrical shape, and is provided projected from the gear portion 1963*c* on the side opposite from the drum 1962 (downstream side in the J direction) along the drum rotational axis L1. The small diameter portion 1963*e* is provided with a recess 1963*r* recessed toward the drum 1962 side (downstream side in the H direction). A side surface portion 1963*s* of the recess 1963*r* has a planar shape parallel to the direction of the drum rotational axis L1, and are arranged at equal intervals with the drum rotational axis L1 interposed therebetween. Further, the recesses 1963*r* are provided at two positions symmetrically with the small diameter portion 1963*g* interposed therebetween in the direction perpendicular to the drum rotational axis L1.

The projection 1963*g* has a cylindrical shape and is provided so as to project from the small diameter portion 1963*e* in the direction away from the drum 1962 (downstream in the J direction) along the drum rotational axis L1. The flange portion 1963*h* has a thin disk shape having a diameter equal to or larger than the diameter of the drum 1962, and is provided on the drum 1962 side (downstream side in the H direction) of the gear portion 1963*d*. The gear portion 1963*d* is an helical tooth having a helix angle $\alpha$2, as in embodiment 17.

Further, the drum unit 1969 includes a gear 1904 having a gear portion 1904*c* as a first gear portion, which will be described in detail hereinafter, and a driven coupling 1905.

Figure 73:
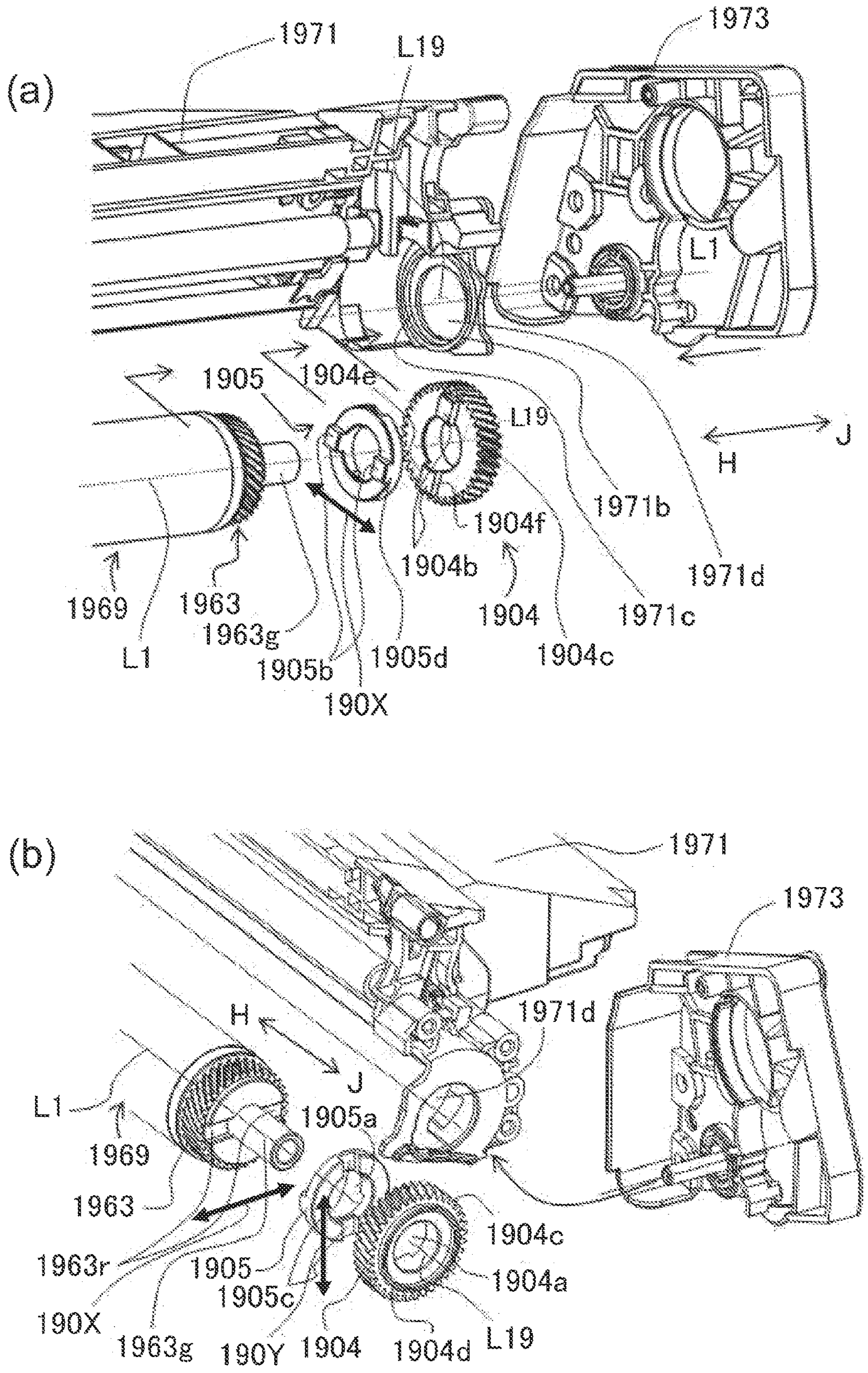
FIG. 73 is exploded perspective views of the cleaning unit.

Next, referring to FIG. 73, the structure of the cleaning unit will be described. FIG. 73 is an exploded perspective view of a driving side of the cleaning unit, wherein part (a) is a view as seen from the driving side toward the non-driving side, and part (b) is a view as seen from the non-driving side toward the driving side. As shown in part (a) of FIG. 73 and part (b) of FIG. 73, the bearing member 1973 is supported by the frame member 1971. A hole 1971*d* is a positioning portion with the bearing member 1973, and is provided on the side surface of the frame member 1971, wherein the hole 1971*d* is formed in an arc shape, and the center of the arc is provided in alignment with a position corresponding to the drum rotational axis L1. In addition, the frame member 1971 is provided with the cylindrical portion 1971*b* projecting downstream in the H direction. The inner peripheral surface 1971*c* of the cylindrical portion 1971*b* has an arcuate shape, and the center line L19 of the arcuate surface is provided at a position not coaxial with the drum rotational axis L1 but parallel to it. In other words, the hole 1971*d* is provided at a position eccentric with respect to the inner peripheral surface 1971*c*.

A gear 1904 as a non-coaxial rotating member is rotatably supported on the inner peripheral surface 1971*c* of the cylindrical portion 1971*b*. The gear 1904 has a substantially cylindrical shape, and is provided with a through hole 1904*a*, a gear portion 1904*c* as a first gear portion on the outer circumference, and a cylindrical portion 1904*d* coaxially with the axis of the cylinder as the center. The gear portion 1904*c* is an helical tooth having a helix angle $\alpha$1. From the side surface of the gear 1904, the projection 1904*b* is provided so as to project downstream in the H direction.

When the rotational axis of the gear 1904 is the gear rotational axis L19, the side surface portions 1904*e* and 1904*f* of the projections 1904*b* have planar shapes parallel to the direction of the gear rotational axis L19, and are positioned at equal intervals across the gear rotational axis L19. In addition, the projection 1904*b* has an arc shape which does not project beyond a tooth bottom portion of the gear portion 1904*c* in the radial direction with respect to the rotational axis L1. Further, the projection 1904*b* is provided at each of two positions symmetrical with respect to the through hole 1904*a* interposed therebetween in the direction perpendicular to the gear rotational axis 1901. The cylindrical portion 1904*d* projects downstream in the J direction. The gear 1904 is rotatably supported by the frame member 1971 by fitting the cylindrical portion 1904*d* into the inner peripheral surface 1971*c* of the cylindrical portion 1971*b* of the frame member 1971.

A driven coupling 1905 is installed on the downstream side of the gear 1904 in the H direction. The driven coupling 1905 has a generally cylindrical shape, and is coaxially provided with a through hole 1905*a* and a cylindrical portion 1905*d* around a cylindrical axis. A projection 1905*b* is provided on the downstream side of the cylindrical portion 1905*d* in the H direction so as to project downstream in the H direction. In addition, a recess 1905*c* is provided on the downstream side of the cylindrical portion 1905*d* in the J direction and is recessed toward the downstream side in the H direction. The projection 1905*b* has parallel surfaces which are spaced by a distance equal to the distance between the side surface portions 1963*s* of the recess portion 1963*r* with the cylindrical axis as the center, and the recess portion 1905*c* has parallel surfaces which are spaced by a distance equal to the distance between the side surface portions 1904*e* and 1904*f* of the projection 1904*b* with the cylindrical axis as the center, and in addition, the projections 1905*b* and the recess portions 1905*c* are extended in orthogonal directions passing through the cylindrical axis.

The projection 1904*b* of the gear 1904 fits into the recess portion 1905*c* of the driven coupling 1905 in the direction of the rotational axis L1 of the cylinder, and the projection 1904*b* is movable (slidable) in the recess portion 1905*c* in directions indicated by double head arrow 190Y (see part (b) of FIG. 73). The 190Y direction is parallel to the plane perpendicular to the rotational axis L1. Further, the projection 1904*b* can transmit the driving force for rotating the driven coupling 1905 about the rotational axis L1 to the recess portion 1905*c*.

Further, the projection 1963*g* of the driving side flange 1963 penetrates the through hole 1905*a* of the driven coupling 1905 and the through hole 1904*a* of the gear 1904. Here, a diametrical sizes of the through hole 1905*a* and the through hole 1904*a* are sufficiently larger than the outer diameter of the projection 1963*g*.

Further, the projection 1905*b* of the driven coupling 1905 is fitted into the recess portion 1963*r* of the driving side flange 1963 in the direction of the rotational axis L1, and the projection 1905*b* is movable (slidable) in the recess portion 1963*r* in directions indicated by double head arrow 190X. The 190X direction is parallel to the plane perpendicular to the rotational axis L1 and is a direction perpendicular to the 190Y direction as viewed along the rotational axis L1. In addition, the projection 1905*b* can transmit the driving force for rotating the driving side flange 1963 about the rotational axis L1 to the recess portion 1963*r*.

The free end of the projection 1963*g* is rotatably supported by the drum bearing member 1973 as in embodiment 17.

As described above, the inner peripheral surface 1971*c* of the cylindrical portion 1971*b* of the frame member 1971 is placed eccentrically with respect to the hole 1971*d*. Therefore, the gear 1904 supported on the inner peripheral surface 1971*c* and the driving side flange 1963 supported coaxially with the hole 1971*d* are rotatably supported at eccentric positions.

Figure 74:
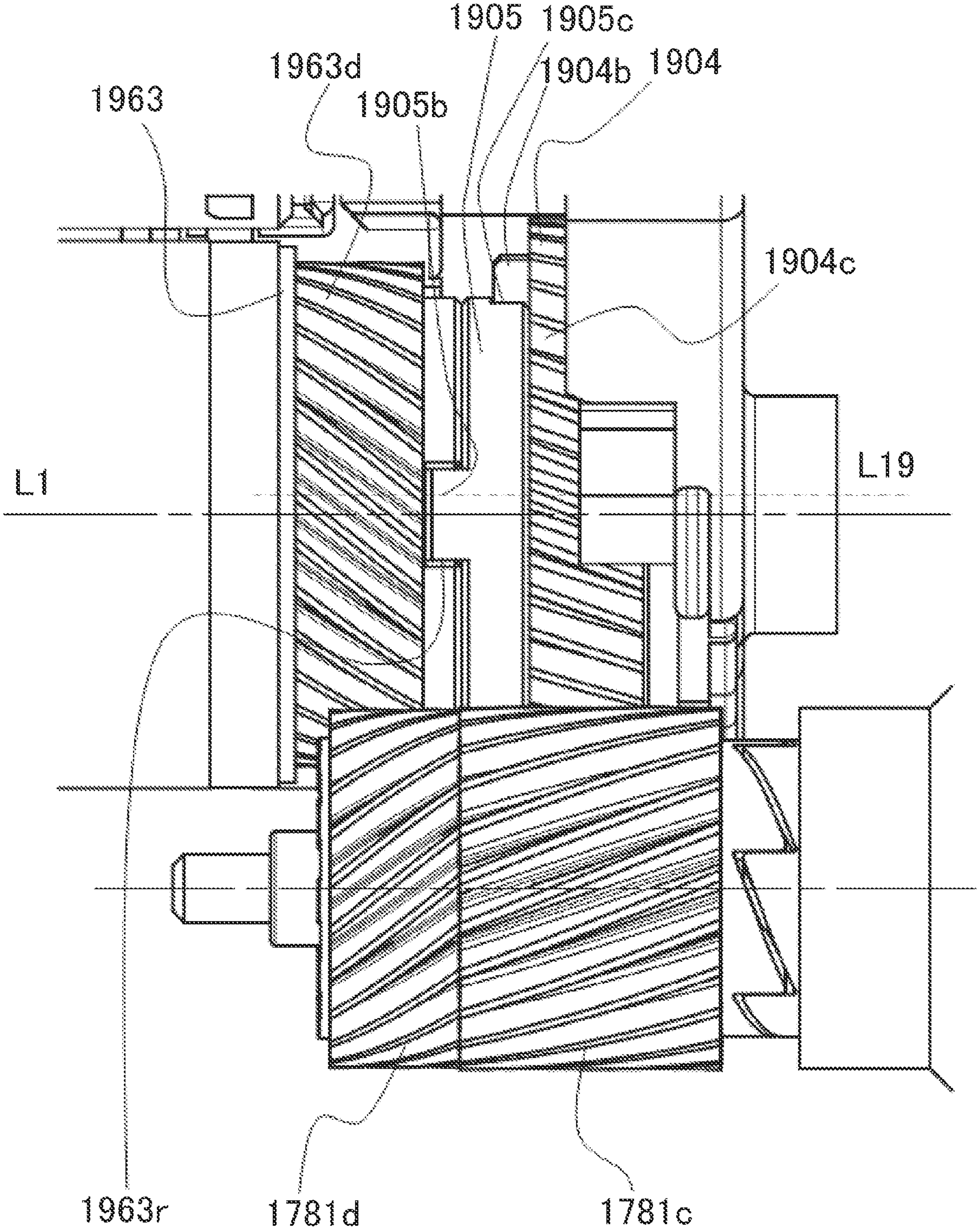
FIG. 74 is an illustration of a drum unit which is in meshing engagement with a drive transmission gear.
Figure 75:
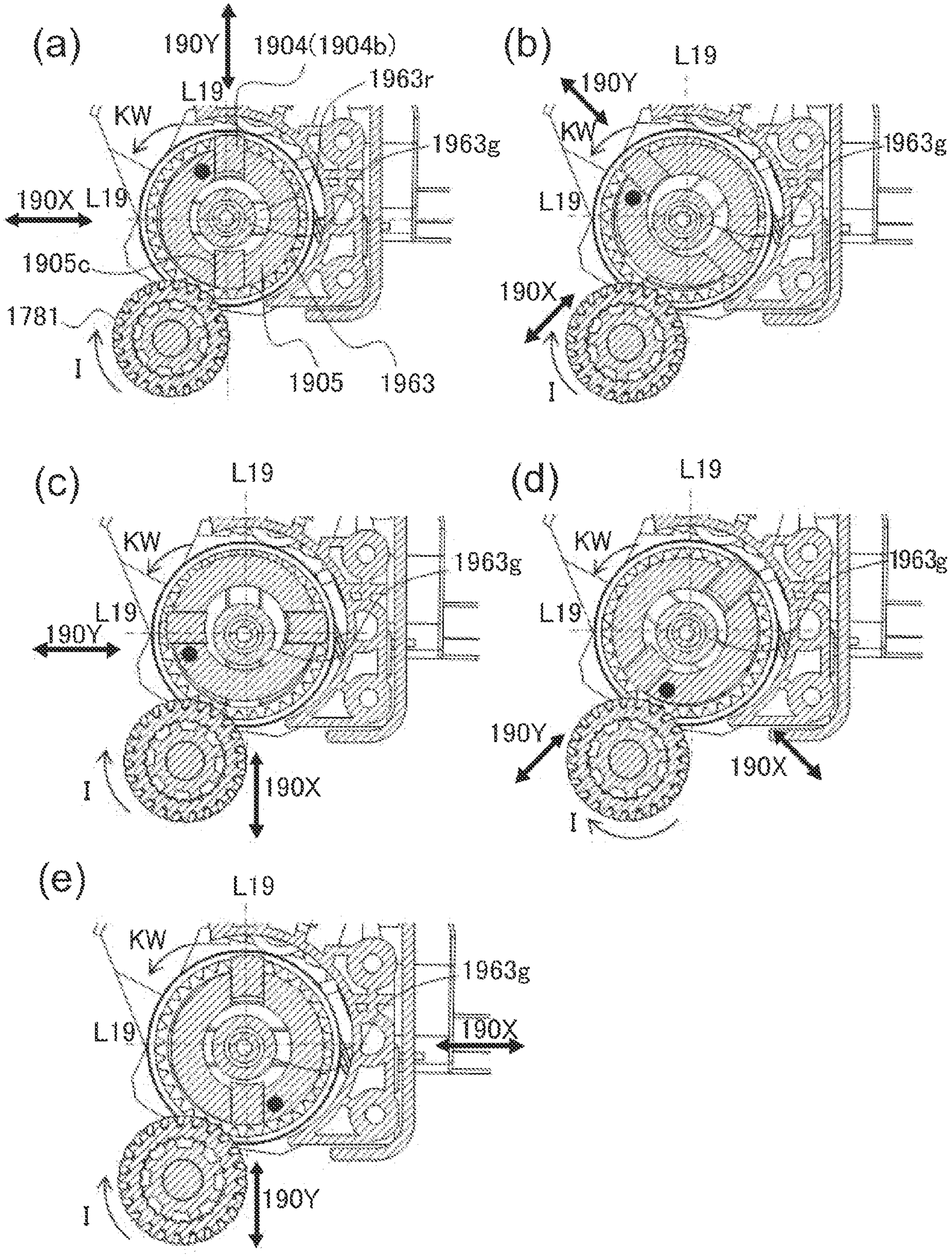
FIG. 75 is cross-sectional views illustrating an engaged state between the drum unit and the drive transmission gear.

Next, referring to FIGS. 74 and 75, the engagement with the drive transmission gear 1781 will be described. FIG. 74 is an illustration showing a drum unit 1969 which meshes with the drive transmission gear 1781, and is a view as seen in a direction perpendicular to the rotational axis L1. Part (a) of FIG. 75 to part (e) of FIG. 75 are cross-sectional views showing engaged states between the drum unit 1969 and the drive transmission gear 178, and are cross-sectional views taken along a plane perpendicular to the rotational axis L1 and passing through the projection 1904*b* of the gear 1904, as viewed in the H direction. In FIG. 75, the position of the rotational axis L19 is indicated by an intersection between a horizontal chain line extending left and right and the vertical chain line extending vertically, and on the other hand, the position of the rotational axis L1 is omitted for the sake of simplicity because it is the center of the projection 1963*g*. Further, a black dot shown on the driven coupling 1905 in FIG. 75 is a mark indicating a specific portion of the driven coupling 1905, and is described for easy understanding of the rotation phase of the driven coupling 1905.

As shown in FIG. 74, the second main assembly gear portion 1781*d* of the drive transmission gear 1781 is engaged with the second gear portion 1963*d* of the driving side flange 1963, and the first main assembly gear portion 81*c* is engaged with the gear 1904 (first gear portion).

As shown in part (a) of FIG. 75 to part (e) of FIG. 75, by rotation of the drive transmission gear 1781 in the I direction, the drive force is transmitted from the drive transmission gear 1781 to the gear portion 1904*c* (first gear portion), so that the gear 1904 rotates in a KW direction about the gear rotational axis L19. The driving force of the drive transmission gear 1781 is transmitted to the driving side flange 1963 by way of the driven coupling 1905 which engages with the gear 1904, so that the driving side flange 1963 is rotated in the K direction (see FIG. 72) about the rotational axis L1.

As the gear 1904 and the drum unit 1969 rotate, the driven coupling 1905 moves in the recess portion 1963*r* of the driving side flange 1963 so that the projection 1905*b* (see FIG. 74) moves in the 190X direction with respect to the driving side flange 1963. In addition, the gear 1904 moves in the 190Y direction with respect to the driven coupling 1905 by the movement of the projection 1904*b* in the recess portion 1905*c*. By this, the gear 1904 (rotational axis L19) and the driving side flange 1963 (rotational axis L1) can transmit the driving force for rotation between the gear 1904 and the driving side flange 1963 while maintaining the eccentric position (non-coaxial and parallel state).

Then, by the same operation as in embodiment 19, the drive transmission gear 1781 is moved to the balanced position and is in the balanced state. In the balanced state, the drive transmission gear 1781 receives the force FB at the second gear portion 1963*d*, and receives, at the side surface portion 1963*s*, a force corresponding to the drive force FD received by the gear portion 1904*c* (first gear portion) of the gear 1904, by way of the driven coupling 1905. The teeth of the second gear portion 1963*d* are in a fixed state such that it cannot move (rotate) in the direction opposite to the I direction relative to the teeth of the first gear portion 1904*c*. Therefore, the backlashless state is provided, and the same effect as that of embodiment 17 can be provided.

As described in the foregoing, according to embodiment 19, Modified Example 1 of embodiment 19, and Modified Example 2 of embodiment 19, the same effect as that of embodiment 17 can be provided. Further, the elements of each of the above-described embodiments can be applied to the structure of this embodiment. In particular, the structures of the first helical tooth (first projection) of the first gear portion and the second helical tooth (second projection) of the second gear portion may be modified to the helical gear, the super gear and/or the projection described in Embodiments 2, 3, 4, 5, 6, 10, 11, 12, 13, 14 or 16.

Embodiment 20

Next, referring to FIGS. 76, 77, 78, and 79, Embodiment 20 will be described below. As compared with Embodiment 17, this embodiment is different in that the first gear portion (outer tooth portion 2002*b*) which receives the driving force FD rotates coaxially with the rotational axis (L1) of the second gear portion (2063*d*) which receives the force FB, only in a part of the region. In other words, in this embodiment, as compared with embodiment 17, it can be said that the movement of the first gear portion (outer tooth portion 2002*b*) is not composed of only the rotation about one rotational axis (L1). The other points are the same as in embodiment 17, and therefore, the detailed description thereof will be omitted. Further, among the elements in this embodiment, the elements corresponding to the elements of Embodiment 1 are assigned reference numerals associated with the corresponding elements of Embodiment 1. Regarding these elements, the matters not specifically explained are the same as the corresponding elements of Embodiment 1.

<Drum Unit 2069>

Figure 76:
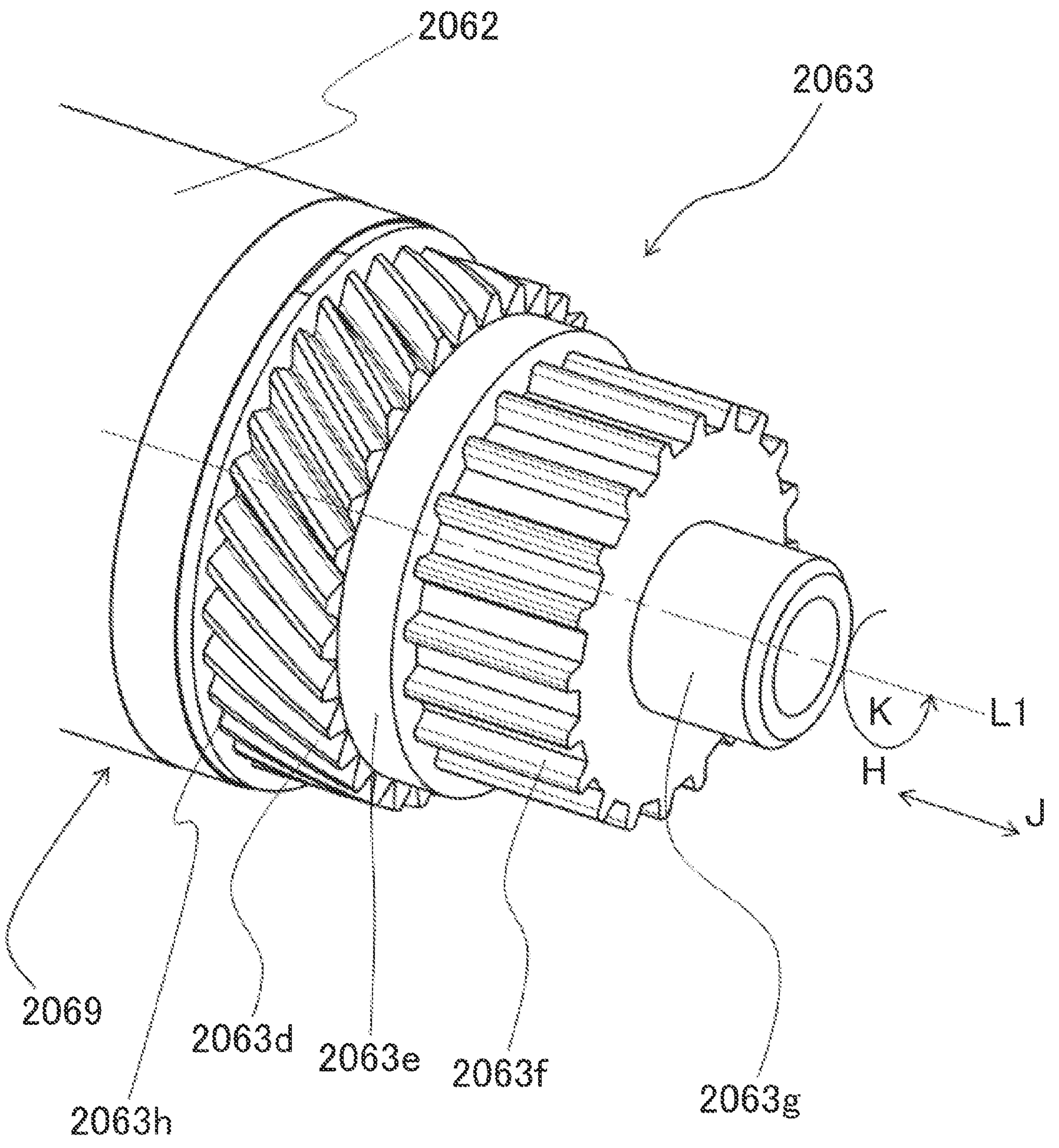
FIG. 76 is a partial perspective view of the drum unit.
Figure 77:
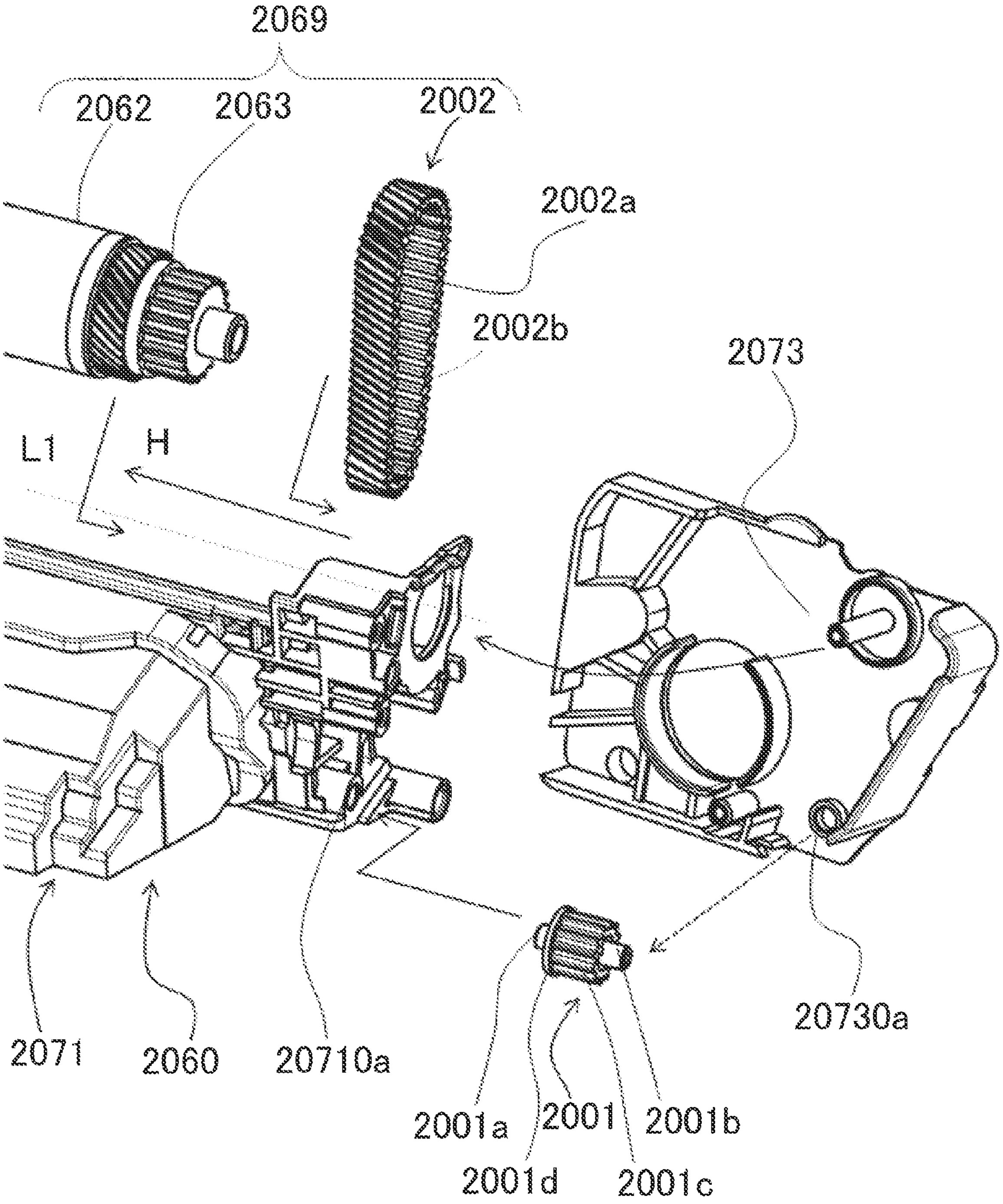
FIG. 77 is an exploded perspective view of the cleaning unit and the drum unit.
Figure 78:
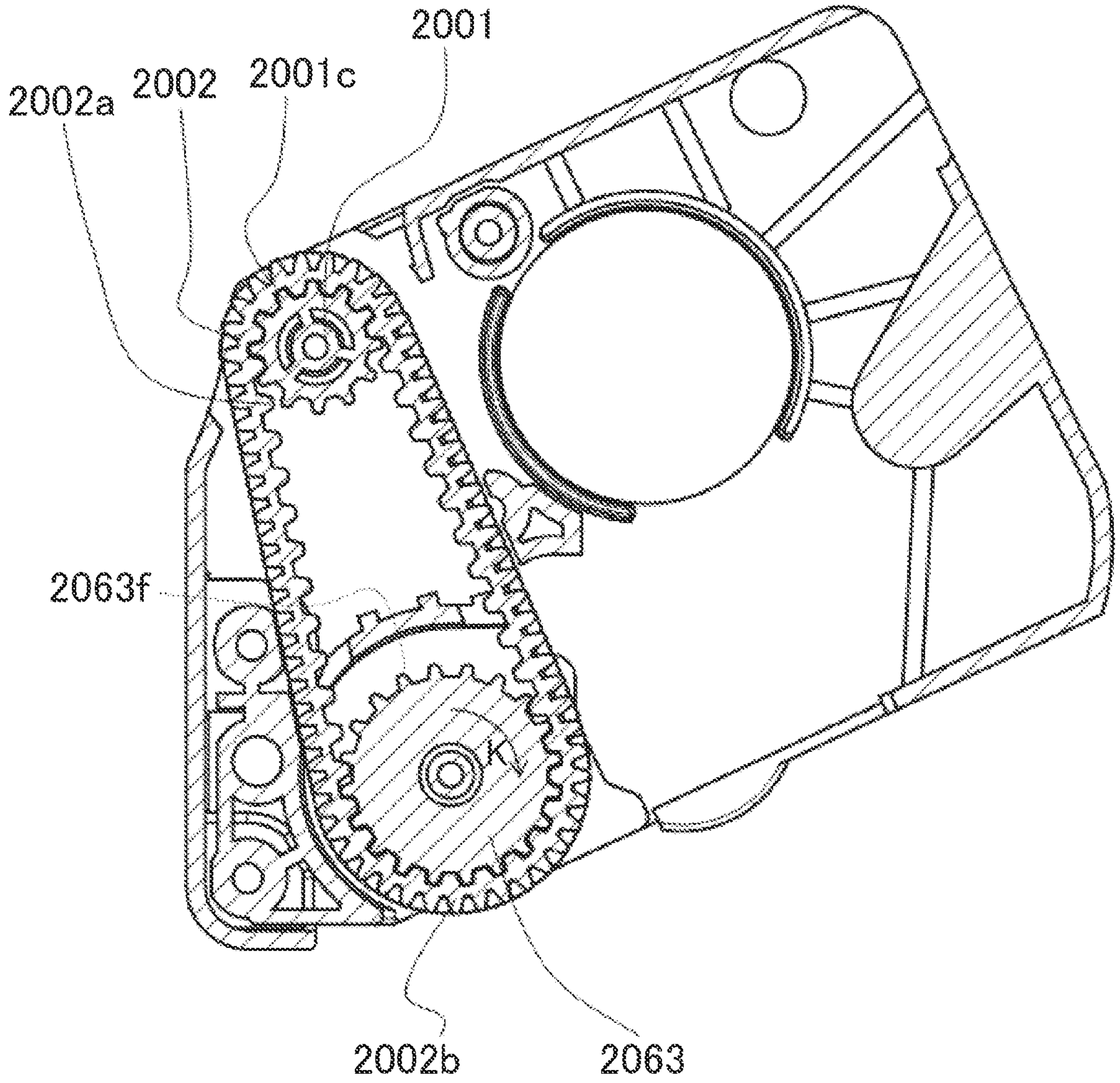
FIG. 78 is a cross-sectional view of the cleaning unit.

FIG. 76 is a partial perspective view of the drum unit 2069. FIG. 77 is an exploded perspective view of a driving side of a cleaning unit 2060 and a drum unit 2069. FIG. 78 is a cross-sectional view of a driving side flange 2063 of the cleaning unit 2060 at the position of a gear portion 2063*f*.

As shown in FIG. 76, the driving side flange 2063 includes the gear portion 2063*f*, the second gear portion (second unit side gear portion) 2063*d*, a projection 2063*g*, a small diameter portion 2063*e*, and a flange portion 2063*h* around the drum rotational axis L1. The gear portion 2063*f* has a pulley shape corresponding to a toothed belt.

The projection 2063*g* has a substantially cylindrical shape, and is provided so as to project beyond the gear portion 2063*f* in the direction away from the drum 2062 side (downstream side in the J direction) along the drum rotational axis L1. The small diameter portion 2063*e* has a substantially cylindrical shape with a diameter equal to or larger than the diameter of the gear portion 2063*f* and equal to or smaller than the diameter of the second gear portion 2063*d*, and is provided on the side closer to the drum 2062 (downstream side in the H direction) than the gear portion 2063*f* in the direction of the drum rotational axis L1. The second gear portion 2063*d* is an helical tooth having a helix angle α2 as in embodiment 17, and is provided on the drum 2062 side (downstream side in the H direction) of the small diameter portion 2063*e*. The flange portion 2063*h* has a thin disk shape having a diameter equal to or larger than the diameter of the drum 2062, and is provided on the side closer to the drum 2062 (downstream side in the H direction) than the second gear portion 2063*d*.

As shown in FIG. 77, the drum unit 2069 further includes a belt 2002 (see FIG. 77 and so on). The belt 2002 is provided with an outer tooth portion 2002*b* as a first gear portion (first unit side gear portion) on the outer peripheral portion thereof, and an inner tooth portion 2002*a* which meshes with the gear portion 2063*f*. On the inner peripheral portion. The belt 2002 is an elastic belt-shaped member. The outer tooth portion 2002*b* is an helical tooth having a helix angle α1.

Next, referring to FIGS. 77 and 78, the structure of the cleaning unit 2060 on the driving side will be described. As shown in FIG. 77, a bearing member 2073 is supported by a frame member 2071. The frame member 2071 is provided with a generally cylindrical hole 20710*a*. The bearing member 2073 is provided with a generally cylindrical hole 20730*a* facing the hole 20710*a* at a position facing the hole 20710*a*. A pulley 2001 is provided between the hole 20710*a* and the hole 20730*a*. The pulley 2001 has a generally cylindrical shape extending in the direction of the axis parallel to the rotational axis L1. The pulley 2001 is provided with supported portions 2001*a* and 2001*b* which are generally cylindrical projections at the opposite ends in a direction parallel to the rotational axis L1, and is provided with a tooth portion 2001*c* in the form of a pulley corresponding to the inner tooth portion 2002*a* of the belt 2002 on a peripheral surface of a central portion. Further, the pulley 2001 is provided with a flange portion 2001*d* having a diameter larger than that of the tooth portion 2001*c*, between the supported portion 2001*a* and the tooth portion 2001*c*. The supported portions 2001*a* and 2001*b* are rotatably supported by the holes 20710*a* and 20730*a*, respectively, so that the pulley 2001 can rotate about a rotational axis parallel to the rotational axis L1.

<Support Structure of Drum Unit 2069>

The support structure for the driving side flange 2062 and the drum 2062 in the drum unit 2069 by the bearing member 2073 and the frame member 2071 is the same as that of embodiment 19, and therefore, the description thereof will be omitted. On the other hand, as shown in FIG. 78, in the belt 2002 of the drum unit 2069, the inner tooth portion 2002*a* is supported by the pulley 2001 and the gear portion 2063*f* in a state that the gear portion 2063*f* of the driving side flange 2063 and the tooth portion 2001*c* of the pulley 2001 are in meshing engagement with each other. In addition, the belt 2002 is supported by the driving side flange 2063 and the pulley 2001 with an appropriate tension so that the portion not in contact with any of the driving side flange 2063 and the pulley 2001 is significantly flex. Further, the belt 2002 can be circulated and moved by the rotation of the driving side flange 2063 (gear portion 20631) and the pulley 2001 (tooth portion 2001*c*).

<Transmission of Driving Force to Drum Unit 2069>

Figure 79:
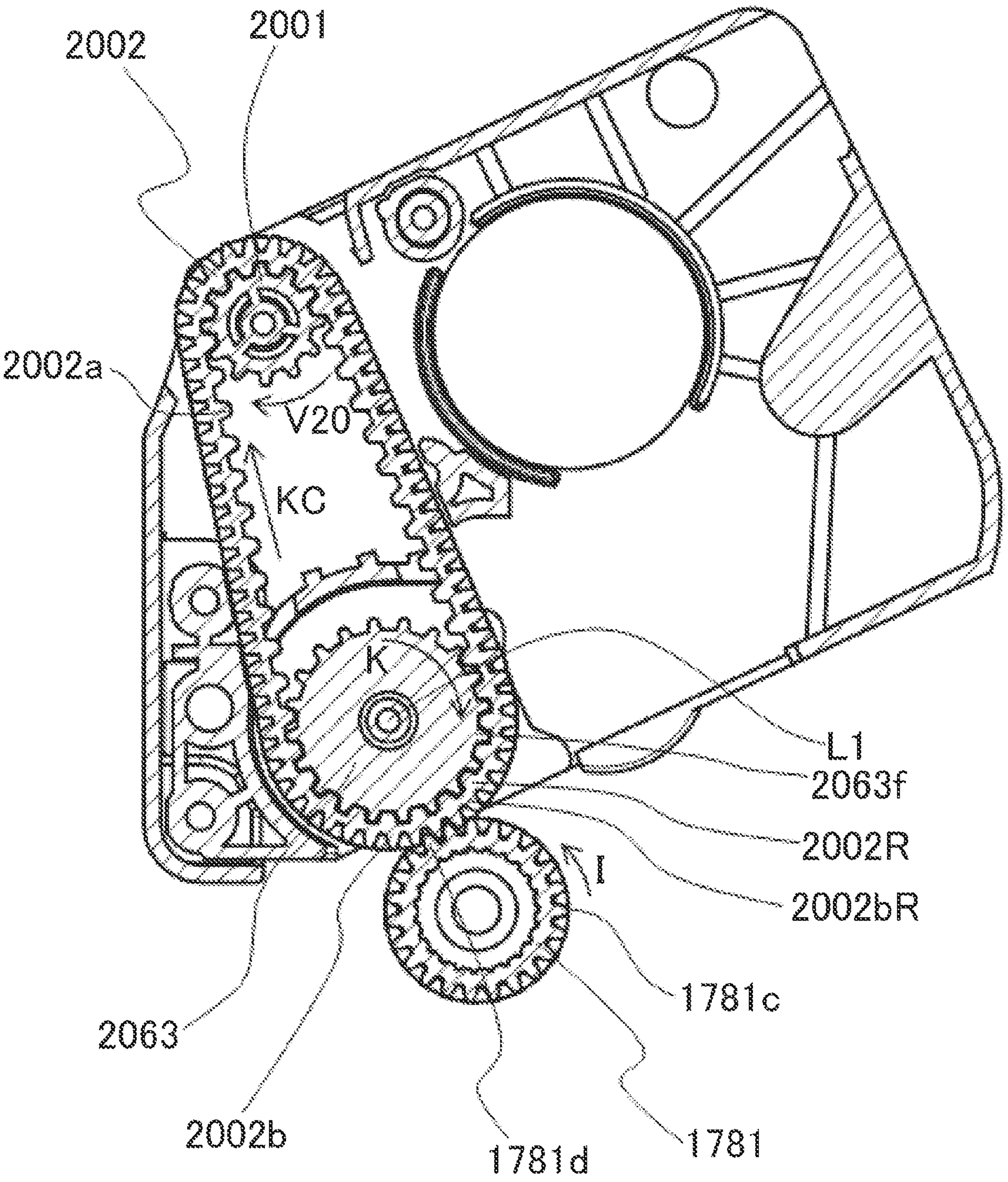
FIG. 79 is a cross-sectional view illustrating an engaged state between the drum unit and the drive transmission gear.
Figure 80:
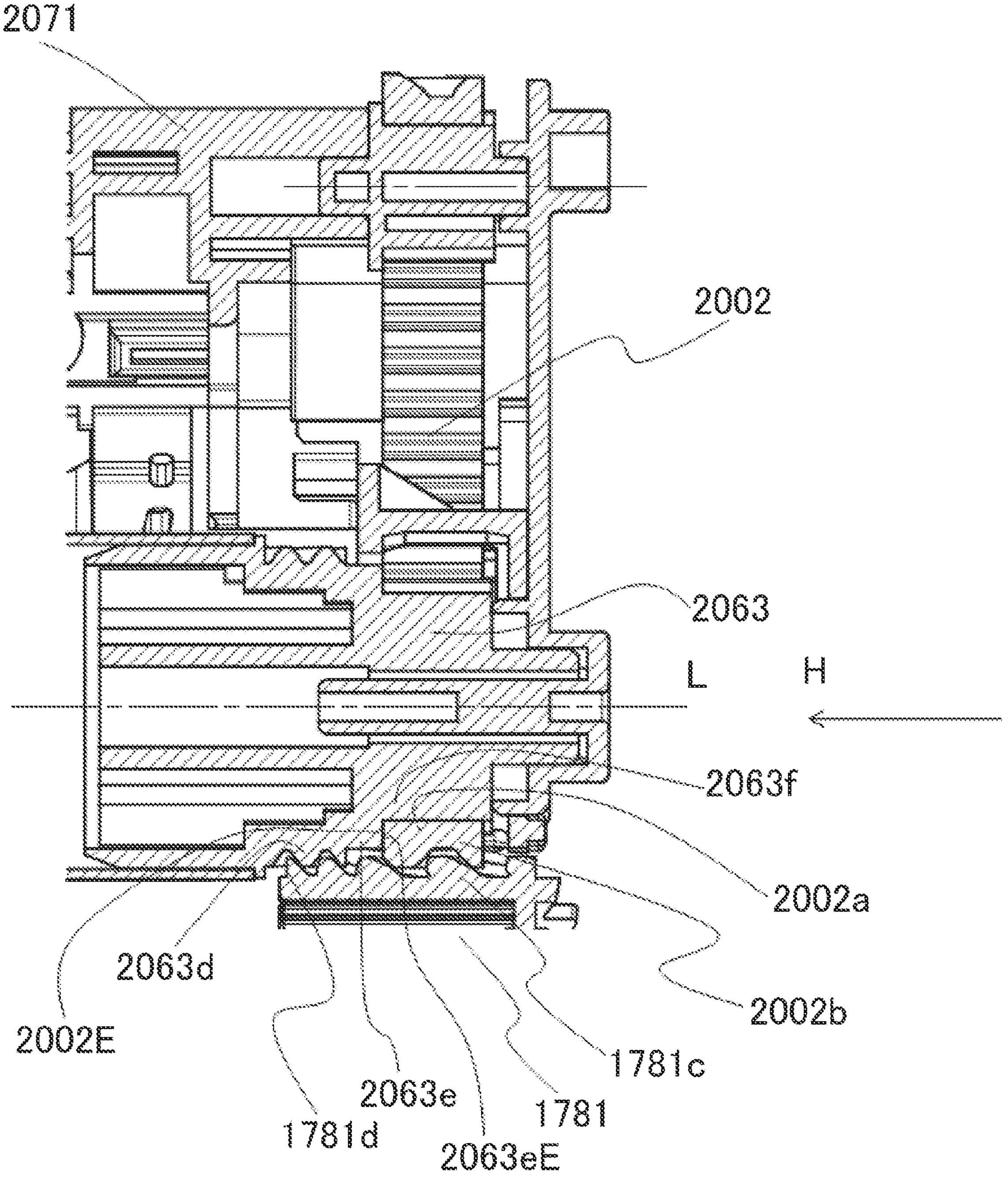
FIG. 80 is a sectional view illustrating an engaged state between the drum unit and the drive transmission gear.

Next, referring to FIGS. 79 and 80, the engagement state with the drive transmission gear 1781 will be described. FIG. 79 is a cross-sectional view illustrating an engaged state between the drum unit 2069 and the drive transmission gear 1781, taken along a plane perpendicular to the rotational axis L1 and passing through the belt 2002, as viewed in the J direction, and FIG. 80 is sectional view illustrating the engaged state between the drum unit 2069 and the transmission gear 1781, taken along a plane including the rotational axis L1.

As shown in FIG. 79, by rotation of the drive transmission gear 1781 in the direction of arrow I, the outer tooth portion 2002*b* of the belt 2002 engages with the first main assembly gear portion 1781*c* and circulates in the direction of arrow KC, which is the circulation movement direction. With the circulation movement of the belt 2002, the gear portion 2063*f* of the driving side flange 2063 which engages with the inner tooth portion 2002*a* of the belt 2002 rotates in the direction of the arrow K. At this time, assuming that the portion of the belt 2002 that is engaged with the inner tooth portion 2002*a* is the rotating portion 2002R, the rotating portion 2002R rotates about the rotational axis L1 in the K direction. Therefore, the circulation movement direction KC of the rotating portion 2002R of the belt 2002 is the same as the K direction. Therefore, when such a part of the outer tooth portion 2002*b* as the first gear portion as is included in the rotating portion 2002R is the rotating gear portion 2002*b*R, the rotating gear portion 2002*b*R rotates about the rotational axis L1 coaxially and integrally with the driving side flange 2063 and the second gear portion 2063*d*. Further, as the belt 2002 circulates in the KC direction, the pulley 2001 rotates in an arrow V20 direction.

By rotation of the drive transmission gear 1781 in the direction of arrow I, the outer tooth portion 2002*b* receives a thrust force in the direction of arrow H through the meshing engagement with the first main assembly gear portion 1781*c*, and the belt 2002 tends to move in the direction of arrow H. However, as shown in FIG. 80, the diameter of the small diameter portion 2063*e* of the driving side flange 2063 is larger than the diameter of the gear portion 2063*f*, and therefore, the end surface 2002E of the belt 2002 abuts on the end surface 2063*e*E of the small diameter portion 2063*e*, so that the movement of the belt 2002 in the direction of the arrow H is restricted (stopped).

On the other hand, the drive transmission gear 1781 receives a thrust force through the meshing engagement with the outer tooth portion 2002*b* and to move in the direction of arrow J. Then, similarly to embodiment 17, the second main assembly gear portion 1781*d* moves to the balanced position in which it engages with the second gear portion 2063*d* of the driving side flange 1963, and the movement in the direction of the rotational axis L1 stops. The operations and actions of the first gear portion (outer tooth portion 2002*b*) and the second gear portion 2063*d* from the start of driving the drive transmission gear 1781 to the reaching of the drive transmission gear 1781 to the balanced position are the same as those in embodiment 19.

In this balanced state, the rotating gear portion 2002*b*R of the external tooth portion (first gear portion) 2002*b* receives the driving force FD from the first main assembly gear portion 1781*c*. Since the rotating portion 2002R of the belt 2002 can be regarded as a rigid assembly, this driving force FD is transmitted to the driving side flange 2063 by the meshing (engagement) between the inner tooth portion 2002*a* and the gear portion 2063*f*. That is, the driving side flange 2063 is in a state of receiving the driving force FD by way of the rotating portion 2002R of the belt 2002. In addition, the driving side flange 2063 is in a state that the second gear portion 2063*d* receives the restriction force (braking force) FB from the second main assembly gear portion 1781*d*. The teeth of the second gear portion 2063*d* are fixed so as not to move (rotate) in the direction opposite to the I direction relative to the teeth of the first gear portion 2002*b*. Therefore, the drum unit 2069 (drum 2062, driving side flange 2063, and belt 2002) is driven in a backlashless state. Accordingly, the same effect as that of Embodiment 17 can be obtained even if the structure of this Embodiment is used.

In this embodiment, the belt 2002 is provided with the first gear portion which receives the driving force FD in the balanced state, but the second gear portion which receives the force FB in the balanced state may be provided on the belt supported in the same manner as the belt 2002. In addition, the belt 2002 may be provided with the first gear portion which receives the driving force FD, and the second gear portion which receives the force FB may be provided on another belt.

Further, in this embodiment, the belt 2002 is provided with the inner tooth portion 2002*a* and the outer tooth portion 2002*b* as the first gear portion, but the present invention is not limited to this example. For example, the belt may be a belt which deforms into a shape which follows the shape of the gear of the driving side flange 2063 and the gear of the drive transmission gear 1781, such as the elastic ring 1801 shown in embodiment 18. In such a case, the gear portion 2063*f* of the driving side flange 2063 has a shape corresponding to the first main assembly gear portion 1781*c* of the drive transmission gear 1781, and the gear portion 2063*f* meshes with the first main assembly gear portion 1781*c* by way of the belt. In this case, the gear portion 2063*f* may be regarded as the first gear portion which receives the driving force FD. If the belt covers the second gear portion 2063*d* of the driving side flange 2063 and the belt is provided so as to follow the gear shape of the second gear portion 2063*d*, the second gear portion 2063*d* is can be regarded as the second gear which receives the regulatory force FD.

As described above, according to this embodiment, the same effect as that of embodiment 17 can be provided. In addition, the elements of each of the above-described embodiments can be applied to the structure of this embodiment. In particular, the structures of the first helical tooth (first projection) of the first gear portion and the second helical tooth (second projection) of the second gear portion may be modified into the helical teeth, spur gear teeth, projections and the like which have been described in Embodiments 2, 3, 4, 5, 6, 10, 11, 12, 13, 14 or 16.

Embodiment 21

Next, referring to FIGS. 81 and 82, Embodiment 21 will be described. This embodiment is different from embodiment 17 in the projecting direction of the teeth of the gear portion. That is, in Embodiment 17, the projecting direction of the teeth of each gear portion (first gear portion, second gear portion) is the radial direction centered with respect to the rotational axis L1, but in this embodiment, the projecting direction of the teeth has a directional component parallel to the axis L1. The other points are the same as in embodiment 17, and detailed description thereof will be omitted. In addition, among the elements in this embodiment, the elements corresponding to the elements of Embodiment 1 are assigned reference numerals associated with the corresponding elements of Embodiment 1. Regarding these elements, the matters not specifically explained are the same as the corresponding elements of Embodiment 1.

<Drive Side Flange 2163>

Figure 81:
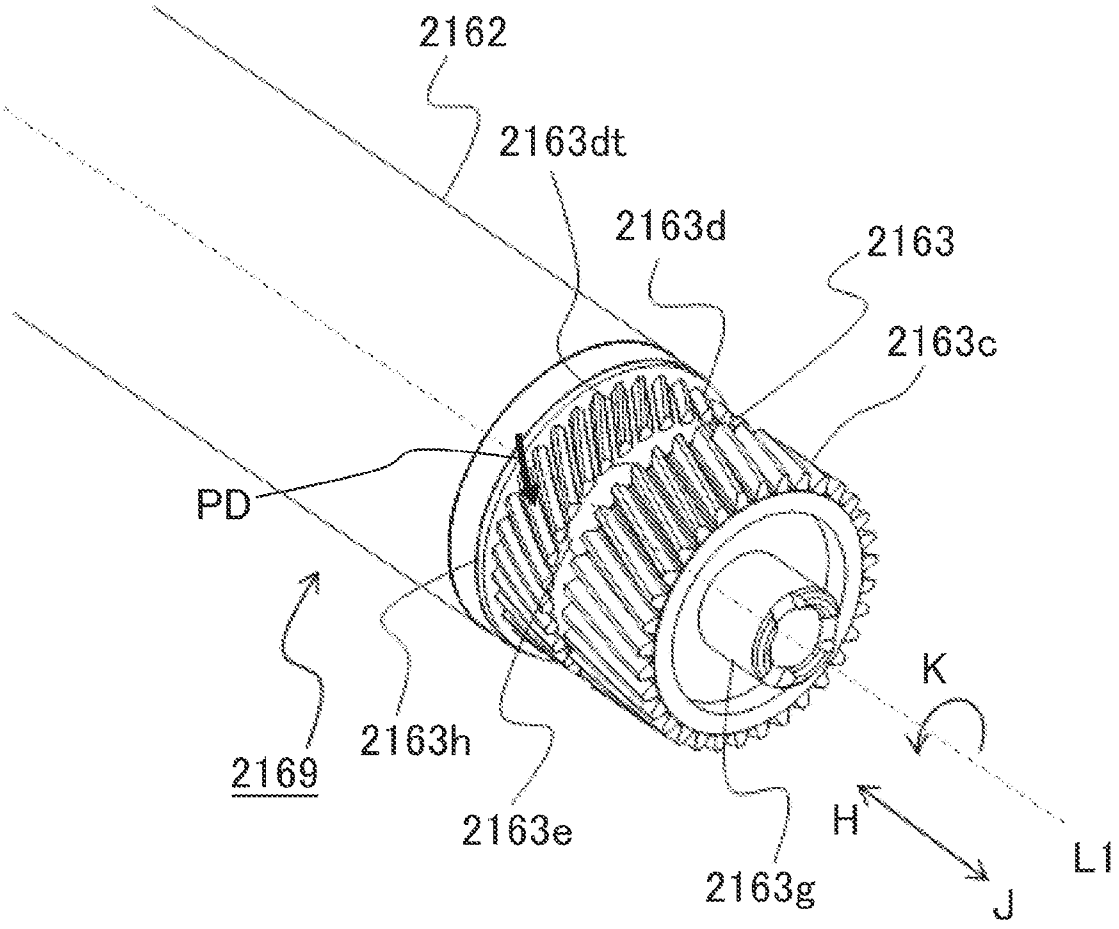
FIG. 81 is a partial perspective view of the drum unit.

FIG. 81 is a partial perspective view of the driving side portion of the drum unit 2169. FIG. 82 is a partial perspective view of the drum unit 2169 taken along a plane perpendicular to the rotational axis L1 and passing through the projection 2163*d* of the driving side flange 2163. As shown in FIG. 81, the driving side flange 2163 is provided, around the rotational axis L1 as the center, with a first gear portion (first unit side gear portion) 2163*c*, a projection 2163*d* as a second gear portion (second unit side gear portion), a projection (supported portion) 2163*g*, a small diameter portion 2163*e*, and a flange portion 2163*h*.

The first gear portion 2163*c* is an helical tooth having a helix angle α1, and has substantially the same shape as the first gear portion 1763*c* of embodiment 17. The projection (supported portion) 2163*g* has a substantially cylindrical shape having a center on the rotational axis L1 and projects from the first gear portion 2163*c* in the direction away from the drum 2162 (downstream side in the J direction) along the rotational axis L1. The projection 2163*g* has substantially the same shape as the projection 1763*g* of Embodiment 17.

The small diameter portion 2163*e* has a substantially cylindrical shape, and is provided projected from the first gear portion 2163*c* toward the drum 2162 side (downstream side in the H direction) along the rotational axis L1. The flange portion 2163*h* has a thin disk shape having a diameter equal to or larger than the diameter of the drum 2162, and is provided on the drum 62 side (downstream side in the H direction) of the small diameter portion 2163*e*.

The projection 2163*d* as the second gear portion comprises a plurality of projections (teeth) 2163*dt*. The number of the projections 2163*dt* is the same as the number of teeth of the first gear portion 2163*c*, and the projections 2163*dt* are formed in a shape which can be engaged with the second main assembly gear portion 1781*d* of the drive transmission gear 1781. In addition, the plurality of projections (teeth) 2163*dt* are helical projections which project from the flange portion 2163*h* so as to extend in the J direction away from the drum 2162 along the rotational axis L1, and are twisted at a helix angle α2 so as to go downstream in the K direction (rotational direction K of the driving side flange 2163) which is a circumferential direction about the rotational axis L1, as goes in the J direction. That is, the projecting direction PD of the projection (teeth) 2163*dt* from the flange portion 2163*h* is a direction having at least an H direction component parallel to the rotational axis L1 and a K direction component in the circumferential direction about the rotational axis L1. The helix angle of the plurality of projections 2163*dt* is the helix angle α2. When the projection 2163*dt* is structured to have a flat tooth shape instead of an helical tooth shape, the projection direction PD has an H direction component parallel to the rotational axis L1 but has no circumferential direction (K direction) component.

Further, each of the projections 2163*dt* is an involute tooth-shaped teeth having an involute surface portion on the lateral side surface, and has substantially the same shape as the second helical tooth (second projection) 1763*dt* of the second gear portion 1763*d* of Embodiment 17. Therefore, the projections 2163*d* can engage with the second main assembly gear portion 1781*d* of the drive transmission gear 1781 to receive the driving force and the restricting force FB, and function as the second gear equivalently to the second gear portion 1763*d* of embodiment 17.

Figure 82:
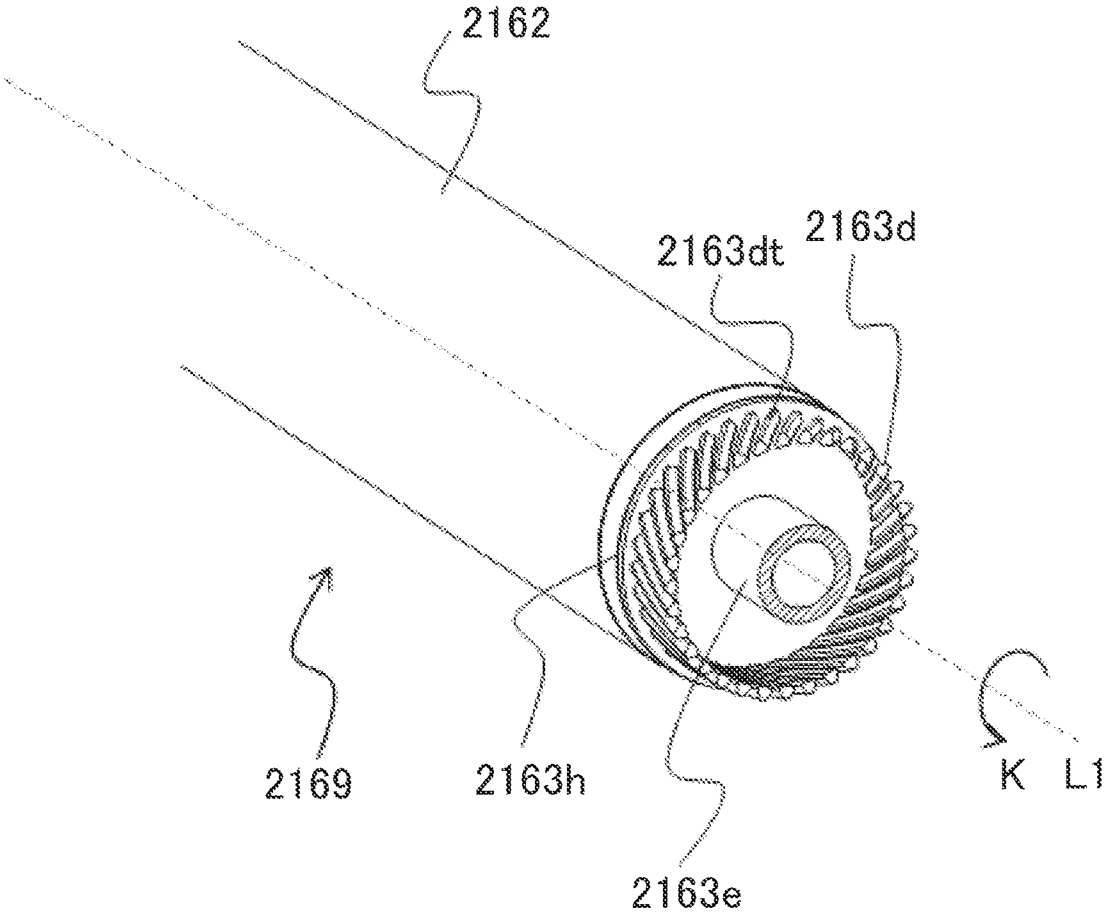
FIG. 82 is a partial perspective view of the drum unit.

Further, as shown in FIG. 82, the plurality of projections 2163*dt* are arranged at equal intervals in the rotational direction K about the rotational axis L1. Further, the plurality of projections 2163*dt* are formed so that the free end portion thereof is away by the same distance from the rotational axis L1 in the radial direction with respect to the rotational axis L1, and the rear end portion is away from the small diameter portion 2163*e* by a certain distance. Therefore, a space is formed between the rear end portion of the plurality of projections 2163*dt* and the outer peripheral surface of the small diameter portion 2163*e* in the radial direction with respect to the rotational axis L1.

Also with such a driving side flange 2163, the teeth (projections 2163*dt*) of the second gear portion 2163*d* cannot move (rotate) in the opposite direction to the I direction relative to the teeth of the first gear portion 2163*c*, thus it is in a fixed state. Therefore the drive force FD and the restriction force FB are received from the drive transmission gear 1781, and is rotationally driven in the K direction while maintaining the backlashless state, and it is possible to the same effect as that of embodiment 17.

The driving side flange 2163 in this embodiment may be manufactured by forming parts thereof separately and then adhering them into the flange 2163. In addition, the driving side flange 2163 may be formed by using different materials such as resin and metal. In particular, since the projection 2163*dt* has a relatively thin shape, it may be preferable to use a metal material in some cases.

Further, in this embodiment, the projection direction PD of the projection 2163*dt* from the flange portion 2163*h* which is the tooth of the second gear portion (projection 2163*d*), is selected to be a direction having the J direction component parallel to the rotational axis L1. However, the projecting direction PD may be a direction having an H-direction component parallel to the rotational axis L1. In such a case, the flange portion 2163*h* is placed at least on the upstream side in the H direction from the second gear portion (projection 2163*d*). In addition the teeth of the first gear portion 2163*c* may be formed by projections projecting in the projecting direction having a component (H direction component or J direction component) parallel to the axis L1, while the second gear portion comprises teeth having a shape projecting in the radial direction with respect to the rotational axis L1, similarly to the second gear portion 1763*d* of embodiment 17. Alternatively, the teeth of the first gear portion 2163*c* and the teeth of the second gear portion (projection 2163*d*) may be formed by projections projecting in the projecting direction having a component (H direction component or J direction component) parallel to the rotational axis L1.

As described above, according to this embodiment, the same effect as that of embodiment 17 can be provided. Further, the elements of each of the above-described embodiments can be applied to the structure of this embodiment. In particular, the structure of the first gear portion of the driving side flange may be modified to the helical teeth, the flat teeth and the projections of in any of Embodiment 2, 3, 4, 5, 6, 10, 11, 12, 13, 14, 16, or the like.

Embodiment 22

Next, referring to FIGS. 83 to 87, Embodiment 22 will be described. This embodiment is different from embodiment 17 in that it has a member capable of filling the gap g between the first gear portion and the second gear portion. The other points are the same as in embodiment 17, and detailed description thereof will be omitted. Further, among the elements in this embodiment, the elements corresponding to the elements of Embodiment 1 are assigned reference numerals associated with the corresponding elements of Embodiment 1. Regarding these elements, the matters not specifically explained are the same as the corresponding elements of Embodiment 1.

<Drive Side Flange 2263>

Figure 83:
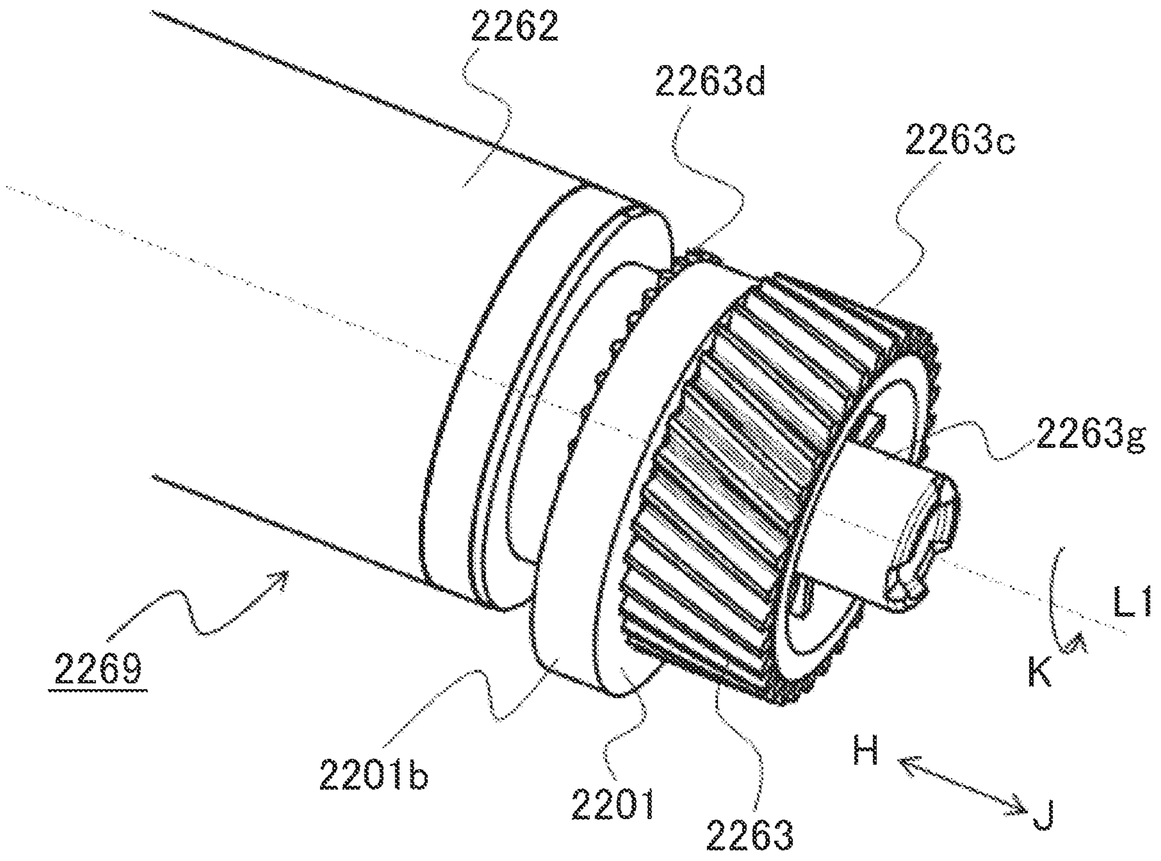
FIG. 83 is a partial perspective view of the drum unit.
Figure 84:
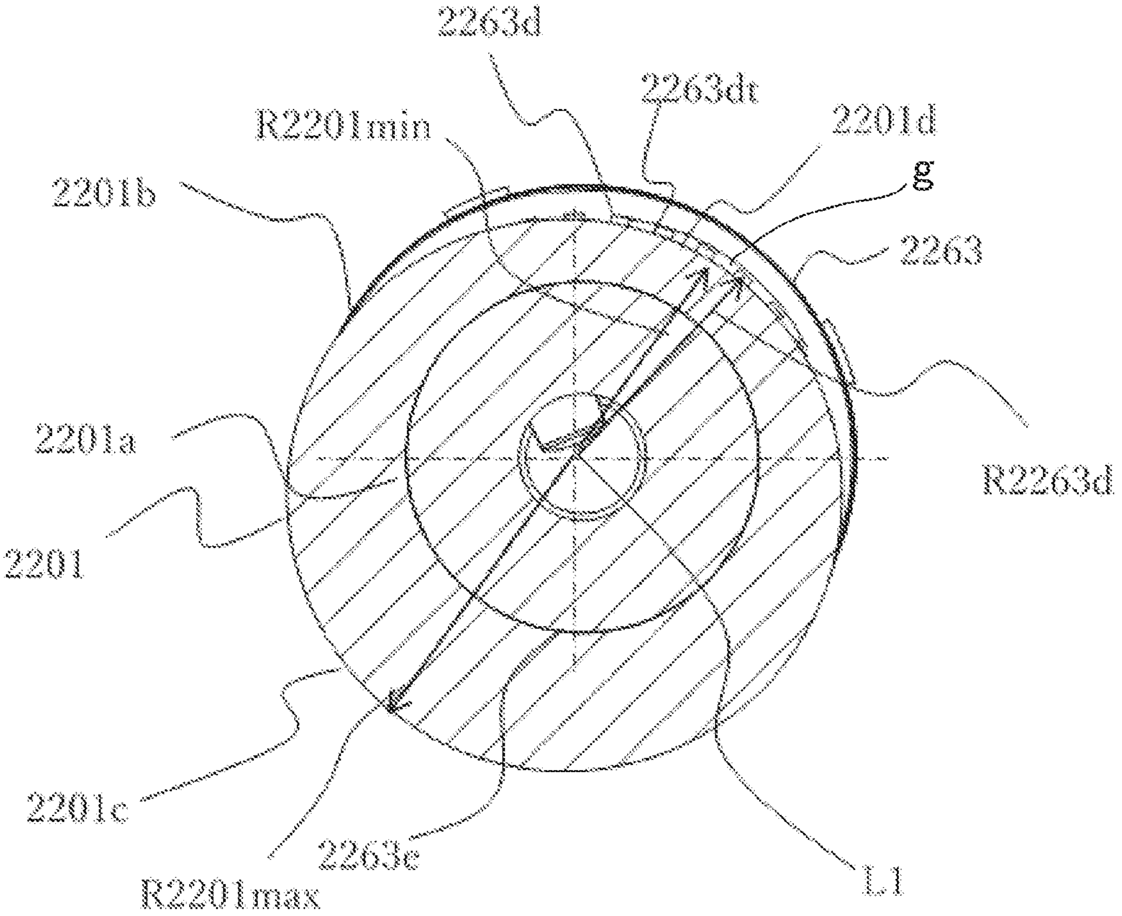
FIG. 84 is a cross-sectional view of the drum unit.

First, referring to FIGS. 83 and 84, the structure of the driving side flange 2263 will be described. FIG. 83 is a partial perspective view of the driving side of the drum unit 2269. FIG. 84 is a cross-sectional view of the drum unit 2269, taken along a plane perpendicular to the rotational axis L1 and passing through an eccentric ring 2201. The driving side flange 2263 is provided with a first gear portion (first unit side gear portion) 2263*c*, a projection 2263*d*, a small diameter portion 2263*e*, and a cylindrical support portion 2263*g*, centered on the rotational axis L1, and the eccentric ring 2201 is mounted on the small diameter portion 2263*e*.

The first gear portion 2263*c* is a helical tooth including a helix angle α1. The cylindrical support portion (projection) 2263*g* has a cylindrical shape centered on the rotational axis L1, and is provided so as to project from the first gear portion 2263*c* in the direction away from the drum 2262 (downstream side in the J direction) along the rotational axis L1. The small diameter portion 2263*e* has a generally cylindrical shape, and is provided so as to project beyond the first gear portion 2263*c* toward the drum 2262 (downstream side in the H direction) along the rotational axis L1. The projections (second gear portion, second unit side gear portion, second rotation part) 2263*d* comprise a plurality of projections (second projections, teeth) 2263*dt* extending in the radial direction with respect to the rotational axis L1, and it is provided at a position closer to the drum 2262 (downstream side in the H direction) than the small diameter portion 2263*e* along the axis L1. The plurality of projections 2263*dt* are formed in a shape capable of transmitting (meshing engagement) the driving force by engaging with the second main assembly gear portion 1781*d* of the drive transmission gear 1781. Specifically, the plurality of projections 2263*dt* are projections projecting in the radial direction with respect to the rotational axis L1, and the tips thereof are structured to be substantially at the same position as the addendum circle diameter of the first gear portion 2263*c*. In addition, the plurality of projections 2263*dt* have the same number of teeth as the number of teeth of the first gear portion 2263*c*, and are arranged at equal intervals in the rotational direction K about the rotational axis L1. In this manner, the plurality of projections 2263*dt* can mesh with the second main assembly gear portion 1781*d* and transmit the rotational driving force, and therefore, in this respect, the plurality of projections 2263*dt* can be said to be the second gear, and the projection 2263*d* is the second gear portion. The projection 2263*d* may be a gear portion shown in the second gear portion 1763*d* or the like in the embodiment 17.

As shown in FIG. 84, the eccentric ring (intermediate member) 2201 is a cylindrical member having an inner diameter portion 2201*a* and an outer diameter portion 2201*b*, but the inner diameter portion 2201*a* and the outer diameter portion 2201*b* have different center positions. In addition, the most projecting portion of the outer diameter portion 2201*b* is referred to as a thick portion 2201*c*, and the closest portion is referred to as a thin portion 2201*d* with respect to the inner diameter portion 2201*a*. Further, the inner diameter portion 2201*a* has a diameter substantially the same as the small diameter portion 2263*e* of the driving side flange 2263. The radius of the eccentric ring 2201 from the rotational axis L1 includes a maximum radius R2201max at the position of the thick portion 2201*c* and a minimum radius R2201min at the thin portion 2201*d*.

The inner diameter portion 2201*a* of the eccentric ring 2201 is rotatably supported by the small diameter portion 2263*e* of the driving side flange 2263. The thick portion 2201*c* of the eccentric ring 2201 projects beyond the first gear portion 2263*c* and the projection 2263*d* of the driving side flange 2263 in the radial direction. That is, the radius R2201max is larger than the maximum radius R2263*d* of the projection 2263*d* and the radius of the addendum circle of the first gear portion 2263*c*.

Further, the thin portion 2201*d* is retracted from the first gear portion 2263*c* and the projection 2263*d* of the driving side flange 2263 in the radial direction. That is, the radius R2201min is smaller than the maximum radius R2263*d* of the projection 2263*d* and the radius of the addendum circle of the first gear portion 2263*c*. That is, by providing the thin portion 2201*d*, a gap g provided between the first gear portion 2263*g* and the projection 2263*d* is formed in the direction of the rotational axis LE Further, the radius R2201min is selected so that, the thin portion 2201*d* does not enter the tooth free end of the drive transmission gear 1781 in a state where the first gear portion 2263*c* and the projection 2263*d*, which will be described hereinafter, are engaged with the drive transmission gear 1781 (see part (b) of FIG. 86).

As described above, the eccentric ring (intermediate member) 2201 has a thin portion 2201*d* as a portion for forming the above-mentioned gap g and a thick portion 2201*c* as a portion for filling the gap g. Then, the eccentric ring (intermediate member) 2201 rotates around the rotational axis L1 to move the thin portion 2201*d* and the thick portion 2201*c*, and it is possible to selectively form the gap g (fill the gap g). As described above, it can be said that the eccentric ring (intermediate member) 2201 can move between the position where the gap g is formed and the position where the gap g is filled by rotating around the rotational axis L1.

Figure 85:
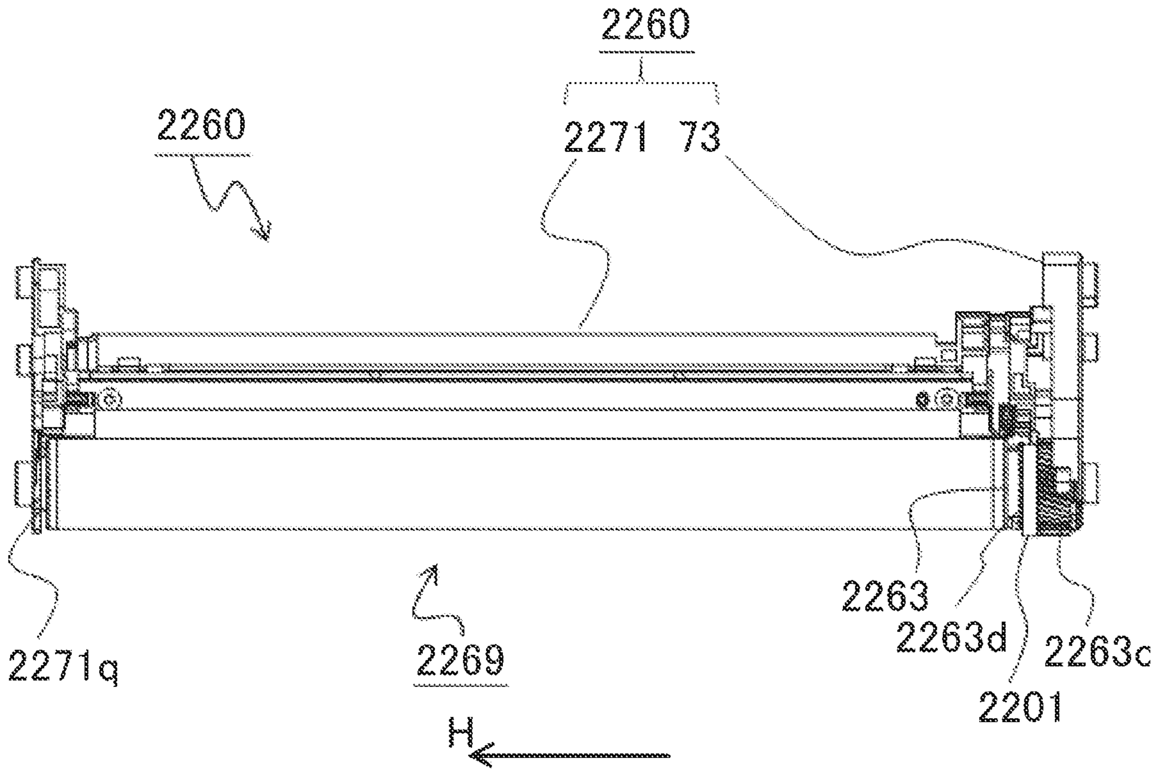
FIG. 85 is an illustration of a state in which the drum unit is assembled to the cleaning unit.

Next, a state in which the drum unit 2269 is assembled to the cleaning unit 2260 will be described referring to FIG. 85. FIG. 85 is an illustration showing a state in which the drum unit 2269 is assembled to the cleaning unit 2260. The cleaning frame 2260*a* of the cleaning unit 2260 supports the drum unit 2269. The cleaning frame 2260*a* comprises a frame member 2271 and a drum bearing member 73. The frame member 2271 is provided with a drum sliding portion 2271*q*.

Similarly to that described in Embodiment 17, when the drive transmission gear 1781 rotates in a predetermined direction after the driving side flange 2263 of the drum unit 2269 engages with the drive transmission gear 1781, the driving side flange 2263 rotates in interrelation with the drive transmission gear 1781, and as described above, a thrust force in the H direction is produced in the drum unit 2269. By this thrust force, the non-driving side flange 2264 and the drum sliding portion 2271*q* are brought into contact with each other, and the movement of the drum unit 2269 in the H direction is restricted. In the other respects, the cleaning unit 2260 has the same structure as that in embodiment 17, the description thereof will be omitted.

<Engagement Between Driving Side Flange 2263 and Drive Transmission Gear 1781*t*>

Figure 86:
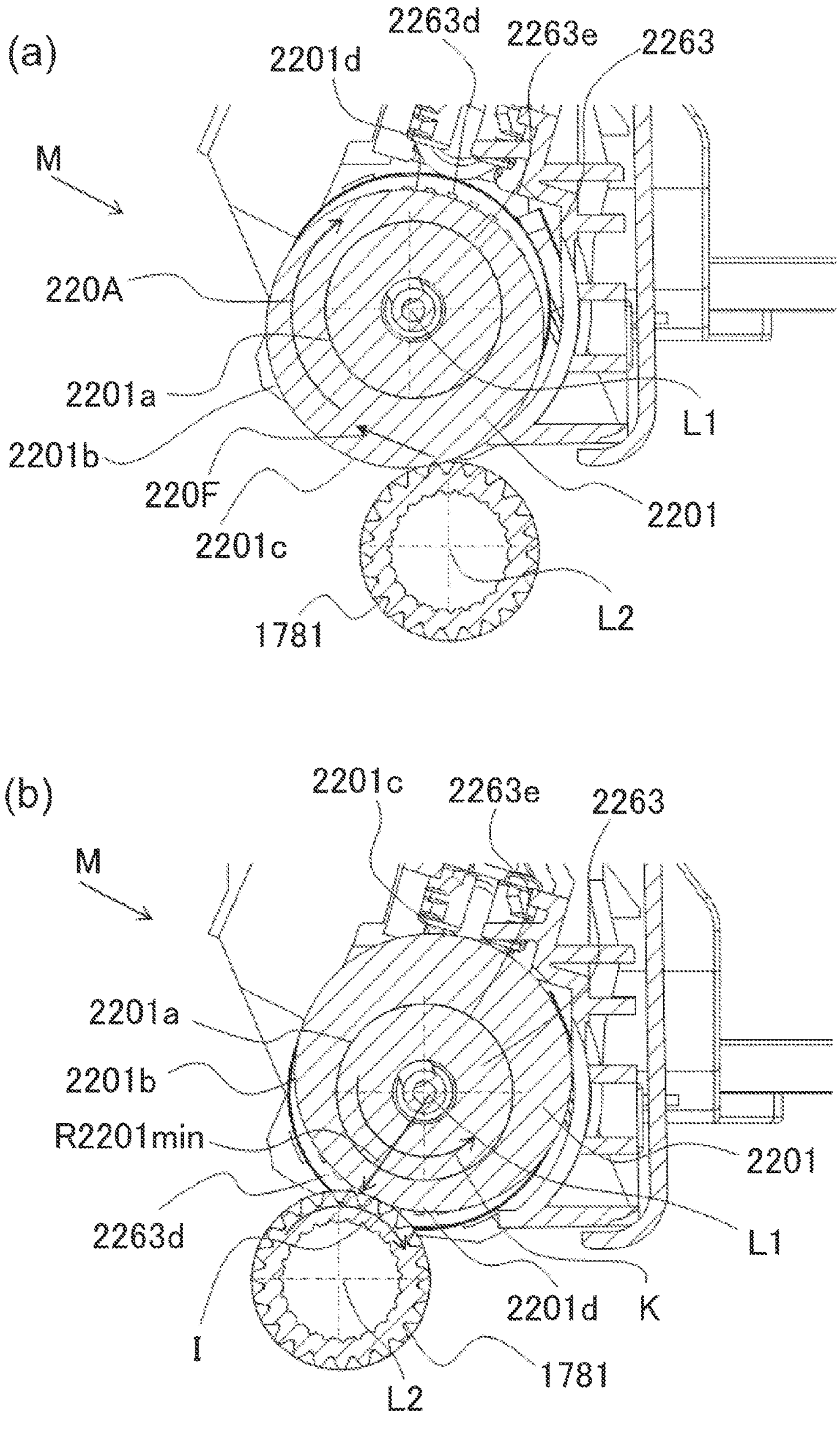
FIG. 86 is cross-sectional views of the driving side flange and the drive transmission gear.

Next, referring to FIG. 86, the engagement between the driving side flange 2263 and the drive transmission gear 1781 will be described. FIG. 86 is a cross-sectional view of the driving side flange 2263 and the drive transmission gear 1781, taken along a plane perpendicular to the rotational axis L1 and passing through the eccentric ring 2201, wherein part (a) of this Figure shows a state at the instance of contact of the eccentric ring 2201 with the drive transmission gear 1781, and part (b) shows a state in which the cartridge B has been mounted in the apparatus main assembly A. FIG. 86, the developing unit is not shown for the sake of simplicity.

As shown in part (a) of FIG. 86, the thick portion 2201*c* of the eccentric ring 2201 projects toward the drive transmission gear 1781 due to the influence of gravity or the like in the radial direction with respect to the rotational axis L1. That is, the gap g is filled at the portion where the thick portion 2201*c* exist. Therefore, at the time of the cartridge is being mounted along the mounting direction M, the thick portion 2201*c* comes into contact with the drive transmission gear 1781 sooner or later. At this time, the thick portion 2201*c* receives the reaction force 220F from the drive transmission gear 1781 against the mounting of the cartridge. As the cartridge moves in the mounting direction M, the eccentric ring 2201 is rotated in the rotational direction 220A about the rotational axis L1 by the reaction force 220F. Then, when the mounting of the cartridge is completed, as shown in part (b) of FIG. 86, the phase of the eccentric ring 2201 in the rotational direction is determined in a state that the thin portion 2201*d* is in contact with the tooth free end of the drive transmission gear 1781. As described above, the thickness of the thin portion 2201*d* satisfies that it retracts from the first gear portion 2263*c* and the projection 2263*d* of the driving side flange 2263 to provide the gap g (see FIG. 84), so that the interference between the ring 2201 and the drive transmission gear 1781 is avoided. For this reason, the driving side flange 2263 can be moved to the mounting completion position without interference between the eccentric ring 2201 and the drive transmission gear 1781, and the first gear portion 2263*c* and the projection 2263*d* are properly brought into engagement with the drive transmission gear 1781, thus establishing the drive transmittable state. As has been described in embodiment 17, when the drive transmission gear 1781 rotates in a predetermined direction, the driving side flange 2263 rotates in interrelation with the drive transmission gear 1781, and the eccentric ring 2201 rotates idly while maintaining the phase in the rotational direction. The backlashless state in the rotational direction during driving is the same as that in Embodiment 17, and therefore, the description thereof will be omitted.

In this embodiment, the eccentric ring 2201 provided between the first gear portion 2263*c* and the projection 2263*d* with respect to the direction of the rotational axis L1 has such a structure that it has a portion (thick wall portion 2201*c*) projecting beyond the first gear portion 2263*c* and the projection 2263*d* in the radial direction of the center of the rotational axis L1. For the eccentric ring 2201, the thin portion 2201*d* is placed at a position opposing the drive transmission gear 1781 in a state in which the driving side flange 2263 and the drive transmission gear 1781 are engaged with each other, so that the eccentric ring 2201 can be retracted in the radial direction beyond the first gear portion 2263*c* and the projection 2263*d* (reduce the radius from the rotational axis L1). By this, the driving side flange 2263 and the drive transmission gear 1781 are properly brought into meshing engagement with each other, so that the driving side flange 2263 receives the drive force FD and the restriction force FB and can be driven in a backlashless state as in the case of the eighteenth embodiment.

In this embodiment, the eccentric ring 2201 is provided with one thick portion 2201*c* and one thin portion 2201*d*, but it may be provided with a plurality of thick portions 2201*c* and/or a plurality of thin portions 2201*d*. In addition, although the eccentric ring 2201 is rotatably provided with respect to the small diameter portion 2263*e*, it may be fixed to the small diameter portion 2263*e* so as to be non-rotatable, and in such a case, as shown in part (b) of FIG. 86, the thin portion 2201*d* may be fixed in a phase in which the thin portion 2201*d* is placed at a position opposing the drive transmission gear 1781.

In addition, the thick portion 2201*c* may be structured to fill only a part of the gap g without filling the entirety of the area of the gap g. That is, the radius R2201max is selected to be smaller than the radius R2263*d* and larger than the radius R2201min. The eccentric ring 2201 cannot fill the gap g, and the gap g always exists. In such a case, it can be said that the eccentric ring 2201 functions as a member for changing the size of the gap g, and movable between a position where a large gap g is formed by the thin portion 2201*d* and a position where a small gap g is formed by the thick portion 2201*c*.

Modified Example of Embodiment 22

Figure 87:
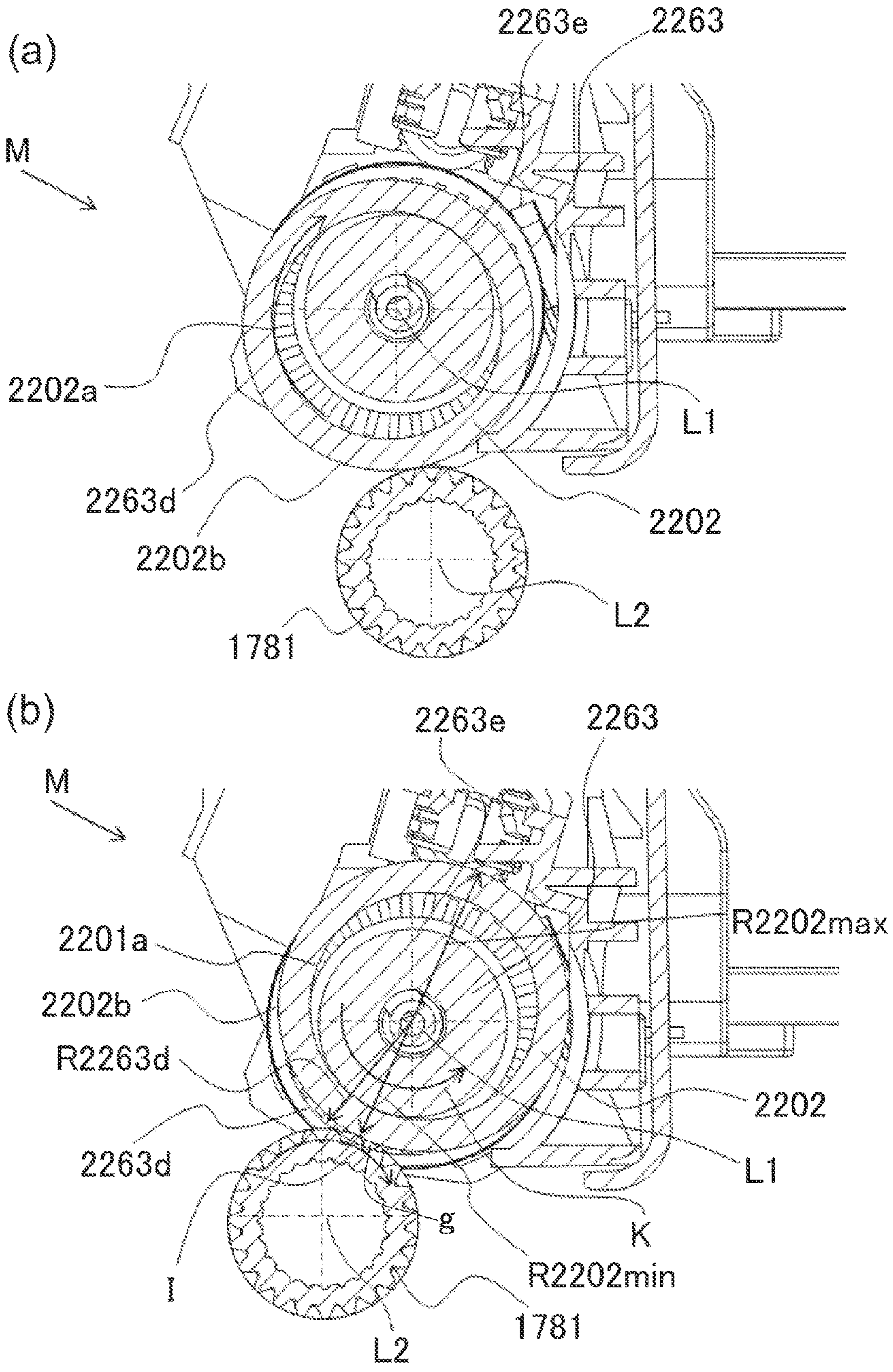
FIG. 87 is cross-sectional views of the driving side flange and the drive transmission gear.

Referring to FIG. 87, a modified example of Embodiment 22 will be described. FIG. 87 is a cross-sectional view of the driving side flange 2263 and the drive transmission gear 1781, taken along a plane perpendicular to the rotational axis L1 and passing through the eccentric ring 2202, wherein part (a) shows a state immediately before the eccentric ring 2202 contacts the drive transmission gear 1781, and part (b) shows a state in which the cartridge B has been mounted in the apparatus main assembly A.

As shown in part (a) of FIG. 87, the eccentric ring (intermediate member) 2202 has cylindrical shapes of an inner diameter portion 2202*a* and an outer diameter portion 2202*b*, and the center positions of them are substantially the same. The eccentric ring 2202 is provided at the position of the small diameter portion 2263*e* of the driving side flange 2263. A diameter of the inner diameter portion 2202*a* is larger than the diameter of the small diameter portion 2263*e* of the driving side flange 2263. A diameter of the outer diameter portion 2202*b* is larger than the diameter of the addendum circle (length obtained by doubling the radius R2263*d*) of the first gear portion (not shown) of the driving side flange 2263 and the projection 2263*d*. By this, for the eccentric ring 2202, the outer diameter portion 2202*b* projects radially beyond the first gear portion (not shown) and the projection 2263*d* of the driving side flange 2263, on the side where the gap between the inner diameter portion 2202*a* and the small diameter portion 2263*e* expands at the time when the inner diameter portion 2202*a* is shifted in the radial direction centered on the rotational direction L1 so as to eliminate the gap therebetween. That is, the maximum value R2201max of the radius (distance) of the outer diameter portion 2202*b* of the eccentric ring 2202 from the rotational axis L1 is larger than the maximum radius R2263*d* of the projection 2263*d* and the radius of the addendum circle of the first gear portion 2263*c*. In addition, on the side where the gap between the inner diameter portion 2202*a* and the small diameter portion 2263*e* is narrowed, the outer diameter portion 2202*b* is retracted in the radial direction beyond the first gear portion (not shown) of the driving side flange 2263 and the projection 2263*d*. That is, the minimum value R2201min of the radius (distance) of the outer diameter portion 2202*b* of the eccentric ring 2202 from the rotational axis L1 is smaller than the maximum radius R2263*d* of the projection 2263*d* and the radius of the addendum circle of the first gear portion 2263*c*.

Next, the operation when the cartridge is mounted to the image forming apparatus will be described. As shown in part (a) of FIG. 87, the eccentric ring 2202 is in a state of shifting to the drive transmission gear 1781 side due to the influence of gravity or the like. That is, the gap g between the first gear portion (not shown) and the projection 2263*d* in the region facing the drive transmission gear 1781 is filled with the eccentric ring 2202. When the cartridge is mounted along the mounting direction M, the eccentric ring 2202 comes into contact with the drive transmission gear 1781. Then, as the cartridge mounting operation progresses, the cartridge is moved to the mounting position, then, as shown in part (b) of FIG. 25, the portion of the eccentric ring 2202 opposing the drive transmission gear 1781 abuts on the drive transmission gear 1781 to move in the direction of the rotational axis L1. At this time, the outer diameter portion 2202*b* is retracted in the 220B direction beyond the first gear portion (not shown) and the projection 2263*d*. Therefore, a gap g is formed between the first gear portion (not shown) and the projection 2263*d*. By this, the driving side flange 2263 can be moved to the mounting position without the eccentric ring 2202 interfering with the drive transmission gear 1781, and the first gear portion (not shown) and the projection 2263*d* can be properly brought into meshing engagement with the drive transmission gear 1781. As described above, in this Modified Example, the eccentric ring (intermediate member) 2202 moves in the direction perpendicular to the rotational axis L1 (radial direction centered on the rotational axis L1), so that it is possible to take a position for providing the gap g and the position for filling the gap g.

As described above, according to this embodiment and the modified examples, the same effects as those of embodiment 17 can be obtained. In addition, the elements of each of the above-described embodiments can be applied to the structure of this embodiment. In particular, the structures of the first helical tooth (first projection) of the first gear portion of the driving side flange and the second helical tooth (second projection) of the second gear portion (projection 2263*d*) may be modified to the helical teeth, the flat teeth, the projections and the like shown in Embodiment 2, 3, 4, 5, 6, 10, 11, 12, 13, 14, 16 or 17.

Embodiment 23

Next, Embodiment 23 will be described below referring to FIGS. 88 to 91. This embodiment is different from Embodiment 17 in that it has a member capable of filling the gap g between the first gear portion and the second gear portion. The other points are the same as in Embodiment 17, and detailed description thereof will be omitted. In addition, among the elements in this embodiment, the elements corresponding to the elements of Embodiment 1 are assigned the reference numerals associated with the corresponding elements of Embodiment 1. Regarding these elements, the matters not specifically explained are the same as the corresponding elements of Embodiment 1.

<Drive Side Flange 2363>

Figure 88:
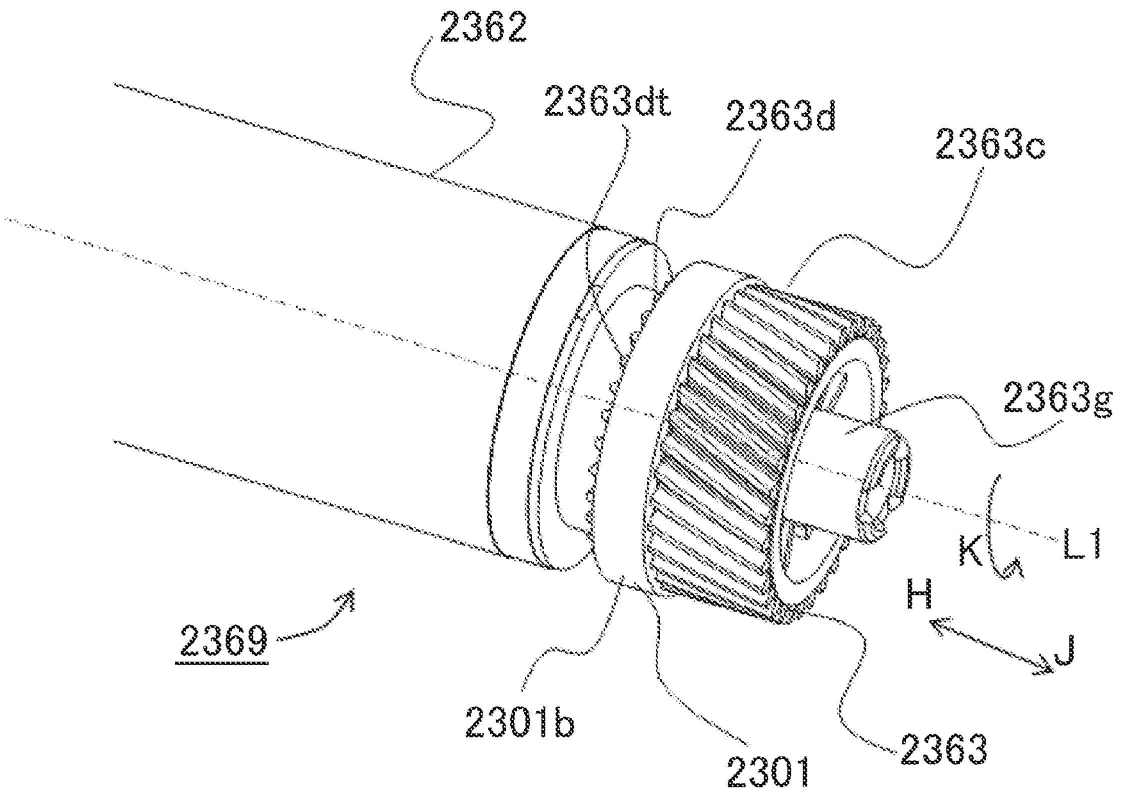
FIG. 88 is a partial perspective view of the drum unit.
Figure 89:
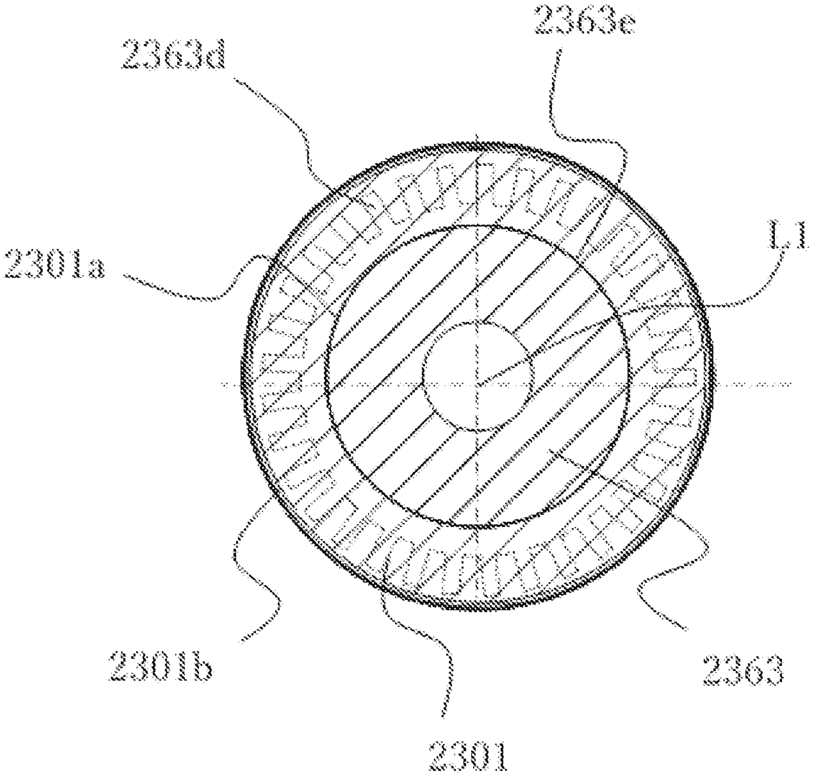
FIG. 89 is a cross-sectional view of the driving side flange.

First, referring to FIGS. 88 and 89, the structure of the driving side flange 2363 will be described. FIG. 88 is a partial perspective view of the driving side of the drum unit 2369. FIG. 89 is a cross-sectional view of the driving side flange 2363 taken along a plane perpendicular to the rotational axis L1 and passing through the elastic member 2301. The driving side flange 2363 is provided, around the rotational axis L1, with a first gear portion (first unit side gear portion) 2363*c*, a projection 2363*d*, a small diameter portion 2363*e*, and a cylindrical support portion 2363*g*, and further, the small diameter portion 2363*e* is provided with an elastic member 2301 mounted thereon.

The first gear portion 2363*c* is an helical tooth having a helix angle α1. The cylindrical support portion (projection) 2363*g* has a cylindrical shape centered on the rotational axis L1 and is provided so as to project from the first gear portion 2363*c* in the direction opposite to the drum 2362 (downstream side in the J direction) along the rotational axis L1. The small diameter portion 2363*e* has a substantially cylindrical shape, and is provided so as to project from the first gear portion 2363*c* toward the drum 2362 side (upstream side in the J direction) along the rotational axis L1. The projections (second unit side gear portion, second gear portion, second rotation part) 2363*d* includes a plurality of projections (second projections, teeth) 2363*dt* extending in the radial direction with respect to the rotational axis L1 and is provided on the drum 2362 side (upstream side in the J direction) of the small diameter portion 2363*e* along the axis L1. The plurality of projections 2363*dt* are formed in a shape capable of engaging with the second main assembly gear portion 1781*d* of the drive transmission gear 1781 and transmitting (meshing) the driving force. Specifically, the plurality of projections 2263*dt* are projections projecting in the radial direction with respect to the rotational axis L1, and the free ends thereof are structured to be substantially at the same position as the addendum circle diameter of the first gear portion 2363*c*. In addition, the number of projections 2363*dt* is the same as the number of teeth of the first gear portion 2363*c*, and they are arranged at equal intervals in the rotational direction K about the rotational axis L1. In this manner, the plurality of projections 2363*dt* can mesh with the second main assembly gear portion 1781*d* and transmit the rotational driving force, and therefore, in this respect, the plurality of projections 2363*dt* can be said to be the second gear, and the projection 2363*d* is the second gear portion. The projection 2363*d* may be the gear portion shown in the second gear portion 1763*d* of Embodiment 17.

As shown in FIG. 89, the elastic member (intermediate member) 2301 has a generally cylindrical shape, and includes an inner diameter portion 2301*a* and an outer diameter portion 2301*b*. The diameter of the inner diameter portion 2301*a* is selected to be equal to or smaller than the diameter of the small diameter portion 2363*e* of the driving side flange 2363. In addition, the radius of the outer diameter portion 2301*b* is selected to be larger than the radius of the addendum circle of the first gear portion 2363*c* and the projection 2363*d* of the driving side flange 2363. The elastic member 2301 is made of an elastically deformable material such as sponge or rubber. The elastic member (intermediate member) 2301 is a member which fills the gap g between the first gear portion 2363*c* and the projection 2363*d.*

The driving side flange 2363 and the elastic member 2301 are supported in a state that the inner diameter portion 2301*a* is press-fitted around the small diameter portion 2363*e*. Even if the tightening to the small diameter portion 2363*e* is loose such that the relative rotation therebetween is easy, no problem arises, and therefore, any setting may be used. In addition, as described above, the outer diameter portion 2301*b* of the elastic member 2301 has a radius larger than that of the first gear portion 2363*c* and the projection 2363*d*, so that the outer diameter portion 2301*b* projects beyond the first gear portion 2363*c* and the projection 2363*d* in the radial direction.

Figure 90:
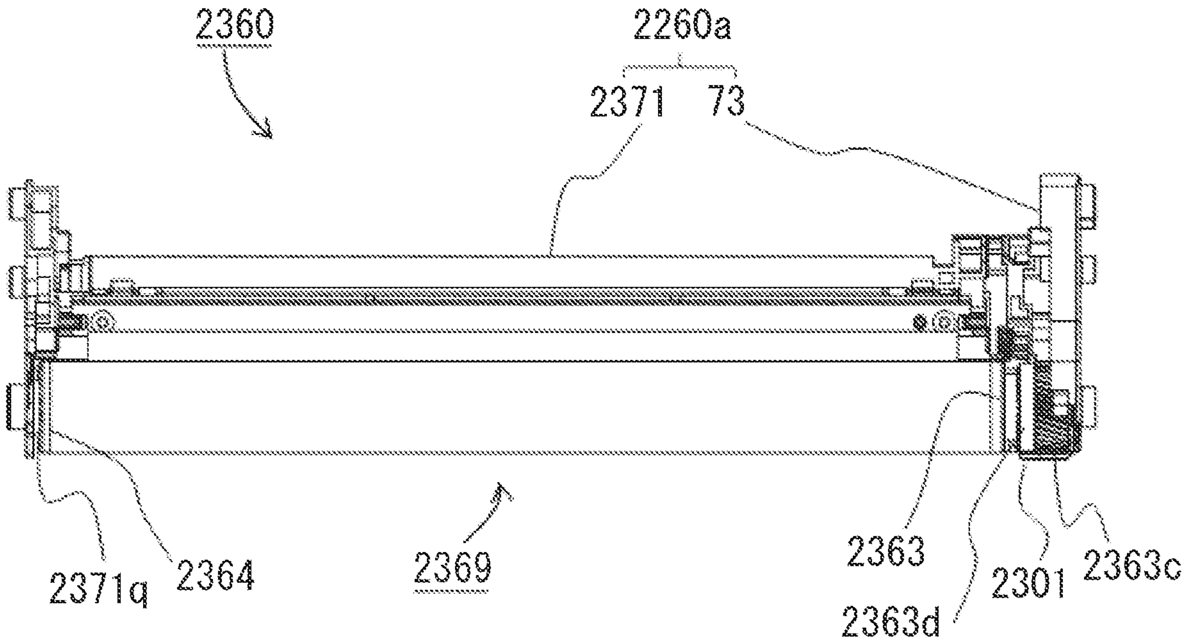
FIG. 90 is an illustration of a state in which the drum unit is assembled to the cleaning unit.

Next, referring to FIG. 90, a state in which the drum unit 2369 is assembled to the cleaning unit 2360 will be described. FIG. 90 is an illustration showing a state in which the drum unit 2369 is assembled to the cleaning unit 2360. The cleaning frame 2360*a* of the cleaning unit 2360 supports the drum unit 2369. The cleaning frame 2360*a* includes a frame member 2371 and a drum bearing member 73. The frame member 2371 is provided with a drum sliding portion 2371*q*.

Similarly to that described in Embodiment 17, when the drive transmission gear 1781 rotates in a predetermined direction after the driving side flange 2363 of the drum unit 2369 engages with the drive transmission gear 1781 the driving side flange 2363 rotates in interrelation with the drive transmission gear 1781, and on the other hand, a thrust force in the H direction is produced to the drum unit 2369, as described above, and the thrust force brings the non-drive drum flange 2364 and the drum sliding portion 2271*q* into contact with each other, so that movement the drum unit 2269 in the H direction is restricted. The other structures of the cleaning unit 2360 are the same as those of Embodiment 17, the description thereof will be omitted.

<Engagement Between Driving Side Flange 2363 and Drive Transmission Gear 1781>

Figure 91:
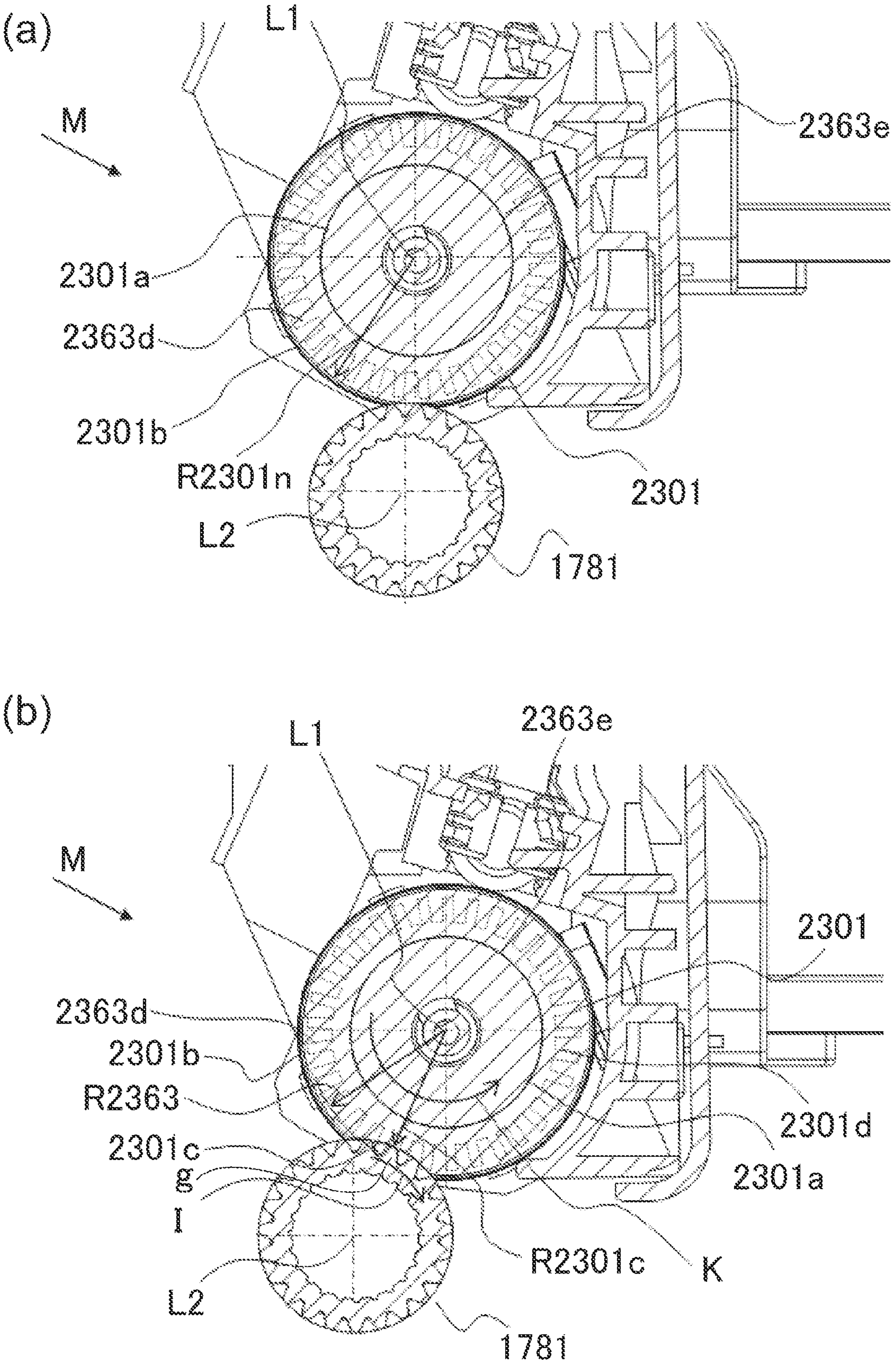
FIG. 91 is cross-sectional views of the driving side flange and the drive transmission gear.

Next, referring to FIG. 91, the engagement between the driving side flange 2363 and the drive transmission gear 1781 will be described. FIG. 91 is a cross-sectional view of the driving side flange 2363 and the drive transmission gear 1781, taken along a plane perpendicular to the rotational axis L1 and passing through the eccentric ring 2201, wherein part (a) show a state at the instance when the elastic member 2301 is brought into contact with the drive transmission gear 1781, and part (b) shows a state in which the cartridge B has been mounted on the apparatus main assembly A. The developing unit is not shown in FIG. 91 for the sake of simplicity.

As shown in part (a) of FIG. 91, the outer diameter portion 2301*b* of the elastic member 2301 is in a state of protruding toward the drive transmission gear 1781 in the radial direction with respect to the rotational axis L1. That is, the radius R2301*n* centered on the rotational axis L1 of the elastic member 2301 is larger than the maximum radius R2263*d* of the projection 2263*d* and the radius of the addendum circle of the first gear portion 2263*c*. Therefore, when the cartridge is mounted along the mounting direction M, the outer diameter portion 2301 of the elastic member 2301 comes into contact with the drive transmission gear 1781. Then, when the mounting of the cartridge is completed, as shown in part (b) of FIG. 91, the elastic member 2301 is compressed and deformed along the shape of the drive transmission gear 1781 due to interference with the drive transmission gear 1781 to form a gap g. Therefore, in the driving side flange 2363, the first gear portion 2363*c* (FIG. 88) and the projection 2363*d* (FIG. 88) project beyond the elastic member 2301 in the deformed portion 2301*c* of the elastic member 2301. That is, the radius R2301*c* centered on the rotational axis L1 of the deformed portion 2301*c* of the elastic member 2301 is smaller than the maximum radius R2263 of the projection 2263*d* and the radius of the addendum circle of the first gear portion 2263*c*. In addition, by the elastic deformation of the elastic member 2301, the driving side flange 2363 can be moved to the mounting position, and the first gear portion 2363*c* and the projection 2363*d* are properly brought into meshing engagement with the drive transmission gear 1781 to enable the transmission of the drive force.

Then, when the drive transmission gear 1781 rotates in the I direction, the driving side flange 2363 rotates in the K direction, and the elastic member 2301 also rotates accordingly. The elastic member 2301 is deformed in accordance with the shape of the drive transmission gear 1781 when the undeformed portion 2301*d* of the elastic member 2301 enters the drive transmission gear 1781 as the driving side flange 2363 rotates. Then, the driving side flange 2363 further rotates and is released from the interference state with the drive transmission gear 1781, so that the shape of the deformed portion 2301*c* is restored. The elastic member 2301 repeats the above-descried states. By this, the driving side flange 2363 and the drive transmission gear 1781 can be appropriately meshed with each other to transmit the drive force. As a result, similarly to the eighteenth embodiment, the driving side flange 2363 receives the driving force FD and the restricting force FB, and can be driven in a backlashless state. Even when the small diameter portion 2363*e* and the inner diameter portion 2301*a* rotate relative to each other, the elastic member 2301 is rotated by the drive transmission gear 1781, so that the same state is provided.

In this embodiment, the elastic member 2301 placed between the first gear portion 2363*c* and the projection 2363*d* with respect to the direction of the rotational axis L1 has a portion projecting beyond the first gear portion 2363*c* and the projection 2363*d* in the radial direction from the center of the rotational axis L1. By deformation, the elastic member 2301 can be retracted in the radial direction beyond the first gear portion 2363*c* and the projection 2363*d* (the radius from the center of the rotational axis L1 is reduced). That is, the elastic member 2301 can establish a state in which the gap g is filled and a state in which the gap g is formed. By this, the driving side flange 2363 and the drive transmission gear 1781 can be appropriately meshed with each other, and the driving side flange 2363 can be driven in a backlashless state by receiving the drive force FD and the restriction force FB.

In this embodiment, the elastic member 2301 is provided so as to cover the entire circumference of the small diameter portion 2363*e* in the circumferential direction about the rotational axis L1, but it may be partially provided. Further, in this embodiment, the radius of the outer diameter portion 2301*b* of the elastic member 2301 about the rotational axis L1 is constant in the circumferential direction (perfect circular shape as viewed in the direction along the rotational axis L1) before being mounted on the apparatus main assembly A. However, the radius of the outer diameter portion 2301*b* about the rotational axis L1 may be non-uniform in the circumferential direction.

In this embodiment, an example is shown in which the member provided between the first gear portion 2363*c* and the projection 2363*d* with respect to the direction of the rotational axis L1 is an elastic member 2301. However, the member provided between the first gear portion 2363*c* and the projection 2363*d* may be a movable member. In such a case, any structure may be used, if the radius R of the movable member from the rotational axis L1 is variable, and the radius R can be reduced to a value smaller than the maximum radius R2363 of the projection 2263*d* and the radius of the addendum circle of the 1 gear portion 2263*c* so that the driving side flange 2363 and the drive transmission gear 1781 can be appropriately meshed with each other. As described above, according to this embodiment, the same effect as that of Embodiment 17 can be provided. In addition, the elements of each of the above-described embodiments can be applied to the structure of this embodiment. In particular, the structures of the first helical tooth (first projection) of the first gear portion of the driving side flange and the second helical tooth (second projection) of the second gear portion (projection 2363*d*) may be modified to the structures of the helical teeth, the flat teeth, the projections and the like of Embodiment 2, 3, 4, 5, 6, 10, 11, 12, 13, 14, 16 or 17.

Embodiment 24

Next, referring to FIGS. 92 to 99, Embodiment 24 will be described below. This embodiment is different from Embodiment 17, in that the first gear portion and the second gear portion are connected with a play, and/or the connection between the first gear portion and the second gear portion is releasable. The other points are the same as in Embodiment 17, and therefore, the detailed description thereof will be omitted. Further, among the elements in this embodiment, the elements corresponding to the elements of Embodiment 1 are assigned reference numerals associated with the corresponding elements of Embodiment 1. Regarding these elements, the matters not specifically explained are the same as the corresponding elements of Embodiment 1.

<Drive Side Drum Flange 2463>

Figure 92:
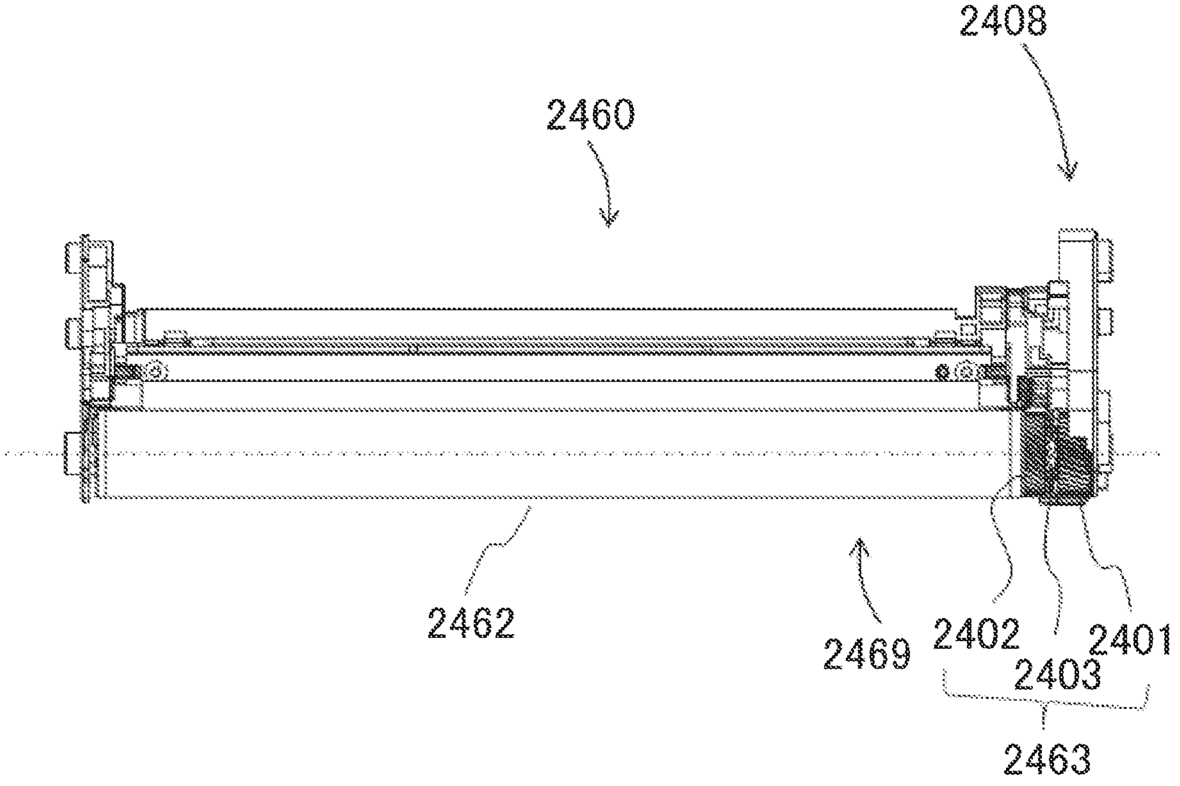
FIG. 92 is a side view of the cleaning unit.
Figure 93:
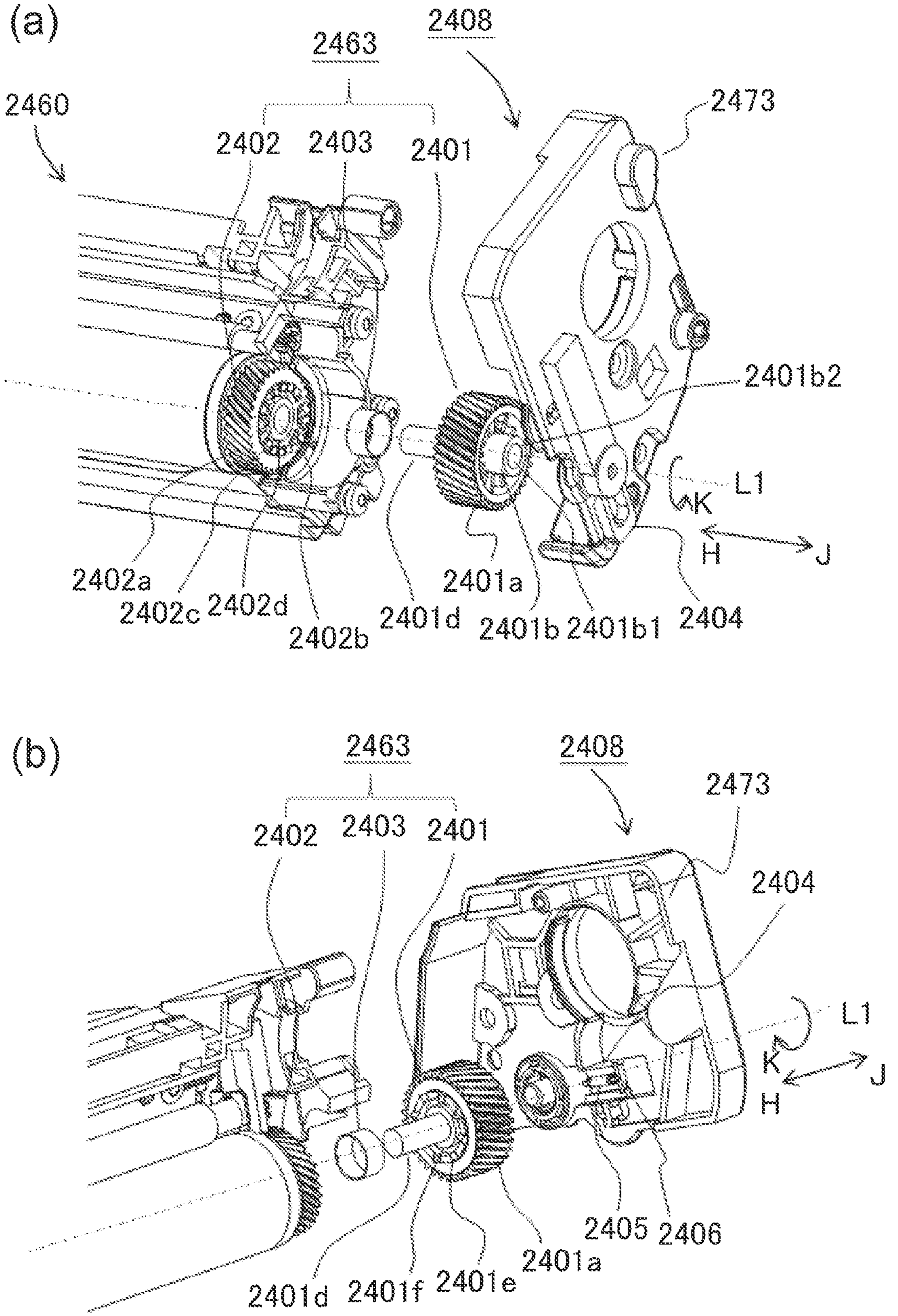
FIG. 93 is exploded perspective views of the cleaning unit and the driving side drum flange.

First, referring to FIGS. 92 and 93, the structure of the driving side drum flange 2463 will be described. FIG. 92 is a side view of the cleaning unit 2460 as viewed from the developing unit side along the direction perpendicular to the rotational axis L1. FIG. 93 is an exploded perspective view of the cleaning unit 2460 and the driving side drum flange 2463 on the driving side, wherein part (a) is a view as seen from the driving side, and part (b) is a view as seen from the non-driving side.

As shown in FIG. 92, in this embodiment, the driving side drum flange 2463 comprises a first gear 2401, a second gear 2402, and a compression spring 2403, and there is provided a drum bearing unit 2408 for functioning the driving side drum flange 2463. Further, as shown in FIG. 93, the driving side drum flange 2463 is provided with a second gear 2402, a compression spring 2403, and a first gear 2401 in this order from the drum 2462 side toward the downstream side in the J direction along the rotational axis L1.

The first gear 2401 comprises a first gear portion (first unit side gear portion) 2401*a*, a cylindrical portion 2401*b*, a shaft portion 2401*d*, a ratchet portion 2401*e*, and a cylindrical portion 2401*f*, around the rotational axis L1 as the center. The first gear portion 2401*a* has helical teeth (projections) having a helix angle α1, and is a gear portion having the same shape as the first gear portion 1763*c* of Embodiment 17. The cylindrical portion 2401*b* has a generally cylindrical shape, and is provided so as to project beyond the end of the first gear portion 2401*a* on the side away from the drum 2462 (downstream side in the J direction) along the rotational axis L1 direction. In the cylindrical portion 2401*b*, a hole portion 2401*b*1 is provided at the center of the rotational axis L1 along the rotational axis L1. In addition, an end surface 2401*b*2 substantially perpendicular to the rotational axis L1 is provided at the free end of the cylindrical portion 2401*b* in the projecting direction (downstream side with respect to the J direction). The shaft portion 2401*d* has a generally cylindrical shape, and projects beyond the end portion of the first gear portion 2401*a* on the drum 2462 side (downstream side in the H direction) along the rotational axis L1 direction. The ratchet portion 2401*e* is formed of a plurality of recess and projection slopes arranged in the rotational direction about the rotational axis L1 and is provided so as to project from the end portion of the first gear portion 2401*a* on the drum 2462 side (downstream side in the H direction). The cylindrical portion 2401*f* has a generally cylindrical shape, and is provided so as to be inside the ratchet portion 2401*e* and outside the shaft portion 2401*d* in the radial direction with respect to the rotational axis L1. In addition, the end surface of the cylindrical portion 2401*f* in the direction of the rotational axis L1 is provided so as to be at a position recessed from the ratchet portion 2401*e* (downstream side in the J direction).

The second gear 2402 comprises a second gear portion (second unit side gear portion) 2402*a*, a hole portion 2402*b*, a ratchet portion 2402*c*, and a cylindrical portion 2402*d* around the rotational axis L1. The second gear portion 2402*a* has helical teeth (projections) having a helix angle α2, has the same number of teeth as the first gear portion 2401*a*, and has the same shape as the second gear portion 1763*d* of Embodiment 17. The hole portion 2402*b* is a through hole provided coaxial with the rotational axis L1 of the second gear portion 2402, and the through hole has such a diameter as to permit rotation relative to the shaft portion 2401*d* of the first gear portion 2401*a*. The ratchet portion 2402*c* is formed of a plurality of recess and projection slopes arranged in the rotational direction about the rotational axis L1 so as to project from the end of the second gear portion 2402*a* on the side away from the drum 2462 (downstream side in the J direction). The cylindrical portion 2402*d* has a generally cylindrical shape, and is provided so as to be inside the ratchet portion 2402*c* and outside the hole portion 2402*b* in the radial direction with respect to the rotational axis L1. In addition, the end surface of the cylindrical portion 2402*d* in the rotational axis L1 direction is provided so as to be at a position retracted from the ratchet portion 2402*c* (upstream side with respect to the J direction). The inner diameter of the compression spring 2403 is larger than the outer diameter of the cylindrical portion 2401*f* of the first gear 2401 and the outer diameter of the cylindrical portion 2402*d* of the second gear 2402.

<Drum Bearing Unit 2408>

Figure 94:
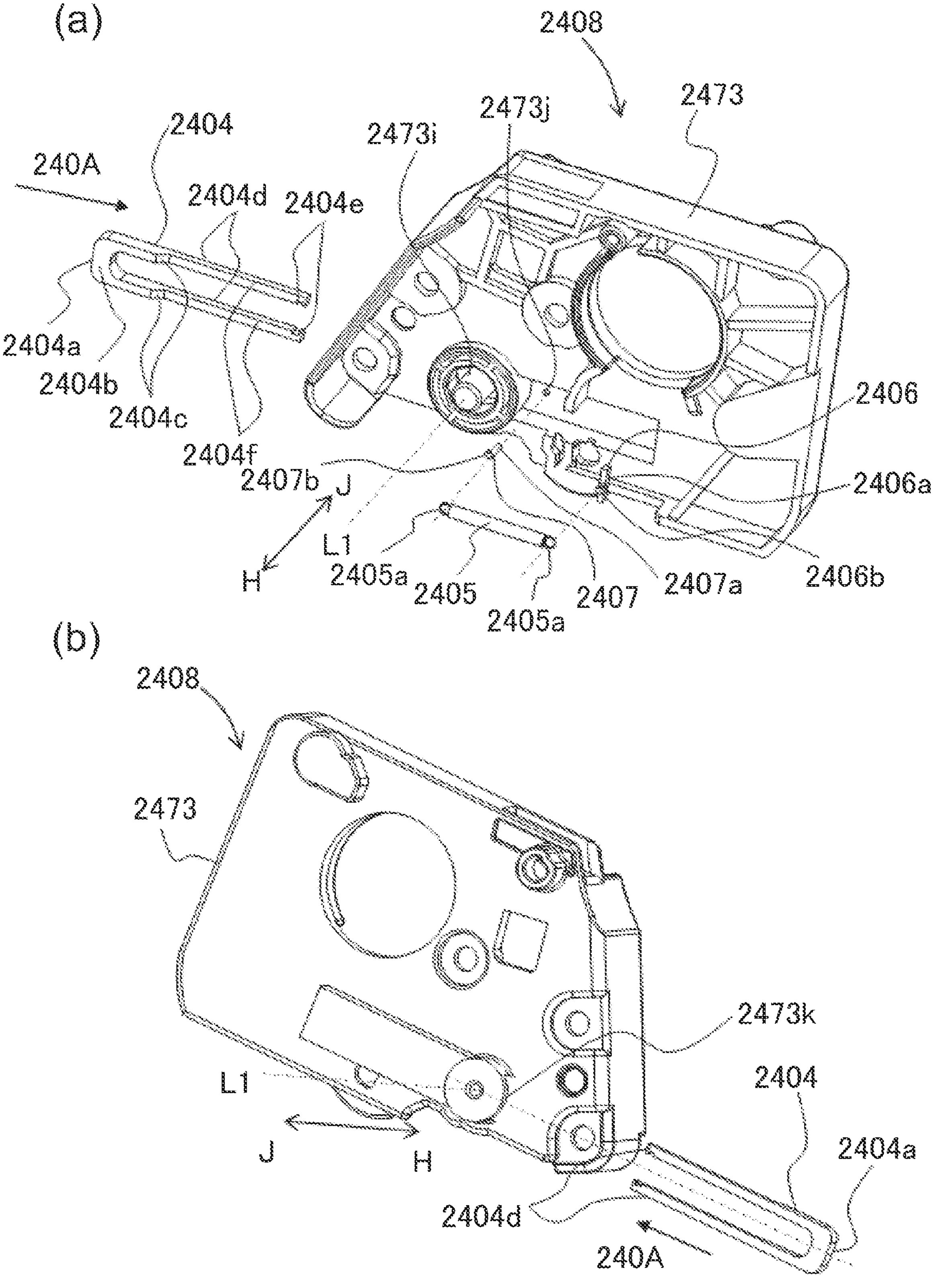
FIG. 94 is exploded perspective views of the drum bearing unit.

Next, referring to FIG. 94, the drum bearing unit 2408 will be described. FIG. 94 is an exploded perspective view of the drum bearing unit 2408, wherein part (a) of FIG. 94 shows a state as viewed from the non-driving side, and part (b) of FIG. 94 shows a state as viewed from the driving side. As shown in part (a) of FIG. 94, the drum bearing unit 2408 comprises a drum bearing member 2473, a movable member 2404, a tension spring 2405, a hook member 2406, and a hook pin 2407.

The drum bearing member 2473 is provided with a support shaft 2473*i* extending coaxially with the rotational axis L1 toward the non-driving side (downstream side in the H direction), and having such a shaft diameter that it is rotatable and movable in the hole portion 2401*b*1 of the first gear 2401. On the surface of the drum bearing member 2473 viewed from the non-driving side, a pin hole 2473*j* is provided on the downstream side of the movable member 2404 (which will be described hereinafter) in the movable direction 24A with respect to the rotational axis L1. The drum bearing member 2473 is provided with a hole portion 2473*k* in the movable direction 24A of the movable member 2404 (which will be described hereinafter) at a position which is on the upstream side of the rotational axis L1 in the movable direction 24A of the movable member 2404 and which faces the support shaft 2473*i*.

The movable member 2404 has a generally U-shape, and if a bottom portion of the U-shape is a pressed surface 2404*a*, the movable member 2404 includes projecting portions 2404*d* extending substantially perpendicular to the pressed surface 2404*a* from the respective ends of the pressed surface 2404*a*. The projection 2404*d* is provided inside the free end thereof with grooves 240*e* facing each other. From the neighborhood of the root of the projection 2404*d* to the pressed surface 2404*a*, the thickness in the direction of the rotational axis L1 is thicker as compared with the free end side, and the thickness different portions are connected by a slope 2404*c*. The surface on the side with a large thickness is referred to as a thick portion surface 2404*b*, and the surface on the side with a small thickness is referred to as a thin portion surface 2404*f*. In addition, the thickness of the thin portion surface 2404*f* is substantially constant.

The tension spring 2405 is provided with hooking portions 2405*a* at the respective ends of the spring. The hook member 2406 comprises a substantially I-shaped body portion 2406*a* and a hook portion 2406*b* projecting from the center of the body portion 2406*a*. The hook pin 2407 comprises a substantially cylindrical body portion 2407*a* and a hook portion 2407*b* provided at the free end of the body portion 2407*a*.

<Assembly of Drum Bearing Unit 2408>

Next, the assembly of the drum bearing unit 2408 will be described. As shown in part (b) of FIG. 94, the movable member 2404 is assembled to the drum bearing member 2473 by inserting the projecting portion 2404*d* into the hole portion 2473*k*. The inserting direction is the movable direction 240A of the movable member 2404. Thereafter, as shown in part (b) of FIG. 93, the hook member 2406 is assembled by engaging and fixing both ends of the body portion 2406*a* with the groove portion 2404*e* (see part (a) of FIG. 94) of the movable member 2404. The fixing method may use any means such as press fitting or bonding. In addition, as shown in part (a) of FIG. 94, the hook pin 2407 is assembled to the drum bearing member 2473 by inserting and fixing the body portion 2407*a* into the pin hole 2473*j*. The fixing method may be any means such as press fitting or bonding. Then, the tension spring 2405 is mounted to the hook member 2406 and the hook pin 2407 by hooking the hook portion 2406*a* to the hook portion 2406 and the hook portion 2407*b*, respectively. As described above, the drum bearing unit 2408 is assembled as shown in FIG. 93. When the movable member 2404 is assembled to the drum bearing unit 2408, it is urged by the tension spring 2405 in the direction opposite to the movable direction 2404.

<Assembly of Driving Side Drum Flange 2463>

Figure 95:
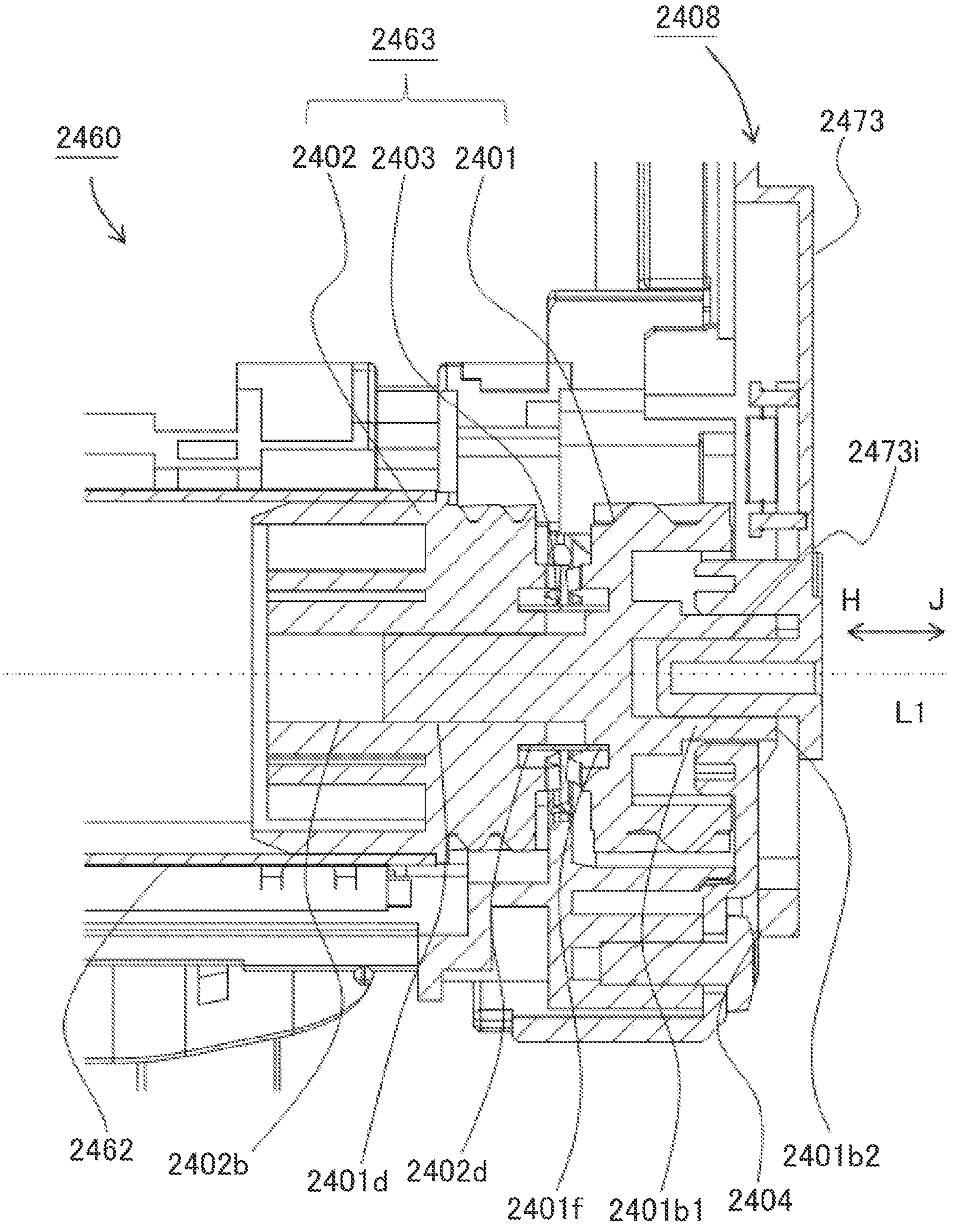
FIG. 95 is a partial sectional view of the cleaning unit.

Next, referring to FIG. 95, the assembly of the driving side drum flange 2463 will be described. FIG. 95 is a partial sectional view of the cleaning unit 2460 in the neighborhood of the driving side drum flange 2463, taken along a plane including the rotational axis L1. As shown in FIG. 95, the second gear 2402 is fixed to the end of the drum 2462. The first gear 2401 is supported at the hole portion 2402*b* so that the shaft portion 2401*d* is rotatable and movable in the direction of the rotational axis L1 relative to the second gear 2402. In addition, the first gear 2401, is rotatably supported at the hole portion 2401*b*1 by the support shaft 2473*i*, movably in the direction of the rotational axis L1 with respect to the drum bearing member 2473. The ends of the compression spring are supported by the cylindrical portion 2401*f* and the cylindrical portion 2402*d* with respect to the first gear 2401 and the second gear 2402, respectively and the compression spring 2403 is compressed therebetween. The first gear 2401 and the second gear 2402 are urged by the urging force of the compression spring 2403 in a direction away from each other along the rotational axis L1. Therefore, the first gear 2401 is urged toward the downstream side in the J direction by the urging force of the compression spring 2403, and the end surface 2401*b*2 of the first gear 2401 is in contact with the movable member 2404.

<Connecting/Disconnecting Operation Between the First Gear 2401 and Second Gear 2402>

Figure 96:
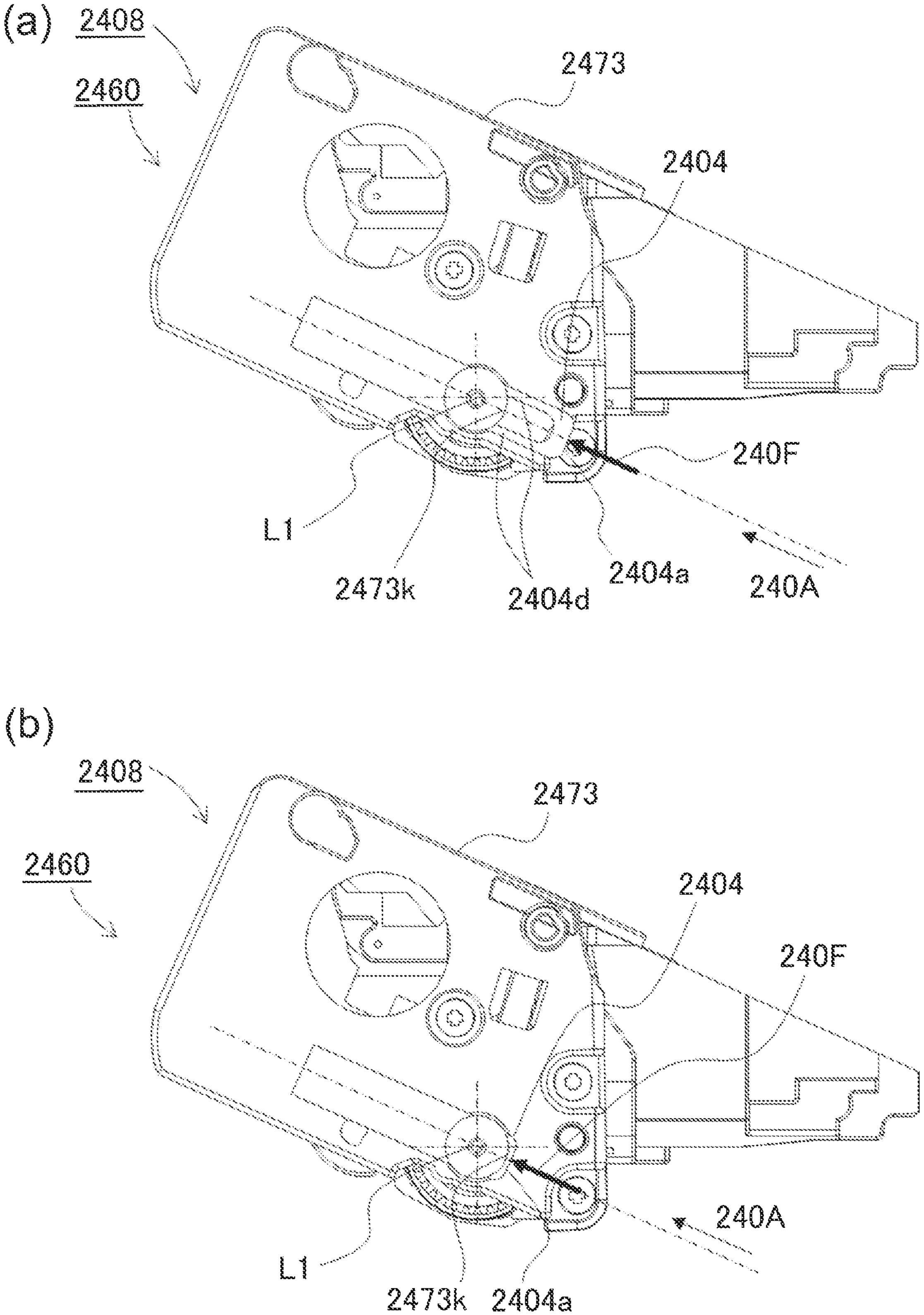
FIG. 96 is illustrations of a cleaning unit.
Figure 97:
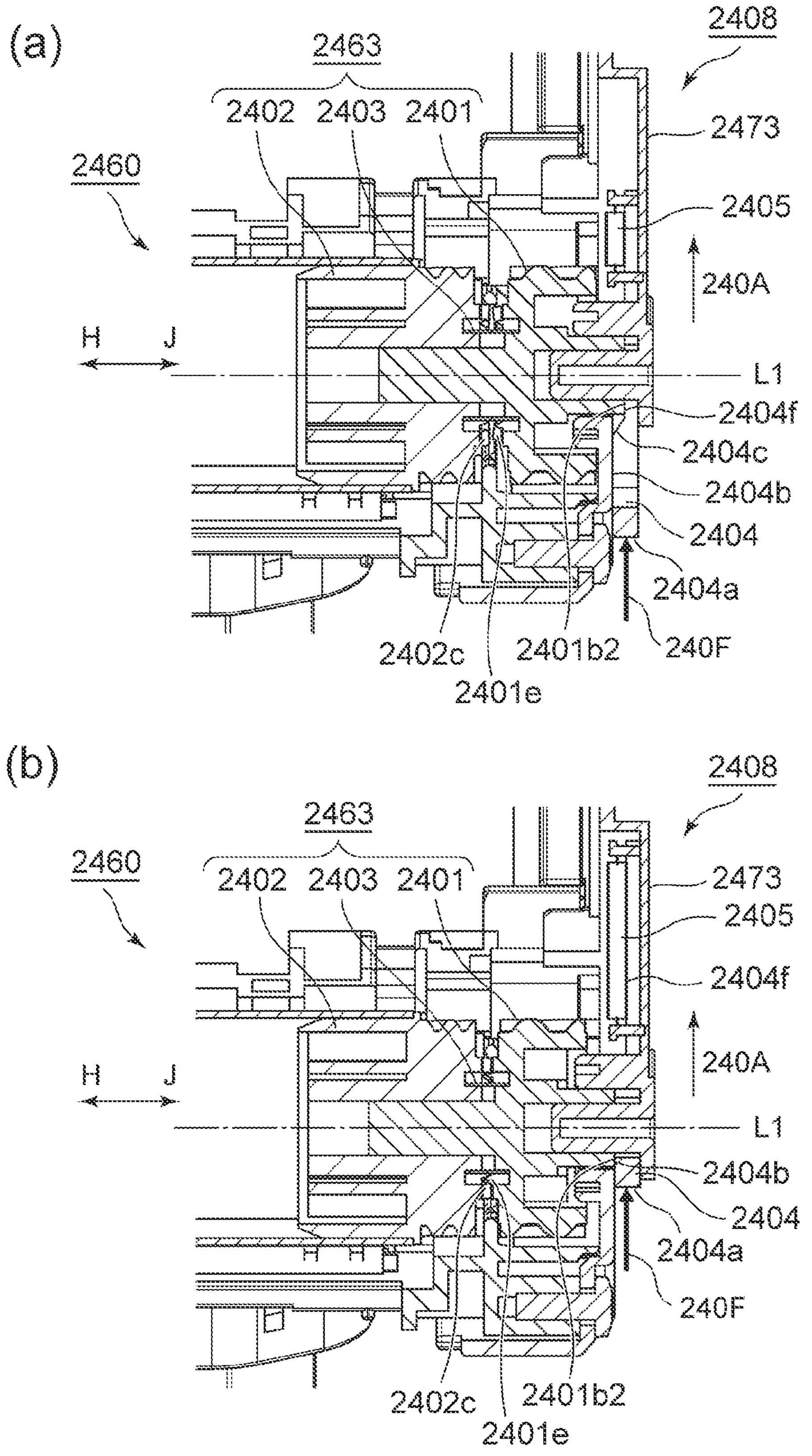
FIG. 97 is partial sectional views of the cleaning unit.

Next, referring to FIGS. 96 and 97, the connection and disconnection operations between the first gear 2401 and the second gear 2402 will be described. FIG. 96 is a view of the cleaning unit 2460 as viewed from the driving side along the rotational axis L1, wherein part (a) shows a state in which no external force is applied to the movable member 2404, and part (b) shows a state in which the movable member 2404 is pressed in the movable direction 240A. FIG. 97 is a partial sectional view of the cleaning unit 2460 in the neighborhood of the driving side drum flange 2463, taken along a plane including the rotational axis L1, wherein part (a) shows a state in which no external force is applied to the movable member 2404, and part (b) shows a state in which the movable member 2404 is pressed in the movable direction 240A.

As shown in part (a) of FIG. 96, when no external force is applied to the movable member 2404, the tension spring 2405 (see FIGS. 93 and 94) urges the movable member 2404 in the direction opposite to the movable direction 240A, and a projecting state beyond the drum bearing member 2473 (disconnected state) is maintained. On the other hand, as shown in part (b) of FIG. 96, when an external force 240F is applied to the pressed portion 2404*a* in the movable direction 240A, the movable member 2404 is pushed in the movable direction 240A against the spring force of the tension spring 2405 into a pushed state (connected state).

Next, referring to part (a) of FIG. 97, a state of the driving side drum flange 2463 in a state in which no external force is applied to the movable member 2404 will be described. In this state, the movable member 2404 is in a position projecting in the direction opposite to the movable direction 240A (state of part (a) of FIG. 96. Therefore, it is urged by the compression spring 2403 toward the drum bearing member 2473 side, and therefore, the first gear 2401 moves to the downstream side in the J direction, and the end surface 2401*b*2 is in contact with the thin portion surface 2404*f* of the movable member 2404. At this time, the ratchet portion 2401*e* of the first gear 2401 and the ratchet portion 2402*c* of the second gear 2402 are in a state of being separated in the direction of the rotational axis L1. That is, the driving side drum flange 2463 is in the disconnected state, the rotational driving force cannot be transmitted between the first gear 2401 and the second gear 2402, and the first gear 2401 can idly rotate with respect to the second gear 2402.

Next, a state in which an external force 240F acts on the pressed surface 240*a* of the movable member 2404 and the movable member 2404 is pushed into the movable direction 240A will be described. When an external force 240F acts on the movable member 2404, the movable member 2404 moves in the movable direction 240A. By this, in the first gear 2401, as shown in part (b) of FIG. 97, the end surface 2401*b*2 moves toward the drum 2462 side (upstream side in the J direction) by the cam action of the slope 2404 of the movable member 2404. Then, the ratchet portion 2401*e* of the first gear 2401 and the ratchet portion 2402*c* of the second gear 2402 become close to each other in the direction of the rotational axis L1 so that engagement in the rotational direction with each other is enabled. That is, the driving side drum flange 2463 becomes in a connected state, and the first gear 2401 and the second gear 2402 are in a state of being integrally rotatably connected to transmit the rotational driving force (connected state). Thereafter, the first gear 2401 is in a state in which the end surface 2401*b*2 is constrained from moving in the direction of the rotational axis L1 by the thick portion surface 2404*b* and is maintained at a position closer to the drum 2462 side.

Next, the description will be made as to operation in which the external force 240F acting on the movable member 2404 is lost and the movable member 2404 projects in the direction opposite to the movable direction 240A. When the external force 240F of the pressed surface 2404*a* is lost, the movable member 2404 moves in the direction opposite to the movable direction 240A by the spring force of the tension spring 2405. Then, the thin portion surface 2404*f* of the movable member 2404 moves to a position facing the end surface 2401*b*2 of the first gear 2401. Here, since the first gear 2401 is urged toward the drum bearing member 2473 by the spring force of the compression spring 2403, the first gear 2401 moves toward the drum bearing member 2473 until the end surface 2401*b*2 abuts on the thin portion surface 2401*f*. At this time, the ratchet portion 2401*e* of the first gear 2401 and the ratchet portion 2402*c* of the second gear 2402 are in a state of being separated in the direction of the rotational axis L1. That is, the rotational driving force cannot be transmitted between the first gear 2401 and the second gear 2402 (disconnection state).

As described above, the cartridge B comprises a clutch mechanism including a ratchet portion 2401*e*, a ratchet portion 2402*c*, a movable member 2404, and a compression spring 2403, and by the movement of the movable member 2404 relative to the drum bearing member 2473, the first gear 2401 and the second gear 2402 of the driving side drum flange 2463 are connected and separated relative to each other so that switching is capable between a state in which the driving force is transmitted with integrally rotatable connection therebetween and a state in which the driving force cannot be transmitted (disconnection).

<Mounting of Cartridge B to Main Assembly A>

Figure 98:
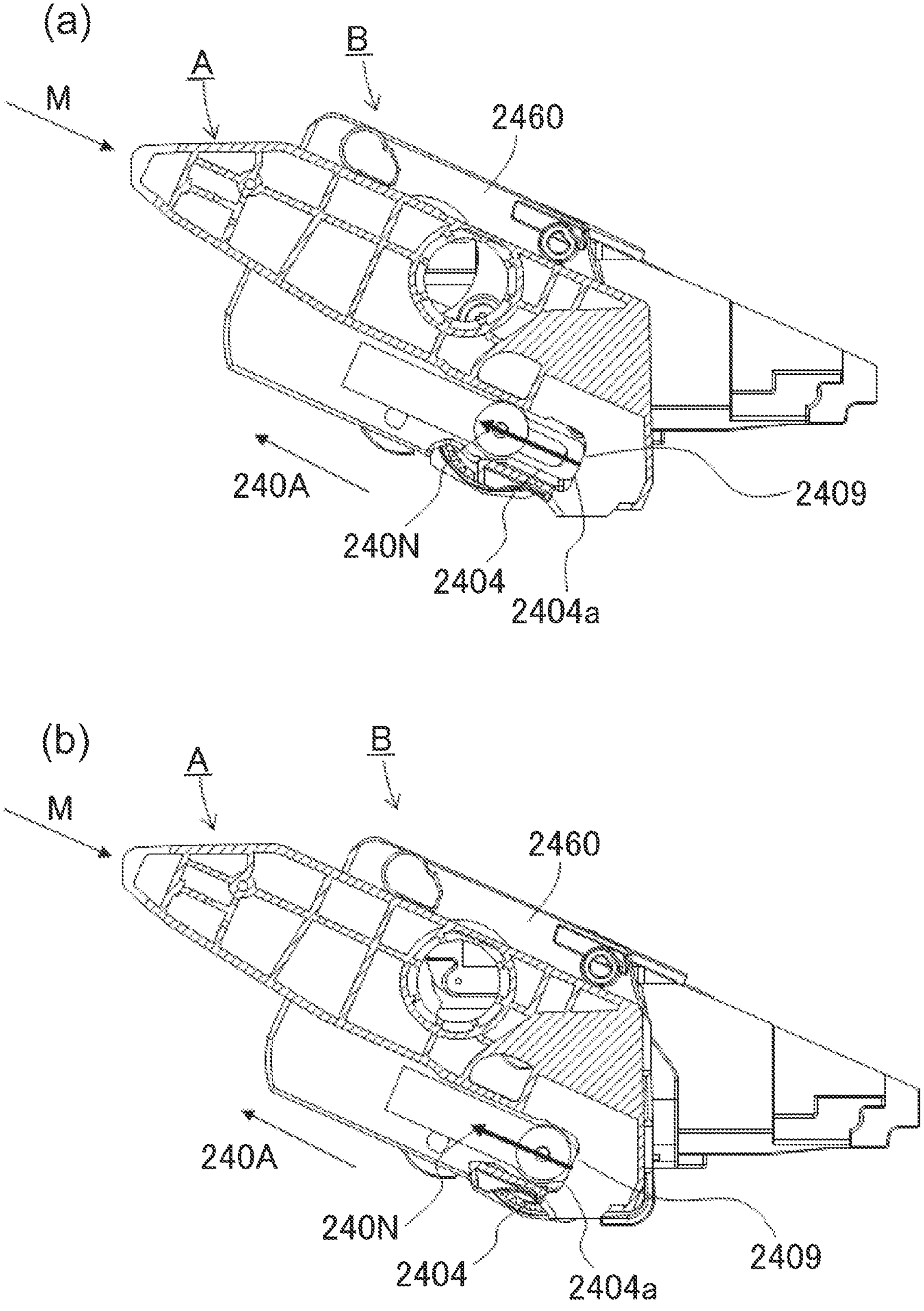
FIG. 98 is illustrations of a cartridge and an apparatus main assembly.
Figure 99:
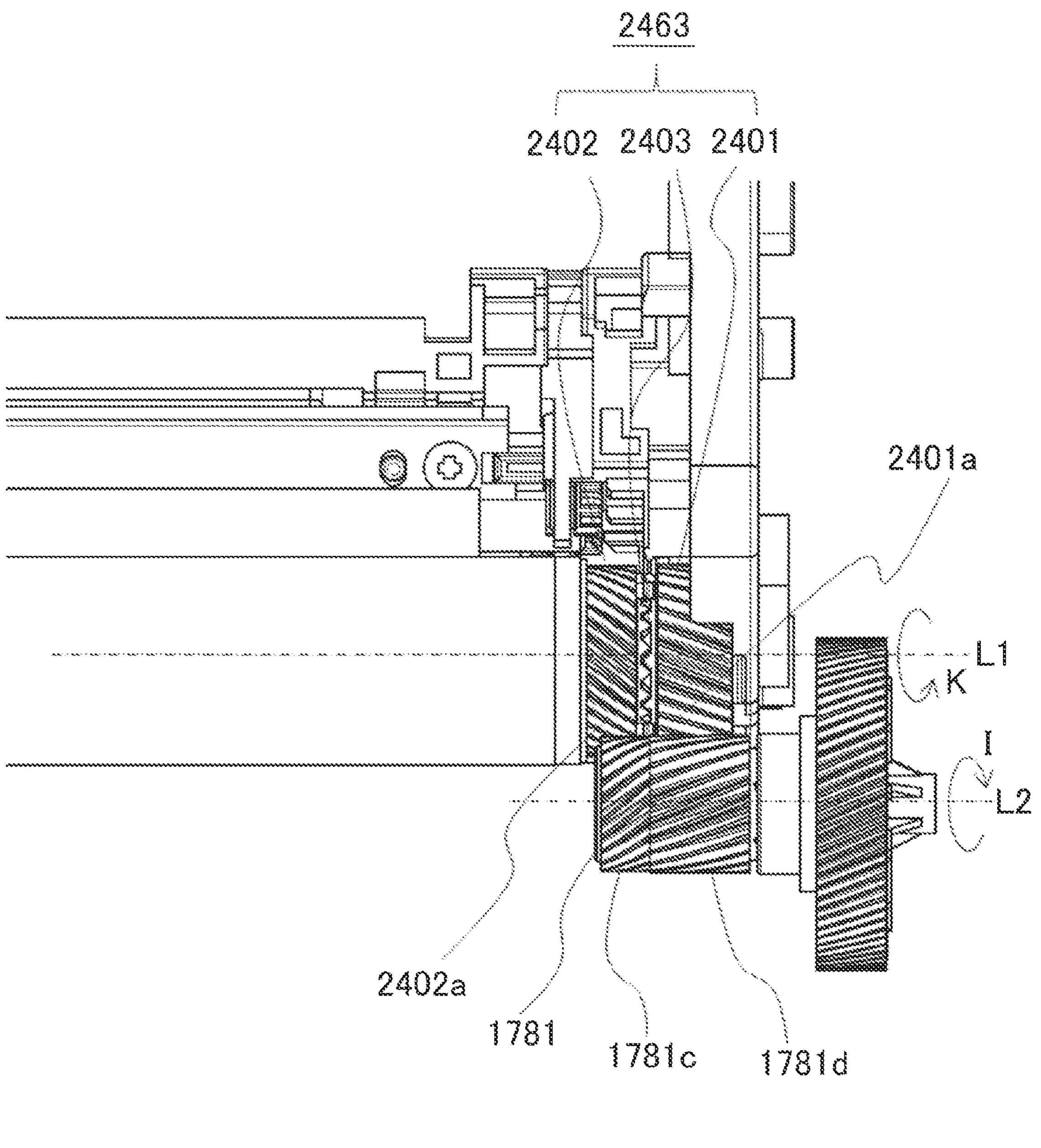
FIG. 99 is an illustration of a driving side drum flange 2463 which engages with a drive transmission gear.

Next, referring to FIGS. 98 and 99, operation of mounting the cartridge B to the apparatus main assembly A will be described. FIG. 98 is an illustration of the cartridge B and the apparatus main assembly A as viewed along the rotational axis L1. Part (a) of FIG. 98 shows a state in which the movable member 2404 has started to come into contact with a first driving side plate 2409 while the cartridge B is being mounted to the apparatus main assembly A, and part (b) of FIG. 98 shows a state in which the cartridge B has been completely mounted to the apparatus main assembly A. In addition, FIG. 99 is an illustration of the driving side drum flange 2463 engaged with the drive transmission gear 1781, as viewed along the direction perpendicular to the rotational axis L1. FIGS. 98 and 99 do not show portions that are not necessary for explanation in order to simplify the drawings.

As shown in part (a) of FIG. 98, the movable direction of the movable member 2404 is structured to be substantially parallel to the mounting direction M of the cartridge B. As the mounting operation of the cartridge B progresses, the movable member 2404 is brought into contact with the first driving side plate 2409 of the apparatus main assembly A at the pressed surface 2404*a* to receive a reaction force 240N against the mounting operation of the cartridge B. By this reaction force 240N, the movable member 2404 is pushed in the movable direction 240A. When the mounting operation of the cartridge B is completed, the movable member 2404 is completely pushed in the movable direction 240A by the first driving side plate 2409. At this time, as described above, the driving side drum flange 2463 is in the connected state, so that the drive transmission is enabled between the first gear 2401 and the second gear 2402 (see part (b) of FIG. 97). Then, as shown in FIG. 99, the driving side drum flange 2463 is engaged with the drive transmission gear 1781 in the connected state, the first gear portion 2401*a* is engaged with the first main assembly gear 1781*c*, and the second gear portion 2402*a* is engaged with the second main assembly gear 1782*d*, respectively.

<Drive Operation Between Driving Side Drum Flange 2463 and Drive Transmission Gear 1781>

Figure 100:
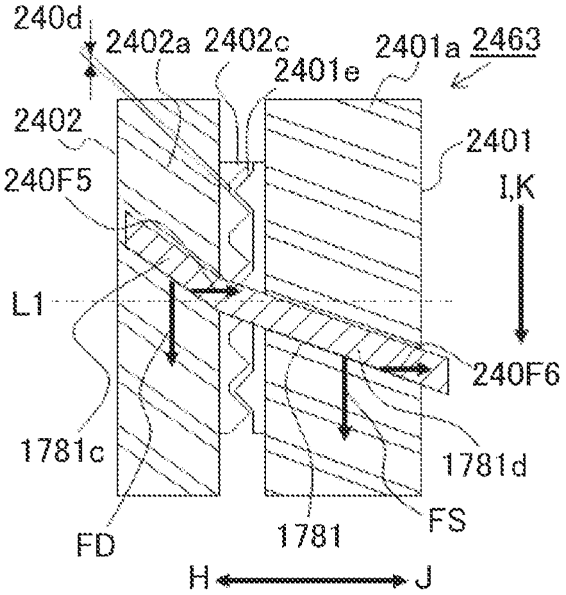
FIG. 100 is schematic sectional views of the meshing engagement portion between the driving side drum flange and the drive transmission gear.
Figure 100:
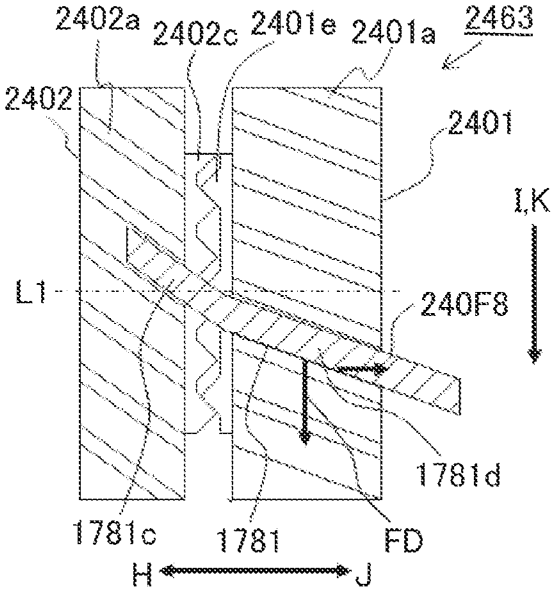
Figure 100:
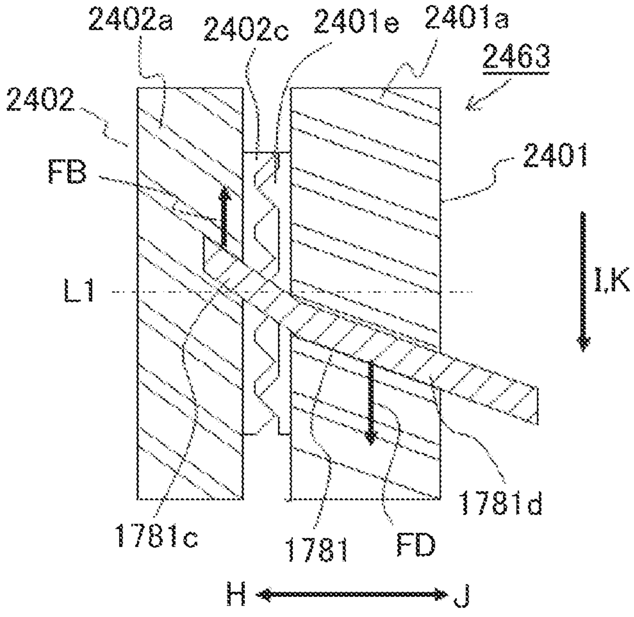

Next, referring to FIG. 100, drive operation between the driving side drum flange 2463 and the drive transmission gear 1781 will be described. FIG. 100 is a schematic sectional view of the meshing engagement portion between the driving side drum flange 2463 and the drive transmission gear 1781, taken along a plane tangential with a pitch circle of the meshing engagement between the driving side drum flange 2463 and the drive transmission gear 1781, as viewed from the drive transmission gear 1781 side. Part (a) of FIG. 100 shows a state in which the ratchet portion 2401*e* is not engaged with the ratchet portion 2402 in the K direction (state before engagement). In addition, part (b) of FIG. 100 shows a state in which the ratchet portion 2401*e* is engaged with the ratchet portion 2402 in the K direction (engaged state). Part (c) of FIG. 100 shows a backlashless state in which the drive transmission gear 1781 is in the balanced position. FIG. 100 schematically shows the shapes for the sake of better illustration, the dimensions and the shapes may differ from those shown in FIGS. 92 to 99.

As shown in part (a) of FIG. 100, immediately after the driving side drum flange 2463 in the connected state and the drive transmission gear 1781 mesh with each other, a gap (play) 240*d* exists between the ratchet portion 2401*e* and the ratchet portion 2402*c*, and in many cases, the ratchet portion 2401*e* and the ratchet portion 2402*c* are not engaged in the K direction (pre-engagement state). The size of the gap (play) 240*d* in the K direction can be appropriately selected. Since the second gear 2402 is fixed to the drum 2462, a load is produced in the rotation in the K direction. The drum 2462 also rotates by the driving force FD being applied in the K direction in the state that the second main assembly gear portion 1781*d* is in contact with the second gear portion 2402*a*. Therefore, when the drive transmission gear 1781 is driven in the I direction, the second main assembly gear portion 1781*d* receives a reaction force of the driving force FD from the second gear portion 2402*a*, and this reaction force produces a thrust force 240F5 in the J direction. Therefore, the drive transmission gear 1781 moves in the J direction by the thrust force 240F5 while being in contact with the second gear portion 2402*a*. Sooner or later, the first main assembly gear portion 1781*c* comes into contact with the first gear portion 2401*a* and applies a driving force FS in the K direction. Here, since there is a gap (play) 240*d* in the K direction between the ratchet portion 2401*e* and the ratchet portion 2402*c*, the first gear 2401 receives the driving force FS to rotate relative to the second gear 2402 to kill the play. Therefore, when the drive transmission gear 1781 is driven in the I direction in the state in which the ratchet portion 2401*e* and the ratchet portion 2402*c* are not engaged with each other (the state in which the play exist in the rotational direction between the first gear 2401 and the second gear 2402), the drive transmission gear 1781 moves in the J direction and rotates the first gear 2401 in the K direction relative to the second gear portion 2402*a*. By this, as shown in part (b) of FIG. 100, the ratchet portion 2401*e* of the first gear 2401 is engaged with the ratchet portion 2402*c* of the second gear 2402 in the K direction (engaged state, state in which play is killed). In addition, the first main assembly gear portion 1781*c* receives a reaction force of the driving force FS from the first gear portion 2401*a*, and this reaction force produces a thrust force 240F6 in the J direction.

As shown in part (b) of FIG. 100, in a state in which the ratchet portion 2401*e* is engaged with the ratchet portion 2402*c* in the K direction (a state in which the play is killed), the first gear 2401 transmits the driving force FD in the K direction to the second gear 2402 and the drum 2462. That is, after the ratchet portion 2401*e* engages with the ratchet portion 2402*c* in the K direction (the play is killed), the first gear 2401 and the second gear 2402 can be regarded as a gear that rotates integrally, as long as the first gear portion 2401 receives the driving force in the K direction. Therefore, the first gear 2401 and the second gear 2402 have the same functions as the driving side drum flange 1764 of Embodiment 17. In addition, the first main assembly gear portion 1781*c* receives a reaction force of the driving force FD from the first gear portion 2401*a*, and this reaction force produces a thrust force 240F8 in the J direction. Therefore, by the drive transmission gear 1781 continuing to rotate in the I direction, the drive transmission gear 1781 receives the thrust force 240F8 and further moves in the J direction to reach the balanced position shown in part (c) of FIG. 100 to establish the backlashless state. In this backlashless state, the first gear portion 2401*a* receives the driving force FD from the first main assembly gear portion 1781*c*, and the second gear portion 2402*a* receives the restricting force FB from the second main assembly gear portion 1781*d*, as in the case of Embodiment 17.

As described in the foregoing, in this embodiment, when the cartridge B is alone, the driving side drum flange 2463 is in the state that the first gear 2401 and the second gear 2402 cannot transmit the driving force (relatively rotatable) in the disconnected state, but when the cartridge B is mounted to the apparatus main assembly A, it becomes the connected state in which the first gear 2401 and the second gear 2402 can rotate integrally (the first gear 2401 and the second gear 2402 transmit the driving force) (connected). However, the connected state of the driving side drum flange 2463 of this embodiment is a connected state in which the first gear 2401 and the second gear 2402 have a play in the rotational direction. That is, the ratchet portion 2401*e* and the ratchet portion 2402*c* have a gap (play) 240*d* in the K direction, and the first gear 2401 and the second gear 2402 can rotate relatively by the amount of the gap (play) 240*d*. When the first gear 2401 rotates in the K direction relative to the second gear 2402 and the ratchet portion 2401*e* engages with the ratchet portion 2402*c* in the K direction and the gap is killed, the first gear 2401 and the second gear 2402 rotate integrally. That is, the first gear 2401 and the second gear 2402 rotate in the state that the teeth of the first gear portion 2401*a* are fixed so as not to move (rotate) in the I direction relative to the teeth of the second gear portion 2402*a*, and the teeth of the second gear portion 2402*a* are fixed so as not to move (rotate) in the direction opposite to the I direction relative to the first gear portion 2401*a*. Even if the driving side drum flange 2463 is structured to be capable of taking a connected state and a disconnected state as described above, the same effect as that of Embodiment 17 can be provided. In addition, even if the first gear 2401 and the second gear 2402 are connected in a state of having play, the same effect as that of Embodiment 17 can be provided.

In this embodiment, when the driving side drum flange 2463 is in the disconnected state, the first gear 2401 cannot transmit the drive force to the second gear 2402 and the drum 2462, but the present invention is not limited to such an example. That is, when the driving side drum flange 2463 is in the disconnected state, the second gear 2402 may be in a state in which the driving force cannot be transmitted to the first gear or the drum 2462, or the first gear 2401 and the second gear 2402 may be in a state in which the driving force cannot be transmitted to the drum 2462. In addition, in this embodiment, by changing the position of the first gear 2401 with respect to the drum 2462, the switching is effected between the disconnected state and the connected state of the driving side drum flange 2463, but, the driving side drum flange may be switched between the disconnected state and the connected state of the driving side drum flange 2463, by changing the position of the second gear 2402 with respect to the drum 2462.

Further, in this embodiment, The use is made with the clutch mechanism for switching between the connecting this state and disconnected state of the driving side drum flange 2463, by relative movement between the first gear 2401 and the second gear 2402 in the direction of the rotational axis L1 toward and away from each other. However, the relative movement of the first gear 2401 and the second gear 2402 in the direction of the rotational axis L1 is not essential, and for example, the use can be made with a clutch mechanism with which at least a part of at least one of the first gear 2401 and the second gear 2402 is moved in a radial direction with respect to the rotational axis L1 to switch between the disconnected state and the connecting this state.

Further, in this embodiment, the movable member 2404 is moved with respect to the drum bearing member 2473 in order to switch between the disconnected state and the connected state of the driving side drum flange 2463. The movement of the movable member 2404 with respect to the drum bearing member 2473 is caused by the movement of the cartridge B relative to the apparatus main assembly A. However, The structure for moving the movable member 2404 with respect to the drum bearing member 2473 may be such that the movable member 2404 is moved in interrelation with the movement of a member such as a door provided in the apparatus main assembly A, in a state where the cartridge B is mounted on the apparatus main assembly A.

In addition, in this embodiment, when the driving side drum flange 2463 is in the disconnected state, the first gear 2401 is structured to be able to rotate one or more full-rotation relative to the second gear 2402, but the structure may be such that the rotation is less than one full-rotation.

Further, in this embodiment, the driving side drum flange 2463 is structured to be to be capable of taking the connected state and the disconnected state, but the structure may be such that the disconnected state cannot be taken. That is, The structure may be such that the connected state is taken in which the drive transmission is enabled in the state that the play (gap 240*d*) exists in the rotational direction between the first gear 2401 and the second gear 2402, but the disconnected state is not taken. Further, the size of the play (gap 240*d*) in the rotational direction between the first gear 2401 and the second gear 2402 may be such that the amount of rotation that the first gear 2401 can rotate relative to the second gear 2402 is less than one full-rotation.

Further, in this embodiment, The structure may be such that when the driving side drum flange 2463 is in the connected state, no play (gap 240*d*) exists always in the rotational direction between the first gear 2401 and the second gear 2402.

As described above, according to this embodiment, the same effect as that of Embodiment 17 can be provided. Further, the elements of each of the above-described embodiments can be applied to the structure of this embodiment. In particular, the structures of the helical teeth of the first gear portion 2401*a* and the helical teeth of the second gear portion 2402*a* of the driving side flange 2463 are modified to the helical teeth, the flat teeth, the projections, and so on of Embodiments 2, 3, 4, 5, 6, 10, 11, 12, 13, 14, and 16.

Embodiment 25

Next, referring to FIGS. 101 to 107, Embodiment 25 will be described. This embodiment shows another structure of the cartridge B that can be operated by receiving a driving force from the driving transmission gear 1781 of the apparatus main assembly A described in Embodiment 17. In this embodiment, the gear (idler gear 2502) driven in the backlashless state does not transmit the driving force to the drum, and another gear (drive gear portion 2501) transmits the driving force to the drum, as is different from embodiment 17. The other points are the same as in Embodiment 17, and detailed description thereof will be omitted. Further, among the elements in this embodiment, the elements corresponding to the elements of Embodiment 1 are assigned reference numerals associated with the corresponding elements of Embodiment 1. Regarding these elements, the matters not specifically explained are the same as the corresponding elements of Embodiment 1.

<Drum Unit 2569 and Cleaning Unit 2560>

Figure 101:
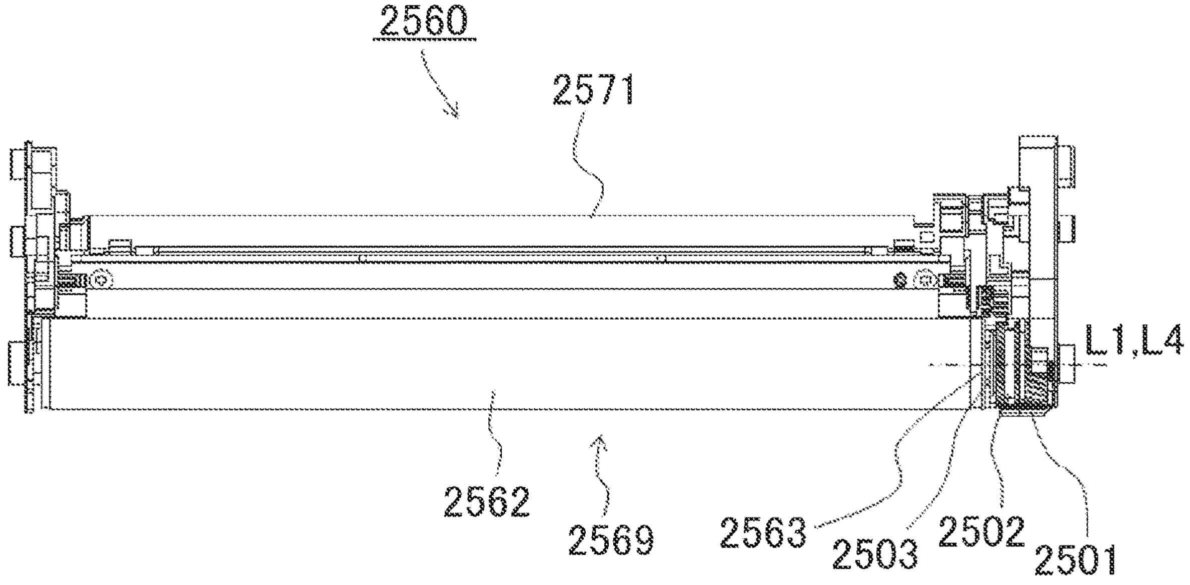
FIG. 101 is an illustration of a cleaning unit.
Figure 102:
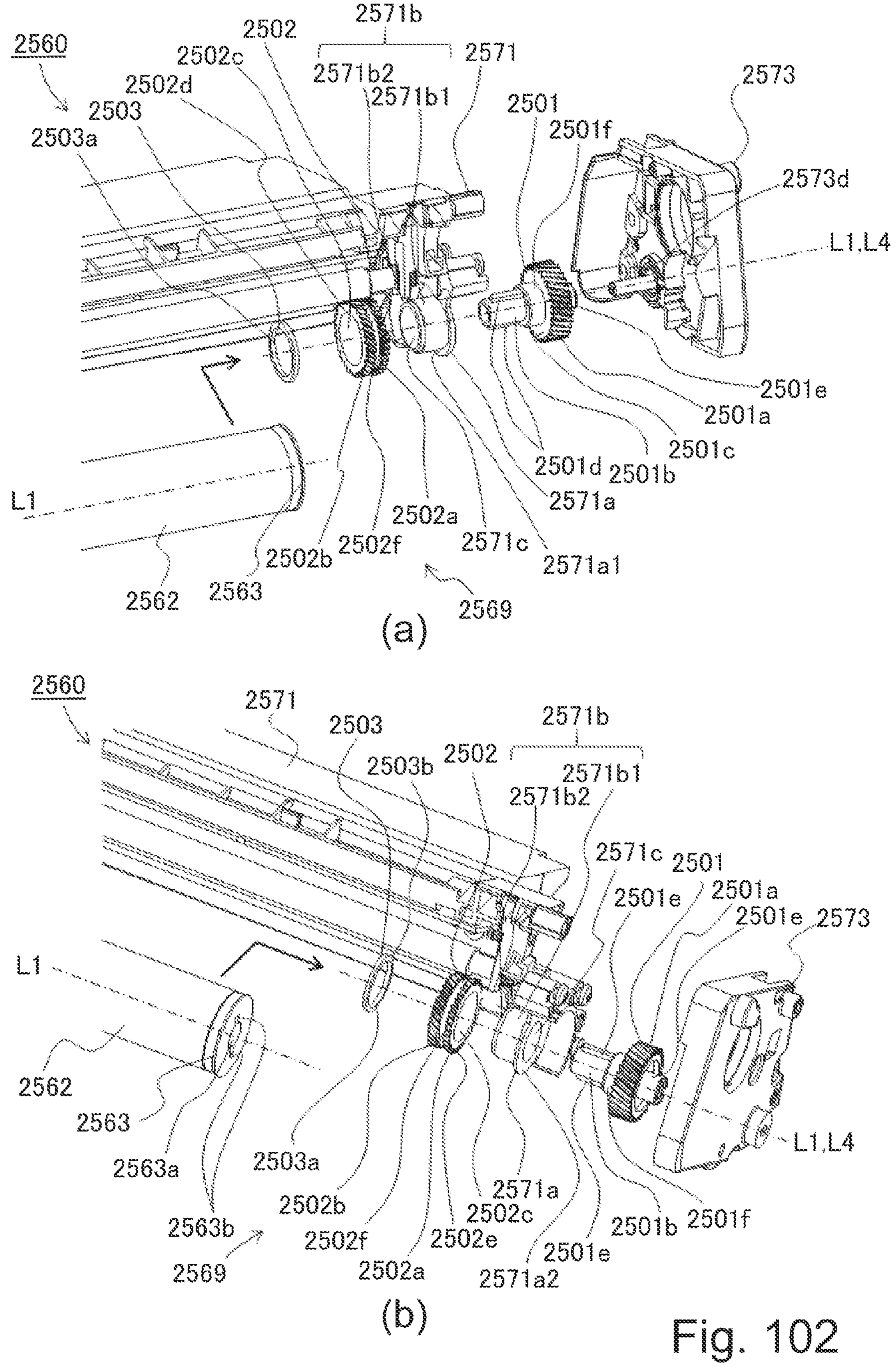
FIG. 102 is exploded perspective views of the cleaning unit and the drum unit.

Referring to FIG. 101 the structure of this embodiment will be described. FIG. 101 is a view of the cleaning unit 2560 as viewed from the developing unit side along the direction perpendicular to the rotational axis L1. As shown in FIG. 101, the drum unit 2569 is provided with a drive gear portion 2501, an idler gear 2502, and a locking member 2503, as is different from Embodiment 17. Further, the structures of the frame member 2571 and the driving side flange 2563 are different. These will be described in detail referring to FIG. 102. FIG. 102 is an exploded perspective view of the driving side of the cleaning unit 2560 and the drum unit 2569, wherein part (a) shows a state as viewed from the non-driving side and part (b) shows a state as viewed from the driving side.

The drive gear portion 2501 comprises, around the rotational axis L1 of the drum, a drive gear portion 2501*a*, a shaft portion 2501*b*, an end surface 2501*c*, a projection 2501*d*, a cylindrical portion 2501*e*, and a large diameter shaft portion 2501*f*. The drive gear (third gear) 2501 is a drive force receiving portion which meshes with (engages with) the drive transmission gear 1781 to receive a drive force for rotationally driving the drum 2562. The drive gear (third gear) 2501 is connected to the drum 2562 so as to be able to transmit a rotational driving force. The drive gear portion 2501*a* has helical teeth having a helix angle α1. The large diameter shaft portion 2501*f* has a generally cylindrical shape, and projects from the end surface 2501*c* on the drum 2562 side of the drive gear portion 2501*a* along the rotational axis L1. The shaft portion 2501*b* has a generally cylindrical shape, and projects from the end surface of the large diameter shaft portion 2501*f* on the drum 2562 side along the rotational axis L1. The projection 2501*d* is a pair of opposed rib-shaped projections, and projects from the circumference of the shaft portion 2501*b* in the radial direction with respect to the rotational axis L1. Here, the radius of the free end portion of the projection 2501*d* is selected to be smaller than the radius of the large diameter shaft portion 2502*f*. The cylindrical portion 2501*e* has a generally cylindrical shape, and projects from the end surface of the drive gear portion 2501*a* on the side away from the drum 2562 along the rotational axis L1.

The idler gear 2502 is a gear integrally molded with a resin which can rotate about the rotational axis L4. The idler gear 2502 portion includes a first gear portion (first portion side gear portion) 2502*a*, a second gear portion (second portion side gear portion) 2502*b*, a hole portion 2502*c*, an inner side surface 2502*d*, an outer surface 2502*e*, and a small diameter portion 2502*f*. The first gear portion 2502*a* has helical teeth (projections) having a helix angle α1, and the number thereof is the same as the number of the teeth of the drive gear portion 2501*a*. The second gear portion 2502*b* has helical teeth (projections) having a helix angle α2, and the number thereof is the same as the number of the teeth of the first gear portion 2502*a*. The small diameter portion 2502*f* has a generally cylindrical shape and is provided between the first gear portion 2502*a* and the second gear portion 2502*b*. The hole portion 2502*c* is a round hole penetrating from the first gear portion 2502*a* to the second gear portion 2502*b*. The inner side surface 2502*d* is an end surface of the idler gear 2502 on the drum 2562 side. The outer side surface 2502*e* is an end surface of the idler gear 2502 opposite to the drum 2562. In this embodiment, the first gear portion 2502*a* has the same number of teeth as the drive gear portion 2501*a*, but the number of teeth of each of the first gear portion 2502*a* and the second gear portion 2502*b* is the drive gear portion may be different from that of the drive gear portion 2501*a*.

The locking member 2503 has a ring shape centered on the rotational axis L1. The inner diameter portion of the ring is an inner diameter portion 2503*a*, and the end surface opposite to the drum 2562 is an end surface 2503*b*.

The driving side flange 2563 has a generally cylindrical shape, and is provided with a hole portion 2563*a* and a locking groove 2563*b* centered on the rotational axis L1. The hole portion 2563*a* is a round hole along the rotational axis L1 of the driving side flange 2563. The locking groove 2563*b* is a pair of opposing grooves, which project radially from the circumference of the hole portion 2563*a* about the rotational axis L1.

As described above, the drum unit 2569 mainly includes the drum 2562, the drive gear portion 2501, the idler gear 2502, the locking member 2503, and the driving side flange 2563.

The frame member 2571 is provided with a locking wall 2571*a*, a cylindrical portion 2571*b*, and an inner diameter portion 2571*c*. The locking wall 2571*a* has a substantially disk shape centered on the rotational axis L1, and the end surface on the drum 2562 side is the inner side surface 2571*a*1 and the end surface on the opposite side to the drum 2562 is the outer surface 2571*a*2. The cylindrical portion 2571*b* has a generally cylindrical shape with a step having a free end diameter which is smaller by the size of the step. The outer peripheral surface of the cylindrical portion 2571*b* is the outer peripheral surface 2571*b*1. In addition, the portion where the diameter of the free end of the cylindrical portion 2571*b* is small is referred to as the stepped portion 2571*b*2. The inner diameter portion 2571*c* has a round hole shape penetrating the locking wall 2571*a* and the cylindrical portion 2571*b*.

Figure 103:
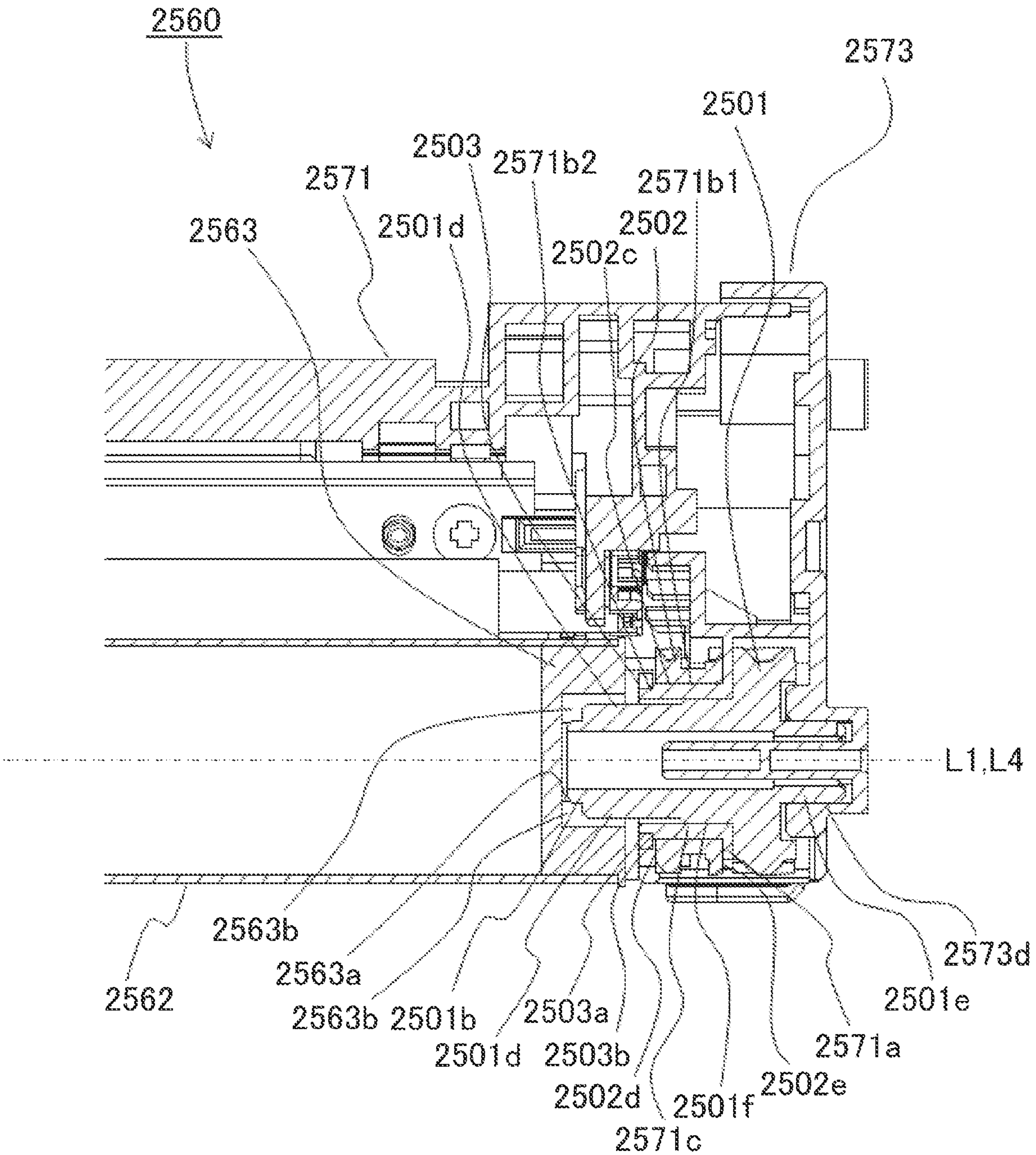
FIG. 103 is a partial sectional view of the cleaning unit.

Next, referring to FIG. 103, the assembly of the cleaning unit 2560 will be described. FIG. 103 is a partial sectional view of the cleaning unit 2560 taken along a plane including the rotational axis L1 in the neighborhood of the driving side flange 2563.

As shown in FIG. 103, the driving side flange 2563 is fixed to the end of the drum 2562 by any means such as adhesion, clamping or press-fitting. The hole portion 2502*c* of the idler gear 2502 is fitted around the outer peripheral surface 2571*b*1 of the frame member 2571 and is supported rotatably about the rotational axis L1. In addition, the outer surface 2502*e* of the idler gear 2502 and the locking wall 2571*a* of the frame member 2571 are arranged so as to oppose each other.

The inner diameter portion 2503*a* of the locking member 2503 is fitted around the stepped portion 2571*b*2 of the frame member 2571, and is fixed by any means such as adhesion or press fitting. As shown in the Figure, the outer peripheral surface diameter of the locking member 2503 is selected to be larger than the diameter of the outer peripheral surface 2571*b*1 of the frame member 2571. By this, the locking member 2503 prevents the idler gear 2502 from disengagement toward the drum 2562.

The drive gear portion 2501 is mounted so that the shaft portion 2501*b* is passed through the inner diameter portion 2571*c* of the frame member 2571 from the side opposite to the drum 2562, and the large diameter shaft portion 2501*f* is rotatably supported by the inner diameter portion 2571*c*. In addition, the drive gear portion 2501 is set so that the phase of the projection 2501*d* and the phase of the locking groove 2563*b* of the driving side flange 2563 match each other (insertable state), and the shaft portion 2501*b* of the drive gear portion 2501 is inserted into the hole portion 2563*a*. By doing so, the drive gear portion 2501 and the driving side flange 2563 are integrally and rotatably engaged (rotatable drive force can be transmitted).

Next, the cylindrical portion 2501*e* of the drive gear portion 2501 is inserted into the hole 2573*d* of drum bearing member 2573. Thereafter, the drum bearing member 2573 is fixed to the frame member 2571 by screw tightening or the like. By doing so, the drive gear portion 2501 is supported by the cleaning unit 2560 rotatably about the rotational axis L1.

With the cleaning unit 2560 assembled in this manner, the drive gear portion 2501, the idler gear 2502, the driving side flange 2563, and the drum 2562 can rotate about the rotational axis L1. That is, the rotational axis L4 of the idler gear 2502 is coaxial with the driving side flange 2563 and the rotational axis L1 of the drum 2562.

In addition, the rotational driving force received by the driving gear 2501 can be transmitted to the driving side flange 2563 and the drum 2562. On the other hand, the idler gear 2502 is supported rotatably about the rotational axis L1 relative to the drive gear portion 2501, the driving side flange 2563, and the drum 2562, and the rotational drive force received by the idler gear 2502 is not transmitted to the drive gear portion 2501, the driving side flange 2563 or the drum 2562.

<Drive Transmission Operation>

Figure 104:
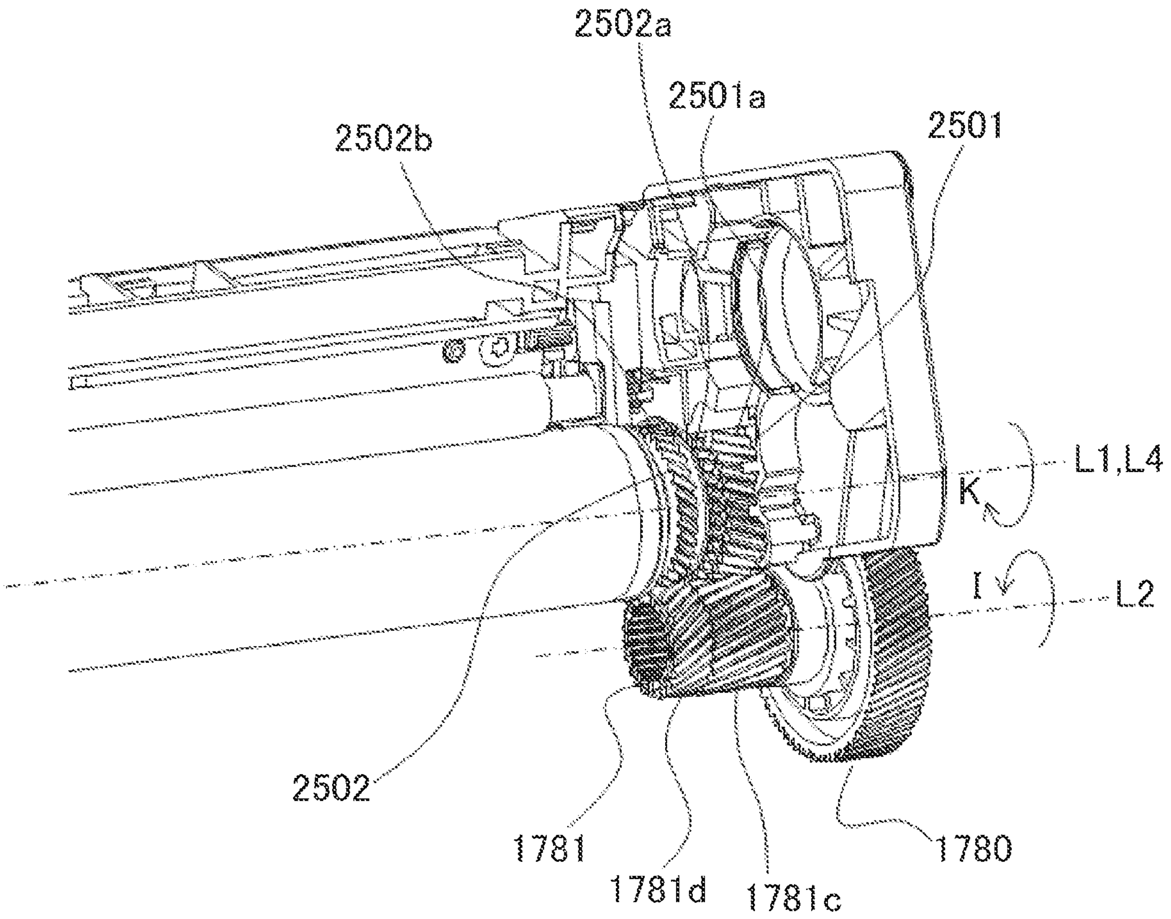
FIG. 104 is a perspective view illustrating a cleaning unit and a drive transmission gear.

Next, referring to FIG. 104, a state in which the cartridge is mounted in the image forming apparatus will be described. FIG. 104 is a perspective view illustrating a cleaning unit 2560 and a drive transmission gear 1781 in a state in which the cartridge B is mounted in the apparatus main assembly A. However, for the sake of better illustration, a part of the cleaning unit 2560, a developing unit, and a part of the apparatus main assembly A are not shown.

As shown in FIG. 104, when the cartridge is mounted in the image forming apparatus, the drive gear portion 2501*a* of the drive gear portion 2501 meshes with the first main assembly gear portion 1781*c* of the drive transmission gear 1781. In addition, in the idler gear portion 2502, the first gear portion 2502*a* meshes with the first main assembly gear portion 1781*c* of the drive transmission gear 1781, and the second gear portion 2502*b* meshes with the second main assembly gear portion 1781*d*.

Figure 105:
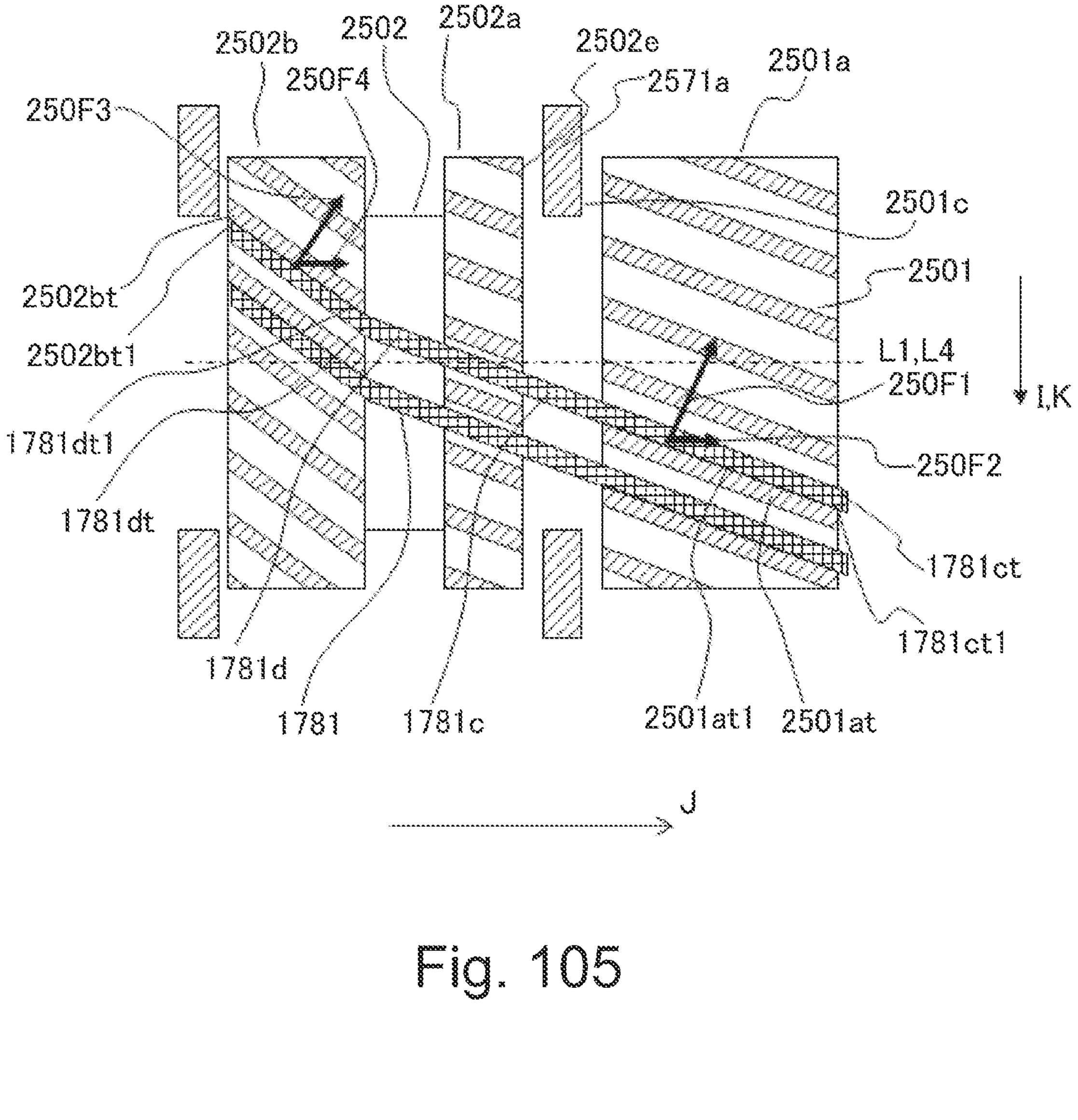
FIG. 105 is a schematic sectional view of a meshing engagement portion between the drive gear and the idler gear and the drive transmission gear.
Figure 106:
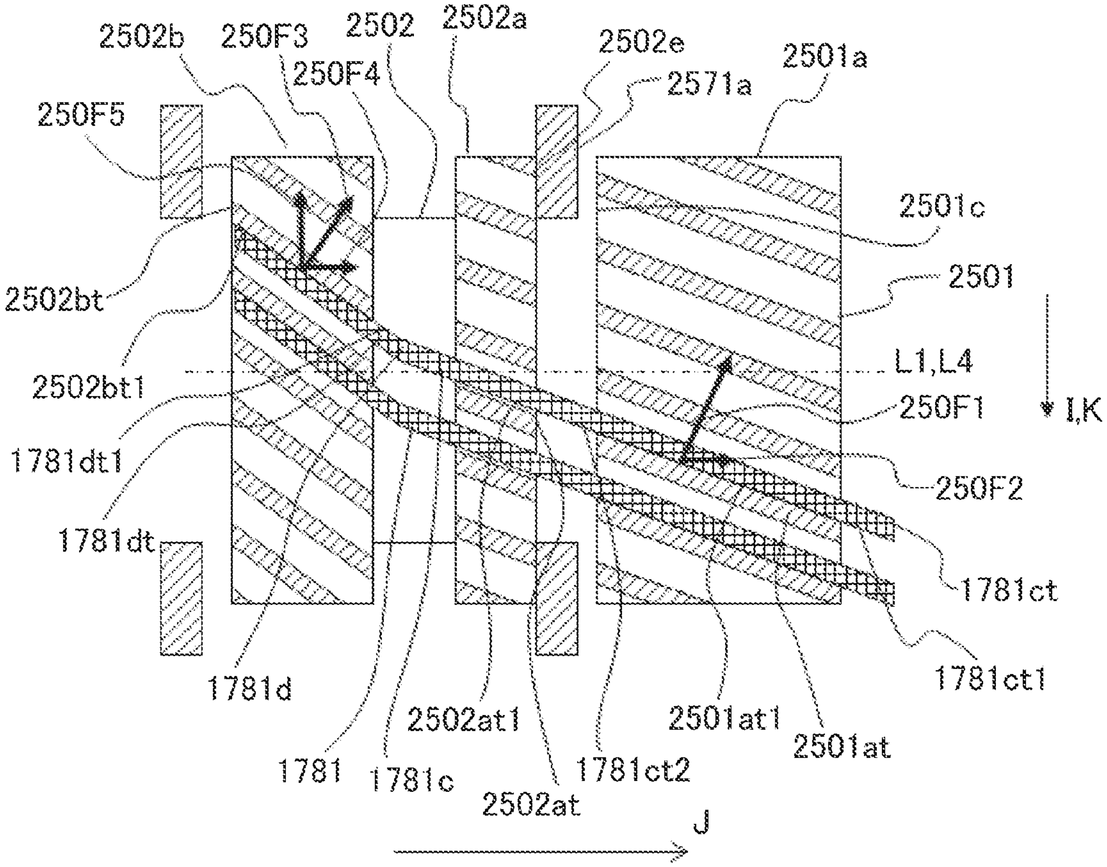
FIG. 106 is a schematic sectional view of the meshing engagement portion between the drive gear and the idler gear and the drive transmission gear.
Figure 107:
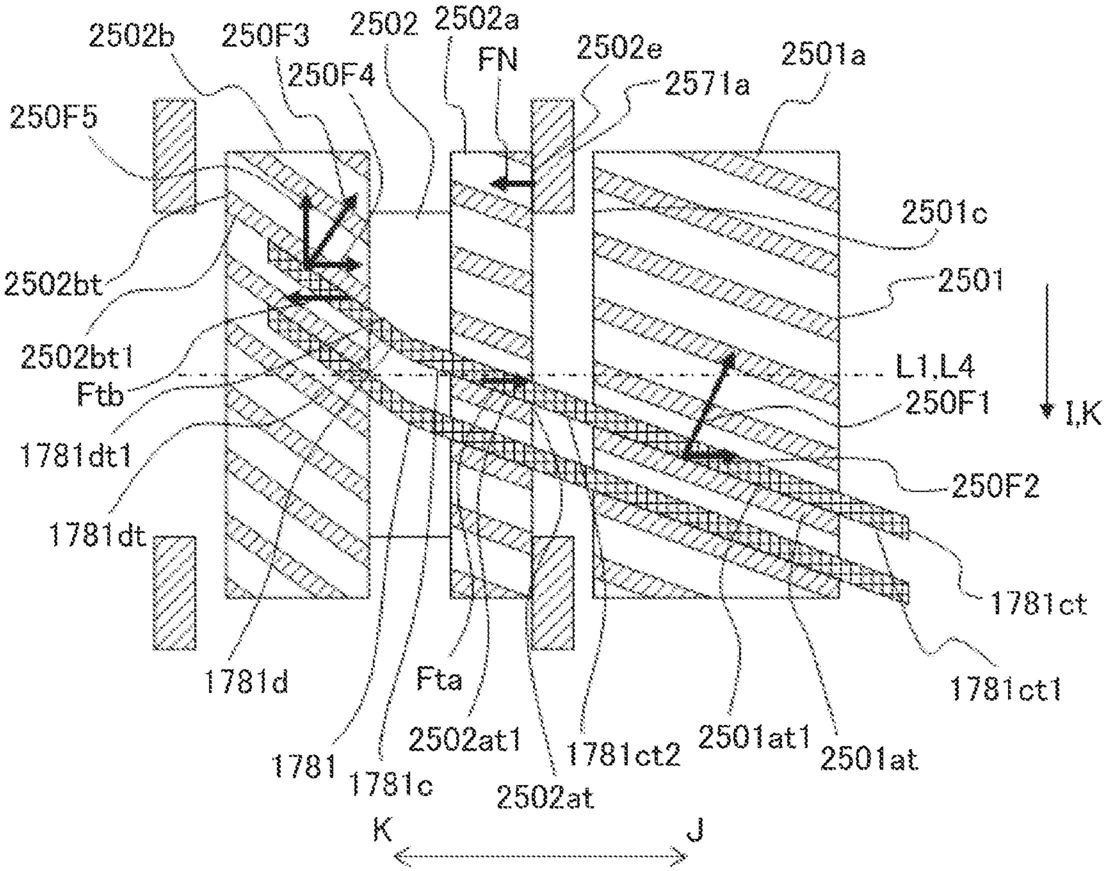
FIG. 107 is a schematic sectional view of the meshing engagement portion between the drive gear and the idler gear and the drive transmission gear.

Next, referring to FIGS. 105, 106 and 107, a state in which the drive is transmitted from the drive transmission gear 1781 to the drive gear portion 2501 when the drive transmission gear 1781 is rotated in the I direction (see FIG. 104) will be described. FIGS. 105, 106 and 107 are schematic sectional views of meshing engagement portion between the drive gear portion 2501, the idler gear 2502 and the drive transmission gear 1781, and the meshing of the drive gear portion 2501 and the idler gear 2502 with the drive transmission gear 1781, taken along a plane tangent to the pitch circle, as viewed from the drive transmission gear 1781 side. The shapes shown in FIGS. 105, 106 and 107 are schematically shown for the sake of better illustration, and therefore, the dimensions and shapes may differ from those shown in FIGS. 101 to 104.

In the following description, in the drive gear portion 2501*a* of the drive gear portion 2501, one gear tooth is a drive helical teeth 2501*at*, and a surface on the upstream side thereof in the I direction is a tooth surface 2501*at*1. In the first gear portion 2502*a* of the idler gear 2502, one gear 1 tooth is a first helical tooth 2502*at*, and a tooth surface on the upstream side thereof in the I direction is a tooth surface 2502*at*1. In the second gear portion 2502*b* of the idler gear 2502, one gear tooth is a second helical tooth 2502*bt*, and a tooth surface on the downstream side thereof in the I direction is a tooth surface 2502*bt*1.

As shown in FIG. 105, when the drive transmission gear 1781 rotates in the I direction and the first main assembly gear portion 1781*c* drives the drive gear portion 2501*a* of the drive gear portion 2501, the tooth surface 1781*ct*1, on the downstream side in the I direction, of the first main assembly gear portion 1781*c* receives a drive reaction force 250F1 from the tooth surface 2501*at*1, on the upstream side in the I direction, of the drive gear portion 2501*a*. At this time, since the first main assembly gear portion 1781*c* of the drive transmission gear 1781 has helical teeth, the drive transmission gear 1781 moves in the J direction by the thrust force 250F2 in the J direction which is a component force direction of the reaction force 250F1.

In the process of the drive transmission gear 1781 moving in the J direction while driving the drive gear portion 2501*a*, the tooth surface 1781*dt*1, on the upstream side in the I direction of the second main assembly gear portion 1781*d*, is brought into contact with the tooth surface 2502*bt*1, on the downstream side in the I direction, of the second gear portion 2502*b* of the idler gear 2502. At this time, the idler gear 2502 receives a force 250F3 at the tooth surface 2502*bt*1. The idler gear 2502 moves in the J direction by the component force 250F4 of the force 250F3 in the J direction, and as shown in FIG. 106, the outer surface 2502*e* abuts on the locking wall 2571*a*, so that the position in the J direction is determined.

Thereafter, in the process of the drive transmission gear 1781 further moving in the J direction while driving the drive gear portion 2501*a*, the tooth surface 2502*bt*1, on the downstream side in the I direction, of the second gear portion 2502*b* receives a component force 250F5, in the I direction, of the force 250F3. By this component force 250F5, the second gear portion 2502*b* of the idler gear 2502 is moved toward the downstream side in the I direction relative to the second main assembly gear portion 1781*d* at the position of the engagement with the second main assembly gear portion 1781*d* of the drive transmission gear 1781. At the same time, the idler gear 2502 rotates toward the downstream side in the I direction relative to the drive gear portion 2501.

Thereafter, the drive transmission gear 1781 further moves in the J direction while driving the drive gear portion 2501*a*, and the second gear portion 2502*b* rotates toward the downstream side in the I direction relative to the second main assembly gear portion 1781*d* at the engagement portion with the second main assembly gear portion 1781*d*. Then, as shown in FIG. 107, the tooth surface 2502*at*1, on the upstream side in the I direction, of the first gear portion 2502*a* of the idler gear 2502 comes into contact with the tooth surface 1781*ct*2, on the downstream side in the I direction, of the first main assembly gear portion 1781*c*.

At this time, the tooth surface 1781*dt*1, on the upstream side in the I direction, of the second main assembly gear portion 1781*d* is brought into contact with the tooth surface 2502*bt*1, on the downstream side in the I direction, of the second gear portion 2502*b* of the idler gear 2502, and the tooth surface 2502*at*1, on the upstream side in the I direction, of the first gear 2502*a* of the idler gear 2502 is brought into contact with the tooth surface 1781*ct*2, on the downstream side in the I direction, of the first main assembly gear portion 1781*c*. The tooth of the first gear portion 2502*a* is fixed so as not to move (rotate) in the I direction relative to the teeth of the second gear portion 2502*b*, and the tooth of the second gear portion 2502*b* is fixed so that it cannot move (rotate) in the direction opposite to the I direction relative to the tooth of the first gear portion 2502*a*. Therefore, the relative movement of the second gear portion 2502*b* relative to the second main assembly gear portion 1781*d* in the I direction stops at the engagement portion with the second main assembly gear portion 1781*d*, and the relative movement of the first gear portion 2502*a* relative to the first main assembly gear portion 1781*c* in the I direction stops at the engagement portion with the first main assembly gear portion 1781*c*. At the same time, the relative rotation of the idler gear 2502 relative to the drive gear portion 2501 also stops.

Here, in general, in the meshing engagement of helical tooth gears, if the gear portions cannot move relative to each other in the rotational direction in the meshing engagement portion therebetween, the gear portions cannot move relative to each other in the rotational axis direction. Also in this embodiment, the drive transmission gear 1781 and the idler gear 2502 cannot move in the rotational direction (I direction, K direction) relative to each other at the engagement portion due to the meshing engagement between the second gear portion 2502*b* and the second main assembly gear portion 1781*d* and the meshing engagement between the first gear portion 2502*a* and the first main assembly gear portion 1781*c*. In other words, the relative position of the drive transmission gear 1781 and the idler gear 2502 in the J direction is determined at the meshing engagement portion. That is, the second main assembly gear portion 1781*d* receives a thrust force Ftb in the K direction by the meshing engagement with the second gear portion 2502*b*, and the first main assembly gear portion 1781*c* receives the thrust force Fta in the J direction by the meshing engagement with the first gear portion 2502*a*.

In addition, the first main assembly gear portion 1781*c* continues to receive the thrust force 250F2 in the J direction by the meshing engagement with the drive gear portion 2501*a*, and tends to move in the J direction integrally with the idler gear 2502. However, as described above, the outer surface 2502*e* of the idler gear 2502 is in contact with the locking wall 2571*a* and receives the reaction force FN in the K direction to, and therefore, the position in the J direction is determined. For this reason, the position, in the J direction, of the drive transmission gear 1781 which cannot move in the J direction relative to the idler gear 2502, is also determined, and this is the balanced position of the drive transmission gear 1781. That is, the force Fta, the force Ftb, and the force 250F1 are in a balanced state. Therefore, the drive transmission gear 1781 rotates in a state in which the position is fixed at the balanced position, and drives the drive gear portion 2501 and the idler gear 2502. The idler gear 2502 is driven in a backlashless state.

As described in the foregoing, in this structure, the drive force can be transmitted from the drive transmission gear 1781 to the drive gear portion 2501 in a state in which the positions of the drive transmission gear 1781 and the idler gear 2502 in the J direction are fixed.

In the above description, the description of the movement of the idler gear 2502 by the component force 250F4 and the component force 250F5 acting on the tooth surface 2502*bt*1 of the idler gear 2502 has been made separately. However, both forces act at the same time, and therefore, the movement of the idler gear 2502 in the J direction and the rotation of the idler gear 2502 relative to the drive transmission gear 1781 may occur at the same time due to the torque required to drive the idler gear 2502.

In this manner, by providing the idler gear 2502 including two helical tooth gear portions having the same twisting direction and different helix angles so as to mesh with the first main assembly gear portion 1781*c* and the second main assembly gear portion of the drive transmission gear 1781, a cartridge B can be provided which is applicable to the apparatus main assembly A including the drive transmission gear 1781 described in Embodiment 17. Further, by providing the drive gear portion 2501 which meshes with the drive transmission gear 1781, it is possible to receive the driving force from the drive transmission gear 1781 and drive the drum 2562 or the like included in the cartridge B.

In this embodiment, the rotational axis L4 of the idler gear 2502 is coaxial with the rotational axis L1 of the drum 2562, but the present invention is not limited to such an example. The rotational axis L4 and the rotational axis L1 may be non-coaxial but parallel, or the rotational axis L4 and the rotational axis L1 may be non-coaxial and non-parallel. In addition, although the idler gear 2502 is rotatably supported by the outer peripheral surface 2571*b*1 of the frame member 2571, it may be rotatably supported by the driving side flange 2563 or the drive gear portion 2501. Further, the idler gear 2502 may be structured to mesh with other gears or the like and transmit the driving force received from the drive transmission gear 1781 to a member other than the drum 2562 such as a developing roller or a charging roller.

Furthermore, in this embodiment, the drive gear (driving force receiving portion) 2501 is structured to engage with the first main assembly gear portion 1781*c* of the drive transmission gear (driving force applying portion) 1781 to receive the driving force, but it may be structured to engage with the second main assembly gear portion 1781*d* of the drive transmission gear 1781 and receive the driving force.

Moreover, the elements of each of the above-described embodiments can be applied to the structure of this embodiment. In particular, the structures of the first helical teeth (first projection) 2502*at* of the first gear portion 2502*a* of the idler gear 2502 and the second helical teeth (second projection) 2502*bt* of the second gear portion 2502*b* may be modified to the helical teeth, the flat teeth, the projection of Embodiment 2, 3, 4, 5, 6, 10, 11, 12, 13, 14 or 16.

Embodiment 26

Next, referring to FIGS. 108 to 111, Embodiment 26 will be described. This embodiment shows another structure of the cartridge B that can be operated by receiving a driving force from the driving transmission gear 1781 of the apparatus main assembly A described in Embodiment 17. In this embodiment, the gear (idler gear 2601) driven in the backlashless state does not transmit the driving force to the drum, and another gear (driving gear 2602) transmits the driving force to the drum, as is different from Embodiment 17. The other points are the same as in Embodiment 17, and detailed description thereof will be omitted. Further, among the elements in this embodiment, the elements corresponding to the elements of Embodiment 1 are assigned reference numerals associated with the corresponding elements of Embodiment 1. Regarding these elements, the matters not specifically explained are the same as the corresponding elements of Embodiment 1.

Figure 108:
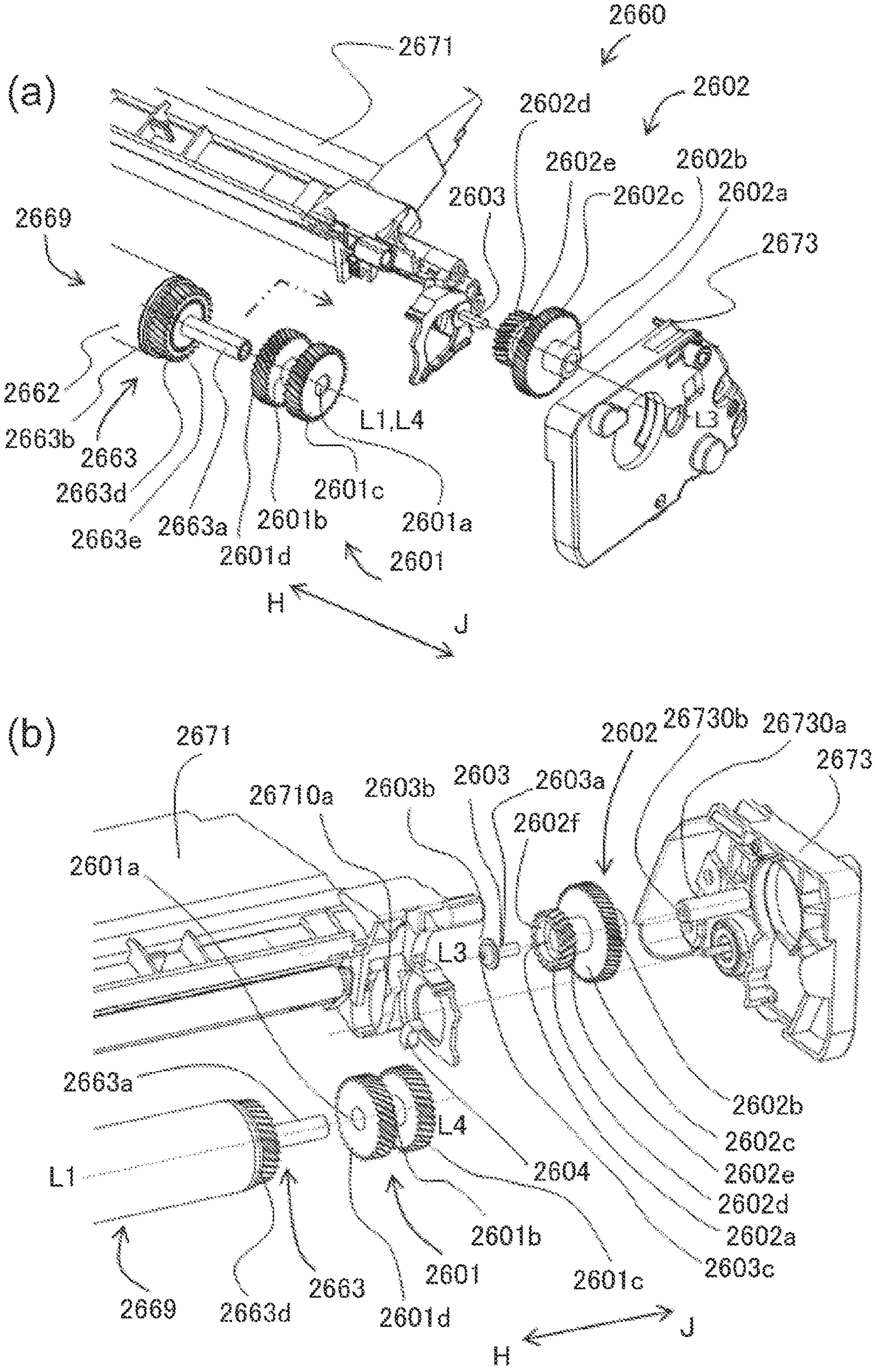
FIG. 108 is exploded perspective views of the cleaning unit and the drum unit.
Figure 109:
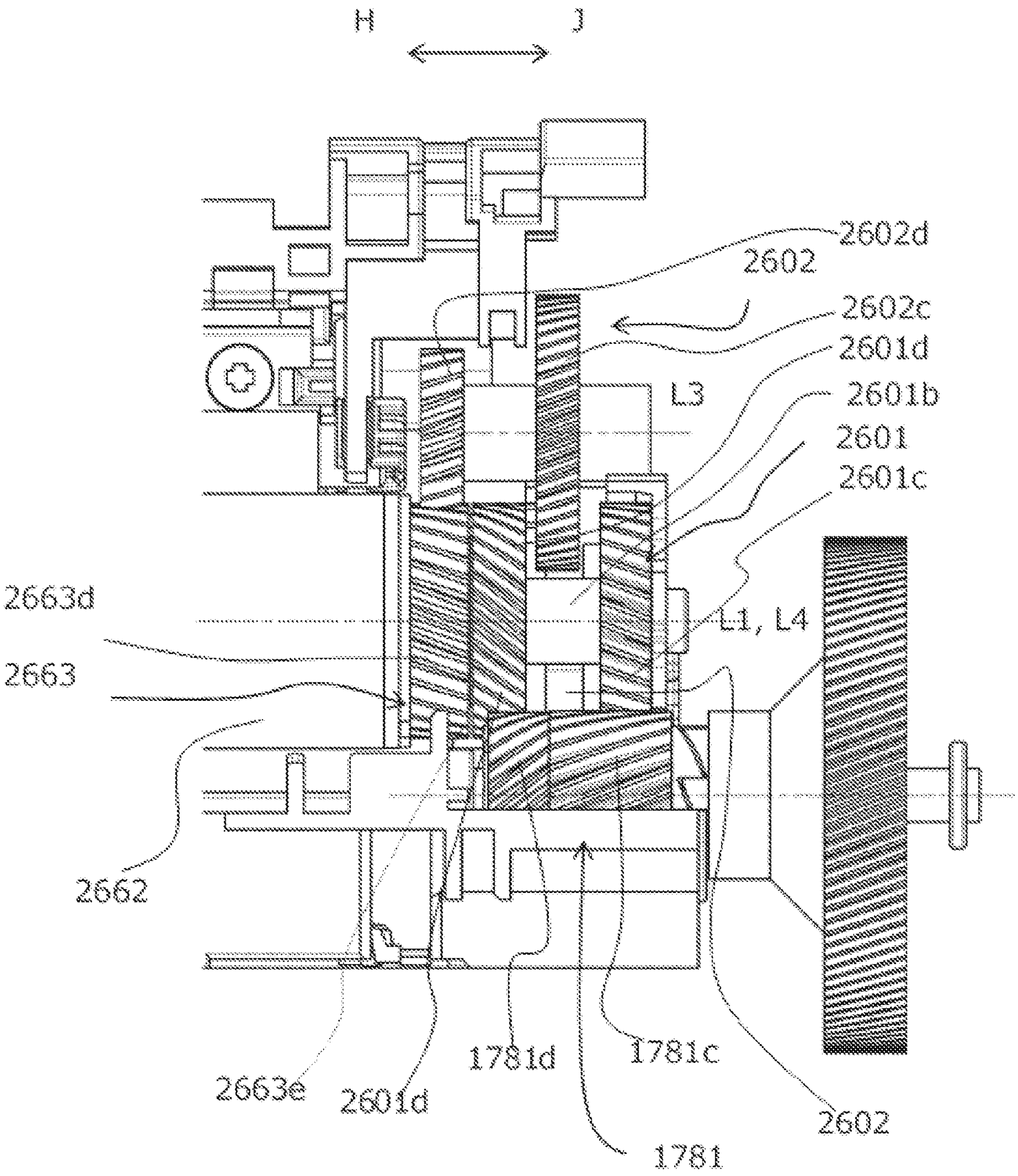
FIG. 109 is an illustration of an engaged state between the cleaning unit and the drive transmission gear.

FIG. 108 is an exploded perspective view of the driving side of the cleaning unit 2660 and the drum unit 2669, wherein part (a) shows a state as viewed from the driving side, and part (b) shows a state as viewed from the non-driving side. Further, FIG. 109 is an illustration of an engaged state between the cleaning unit 2660 and the drive transmission gear 1781, and shows a state as viewed along a direction perpendicular to the rotational axis L1.

<Cleaning Unit 2660>

The cleaning unit 2660 includes a frame member 2671 and a drum bearing member 2673 which form a cleaning frame. The drum bearing member 2673 includes a cylindrical portion 26730*a*. The cylindrical portion 26730*a* has a cylindrical shape projecting in the H direction so as to form a rotational axis L3 parallel to the rotational axis L1 of the drum 2662. A screw hole 26730*b* is provided at the free end of the cylindrical portion 26730*a* on the drum 2662 side. A driving gear 2602 is rotatably mounted to the cylindrical portion 26730*a*.

The driving gear 2602 has a generally cylindrical shape, and includes a first cylindrical portion 2602*b*, a first gear portion (first unit side gear portion) 2602*c*, a second cylindrical portion 2602*e*, and a second gear portion (second gear portion side gear portion) 2602*d*, arranged coaxially in this order from the upstream side along the H direction, and the cylindrical portion 26730*a* is provided with a through hole 2602*a*. Further, on the drum 2662 side of the second gear portion 2602*d*, a recess portion 2602*f* recessed in a cylindrical shape in the direction opposite to the drum 2662 side is formed. The driving gear 2602 is mounted so that the through hole 2602*a* is penetrated by the cylindrical portion 26730*a* of the drum bearing member 2673, and the driving gear 2602 is supported by the drum bearing member 2673 rotatably about the rotational axis L3.

Further, a screw 2603 is threaded in the screw hole 26730*b*. The screw 2603 includes a screw portion 2603*a*, a flange portion 2603*b*, and a screw head 2603*c*. The outer diameter of the flange portion 2603*b* is smaller than the inner diameter of the recess portion 2602*f* of the driving gear 2602, and therefore, when the screw 2603 is threaded into the screw hole 26730*b*, the screw 2603 penetrates into the recess portion 2602*f*. In addition, the flange portion 2603*b* faces the bottom surface of the recess portion 2602*f* of the driving gear 2602 with a small gap. In this manner, the screw 2603 prevents the driving gear 2602 from disengaging from the drum bearing member 2673.

Next, the structure of the driving flange 2663 will be described. As shown in part (a) of FIG. 108, the driving flange 2663 includes a gear portion (third gear portion) 2663*d*, a cylindrical support portion 2663*a*, a cylindrical portion 2663*e*, and a flange portion 2663*b*, which are arranged about the rotational axis L1 as the center. The cylindrical support portion 2663*a* has a generally cylindrical shape, and is provided projected from the gear portion 2663*d* in the direction opposite to the drum 2662 along the rotational axis L1. The cylindrical portion 2663*e* has a generally cylindrical shape, and is provided projected from the gear portion 2663*d* on the side opposite to the drum 2662 along the rotational axis L1. The flange portion 2663*b* has a thin disk shape having a diameter equal to or larger than the diameter of the drum 2662, and is provided on the drum 2662 side of the gear portion 2663*d*. In addition, it can be said that the gear portion (third gear portion) 2663*d* is connected to the drum 2662 so as to be able to transmit the driving force.

An idler gear 2601 is rotatably mounted to the cylindrical support portion 2663*a*. The idler gear 2601 is integrally molded with a resin and includes a first gear portion 2601*c*, a cylindrical portion 2601*b*, and a second gear portion 2601*d* in order from the upstream along the drum 2662 and the H direction, and further includes a through hole 2601*a* centered on the rotational axis L1. The first gear portion 2601*c* has a helical tooth gear having a helix angle α1, and the second gear portion 2601*d* has a helical tooth gear having the same twisting direction as the helical tooth gear of the first gear portion 2601*c* and having a helix angle α2. In addition, the outer diameter of the cylindrical portion 2601*b* is smaller than that of the first gear portion 2601*c* and the second gear portion 2601*d*.

The idler gear 2601 is mounted so that the through hole 2601*a* is fitted around the cylindrical support portion 2663*a* of the driving flange 2663, and is supported by the driving flange 2663 rotatably about the rotational axis L4. The rotational axis L4 of the idler gear 2601 is coaxial with the rotational axis L1 of the drum 2662. As will be described hereinafter, the second gear portion 2601*d* receives a force in the direction of arrow H along the rotational axis L4 and abuts on the cylindrical portion 2663*e*.

The driving flange 2663 is rotatably supported by the bearing member 2673, as in Embodiment 17. Thus, the drum unit 2669 is rotatably supported by the cleaning unit 2660.

As shown in part (b) of FIG. 108, the frame member 2671 is has a circumferential surface 26710*a*. The circumferential surface 26710*a* is a cylindrical surface coaxial with the rotational axis L4 of the idler gear 2601 after being assembled to the cleaning unit 2660, and has a diameter larger than the diameter of the cylindrical portion 01*b* of the idler gear 2601. In addition, the friction member 2604 is mounted on the circumferential surface 26710*a* by means such as double-sided tape or adhesive. The friction member 2604 contacts the cylindrical portion 2601*b* of the idler gear 2601, and, a frictional force that hinders the rotation is generated when the idler gear 2601 rotates.

As shown in FIG. 109, in a state that the drum unit 2669 and the driving gear 2602 are assembled to the cleaning unit 2660, the rotational axis L3 of the driving gear 2602 is parallel to the rotational axis L1 of the drum 2662 and the driving side flange 2663. In addition, the first gear portion 2602*c* of the driving gear 2602 is assembled so as to be located between the first gear portion 2601*c* and the second gear portion 2601*d* of the idler gear 2601, with respect to the direction of the rotational axis L1 of the drum unit 2669. Further, the second gear portion 2602*d* of the driving gear 2602 meshes with the gear portion 2663*d* of the driving flange 2663, and the driving force can be transmitted from the driving gear 2602 to the driving flange 2663.

<Drive of Idler Gear 2601>

Next, the drive transmission with the drive transmission gear 1781 of the main assembly of the apparatus will be described. When the cartridge B is mounted in the apparatus main assembly A, as shown in FIG. 109, the first gear portion 2601*c* of the idler gear 2601 meshes with the first main assembly gear portion 1781*c* of the drive transmission gear 1781, and the second gear portion 2601*d* of the idler gear 2601 meshes with the second main assembly gear portion 1781*d*. As described above, since the friction member 2604 receives a frictional force that hinders rotation, a predetermined torque is required to drive the idler gear 2601. In addition, the idler gear 2601 receives the spring force of the compression spring 1785 (see FIG. 53) in the H direction by way of the drive transmission gear 1781, moves in the H direction to abut to the cylindrical portion 2663*e* of the driving flange 2663.

Then, when the drive transmission gear 1781 is driven, the drive transmission gear 1781 receives a thrust force by meshing engagement with the idler gear 2601 and moves to a balanced position by the same principle as in Embodiment 17. The teeth of the second gear portion 2601*d* are fixed so as not to move (rotate) in the opposite direction of the I direction relative to the teeth of the first gear portion 2601*c*, and therefore, in the balanced state, there exists no play (backlash) in the I direction between the drive transmission gear 2681 and the idler gear 2601, that is, a backlash-less state is established.

<Drive of Drum 2662>

Figure 110:
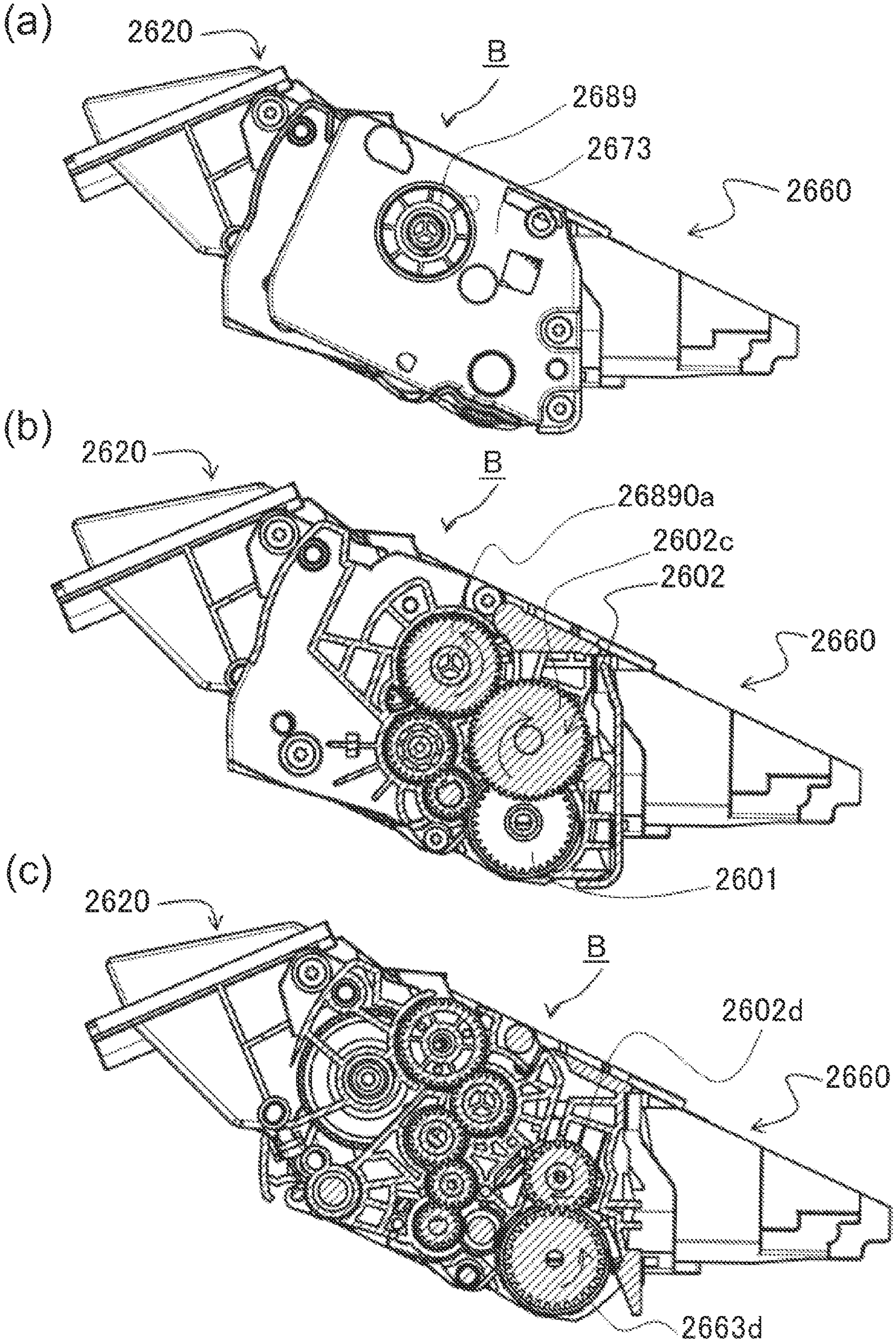
FIG. 110 is views of the cartridge as viewed in the direction of the rotational axis of the drum.
Figure 111:
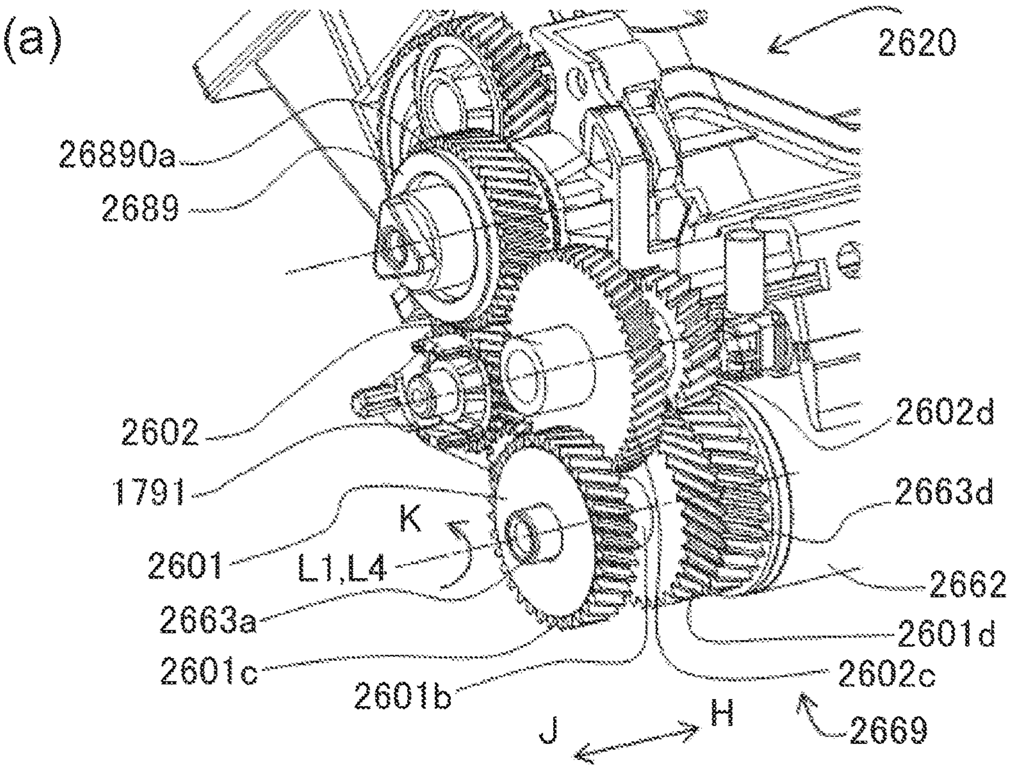
FIG. 111 is perspective views of the drive transmission mechanism of the cartridge.
Figure 111:
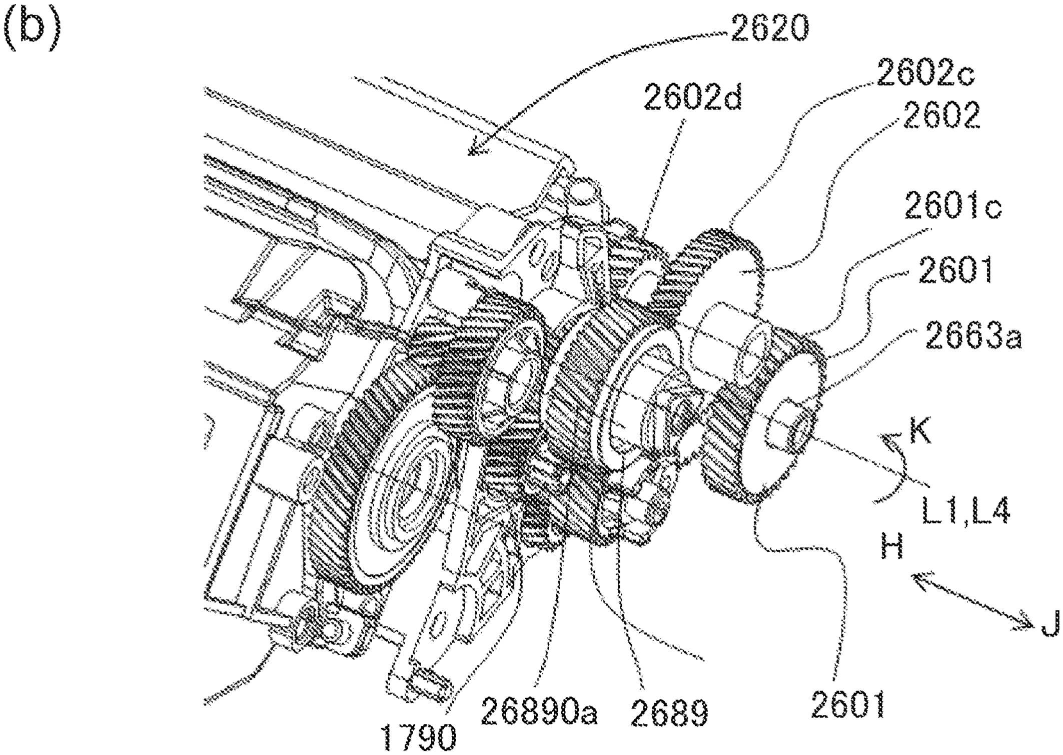

Next, referring to FIGS. 110 and 111, the driving of the drum 2662 will be described. FIG. 110 is a view of the cartridge B as seen along the direction of the rotational axis L1 of the drum 2662, wherein part (a) shows the appearance of the cartridge B, part (b) shows a view taken along a plane passing through the first gear portion 2601*c* of the driving gear 2602, and part (c) shows a view taken along a plane passing through the second gear portion 2601*d* of the driving gear 2602. It shows the state of the gear. FIG. 111 is a perspective view of the drive transmission mechanism of the cartridge B, and parts (a) and (b) show states as viewed from different angles, and the drum bearing member 2673 and the like are not shown so that the structure of the drive transmission mechanism can be understood.

The development coupling member 2689 engages with the main assembly side coupling member 1799 (see FIG. 57) of the apparatus main assembly A to transmit the driving force, similarly to the development coupling member 1789 of Embodiment 17. In addition, the development coupling member 2689 meshes with the idler gear 1790, and transmits the driving force to the developing roller 1732 (see FIG. 50) by way of the idler gear 1791 or the like on the downstream side in the driving force transmission path.

Further, the development coupling member 2689 is provided with a gear portion 26890*a*, and as shown in part (b) of FIG. 110, the gear portion 26890*a* meshes with the first gear portion 2602*c* of the driving gear 2602 provided in the cleaning unit 2660.

Further, the developing unit 2620 is structured to be rotatable (swing) relative to the cleaning unit 2660 about an axis coaxial with the rotating axis of the development coupling member 2689. Therefore, even when the developing unit 2620 swings with respect to the cleaning unit 2660 about the rotational axis of the development coupling member 2689, the distance between the gear portion 26890*a* of the development coupling member 2689 and the rotational axis of the driving gear 2602 remains the same. Therefore, the gears of the developing unit 2620 and the cleaning unit 2660 can be stably meshed with each other.

In addition, as shown in part (c) of FIG. 110, the second gear portion 2602*d* of the driving gear 2602 meshes with the gear portion 2663*d* of the driving flange 2663.

In this manner, the driving force transmitted through engagement of the development coupling member 2689 with the main assembly side coupling member 1799 (see FIG. 57) is transmitted to the driving flange 2663 by way of the driving gear 2602 and is the transmitted to the drum 2662. That is, the main assembly side coupling member 1799 is a driving force applying portion, and the development coupling member 2689 is a driving force receiving portion which receives the driving force for rotationally driving the drum 2662 from the main assembly side coupling member 1799.

As described above, in this embodiment, the idler gear 2601 including two helical tooth gear portions having the same twist direction but different twist angles so as to mesh with the first main assembly gear portion 1781*c* and the second main assembly gear portion of the drive transmission gear 1781, by which a cartridge B applicable to the apparatus main assembly A including the drive transmission gear 1781 described in Embodiment 17 can be provided. Further, in the structure of this embodiment, the driving force received from the apparatus main assembly A by the development coupling member 2689 is transmitted to the driving flange 2663 by way of the driving gear 2602 to drive the drum 2662 and the like included in the cartridge B.

In this embodiment, the rotational axis L4 of the idler gear 2601 is coaxial with the rotational axis L1 of the drum 2662, but the present invention is not limited to such an example. The rotational axis L4 and the rotational axis L1 may be non-coaxial and parallel, or the rotational axis L4 and the rotational axis L1 may be non-coaxial and non-parallel. In addition, although the idler gear 2601 is supported by the driving flange 2663, it may be rotatably supported by the frame member 2671. Further, the idler gear 2601 may be structured to mesh with another gear or the like and transmit the driving force received from the drive transmission gear 1781 to a member other than the drum 2662 such as a charging roller or the developing roller 1732.

Furthermore, the elements of each of the above-described embodiments can be applied to the structure of this embodiment. In particular, the structures of the first helical tooth (first projection) of the first gear portion 2601*c* of the idler gear 2601 and the second helical tooth (second projection) of the second gear portion 2601*d* may be modified to the helical teeth, the flat teeth, the projections and the like of Embodiment 2, 3, 4, 5, 6, 10, 11, 12, 13, 14 or 16.

<Examples of the Disclosed Structure or Concept>

The following are examples of the structures or concepts of the embodiments disclosed in the foregoing. However, these are merely examples, and the above-mentioned disclosure of this embodiment is not limited to the structure or concept in the following.

<<Structure A>>

[Structure A1]

A photosensitive member unit detachably mountable to a main assembly of an image forming apparatus, the image forming apparatus including a first main assembly side helical gear portion and a second main assembly side helical gear portion which are coaxially rotatable, the photosensitive member unit comprising:

a photosensitive member rotatable about a rotational axis thereof;

a first unit side helical gear portion for meshing engagement with the first main assembly side helical gear portion; and a second unit side helical gear portion for meshing engagement with the second main assembly side helical gear portion, wherein a twisting direction of a tooth of the second unit side helical gear portion is the same as the twisting direction of a tooth of first unit side helical gear portion, wherein a helix angle of the tooth of the second unit side helical gear portion is larger than a helix angle of the tooth of the first unit side helical gear portion, and wherein the first unit side helical gear portion and the second unit side helical gear portion are rotatable in a state in which the first unit side helical gear portion is in meshing engagement with the first main assembly side helical gear portion, and the second unit side helical gear portion is in meshing engagement with the second main assembly side helical gear portion.

[Structure A2]

A photosensitive member unit according to Structure A1, wherein with respect to the rotational axis of the photosensitive member, the second unit side helical gear portion is disposed between the photosensitive member and the first unit side helical gear portion.

[Structure A3]

A photosensitive member unit according to Structure A1 or A2, wherein with respect to the rotational axis of the photosensitive member, a gap is provided between the first unit side helical gear portion when the second unit side helical gear portion.

[Structure A4]

A photosensitive member unit according to Structure A3, wherein the main assembly of the image forming apparatus includes a projected portion between the first main assembly side helical gear portion and the second main assembly side helical gear portion, and in a state in which the first unit side helical gear portion is in meshing engagement with the first main assembly side helical gear portion, and second unit side helical gear portion is in meshing engagement with the second main assembly side helical gear portion, and the projected portion is inserted in the gap.

[Structure A5]

A photosensitive member unit according to Structure A3 or A4, wherein the unit comprises an intermediary member between the first unit side helical gear portion and the second unit side helical gear portion with respect to the rotational axis of the photosensitive member, the intermediary member being capable of filling the gap.

[Structure A6]

A photosensitive member unit according to Structure A5, wherein the intermediary member is movable between a position for providing the gap and a position for filling the gap, by rotation thereof.

[Structure A7]

A photosensitive member unit according to Structure A5, wherein the intermediary member is movable between the position for providing the gap and the position for filling the gap, by movement thereof in a direction perpendicular to the rotational axis of the photosensitive member.

[Structure A8]

A photosensitive member unit according to Structure A5, wherein the intermediary member is made of an elastic member and is capable of taking a position for providing the gap and a position for filling the gap, by elastic deformation thereof.

[Structure A9]

A photosensitive member unit according to any one of Structures A3-A8, wherein with respect to the rotational axis of the photosensitive member, a tooth width Wc of the first unit side helical gear portion and a width We of the gap satisfy, $$Wc > We \geq Wc/5.$$

[Structure A10]

A photosensitive member unit according to Structure A9, wherein with respect to the rotational axis of the photosensitive member, the width We of the gap and a tooth width Wd of the second unit side helical gear portion satisfy, $$Wd > We.$$

[Structure A11]

A photosensitive member unit according to any one of Structures A1-A10, wherein the first helical gear portion and the second helical gear portion each have at least one tooth having a width satisfying, $$Wc>Wd,$$

where Wc is a tooth width of the first helical gear portion and Wd is a tooth width of the second helical gear portion, measured in the rotational axis of the photosensitive member.

[Structure A12]

A photosensitive member unit according to any one of Structures A1-A11, wherein the helix angle of the tooth of the first unit side helical gear portion is not less than 15° and not more than 40°.

[Structure A13]

A photosensitive member unit according to any one of Structures A1-A11, wherein the helix angle of the tooth of the first unit side helical gear portion is not less than 20° and not more than 35°.

[Structure A14]

A photosensitive member unit according to any one of Structures A1-A13, wherein the helix angle of the tooth of the first unit side helical gear portion is not less than 20° and not more than 40°.

[Structure A15]

A photosensitive member unit according to any one of Structures A1-A13, wherein a helix angle of the second unit side helical gear portion is not less than 25° and not more than 35°.

[Structure A16]

A photosensitive member unit according to any one of Structures A1-A15, wherein the first unit side helical gear portion includes a plurality of such teeth, at least one of which is constituted by a plurality of first projections provided separately in the direction of the rotational axis of the photosensitive member or in a rotational movement direction of the first unit side helical gear portion, the first projections being provided so as to be contactable with one of the teeth of the first main assembly side helical gear portion at respective positions away from each other in the direction of the rotational axis.

[Structure A17]

A photosensitive member unit according to any one of Structures A1-A16, wherein the second unit side helical gear portion includes a plurality of such teeth, at least one of which is constituted by a plurality of second projections provided separately in the direction of the rotational axis of the photosensitive member or in a rotational movement direction of the second unit side helical gear portion, the second projections being provided so as to be contactable with one of the teeth of the second main assembly side helical gear portion at respective positions away from each other in the direction of the rotational axis.

[Structure A18]

A photosensitive member unit according to any one of Structures A1-A17, wherein the first unit side helical gear portion includes a number of such teeth, and the second unit side helical gear portion includes the same number of such teeth.

[Structure A19]

A photosensitive member unit according to any one of Structures A1-A17, wherein first unit side helical gear portion includes a tooth missing part.

[Structure A20]

A photosensitive member unit according to any one of Structures A1-A17, wherein second unit side helical gear portion includes a tooth missing part.

[Structure A21]

A photosensitive member unit according to any one of Structures A1-A20, wherein a projecting direction of the first unit side helical gear portion and a projecting direction of the second unit side helical gear portion include respective components parallel with the rotational axis of the photosensitive drum.

[Structure A22]

A photosensitive member unit according to any one of Structures A1-A21, further comprising an elastic member covering the first unit side helical gear portion and/or the second unit side helical gear portion.

[Structure A23]

A photosensitive member unit according to any one of Structures A1-A22, wherein while the first unit side helical gear portion and the second unit side helical gear portion are rotated in a predetermined direction by rotation of the first main assembly side helical gear portion and the second main assembly side helical gear portion, the first unit side helical gear portion and the second unit side helical gear portion are in a state that the tooth of first unit side helical gear portion is in contact with such a tooth of first main assembly side helical gear portion as is at a position on an upstream side in the predetermined direction, the tooth of the second unit side helical gear portion is in contact with such a tooth of the second main assembly side helical gear portion as is at a position on an upstream side in the predetermined direction, and the tooth of the second unit side helical gear portion is fixed so as not to be rotated in a direction opposite to the predetermined direction relative to the first unit side helical gear portion.

[Structure A24]

A photosensitive member unit according to any one of Structures A1-A23, wherein the first unit side helical gear portion is capable of transmitting a driving force to the second unit side helical gear portion.

[Structure A25]

A photosensitive member unit according to any one of Structures A1-A24, wherein the first unit side helical gear portion and the second unit side helical gear portion are rotatable coaxially with each other.

[Structure A26]

A photosensitive member unit according to [Structure A25, wherein a rotational axis of the first unit side helical gear portion and a rotational axis of the second unit side helical gear portion are coaxial with the rotational axis of the photosensitive member.

[Structure A27]

A photosensitive member unit according to [Structure A25 or 26, wherein the first unit side helical gear portion and the second unit side helical gear portion are integrally molded.

[Structure A28]

A photosensitive member unit according to [Structure A27, wherein the first unit side helical gear portion when the second unit side helical gear portion integrally resin-molded.

[Structure A29]

A photosensitive member unit according to any one of Structures A25-A28, wherein a diameter of an addendum circle of the second unit side helical gear portion is larger than a diameter of a dedendum circle of the first unit side helical gear portion or 0.8 times a diameter of an addendum circle of the first unit side helical gear portion, and smaller than 1.1 times the diameter of the addendum circle of the first unit side helical gear portion.

[Structure A30]

A photosensitive member unit according to any one of Structures A1-A24, wherein the rotational axis of the first unit side helical gear portion and the rotational axis of the second unit side helical gear portion are not coaxial with each other.

[Structure A31]

A photosensitive member unit according to [Structure A30, wherein the rotational axis of the first unit side helical gear portion or the rotational axis of the second unit side helical gear portion are coaxial with the rotational axis of the photosensitive member.

[Structure A32]

A photosensitive member unit according to [Structure A30 or 31, wherein the rotational axis of the first unit side helical gear portion and the rotational axis of the second unit side helical gear portion are parallel with each other.

[Structure A33]

A photosensitive member unit according to any one of Structures A1-A24, wherein the first unit side helical gear portion and/or the second unit side helical gear portion is provided on a belt-like member.

[Structure A34]

A photosensitive member unit according to any one of Structures A1-A23, wherein the first unit side helical gear portion is connected with the second unit side helical gear portion so as to be capable of transmitting the driving force.

[Structure A35]

A photosensitive member unit according to [Structure A34, wherein the first unit side helical gear portion is connected with the second unit side helical gear portion with a play therebetween in the rotational direction.

[Structure A36]

A photosensitive member unit according to [Structure A34 or 35, wherein the first unit side helical gear portion is capable of being in a connected state of being connected with the second unit side helical gear portion to transit the driving force thereto and in a disconnected state of being incapable of transmitting the driving force to the second unit side helical gear portion.

[Structure A37]

A photosensitive member unit according to any one of Structures A1-A24, wherein a rotational force received by the first unit side helical gear portion is transmitted to the photosensitive member.

[Structure A38]

A photosensitive member unit according to any one of Structures A1-A24, further comprising a flange mounted to an end of the photosensitive member in the direction of the rotational axis of the photosensitive member, wherein the first unit side helical gear portion and the second unit side helical gear portion are provided on the flange.

[Structure A39]

A photosensitive member unit according to any one of Structures A1-A36, further comprising a driving force receiving portion capable of meshing engagement with the first main assembly side helical gear portion or the second main assembly side helical gear portion to receive a driving force for rotating the photosensitive member.

[Structure A40]

A photosensitive member unit according to any one of Structures A1-A36, further comprising a driving force receiving portion capable of engagement with a drive force applying portion provided in the main assembly of the image forming apparatus to receive a driving force for rotating the photosensitive member.

[Structure A41]

A photosensitive member unit according to [Structure A11, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \leq (4/5) \cdot Wc1.$$

[Structure A42]

A photosensitive member unit according to [Structure A11, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \leq (3/4) \cdot Wc1.$$

[Structure A43]

A photosensitive member unit according to any one of Structures A11, 41 or 42, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \geq (1/10) \cdot Wc1.$$

[Structure A44]

A photosensitive member unit according to any one of Structures A1-A43, wherein a twisting direction of the tooth of the second main assembly side helical gear portion is the same as a twisting direction of the tooth of the first main assembly side helical gear portion, wherein a helix angle of the tooth of the second main assembly side helical gear portion is larger than a helix angle of the tooth of the first main assembly side helical gear portion, and wherein the first main assembly side helical gear portion and the second main assembly side helical gear portion are integrally rotatable.

[Structure A45]

A photosensitive member unit according to any one of Structures A1-A44, wherein the photosensitive member unit is mountable to and dismountable from the main assembly of the image forming apparatus by movement thereof in a direction perpendicular to a rotational axis of the first main assembly side helical gear portion.

[Structure A46]

A cartridge comprising the photosensitive member unit according to any one of Structures A1-A45, and a frame rotatably supporting the photosensitive member unit.

<<Structure AX1>>

[Structure AX1]

A cartridge detachably mountable to a main assembly of an image forming apparatus, the image forming apparatus including a first main assembly side helical gear portion and a second main assembly side helical gear portion which are coaxially rotatable, the cartridge comprising:

a rotatable member rotatable about a rotational axis thereof;

a frame rotatably supporting the rotatable member;

a first unit side helical gear portion for meshing engagement with the first main assembly side helical gear portion; and a second unit side helical gear portion for meshing engagement with the second main assembly side helical gear portion;

wherein a twisting direction of a tooth of the second unit side helical gear portion is the same as the twisting direction of a tooth of first unit side helical gear portion, wherein a helix angle of the tooth of the second unit side helical gear portion is larger than a helix angle of the tooth of the first unit side helical gear portion, and wherein the first unit side helical gear portion and the second unit side helical gear portion are rotatable in a state in which the first unit side helical gear portion is in meshing engagement with the first main assembly side helical gear portion, and the second unit side helical gear portion is in meshing engagement with the second main assembly side helical gear portion.

<Structures Incorporatable in Structure AX1 (Dependent Structure)>

The elements of the above-described Structures A1-A45 are incorporatable in Structure AX1.

<<Structure AY1>>

[Structure AY1]

An image forming apparatus comprising, a main assembly including a first main assembly side helical gear portion and a second main assembly side helical gear portion which are coaxially rotatable; and a cartridge detachably mounted in the main assembly, the cartridge including (i) a rotatable member rotatable about a rotational axis thereof, (ii) a frame rotatably supporting the rotatable member, (iii) a first unit side helical gear portion for meshing engagement with the first main assembly side helical gear portion, and (iv) a second unit side helical gear portion for engagement with the second main assembly side helical gear portion, wherein a twisting direction of a tooth of the second unit side helical gear portion is the same as the twisting direction of a tooth of first unit side helical gear portion, wherein a helix angle of the tooth of the second unit side helical gear portion is larger than a helix angle of the tooth of the first unit side helical gear portion, and wherein in a state that the cartridge is mounted in the main assembly, the first unit side helical gear portion and the second unit side helical gear portion are rotatable in a state in which the first unit side helical gear portion is in meshing engagement with the first main assembly side helical gear portion, and the second unit side helical gear portion is in meshing engagement with the second main assembly side helical gear portion.

<Structures Incorporatable in Structure AY1 (Dependent Structure)>

The elements of the above-described Structures A1-A45 are incorporatable in Structure AY1.

<<Structure B>>

[Structure B1]

A photosensitive member unit detachably mountable to a main assembly of an image forming apparatus, the main assembly including a first main assembly side helical gear portion and a second main assembly side helical gear portion which are rotatable coaxially with each other, wherein a twisting direction of a tooth of the second main assembly side helical gear portion is the same as a twisting direction of a tooth of the first main assembly side helical gear portion, and a helix angle of the tooth of the second main assembly side helical gear portion is larger than a helix angle of the tooth of the first main assembly side helical gear portion, said photosensitive member unit comprising:

a photosensitive member rotatable about a rotational axis thereof;

a first unit side gear portion as a helical gear portion capable of meshing engagement with the first main assembly side helical gear portion; and a second unit side gear portion including a plurality of teeth capable of engagement with the second main assembly side helical gear portion, wherein the first unit side gear portion and the second unit side gear portion a rotatable in a state in which the first unit side gear portion is meshing engagement with the first main assembly side helical gear portion and the second unit side gear portion is in meshing engagement with the second main assembly side helical gear portion.

[Structure B2]

A photosensitive member unit according to Structure B1, wherein with respect to the rotational axis of the photosensitive member, the second unit side gear portion is disposed between the photosensitive member and the first unit side gear portion.

[Structure B3]

A photosensitive member unit according to Structure B1 or B2, wherein with respect to the rotational axis of the photosensitive member, a gap provided between the first unit side gear portion and the second unit side gear portion.

[Structure B4]

A photosensitive member unit according to Structure B4, wherein the main assembly of the image forming apparatus includes a projected portion between the first main assembly side helical gear portion and the second main assembly side helical gear portion, wherein the projected portion is inserted into the gap in a state in which the first unit side gear portion is in meshing engagement with the first main assembly side helical gear portion and the second unit side gear portion is in meshing engagement with the second main assembly side helical gear portion.

[Structure B5]

A photosensitive member unit according to Structure B3 or B4, further comprising an intermediary member between the first unit side gear portion and the second unit side gear portion, the intermediary member is capable of filling the gap.

[Structure B6]

A photosensitive member unit according to Structure B5, wherein the intermediary member is movable between a position for providing the gap and a position for filling the gap, by rotation thereof.

[Structure B7]

A photosensitive member unit according to Structure B5, wherein the intermediary member is movable between the position for providing the gap and the position for filling the gap, by movement thereof in a direction perpendicular to the rotational axis of the photosensitive member.

[Structure B8]

A photosensitive member unit according to Structure B5, wherein the intermediary member is made of an elastic member and is capable of taking a position for providing the gap and a position for filling the gap, by elastic deformation thereof.

[Structure B9]

A photosensitive member unit according to any one of Structures B3-B8, wherein with respect to the rotational axis of the photosensitive member, a tooth width Wc of the first unit side gear portion and a width We of the gap satisfy, $$Wc>We\geq Wc/5.$$

[Structure B10]

A photosensitive member unit according to Structure B11, wherein with respect to the rotational axis of the photosensitive member, a width We of the gap and a tooth width Wd of the second unit side gear portion satisfy, $$Wd>We.$$

[Structure B11]

A photosensitive member unit according to any one of Structures B1-B10, wherein the first helical gear portion and the second helical gear portion each have at least one tooth having a width satisfying, $$Wc>Wd,$$

where Wc is a tooth width of the first helical gear portion, and Wd is a tooth width of the second helical gear portion, measured in the direction of the rotational axis of the photosensitive member.

[Structure B12]

A photosensitive member unit according to any one of Structures B1-B11, wherein a helix angle of the tooth of the first unit side gear portion is not less than 15° and not more than 40°.

[Structure B13]

A photosensitive member unit according to any one of Structures B1-B11, wherein a helix angle of the tooth of the first unit side gear portion is not less than 20° and not more than 40°.

[Structure B14]

A photosensitive member unit according to any one of Structures B1-B13, wherein the first unit side gear portion includes a plurality of such teeth, at least one of which is constituted by a plurality of first projections provided separately in the direction of the rotational axis of the photosensitive member or in a rotational movement direction of the first unit side gear portion, the first projections being provided so as to be contactable with one of the teeth of the first main assembly side helical gear portion at respective positions away from each other in the direction of the rotational axis.

[Structure B15]

A photosensitive member unit according to any one of Structures B1-B14, wherein at least one tooth of the teeth of the second unit side gear has a corner portion which is provided so as to contact one tooth of the second main assembly side helical gear portion, only at one position in the direction of the rotational axis.

[Structure B16]

A photosensitive member unit according to any one of Structures B1-B14, wherein the second unit side gear portion is a helical gear portion having a twisting direction which is the same as a twisting direction of the tooth of the first unit side gear portion.

[Structure B17]

A photosensitive member unit according to Structure B16, wherein the second unit side gear portion includes a plurality of such teeth, at least one of which is constituted by a plurality of second projections provided separately in the direction of the rotational axis of the photosensitive member or in a rotational movement direction of the second unit side gear portion, the second projections being provided so as to be contactable with one of the teeth of the second main assembly side helical gear portion at respective positions away from each other in the direction of the rotational axis.

[Structure B18]

A photosensitive member unit according to any one of Structures B1-B17, wherein the first unit side gear portion includes a number of such teeth, and the second unit side gear portion includes the same number of such teeth.

[Structure B19]

A photosensitive member unit according to any one of Structures B1-B17, wherein first unit side gear portion includes a tooth missing part.

[Structure B20]

A photosensitive member unit according to any one of Structures B1-B17, wherein second unit side gear portion includes a tooth missing part.

[Structure B21]

A photosensitive member unit according to any one of Structures B1-B20, wherein a projecting direction of the first unit side gear portion and a projecting direction of the second unit side gear portion include respective components parallel with the rotational axis of the photosensitive drum.

[Structure B22]

A photosensitive member unit according to any one of Structures B1-B21, further comprising an elastic member covering the first unit side gear portion and/or the second unit side gear portion.

[Structure B23]

A photosensitive member unit according to any one of Structures B1-B22, wherein while the first unit side helical gear portion and the second unit side helical gear portion are rotated in a predetermined direction by rotation of the first main assembly side helical gear portion and the second main assembly side helical gear portion, the first unit side gear portion and the second unit side gear portion are in a state that the tooth of first unit side gear portion is in contact with such a tooth of first main assembly side helical gear portion as is at a position on an upstream side in the predetermined direction, a tooth of the second unit side gear portion is in contact with such a tooth of the second main assembly side helical gear portion as is at a position and an upstream side in the predetermined direction, and the tooth of the second unit side gear portion is fixed so as not to be rotated in a direction opposite to the predetermined direction relative to the first unit side gear portion.

[Structure B24]

A photosensitive member unit according to any one of Structures B1-B23, wherein the first unit side gear portion is capable of transmitting a driving force to the second unit side gear portion.

[Structure B25]

A photosensitive member unit according to any one of Structures B1-B24, wherein the first unit side gear portion and the second unit side gear portion are rotatable coaxially with each other.

[Structure B26]

A photosensitive member unit according to Structure B25, wherein a rotational axis of the first unit side gear portion and a rotational axis of the second unit side gear portion are coaxial with the rotational axis of the photosensitive member.

[Structure B27]

A photosensitive member unit according to Structure B25 or B26, wherein the first unit side gear portion and the second unit side gear portion are integrally molded.

[Structure B28]

A photosensitive member unit according to Structure B27, wherein the first unit side gear portion when the second unit side gear portion integrally resin-molded.

[Structure B29]

A photosensitive member unit according to any one of Structures B25-B28, wherein a diameter of an addendum circle of the second unit side gear portion is larger than a diameter of a dedendum circle of the first unit side gear portion or 0.8 times a diameter of an addendum circle of the first unit side gear portion, and smaller than 1.1 times the diameter of the addendum circle of the first unit side gear portion.

[Structure B30]

A photosensitive member unit according to any one of Structures B1-B24, wherein the rotational axis of the first unit side gear portion and the rotational axis of the second unit side gear portion are not coaxial with each other.

[Structure B31]

A photosensitive member unit according to Structure B30, wherein the rotational axis of the first unit side gear portion or the rotational axis of the second unit side gear portion are coaxial with the rotational axis of the photosensitive member.

[Structure B32]

A photosensitive member unit according to Structure B30 or B31, wherein the rotational axis of the first unit side gear portion and the rotational axis of the second unit side gear portion are parallel with each other.

[Structure B33]

A photosensitive member unit according to any one of Structures B1-B24, wherein the first unit side gear portion and/or the second unit side gear portion is provided on a belt-like member.

[Structure B34]

A photosensitive member unit according to any one of Structures B1-B23, wherein the first unit side gear portion is connected with the second unit side gear portion so as to be capable of transmitting the driving force.

[Structure B35]

A photosensitive member unit according to Structure B34, wherein the first unit side gear portion is connected with the second unit side gear portion with a play therebetween in the rotational direction.

[Structure B36]

A photosensitive member unit according to Structure B34 or B35, wherein the first unit side gear portion is capable of being in a connected state of being connected with the second unit side gear portion to transit the driving force thereto and in a disconnected state of being incapable of transmitting the driving force to the second unit side gear portion.

[Structure B37]

A photosensitive member unit according to any one of Structures B1-B24, wherein a rotational force received by the first unit side gear portion is transmitted to the photosensitive member.

[Structure B38]

A photosensitive member unit according to any one of Structures B1-B24, further comprising a flange mounted to an end of the photosensitive member in the direction of the rotational axis of the photosensitive member, and the first unit side gear portion and the second unit side gear portion are provided on the flange.

[Structure B39]

A photosensitive member unit according to any one of Structures B1-B36, further comprising a driving force receiving portion capable of meshing engagement with the first main assembly side helical gear portion or the second main assembly side helical gear portion to receive a driving force for rotating the photosensitive member.

[Structure B40]

A photosensitive member unit according to any one of Structures B1-B36, further comprising a driving force receiving portion capable of engagement with a drive force applying portion provided in the main assembly of the image forming apparatus to receive a driving force for rotating the photosensitive member.

[Structure B41]

A photosensitive member unit according to Structure B11, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \leq (4/5) \cdot Wc1.$$

[Structure B42]

A photosensitive member unit according to Structure B11, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \leq (3/4) \cdot Wc1.$$

[Structure B43]

A photosensitive member unit according to Structure B11, 41 or B42, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \geq (1/10) \cdot Wc1.$$

[Structure B44]

A photosensitive member unit according to any one of Structures B1-B43, wherein the first main assembly side helical gear portion and the second main assembly side helical gear portion are integrally rotatable.

[Structure B45]

A photosensitive member unit according to any one of Structures B1-B44, wherein the photosensitive member unit is mountable to and dismountable from the main assembly of the image forming apparatus by movement thereof in a direction perpendicular to a rotational axis of the first main assembly side helical gear portion.

[Structure B46]

A cartridge comprising the photosensitive member unit according to any one of Structures B1-B45, and a frame rotatably supporting the photosensitive member unit.

<<Structure BX1>>

[Structure BX1]

A cartridge detachably mountable to a main assembly of an image forming apparatus, the main assembly including a first main assembly side helical gear portion and a second main assembly side helical gear portion which are rotatable coaxially with each other, wherein a twisting direction of a tooth of the second main assembly side helical gear portion is the same as a twisting direction of a tooth of the first main assembly side helical gear portion, and a helix angle of the tooth of the second main assembly side helical gear portion is larger than a helix angle of the tooth of the first main assembly side helical gear portion, the cartridge comprising:

a rotatable member rotatable about a rotational axis thereof;

a frame rotatably supporting the rotatable member;

a first unit side gear portion as a helical gear portion capable of meshing engagement with the first main assembly side helical gear portion; and a second unit side gear portion including a plurality of teeth capable of engagement with the second main assembly side helical gear portion;

wherein the first unit side gear portion and the second unit side gear portion a rotatable in a state in which the first unit side gear portion is meshing engagement with the first main assembly side helical gear portion and the second unit side gear portion is in meshing engagement with the second main assembly side helical gear portion.

<Structures Incorporatable in Structure BX1 (Dependent Structure)>

The elements of the above-described Structures B1-B45 are incorporatable in Structure BX1.

<<Structure BY1>>

[Structure BY1]

An image forming apparatus comprising, a main assembly including a first main assembly side helical gear portion and a second main assembly side helical gear portion which are coaxially rotatable; and a cartridge detachably mounted in the main assembly, the cartridge including (i) a rotatable member rotatable about a rotational axis thereof, (ii) a frame rotatably supporting the rotatable member, (iii) a first unit side helical gear portion, as a helical gear, for meshing engagement with the first main assembly side helical gear portion, and (iv) a second unit side helical gear portion, having a plurality of teeth, for engagement with the second main assembly side helical gear portion, wherein a twisting direction of a tooth of the second unit side helical gear portion is the same as the twisting direction of a tooth of first unit side helical gear portion, wherein a helix angle of the tooth of the second unit side helical gear portion is larger than a helix angle of the tooth of the first unit side helical gear portion, and wherein in a state that the cartridge is mounted in the main assembly, the first unit side gear portion and the second unit side gear portion are rotatable in a state that the first unit side gear portion is in meshing engagement with the first main assembly side helical gear portion, and the second unit side gear portion is in meshing engagement with the second main assembly side helical gear portion.

<Structures Incorporatable in Structure BY1 (Dependent Structure)>

The elements of the above-described Structures B1-B45 are incorporatable in Structure BY1.

<<Structure C>>

[Structure C1]

A photosensitive member unit detachably mountable to a main assembly of an image forming apparatus, the image forming apparatus including a first main assembly side helical gear portion and a second main assembly side helical gear portion which are coaxially rotatable, the photosensitive member unit comprising:

a photosensitive member rotatable about a rotational axis thereof;

a first unit side gear portion as a helical gear portion capable of meshing engagement with the first main assembly side helical gear portion; and a second unit side gear portion including a plurality of teeth capable of engagement with the second main assembly side helical gear portion, wherein while the first unit side gear portion and the second unit side gear portion are rotated in a predetermined direction by rotation of the first main assembly side helical gear portion and the second main assembly side helical gear portion, the tooth of first unit side gear portion is in contact with such a tooth of first main assembly side helical gear portion as is at a position on an upstream side in the predetermined direction, the tooth of the second unit side gear portion is in contact with such a tooth of the second main assembly side helical gear portion as is at a position on an upstream side in the predetermined direction.

[Structure C2]

A photosensitive member unit according to Structure C1, wherein with respect to the rotational axis of the photosensitive member, the second unit side gear portion is disposed between the photosensitive member and the first unit side gear portion.

[Structure C3]

A photosensitive member unit according to Structure C1 or C2, wherein with respect to the rotational axis of the photosensitive member, a gap provided between the first unit side gear portion and the second unit side gear portion.

[Structure C4]

A photosensitive member unit according to Structure C3, wherein the main assembly of the image forming apparatus includes a projected portion between the first main assembly side helical gear portion and the second main assembly side helical gear portion, wherein the projected portion is inserted into the gap in a state in which the first unit side gear portion is in meshing engagement with the first main assembly side helical gear portion and the second unit side gear portion is in meshing engagement with the second main assembly side helical gear portion.

[Structure C5]

A photosensitive member unit according to Structure C3 or C4, further comprising an intermediary member between the first unit side gear portion and the second unit side gear portion, the intermediary member is capable of filling the gap.

[Structure C6]

A photosensitive member unit according to Structure C5, wherein the intermediary member is movable between a position for providing the gap and a position for filling the gap, by rotation thereof.

[Structure C7]

A photosensitive member unit according to Structure C5, wherein the intermediary member is movable between the position for providing the gap and the position for filling the gap, by movement thereof in a direction perpendicular to the rotational axis of the photosensitive member.

[Structure C8]

A photosensitive member unit according to Structure C5, wherein the intermediary member is made of an elastic member and is capable of taking a position for providing the gap and a position for filling the gap, by elastic deformation thereof.

[Structure C9]

A photosensitive member unit according to any one of Structures C3-C8, wherein with respect to the rotational axis of the photosensitive member, a tooth width Wc of the first unit side gear portion and a width We of the gap satisfy, $$Wc>We\geq Wc/5.$$

[Structure C10]

A photosensitive member unit according to Structure C9, wherein with respect to the rotational axis of the photosensitive member, a width We of the gap and a tooth width Wd of the second unit side gear portion satisfy, $$Wd>We.$$

[Structure C11]

A photosensitive member unit according to any one of Structures C1-C10, wherein the first helical gear portion and the second helical gear portion each have at least one tooth having a width satisfying, $$Wc>Wd,$$

where Wc is a tooth width of the first helical gear portion, and Wd is a tooth width of the second helical gear portion, measured in the direction of the rotational axis of the photosensitive member.

[Structure C12]

A photosensitive member unit according to any one of Structures C1-C11, wherein a helix angle of the tooth of the first unit side gear portion is not less than 15° and not more than 40°.

[Structure C13]

A photosensitive member unit according to any one of Structures C1-C11, wherein a helix angle of the tooth of the first unit side gear portion is not less than 15° and not more than 35°.

[Structure C14]

A photosensitive member unit according to any one of Structures C1-C13, wherein the first unit side gear portion includes a plurality of such teeth, at least one of which is constituted by a plurality of first projections provided separately in the direction of the rotational axis of the photosensitive member or in a rotational movement direction of the first unit side gear portion, the first projections being provided so as to be contactable with one of the teeth of the first main assembly side helical gear portion at respective positions away from each other in the direction of the rotational axis.

[Structure C15]

A photosensitive member unit according to any one of Structures C1-C14, wherein at least one tooth of the teeth of the second unit side gear has a corner portion provided so as to contact one tooth of the second main assembly side helical gear portion, only at one position in the direction of the rotational axis.

[Structure C16]

A photosensitive member unit according to any one of Structures C1-C14, wherein the second unit side gear portion is a helical gear portion having a twisting direction which is the same as a twisting direction of the tooth of the first unit side gear portion.

[Structure C17]

A photosensitive member unit according to Structure C16, wherein the second unit side gear portion includes a plurality of such teeth, at least one of which is constituted by a plurality of second projections provided separately in the direction of the rotational axis of the photosensitive member or in a rotational movement direction of the second unit side gear portion, the second projections being provided so as to be contactable with one of the teeth of the second main assembly side helical gear portion at respective positions away from each other in the direction of the rotational axis.

[Structure C18]

A photosensitive member unit according to any one of Structures C1-C17, wherein the first unit side gear portion includes a number of such teeth, and the second unit side gear portion includes the same number of such teeth.

[Structure C19]

A photosensitive member unit according to any one of Structures C1-C17, wherein first unit side gear portion includes a tooth missing part.

[Structure C20]

A photosensitive member unit according to any one of Structures C1-C17, wherein second unit side gear portion includes a tooth missing part.

[Structure C21]

A photosensitive member unit according to any one of Structures C1-C20, wherein a projecting direction of the first unit side gear portion and a projecting direction of the second unit side gear portion include respective components parallel with the rotational axis of the photosensitive drum.

Structure C22]

A photosensitive member unit according to any one of Structures C1-C21, further comprising an elastic member covering the first unit side gear portion and/or the second unit side gear portion.

[Structure C23]

A photosensitive member unit according to any one of Structures C1-C22, wherein while the first unit side gear portion and the second unit side gear portion are rotated in a predetermined direction by rotation of the first main assembly side helical gear portion and the second main assembly side helical gear portion, the first unit side gear portion and the second unit side gear portion are in a state that the tooth of the second unit side gear portion is fixed so as not to be rotated in a direction opposite to the predetermined direction relative to the first unit side gear portion.

Structure C24]

A photosensitive member unit according to any one of Structures C1-C23, wherein the first unit side gear portion is capable of transmitting a driving force to the second unit side gear portion.

[Structure C25]

A photosensitive member unit according to any one of Structures C1-C24, wherein the first unit side gear portion and the second unit side gear portion are rotatable coaxially with each other.

[Structure C26]

A photosensitive member unit according to Structure C25, wherein a rotational axis of the first unit side gear portion and a rotational axis of the second unit side gear portion are coaxial with the rotational axis of the photosensitive member.

[Structure C27]

A photosensitive member unit according to Structure C25 or 26, wherein the first unit side gear portion and the second unit side gear portion are integrally molded.

[Structure C28]

A photosensitive member unit according to Structure C27, wherein the first unit side gear portion when the second unit side gear portion integrally resin-molded.

[Structure C29]

A photosensitive member unit according to any one of Structures C25-C28, wherein a diameter of an addendum circle of the second unit side gear portion is larger than a diameter of a dedendum circle of the first unit side gear portion or 0.8 times a diameter of an addendum circle of the first unit side gear portion, and smaller than 1.1 times the diameter of the addendum circle of the first unit side gear portion.

[Structure C30]

A photosensitive member unit according to any one of Structures C1-C24, wherein the rotational axis of the first unit side gear portion and the rotational axis of the second unit side gear portion are not coaxial with each other.

[Structure C31]

A photosensitive member unit according to Structure C30, wherein the rotational axis of the first unit side gear portion or the rotational axis of the second unit side gear portion are coaxial with the rotational axis of the photosensitive member.

[Structure C32]

A photosensitive member unit according to Structure C30 or 31, wherein the rotational axis of the first unit side gear portion and the rotational axis of the second unit side gear portion are parallel with each other.

[Structure C33]

A photosensitive member unit according to any one of Structures C1-C24, wherein the first unit side gear portion and/or the second unit side gear portion is provided on a belt-like member.

[Structure C34]

A photosensitive member unit according to any one of Structures C1-C23, wherein the first unit side gear portion is connected with the second unit side gear portion so as to be capable of transmitting the driving force.

[Structure C35]

A photosensitive member unit according to Structure C34, wherein the first unit side gear portion is connected with the second unit side gear portion with a play therebetween in the rotational direction.

[Structure C36]

A photosensitive member unit according to Structure C34 or C35, wherein the first unit side gear portion is capable of being in a connected state of being connected with the second unit side gear portion to transit the driving force thereto and in a disconnected state of being incapable of transmitting the driving force to the second unit side gear portion.

[Structure C37]

A photosensitive member unit according to any one of Structures C1-C24, wherein a rotational force received by the first unit side gear portion is transmitted to the photosensitive member.

[Structure C38]

A photosensitive member unit according to any one of Structures C1-C24, further comprising a flange mounted to an end of the photosensitive member in the direction of the rotational axis of the photosensitive member, wherein the first unit side gear portion and the second unit side gear portion are provided on the flange.

[Structure C39]

A photosensitive member unit according to any one of Structures C1-C36, further comprising a driving force receiving portion capable of meshing engagement with the first main assembly side helical gear portion or the second main assembly side helical gear portion to receive a driving force for rotating the photosensitive member.

[Structure C40]

A photosensitive member unit according to any one of Structures C1-C36, further comprising a driving force receiving portion capable of engagement with a drive force applying portion provided in the main assembly of the image forming apparatus to receive a driving force for rotating the photosensitive member.

[Structure C41]

A photosensitive member unit according to Structure C11, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \leq (4/5) \cdot Wc1.$$

[Structure C42]

A photosensitive member unit according to Structure C11, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \leq (3/4) \cdot Wc1.$$

[Structure C43]

A photosensitive member unit according to Structure C11, 41 or 42, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \geq (1/10) \cdot Wc1.$$

[Structure C44]

A photosensitive member unit according to any one of Structures C1-C43, wherein the first main assembly side helical gear portion and the second main assembly side helical gear portion are integrally rotatable.

[Structure C45]

A photosensitive member unit according to any one of Structures C1-C44, wherein the photosensitive member unit is mountable to and dismountable from the main assembly of the image forming apparatus by movement thereof in a direction perpendicular to a rotational axis of the first main assembly side helical gear portion.

[Structure C46]

A cartridge comprising the photosensitive member unit according to any one of Structures C1-C45, and a frame rotatably supporting the photosensitive member unit.

<<Structure CX1>>

[Structure CX1]

A cartridge detachably mountable to a main assembly of an image forming apparatus, the image forming apparatus including a first main assembly side helical gear portion and a second main assembly side helical gear portion which are coaxially rotatable, the cartridge comprising:

a rotatable member rotatable about a rotational axis thereof;

a frame rotatably supporting the rotatable member;

a first unit side gear portion as a helical gear portion capable of meshing engagement with the first main assembly side helical gear portion; and a second unit side gear portion including a plurality of teeth capable of engagement with the second main assembly side helical gear portion;

wherein while the first unit side gear portion and the second unit side gear portion are rotated in a predetermined direction by rotation of the first main assembly side helical gear portion and the second main assembly side helical gear portion, the tooth of first unit side gear portion is in contact with such a tooth of first main assembly side helical gear portion as is at a position on an upstream side in the predetermined direction, and a tooth of the second unit side gear portion is in contact with such a tooth of the second main assembly side helical gear portion as is at a position and an upstream side in the predetermined direction.

<Structures Incorporatable in Structure CX1 (Dependent Structure)>

The elements of the above-described Structures C1-C45 are incorporatable in Structure CX1.

<<Structure CY1»

[Structure CY1]

An image forming apparatus comprising, a main assembly including a first main assembly side helical gear portion and a second main assembly side helical gear portion which are coaxially rotatable; and a cartridge detachably mounted in the main assembly, the cartridge including (i) a rotatable member rotatable about a rotational axis thereof, (ii) a frame rotatably supporting the rotatable member, (iii) a first unit side helical gear portion, as a helical gear, for meshing engagement with the first main assembly side helical gear portion, and (iv) a second unit side helical gear portion, having a plurality of teeth, for engagement with the second main assembly side helical gear portion, wherein in a state that the cartridge is mounted in the main assembly, while the first unit side gear portion and the second unit side gear portion are rotated in a predetermined direction by rotation of the first main assembly side helical gear portion and the second main assembly side helical gear portion, the tooth of first unit side gear portion is in contact with such a tooth of first main assembly side helical gear portion as is at a position on an upstream side in the predetermined direction, and a tooth of the second unit side gear portion is in contact with such a tooth of the second main assembly side helical gear portion as is at a position and an upstream side in the predetermined direction. THE <Structures Incorporatable in Structure CY1 (Dependent Structure)>

The elements of the above-described Structures C1-C45 are incorporatable in Structure CY1.

<<Structure NA>>

[Structure NA1]

A photosensitive member unit detachably mountable to a main assembly of an image forming apparatus, the photosensitive member unit comprising:

a photosensitive member rotatable about a rotational axis thereof;

a rotatable first helical gear portion;

a second helical gear portion integrally rotatable with the first helical gear portion; and a twisting direction of a tooth of the second helical gear portion is the same as a twisting direction of a tooth of the first helical gear portion, and a helix angle of the tooth of the second helical gear portion is larger than a helix angle of the tooth of the first helical gear portion.

[Structure NA2]

A photosensitive member unit according to Structure NA1, wherein with respect to the rotational axis of the photosensitive member, the second helical gear portion is provided between the photosensitive member and the first helical gear portion.

[Structure NA3]

A photosensitive member unit according to Structure NA1 or NA2, wherein with respect to the rotational axis of the photosensitive member, a gap is formed between the first helical gear portion and the second helical gear portion.

[Structure NA4]

A photosensitive member unit according to Structure NA3, further comprising an intermediary member provided between the first helical gear portion and the second helical gear portion with respect to the rotational axis of the photosensitive member, the intermediary member being capable of filling the gap.

[Structure NA5]

A photosensitive member unit according to Structure NA4, wherein the intermediary member is movable between a position for providing the gap and a position for filling the gap, by rotation thereof.

[Structure NA6]

A photosensitive member unit according to Structure NA4, wherein the intermediary member is movable between the position for providing the gap and the position for filling the gap, by movement thereof in a direction perpendicular to the rotational axis of the photosensitive member.

[Structure NA7]

A photosensitive member unit according to Structure NA4, wherein the intermediary member is made of an elastic member and is capable of taking a position for providing the gap and a position for filling the gap, by elastic deformation thereof.

[Structure NA8]

A photosensitive member unit according to any one of Structures C3-NA7, wherein with respect to the rotational axis of the photosensitive member, a tooth width Wc of the first helical gear portion and a width We a gap satisfy, $$Wc>We\geq Wc/5.$$

[Structure NA9]

A photosensitive member unit according to Structure NA8, wherein with respect to the rotational axis of the photosensitive member, a width We of the gap and a tooth width Wd of the second helical gear portion satisfy, $$Wd>We.$$

[Structure NA10]

A photosensitive member unit according to any one of Structures NA1-NA9, wherein the first helical gear portion and the second helical gear portion each have at least one tooth having a width satisfying, $$Wc>Wd,$$

where Wc is a tooth width of the first helical gear portion, and Wd is a tooth width of the second helical gear portion, measured in the direction of the rotational axis of the photosensitive member.

[Structure NA11]

A photosensitive member unit according to Structure NA10, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1\leq(4/5)\cdot Wc1.$$

[Structure NA12]

A photosensitive member unit according to Structure NA10, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \leq (3/4) \cdot Wc1.$$

[Structure NA13]

A photosensitive member unit according to any one of Structures NA10-NA12, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \geq (1/10) \cdot Wc1.$$

[Structure NA14]

A photosensitive member unit according to any one of Structures NA1-NA10, wherein a helix angle of the tooth of the first helical gear portion is not less than 15° and not more than 40°.

[Structure NA15]

A photosensitive member unit according to Structure NA14, wherein the helix angle of the tooth of the first helical gear portion is not less than 20° and not more than 35°.

[Structure NA16]

A photosensitive member unit according to any one of Structures NA1-NA12, wherein a helix angle of the tooth of the second helical gear portion is not less than 20° and not more than 40°.

[Structure NA17]

A photosensitive member unit according to any one of Structures NA1-NA12, wherein a helix angle of the tooth of the second helical gear portion is not less than 25° and not more than 35°.

[Structure NA18]

A photosensitive member unit according to any one of Structures NA1-NA15, wherein the first helical gear portion includes a plurality of such teeth, at least one of which is constituted by a plurality of first projections provided separately in the direction of the rotational axis of the photosensitive member or in a rotational movement direction of the first helical gear portion.

[Structure NA19]

A photosensitive member unit according to any one of Structures NA1-NA18, wherein the second helical gear portion includes a plurality of such teeth, at least one of which is constituted by a plurality of second projections provided separately in the direction of the rotational axis of the photosensitive member or in a rotational movement direction of the second helical gear portion.

[Structure NA20]

A photosensitive member unit according to any one of Structures NA1-NA19, wherein the first helical gear portion includes a number of such teeth, and the second helical gear portion includes the same number of such teeth.

[Structure NA21]

A photosensitive member unit according to any one of Structures NA1-NA19, wherein the first helical gear portion includes a tooth missing part.

[Structure NA22]

A photosensitive member unit according to any one of Structures NA1-NA19, wherein the second helical gear portion includes a tooth missing part.

[Structure NA23]

A photosensitive member unit according to any one of Structures NA1-NA22, wherein a projecting direction of the first a helical gear portion and a projecting direction of the second a helical gear portion include respective components parallel with the rotational axis of the photosensitive drum.

[Structure NA24]

A photosensitive member unit according to any one of Structures NA1-NA23, further comprising an elastic member covering the first helical gear portion and/or the second helical gear portion.

[Structure NA25]

A photosensitive member unit according to any one of Structures NA1-NA24, wherein while the first helical gear portion and the second helical gear portion are rotated in a predetermined direction, the first a helical gear portion and the second a helical gear portion are in a state that the tooth of the second helical gear portion is fixed so as not to be rotated in a direction opposite to the predetermined direction relative to the first helical gear portion.

[Structure NA26]

A photosensitive member unit according to any one of Structures NA1-NA23, wherein the first helical gear portion is capable of transmitting a driving force to the second helical gear portion.

[Structure NA27]

A photosensitive member unit according to any one of Structures NA1-NA26, wherein the first helical gear portion and the second helical gear portion a rotatable coaxially with each other.

[Structure NA28]

A photosensitive member unit according to Structure NA27, wherein a rotational axis of the first helical gear portion and a rotational axis of the second helical gear portion is coaxial with the rotational axis of the photosensitive member.

[Structure NA29]

A photosensitive member unit according to Structure NA27 or 28, wherein the first helical gear portion and the second helical gear portion are integrally molded.

[Structure NA30]

A photosensitive member unit according to Structure NA29, wherein the first helical gear portion and the second helical gear portion are integrally resin-molded.

[Structure NA31]

A photosensitive member unit according to any one of Structures NA27-NA30, wherein a diameter of an addendum circle of the second helical gear portion is larger than a diameter of a dedendum circle of the first a helical gear portion or 0.8 times a diameter of an addendum circle of the first a helical gear portion, and smaller than 1.1 times the diameter of the addendum circle of the first helical gear portion.

[Structure NA32]

A photosensitive member unit according to Structure NA31, wherein the diameter of the addendum circle of the second helical gear portion is larger than 0.9 times the diameter of the addendum circle of the first helical gear portion.

[Structure NA33]

A photosensitive member unit according to any one of Structures NA1-NA26, wherein a rotational axis of the first helical gear portion and a rotational axis of the second helical gear portion are is not coaxial with each other.

[Structure NA34]

A photosensitive member unit according to Structure NA33, wherein the rotational axis of the first helical gear portion or the rotational axis of the second helical gear portion are coaxial with the rotational axis of the photosensitive member.

[Structure NA35]

A photosensitive member unit according to Structure NA33 or NA34, wherein the rotational axis of the first helical gear portion and the rotational axis of the second helical gear portion are parallel with each other.

[Structure NA36]

A photosensitive member unit according to any one of Structures NA1-NA26, wherein the first helical gear portion and/or the second helical gear portion are provided on a belt-like member.

[Structure NA37]

A photosensitive member unit according to any one of Structures NA1-NA25, wherein the first helical gear portion connected with the second helical gear portion so as to be capable of transmitting a driving force.

[Structure NA38]

A photosensitive member unit according to Structure NA37, wherein the first helical gear portion is connected with the second helical gear portion with a play in the rotational movement direction.

[Structure NA39]

A photosensitive member unit according to Structure NA37 or 38, wherein the first a helical gear portion is capable of being in a connected state of being connected with the second helical gear portion to transit the driving force thereto and in a disconnected state of being incapable of transmitting the driving force to the second helical gear portion.

[Structure NA40]

A photosensitive member unit according to any one of Structures NA1-NA26, wherein the first helical gear portion is connected with the photosensitive member so as to be capable of transmitting a rotational force.

[Structure NA41]

A photosensitive member unit according to any one of Structures NA1-NA26, further comprising a flange mounted to an end of the photosensitive member in the direction of the rotational axis of the photosensitive member, wherein the first helical gear portion and the second helical gear portion are provided on the flange.

[Structure NA42]

A photosensitive member unit according to any one of Structures NA1-NA39, further comprising a third gear portion connected so as to be capable of transmitting the driving force to the photosensitive member.

<<Structure-NAX>>

[Structure-NAX1]

A cartridge detachably mountable to a main assembly of an image forming apparatus, the cartridge comprising:

a rotatable member rotatable about a rotational axis thereof;

a frame rotatably supporting the rotatable member;

a rotatable first helical gear portion; and a second helical gear portion integrally rotatable with the first helical gear portion, wherein a twisting direction of the tooth of the second helical gear portion is the same as a twisting direction of the tooth of the first helical gear portion, and a helix angle of the tooth of the second helical gear portion is larger than a helix angle of the tooth of the first helical gear portion.

<Structures Incorporatable in Structure NAX1 (Dependent Structure)>

The elements of the above-described Structures NA1-NA42 are incorporatable in Structure NAX1.

<<Structure-NB>>

[Structure-NB1]

A photosensitive member unit detachably mountable to a main assembly of an image forming apparatus, the photosensitive member unit comprising:

a photosensitive member rotatable about a rotational axis thereof;

a first gear portion as a helical gear portion; and a second gear portion including a plurality of teeth, wherein with respect to the rotational axis of the photosensitive member, the second gear portion is disposed between the first gear portion and the photosensitive member, wherein with respect to the rotational axis of the photosensitive member, a gap provided between the first gear portion and the second gear portion, and wherein the first gear portion and the second gear portion each have at least one tooth satisfying, $$Wc>Wd,$$

where Wc is a tooth width of the first gear portion, and Wd is a tooth width of the second gear portion, measured in the rotational axis direction of the photosensitive member.

[Structure-NB2]

A photosensitive member unit according to Structure-NB1, further comprising an intermediary member capable of filling the gap, between the first gear portion and the second gear portion with respect to the rotational axis of the photosensitive member.

[Structure-NB3]

A photosensitive member unit according to Structure-NB2, wherein the intermediary member is movable between a position for providing the gap and a position for filling the gap, by rotation thereof.

[Structure-NB4]

A photosensitive member unit according to Structure-NB2, wherein the intermediary member is movable between a position for providing the gap and a position for filling the gap, by the movement thereof in a direction perpendicular to the rotational axis of the photosensitive member.

[Structure-NB5]

A photosensitive member unit according to Structure-NB2, wherein the intermediary member is an elastic member and is capable of taking a state of providing the gap and a state of filling the gap.

[Structure-NB6]

A photosensitive member unit according to any one of Structures-NB1-NB5, wherein with respect to the rotational axis of the photosensitive member, a tooth width Wc of the first gear portion and a width We of the gap satisfy, $$Wc>We\geq Wc/5.$$

[Structure-NB7]

A photosensitive member unit according to Structure-NB6, wherein with respect to the rotational axis of the photosensitive member, a width We of the gap and a tooth width Wd the second gear portion satisfy, $$Wd>We.$$

[Structure-NB8]

A photosensitive member unit according to any one of Structures-NB1-NB7, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \leq (4/5) \cdot Wc1.$$

A photosensitive member unit according to any one of Structures-NB1-NB7, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \leq (3/4) \cdot Wc1.$$

[Structure-NB10]

A photosensitive member unit according to any one of Structures-NB1-NB9, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \geq (1/10) \cdot Wc1.$$

[Structure-NB11]

A photosensitive member unit according to any one of Structures-NB1-NB10, wherein a helix angle of the tooth of the first gear portion is not less than 15° and not more than 40°.

[Structure-NB12]

A photosensitive member unit according to any one of Structures-NB1-NB10, wherein a helix angle of the tooth of the first gear portion is not less than 20° and not more than 35°.

[Structure-NB13]

A photosensitive member unit according to any one of Structures-NB1-NB12, wherein the first gear portion includes a plurality of such teeth, at least one of which is constituted by a plurality of first projections provided separately in the direction of the rotational axis of the photosensitive member or in a rotational movement direction of the first gear portion.

[Structure-NB14]

A photosensitive member unit according to any one of Structures-NB1-NB13, wherein the second gear portion includes a plurality of such teeth, at least one of which is a tooth having a projecting shape projecting in a radial direction with respect to the rotational axis of the second gear portion.

[Structure-NB15]

A photosensitive member unit according to Structure-NB14, wherein the projecting shape of the second gear portion is a cylindrical projection projecting in the radial direction with respect to the rotational axis of the second gear portion.

[Structure-NB16]

A photosensitive member unit according to Structure-NB14, wherein the projecting shape of the second gear portion is a projection having a polygonal cross-section and projecting in the radial direction with respect to the rotational axis of the second gear portion.

A photosensitive member unit according to any one of Structures-NB1-NB14, wherein the second gear portion includes a helical gear tooth, and a twisting direction of the tooth of the a helical gear is the same as a twisting direction of the tooth of the first gear portion.

[Structure-NB18]

A photosensitive member unit according to Structure-NB17, wherein a helix angle of the tooth of the of the second gear portion is not less than 20° and not more than 40°.

[Structure-NB19]

A photosensitive member unit according to Structure-NB17, wherein a helix angle of the tooth of the of the second gear portion is not less than 25° and not more than 35°.

[Structure-NB20]

A photosensitive member unit according to any one of Structures-NB17-NB19, wherein the tooth of the helical gear of the second gear portion is constituted by a plurality of second projections provided separately in the direction of the rotational axis of the photosensitive member or in the rotational moving direction of the second gear portion.

[Structure-NB21]

A photosensitive member unit according to any one of Structures-NB1-NB20, wherein the first gear portion includes a number of such teeth, and the second gear portion includes the same number of such teeth.

[Structure-NB22]

A photosensitive member unit according to any one of Structures-NB1-NB21, further comprising an elastic member covering the first gear portion and/or the second gear portion.

[Structure-NB23]

A photosensitive member unit according to any one of Structures-NB1-NB22, wherein while the first gear portion and the second gear portion are rotating in predetermined directions, the tooth of the second gear portion Is fixed so as not to rotate relative to the tooth of the first gear portion in a direction opposite to the predetermined direction.

[Structure-NB24]

A photosensitive member unit according to any one of Structures-NB1-NB23, wherein the first gear portion is capable of transmitting a driving force to the second gear portion.

A photosensitive member unit according to any one of Structures-NB1-NB24, wherein the first gear portion and the second gear portion are rotatable coaxially.

[Structure-NB26]

A photosensitive member unit according to Structure-NB25, wherein the rotational axis of the first gear portion and the rotational axis of the second gear portion are coaxial with rotational axis of the photosensitive member.

[Structure-NB27]

A photosensitive member unit according to Structure-NB25 or NB26, wherein the first gear portion and the second gear portion are integrally molded.

[Structure-NB28]

A photosensitive member unit according to Structure-NB27, wherein the first gear portion and the second gear portion are integrally resin-molded.

[Structure-NB29]

A photosensitive member unit according to any one of Structures-NB25-NB28, wherein a diameter of an addendum circle of the second gear portion is larger than 0.8 times a diameter of a dedendum circle or a diameter of the addendum circle of the first gear portion, and is smaller than 1.1 times a diameter of an addendum circle of the first gear portion.

[Structure-NB30]

A photosensitive member unit according to Structure-NB29, wherein a diameter of an addendum circle of the second helical gear portion is larger than 0.9 times the diameter of the addendum circle.

[Structure-NB31]

A photosensitive member unit according to any one of Structures-NB1-NB23, wherein the first gear portion is connected with the second gear portion so as to be capable of transmitting a driving force.

[Structure-NB32]

A photosensitive member unit according to Structure-NB31, wherein the first gear portion is connected with the second gear portion with a play in the rotational direction.

[Structure-NB33]

A photosensitive member unit according to any one of Structures-NB1-NB24, wherein the first gear portion is connected with the photosensitive member so as to be capable of transmitting a rotational driving force thereto.

[Structure-NB34]

A photosensitive member unit according to any one of Structures-NB1-NB24, further comprising a flange Mounted to an end portion of the photosensitive member in the direction of the rotational axis of the photosensitive member, and the first gear portion and the second gear portion are provided on the flange.

[Structure-NB35]

A photosensitive member unit according to any one of Structures-NB1-NB34, further comprising a third gear portion connected with the photosensitive member so as to be capable of transmitting a driving force thereto.

<<Structure NBX>>

[Structure NB1]

A cartridge detachably mountable to a main assembly of an image forming apparatus, the cartridge comprising:

a rotatable member rotatable about a rotational axis thereof;

a frame rotatably supporting the rotatable member;

a first gear portion as a helical gear portion; and a second gear portion including a plurality of teeth, wherein with respect to the rotational direction of the rotatable member, the second gear portion disposed between the first gear portion and the rotatable member, wherein a gap provided between the first gear portion and the second gear portion, with respect to the direction of the rotational axis of the rotatable member, wherein the first gear portion and the second gear portion each have at least one tooth satisfying, $$Wc > Wd,$$

where Wc is a tooth width of the first gear portion, and Wd is a tooth width of the second gear portion, measured in the direction of the rotational axis of the rotatable member.

<Structures Incorporatable in Structure NBX1 (Dependent Structure)>

The elements of the above-described Structures NB1-NB35 are incorporatable in Structure NBX1.

<<Structure NC>>

[Structure NC1]

A photosensitive member unit detachably mountable to a main assembly of an image forming apparatus, the photosensitive member unit comprising:

a photosensitive member rotatable about a rotational axis thereof;

a first gear portion as a helical gear portion; and a second gear portion including a plurality of teeth, wherein with respect to the rotational axis of the photosensitive member, the second gear portion is disposed between the first gear portion and the photosensitive member, wherein with respect to the rotational axis of the photosensitive member, a gap provided between the first gear portion and the second gear portion, and wherein with respect to the rotational axis of the photosensitive member, a tooth width Wc of the first gear portion and a width We of the gap satisfy, $$Wc > We \geq Wc/5.$$

[Structure NC]

A photosensitive member unit according to Structure NC1, further comprising an intermediary member capable of filling the gap, between the first gear portion and the second gear portion with respect to the rotational axis of the photosensitive member.

[Structure NC3]

A photosensitive member unit according to Structure NC2, wherein the intermediary member is movable between a position for providing the gap and a position for filling the gap, by rotation thereof.

[Structure NC4]

A photosensitive member unit according to Structure NC2, wherein the intermediary member is movable between a position for providing the gap and a position for filling the gap, by the movement thereof in a direction perpendicular to the rotational axis of the photosensitive member.

[Structure NC5]

A photosensitive member unit according to Structure NC2, wherein the intermediary member is an elastic member and is capable of taking a state of providing the gap and a state of filling the gap.

[Structure NC6]

A photosensitive member unit according to any one of Structures NC1-NC5, wherein with respect to the rotational axis of the photosensitive member, a width We of the gap and a tooth width Wd the second gear portion satisfy, $$Wd > We.$$

[Structure NC7]

A photosensitive member unit according to any one of Structures NC1-NC6, wherein the first helical gear portion and the second helical gear portion each have at least one tooth satisfying, Wc>Wd, where Wc is a tooth width of the first helical gear portion, and Wd is a tooth width of the second helical gear portion, measured in the rotational axis direction of the photosensitive member.

[Structure NC8]

A photosensitive member unit according to any one of Structures NC1-NC7, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \leq (4/5) \cdot Wc1.$$

[Structure NC9]

A photosensitive member unit according to any one of Structures NC1-NC7, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \leq (3/4) \cdot Wc1.$$

[Structure NC10]

A photosensitive member unit according to any one of Structures NC1-NC9, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy, $$Wd1 \geq (1/10) \cdot Wc1.$$

[Structure NC11]

A photosensitive member unit according to any one of Structures NC1-NC10, wherein a helix angle of the tooth of the first gear portion is not less than 15° and not more than 40°.

[Structure NC12]

A photosensitive member unit according to any one of Structures NC1-NC10, wherein a helix angle of the tooth of the first gear portion is not less than 20° and not more than 35°.

[Structure NC13]

A photosensitive member unit according to any one of Structures NC1-NC12, wherein the first gear portion includes a plurality of such teeth, at least one of which includes a plurality of first projections provided separately in the rotational axis direction of the photosensitive member or a rotational moving direction of the first gear portion.

[Structure NC14]

A photosensitive member unit according to any one of Structures NC1-NC13, wherein the second gear portion includes a plurality of such teeth, at least one of which is a tooth having a projecting shape projecting in a radial direction with respect to the rotational axis of the second gear portion.

[Structure NC15]

A photosensitive member unit according to Structure NC14, wherein the projecting shape of the second gear portion is a cylindrical projection projecting in the radial direction with respect to the rotational axis of the second gear portion.

[Structure NC16]

A photosensitive member unit according to Structure NC14, wherein the projecting shape of the second gear portion is a projection having a polygonal cross-section and projecting in the radial direction with respect to the rotational axis of the second gear portion.

[Structure NC17]

A photosensitive member unit according to any one of Structures NC1-NC14, wherein the second gear portion includes a helical gear tooth, and a twisting direction of the tooth of the a helical gear is the same as a twisting direction of the tooth of the first gear portion.

[Structure NC18]

A photosensitive member unit according to Structure NC17, wherein a helix angle of the tooth of the of the second gear portion is not less than 20° and not more than 40°.

[Structure NC19]

A photosensitive member unit according to Structure NC17, wherein a helix angle of the tooth of the of the second gear portion is not less than 25° and not more than 35°.

[Structure NC20]

A photosensitive member unit according to Structure NC17, wherein the tooth of the helical gear of the second gear portion is constituted by a plurality of second projections provided separately in the direction of the rotational axis of the photosensitive member or a rotational moving direction of the second gear portion.

[Structure NC21]

A photosensitive member unit according to any one of Structures NC1-NC20, wherein the first gear portion includes a number of such teeth, and the second gear portion includes the same number of such teeth.

[Structure NC22]

A photosensitive member unit according to any one of Structures NC1-NC21, further comprising an elastic member covering the first gear portion and/or the second gear portion.

[Structure NC23]

A photosensitive member unit according to any one of Structures NC1-NC22, wherein while the first gear portion and the second gear portion are rotating in predetermined directions, the tooth of the second gear portion Is fixed so as not to rotate relative to the tooth of the first gear portion in a direction opposite to the predetermined direction.

[Structure NC24]

A photosensitive member unit according to any one of Structures NC1-NC23, wherein the first gear portion is capable of transmitting a driving force to the second gear portion.

[Structure NC25]

A photosensitive member unit according to any one of Structures NC1-NC24, wherein the first gear portion and the second gear portion are rotatable coaxially.

[Structure NC26]

A photosensitive member unit according to Structure NC25, wherein the rotational axis of the first gear portion and the rotational axis of the second gear portion are coaxial with rotational axis of the photosensitive member.

[Structure NC27]

A photosensitive member unit according to Structure NC25 or NC26, wherein the first gear portion and the second gear portion are integrally molded.

A photosensitive member unit according to Structure NC27, wherein the first gear portion and the second gear portion are integrally resin-molded.

[Structure NC29]

A photosensitive member unit according to any one of Structures NC25-NC28, wherein a diameter of an addendum circle of the second gear portion is larger than 0.8 times a diameter of a dedendum circle or a diameter of the addendum circle of the first gear portion, and is smaller than 1.1 times a diameter of an addendum circle of the first gear portion.

[Structure NC30]

A photosensitive member unit according to Structure NC29, wherein a diameter of an addendum circle of the second helical gear portion is larger than 0.9 times the diameter of the addendum circle.

[Structure NC31]

A photosensitive member unit according to any one of Structures NC1-NC23, wherein the first gear portion is connected with the second gear portion so as to be capable of transmitting a driving force.

[Structure NC32]

A photosensitive member unit according to Structure NC31, wherein the first gear portion is connected with the second gear portion with a play in the rotational direction.

[Structure NC33]

A photosensitive member unit according to any one of Structures NC1-NC24, wherein the first gear portion is connected with the photosensitive member so as to be capable of transmitting a rotational driving force thereto.

[Structure NC34]

A photosensitive member unit according to any one of Structures NC1-NC24, further comprising a flange Mounted to an end portion of the photosensitive member in the direction of the rotational axis of the photosensitive member, and the first gear portion and the second gear portion are provided on the flange.

[Structure NC35]

A photosensitive member unit according to any one of Structures NC1-NC34, further comprising a third gear portion connected with the photosensitive member so as to be capable of transmitting a driving force thereto.

<<Structure NCX>>

[Structure NCX1]

A photosensitive member unit detachably mountable to a main assembly of an image forming apparatus, the cartridge comprising:

a rotatable member rotatable about a rotational axis thereof;

a frame rotatably supporting the rotatable member;

a first gear portion as a helical gear portion; and a second gear portion including a plurality of teeth, wherein with respect to the rotational direction of the rotatable member, the second gear portion disposed between the first gear portion and the rotatable member, wherein a gap provided between the first gear portion and the second gear portion, with respect to the direction of the rotational axis of the rotatable member, wherein with respect to the direction of the rotational axis of the rotatable member, a tooth width Wc of the first gear portion and a width We of the gap satisfy, $$Wc > We \geq Wc/5.$$

<Structures Incorporatable in Structure NCX1 (Dependent Structure)>

The elements of the above-described Structures NC1-NC35 are incorporatable in Structure NCX1.

<<Structure ND>>

[Structure ND1]

A cartridge detachably mountable to a main assembly of an image forming apparatus, the cartridge comprising:

a photosensitive member rotatable about a rotational axis thereof;

a frame rotatably supporting the photosensitive member;

a first gear portion as a helical gear portion;

a second gear portion including a plurality of teeth, a memory substrate supported by the frame; and an electrode portion electrically connected with the memory substrate, wherein with respect to the rotational axis of the photosensitive member, the second gear portion disposed between the first gear portion and the photosensitive member, and a gap is provided between the first gear portion and the second gear portion, and wherein with respect to the rotational axis of the photosensitive member, the first gear portion and the second gear portion are provided at a first end portion of the frame, and the electrode portion is provided at a second end portion of the frame which is opposite from the first end portion of the frame.

[Structure ND2]

A cartridge according to Structure ND1, further comprising a developing roller for carrying a developer to be deposited on the photosensitive member, wherein the electrode portion is disposed downstream of the rotational axis in a direction which is perpendicular to the rotational axis and which is from a rotational center of the developing roller toward the rotational axis of the photosensitive member.

[Structure ND3]

A cartridge according to Structure ND2, wherein the electrode portion is disposed downstream of the photosensitive member in a direction which is perpendicular to the rotational axis and which is from a rotational center of the developing roller toward the rotational axis of the photosensitive member.

[Structure ND4]

A cartridge according to any one of Structures ND1-ND3, wherein wherein the frame is provided with a first bearing member provided at the first end portion of the frame, and a second bearing member provided at the second end portion of the frame, and is provided with a projected portion projecting downstream beyond the first bearing member in a direction which is perpendicular to the rotational axis and which is from the rotation axis of the developing roller toward the rotational axis of the photosensitive member, and wherein the electrode portion is provided on the projected portion.

[Structure ND5]

A cartridge according to any one of Structures ND1-ND3, wherein wherein the frame is provided with a first bearing member provided at the first end portion of the frame, and a second bearing member provided at the second end portion of the frame, and is provided with a projected portion projecting downstream beyond the photosensitive member in a direction which is perpendicular to the rotational axis and which is from the rotation axis of the developing roller toward the rotational axis of the photosensitive member, and wherein the electrode portion is provided on the projected portion.

[Structure ND6]

A cartridge according to any one of Structures ND1-ND5, wherein the photosensitive member has a first end portion closer to the frame first end portion than to the frame second end portion and a second end portion opposite from the first end portion in the direction of the rotational axis of the photosensitive member, and a region in which the electrode portion is provided includes a position of the second end portion of the photosensitive member with respect to the direction of the rotational axis.

[Structure ND7]

A cartridge according to any one of Structures ND1-ND5, wherein the photosensitive member has a first end portion closer to the frame first end portion than to the frame second end portion and a second end portion opposite from the first end portion in the direction of the rotational axis of the photosensitive member, and a region in which the electrode portion is provided at a position closer to an outside of the frame than a position of the second end portion of the photosensitive member.

[Structure ND8]

A cartridge according to Structure ND6 or ND7, further comprising a flange member mounted to the second end portion of the photosensitive member, wherein a region in which the electrode portion is provided and a region in which the flange member is provided overlap at least partly, with respect to the direction of the rotational axis.

[Structure ND9]

A cartridge according to Structure ND7, wherein a flange member mounted to the second end portion of the photosensitive member, a region in which the electrode portion is provided at a position closer to an outside of the frame than a region in which the flange member is provided.

<Structures Incorporatable in Structure NAX1 (Dependent Structure)>

The elements of the above-described Structures NC1-NC35 are incorporatable in Structure ND.

[Structure NE1]

A cartridge detachably mountable to a main assembly of an image forming apparatus, the cartridge comprising:

a photosensitive member unit including a photosensitive member rotatable about a rotational axis thereof, a first gear portion having a plurality of teeth, and a second gear portion having a plurality of teeth;

a frame having a frame first end portion and a frame second end portion opposite from the frame first end portion, with respect to the rotational axis of the photosensitive member;

a developing roller for carrying a developer to be deposited on the photosensitive member; and a memory substrate including an electrode portion, wherein with respect to the rotational axis of the photosensitive member, the first gear portion is disposed at a position closer to the first end portion of the frame than to the second end portion of the frame, the second gear portion is disposed between the first gear portion and the photosensitive member, and a gap is provided between the first gear portion and the second gear portion, wherein the frame is provided with a first bearing member provided at the first end portion of the frame, and a second bearing member provided at the second end portion of the frame, wherein the first bearing member is provided with a projection which projects in a direction of the rotational axis of the photosensitive member and which is provided with a hole portion inside thereof, and the first bearing member rotatably supports the rotatably by an inner peripheral surface of the hole portion, and wherein the second bearing member rotatably supports the photosensitive member unit, and supports the memory substrate.

<Structures Incorporatable in Structure NF (Dependent Structure)>

The elements of the above-described Structures NC1-9 are incorporatable in Structure ND.

[Structure NF1]

A cartridge detachably mountable to a main assembly of an image forming apparatus, the cartridge comprising:

a photosensitive member unit including a photosensitive member rotatable about a rotational axis thereof, a first gear portion having a plurality of teeth, and a second gear portion having a plurality of teeth;

a frame having a first end portion of the frame and a second end portion of the frame opposite from the first end portion, with respect to the rotational axis of the photosensitive member; and a developing roller for carrying a developer to be deposited on the photosensitive member, wherein with respect to the rotational axis of the photosensitive member, the first gear portion is disposed at a position closer to the frame first end portion than to the frame second end portion, the second gear portion is disposed between the first gear portion and the photosensitive member, and a gap is provided between the first gear portion and the second gear portion, wherein the frame is provided with a first bearing member at the frame first end portion, wherein the first bearing member is provided with a projection projecting in a direction of the rotational axis of the photosensitive member, and a supporting portion provided on an inner peripheral surface of a hole portion formed the inside of the projection and rotatably supporting the photosensitive member unit, and wherein the projection is elongated along a direction perpendicular to the rotational axis and parallel with a line connecting a rotation axis of the developing roller and the rotational axis of the photosensitive member.

<Structures Incorporatable in Structure NF (Dependent Structure)>

The elements of the above-described Structures NC1-NC35 or Structures ND1-9 is incorporatable in Structure NF.

INDUSTRIAL APPLICABILITY

The present invention provides a photosensitive member unit and a cartridge which can be mounted to and dismounted from an image forming apparatus including a main assembly side gear portion and which includes a unit side gear portion, and provides an electrophotographic image forming apparatus.

The present invention is not limited to the above embodiments, and various modifications can be made without departing from the spirit and scope of the present invention. Therefore, the following Claims are attached in order to publicize the scope of the present invention.

This application Claims priority on the basis of Japanese Patent Application No. 2020-145892 filed on Aug. 31, 2020, and all the contents thereof are incorporated herein by reference.

The invention claimed is:

1. A photosensitive member unit detachably mountable to a main assembly of an image forming apparatus, the photosensitive member unit comprising:

a photosensitive member rotatable about a rotational axis thereof;

a rotatable first helical gear portion; and a second helical gear portion integrally rotatable with the first helical gear portion, the second helical gear portion being provided between the photosensitive member and the first helical gear portion in a direction of the rotational axis of the photosensitive member, wherein a twisting direction of a tooth of the second helical gear portion is the same as a twisting direction of a tooth of the first helical gear portion, and a helix angle of the tooth of the second helical gear portion is greater than a helix angle of the tooth of the first helical gear portion.

2. A photosensitive member unit according to claim 1, wherein with respect to the rotational axis of the photosensitive member, a gap is formed between the first helical gear portion and the second helical gear portion.

3. A photosensitive member unit according to claim 2, further comprising an intermediary member provided between the first helical gear portion and the second helical gear portion with respect to the rotational axis of the photosensitive member, the intermediary member being capable of filling the gap.

4. A photosensitive member unit according to claim 3, wherein the intermediary member is movable between a position for providing the gap and a position for filling the gap, by rotation thereof.

5. A photosensitive member unit according to claim 3, wherein the intermediary member is movable between a position for providing the gap and a position for filling the gap, by movement thereof in a direction perpendicular to the rotational axis of the photosensitive member.

6. A photosensitive member unit according to claim 3, wherein the intermediary member is made of an elastic member and is capable of taking a position for providing the gap and a position for filling the gap, by elastic deformation thereof, with respect to the rotational axis of the photosensitive member, a tooth width Wc of the first helical gear portion and a width We of the gap satisfy:

$$Wc>We\geq Wc/5.$$

7. A photosensitive member unit according to claim 2, wherein with respect to the rotational axis of the photosensitive member, a tooth width Wc of the first helical gear portion and a width We a gap satisfy: $Wc>We\geq Wc/5$.

8. A photosensitive member unit according to claim 7, wherein with respect to the rotational axis of the photosensitive member, the width We and a tooth width Wd of the second helical gear portion satisfy:

$$Wd>We.$$

9. A photosensitive member unit according to claim 1, wherein the first helical gear portion and the second helical gear portion each have at least one tooth having a width satisfying:

$$Wc>Wd,$$

where Wc is a tooth width of the first helical gear portion, and Wd is a tooth width of the second helical gear portion, measured in the direction of the rotational axis of the photosensitive member.

10. A photosensitive member unit according to claim 9, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy:

$$Wd1\leq(4/5)\cdot Wc1.$$

11. A photosensitive member unit according to claim 9, wherein a tooth width Wc1 of the tooth of the first helical gear portion that has a largest tooth width measured in the direction of the rotational axis of the photosensitive member and a tooth width Wd1 of the tooth of the second helical gear portion that has a largest tooth width measured in the direction of the rotational axis of the photosensitive member satisfy:

$$Wd1\leq(3/4)\cdot Wc1.$$

12. A photosensitive member unit according to claim 11, wherein the tooth width Wc1 satisfy:

$$Wd1\geq(1/10)\cdot Wc1.$$

13. A photosensitive member unit according to claim 1, wherein the helix angle of the tooth of the first helical gear portion is not less than 15° and not more than 40°.

14. A photosensitive member unit according to claim 1, wherein the helix angle of the tooth of the first helical gear portion is not less than 20° and not more than 35°.

15. A photosensitive member unit according to claim 1, wherein he helix angle of the tooth of the second helical gear portion is not less than 20° and not more than 40°.

16. A photosensitive member unit according to claim 1, wherein the helix angle of the tooth of the second helical gear portion is not less than 25° and not more than 35°.

17. A photosensitive member unit according to claim 1, wherein the first helical gear portion includes a plurality of such teeth, at least one of which is constituted by a plurality of first projections provided separately in the direction of the rotational axis of the photosensitive member or in a rotational movement direction of the first helical gear portion.

18. A photosensitive member unit according to claim 1, wherein the second helical gear portion includes a plurality of such teeth, at least one of which is constituted by a plurality of second projections provided separately in the direction of the rotational axis of the photosensitive member or in a rotational movement direction of the second helical gear portion.

19. A photosensitive member unit according to claim 1, wherein the first helical gear portion and the second helical gear portion include the same number of teeth.

20. A photosensitive member unit according to claim 1, wherein the first helical gear portion includes a tooth missing part.

21. A photosensitive member unit according to claim 1, wherein the second helical gear portion includes a tooth missing part.

22. A photosensitive member unit according to claim 1, wherein a projecting direction of the first helical gear portion and a projecting direction of the second helical gear portion include respective components parallel with the rotational axis of the photosensitive member.

23. A photosensitive member unit according to claim 1, further comprising an elastic member covering the first helical gear portion and/or the second helical gear portion.

24. A photosensitive member unit according to claim 1, wherein while the first helical gear portion and the second helical gear portion are rotated in a predetermined direction, the first helical gear portion and the second helical gear portion are in a state that the tooth of the second helical gear portion is fixed so as not to be rotated in a direction opposite to the predetermined direction relative to the first helical gear portion.

25. A photosensitive member unit according to claim 1, wherein the first helical gear portion is capable of transmitting a driving force to the second helical gear portion.

26. A photosensitive member unit according to claim 1, wherein the first helical gear portion and the second helical gear portion are rotatable coaxially with each other.

27. A photosensitive member unit according to claim 26, wherein a rotational axis of the first helical gear portion and a rotational axis of the second helical gear portion is coaxial with the rotational axis of the photosensitive member.

28. A photosensitive member unit according to claim 26, wherein the first helical gear portion and the second helical gear portion are integrally molded.

29. A photosensitive member unit according to claim 28, wherein the first helical gear portion and the second helical gear portion are integrally resin-molded.

30. A photosensitive member unit according to claim 26, wherein a diameter of an addendum circle of the second helical gear portion is greater than a diameter of a dedendum circle of the first helical gear portion or 0.8 times the diameter of the addendum circle of the first helical gear portion, and less than 1.1 times the diameter of the addendum circle of the first helical gear portion.

31. A photosensitive member unit according to claim 30, wherein the diameter of the addendum circle of the second helical gear portion is greater than 0.9 times the diameter of the addendum circle of the first helical gear portion.

32. A photosensitive member unit according to claim 1, wherein a rotational axis of the first helical gear portion and a rotational axis of the second helical gear portion are not coaxial with each other.

33. A photosensitive member unit according to claim 32, wherein the rotational axis of the first helical gear portion or the rotational axis of the second helical gear portion is coaxial with the rotational axis of the photosensitive member.

34. A photosensitive member unit according to claim 32, wherein the rotational axis of the first helical gear portion and the rotational axis of the second helical gear portion are parallel to each other.

35. A photosensitive member unit according to claim 1, wherein the first helical gear portion, the second helical gear portion, or the first helical gear portion and the second helical gear portion are provided on a belt-like member.

36. A photosensitive member unit according to claim 1, wherein the first helical gear portion is connected with the second helical gear portion so as to be capable of transmitting a driving force.

37. A photosensitive member unit according to claim 36, wherein the first helical gear portion is connected with the second helical gear portion with play in a rotational movement direction of the first helical gear portion.

38. A photosensitive member unit according to claim 36, wherein the first helical gear portion is capable of being in a connected state of being connected with the second helical gear portion to transit the driving force thereto and in a disconnected state of being incapable of transmitting the driving force to the second helical gear portion.

39. A photosensitive member unit according to claim 1, wherein the first helical gear portion is connected with the photosensitive member so as to be capable of transmitting a rotational force.

40. A photosensitive member unit according to claim 1, further comprising a flange mounted to an end of the photosensitive member in the direction of the rotational axis of the photosensitive member, wherein the first helical gear portion and the second helical gear portion are provided on the flange.

41. A photosensitive member unit according to claim 1, further comprising a third gear portion connected so as to be capable of transmitting a driving force to the photosensitive member.

* * * * *